US008567251B2

(12) United States Patent
Welle et al.

(10) Patent No.: US 8,567,251 B2
(45) Date of Patent: Oct. 29, 2013

(54) DETAILFUNCTION BASED MEASUREMENT

(75) Inventors: Roland Welle, Oberwolfach (DE); Karl Griessbaum, Muehlenbach (DE)

(73) Assignee: Vega Grieshaber KG, Wolfach (DE)

( * ) Notice: Subject to any disclaimer, the term of this patent is extended or adjusted under 35 U.S.C. 154(b) by 649 days.

(21) Appl. No.: 12/678,649

(22) PCT Filed: Sep. 22, 2008

(86) PCT No.: PCT/EP2008/008000
§ 371 (c)(1),
(2), (4) Date: Jul. 8, 2010

(87) PCT Pub. No.: WO2009/037000
PCT Pub. Date: Mar. 26, 2009

(65) Prior Publication Data
US 2010/0307251 A1  Dec. 9, 2010

Related U.S. Application Data

(60) Provisional application No. 60/973,914, filed on Sep. 20, 2007.

(51) Int. Cl.
*G01N 29/48* (2006.01)
*G01N 29/44* (2006.01)

(52) U.S. Cl.
USPC .......................................................... 73/602

(58) Field of Classification Search
USPC .......................................................... 73/602
See application file for complete search history.

(56) References Cited

U.S. PATENT DOCUMENTS

| | | | |
|---|---|---|---|
| 5,157,639 | A | 10/1992 | Leszczynski |
| 5,781,144 | A | 7/1998 | Hwa |
| 5,956,663 | A | 9/1999 | Eryurek |
| 5,969,666 | A | 10/1999 | Burger et al. |
| 6,097,669 | A | 8/2000 | Jordan et al. |
| 6,415,660 | B1 | 7/2002 | Sinz et al. |

(Continued)

FOREIGN PATENT DOCUMENTS

| | | |
|---|---|---|
| DE | 4 234 300 | 4/1994 |
| DE | 10 2005 063 079 | 7/2007 |

(Continued)

OTHER PUBLICATIONS

Misiti et al., "Wavelet Toolbox 4 User's Guide", The Mathworks Inc., 2007, pp. 1-7 to 1-37.

(Continued)

*Primary Examiner* — Peter Macchiarolo
*Assistant Examiner* — Rose M Miller
(74) *Attorney, Agent, or Firm* — Fay Kaplun & Marcin, LLP

(57) ABSTRACT

A method and device for selecting echoes from an echo list. The method includes receiving an echo list, the echo list including a plurality of current echoes, at least two current echoes of the plurality of current echoes including a relationship correlation. The method also includes weighting at least one assignment of at least one current echo of the plurality of current echoes of at least one past echo of at least one past echo function. The method also includes selecting an assignment of at least one current echo to the at least one past echo of the at least one past echo function such that a predeterminable selection criterion is fulfilled. The selection of the assignment takes into account the relationship correlation between the at least two current echoes of the plurality of current echoes.

13 Claims, 52 Drawing Sheets

(56) References Cited

U.S. PATENT DOCUMENTS

| | | |
|---|---|---|
| 7,038,617 B1 | 5/2006 | Ferrante |
| 7,054,227 B2 | 5/2006 | Daigle |
| 2005/0066731 A1 | 3/2005 | Wall |
| 2007/0165488 A1 | 7/2007 | Wildey |

FOREIGN PATENT DOCUMENTS

| | | |
|---|---|---|
| EP | 0 882 956 | 5/1998 |
| RU | 2 159 923 | 11/2000 |
| RU | 2 282 196 | 2/2005 |
| WO | 01/75474 | 10/2001 |
| WO | 02/090995 | 11/2002 |
| WO | 2007/077079 | 7/2007 |

OTHER PUBLICATIONS

Tammana et al., "Synthetic aperture radar raw data compression using wavelet packet transform and trellis coded quantization", Circuits and Systems, Aug. 7-10, 2005, XP 010893915, pp. 1705-1708.

Elsehely et al.; "Radar Target Detection using Multiscale Wavelet Transform"; European Microwave Conference; 1999; 19991001 IEEE; Piscataway, NJ, USA; pp. 169-172.

Xia et al., "Detection of Laser Radar Target Based on Wavelet Decomposition", Signal Processing, 8th International Conference; 2006, XP 031059252, 4 sheets.

Marcianesi et al., "A new wavelet-based algorithm for filtering low SRN signals", Neural Networks for Signal Processing XI, 2001, XP 010555174, pp. 549-558.

Ohsumi et al., "Online Detection of Pulse Sequence in Random Noise Using a Wavelet", IEEE Transactions on Signal, New York, NY, Sep. 1999, vol. 47, No. 9, XP 011058701, pp. 2526-2531.

Jähne, "Digital Image Processing", 5th edition, Springer Verlag, 2002., 598 sheets, pp. v-585.

Jähne, "Digital Image Processing", 6th edition revised and extended edition, Springer Verlag, 2002, 16 sheets, pp. 67-80.

Kroschel, "Statistische Informationstechnik", 4th edition, Springer Verlag, 2004, 16 sheets, pp. 31-36.

Blackman, "Multiple-Target Tracking with Radar Applications", Artech House, 1986, 11 sheets, pp. 1-17.

Bäni, "Wavelets—Eine Einführung für Ingenieure", Oldenburg Verlag, 2002, 15 sheets, pp. 220-226.

*Bi-orthogonal wavelets*

*Coiflets [4]*

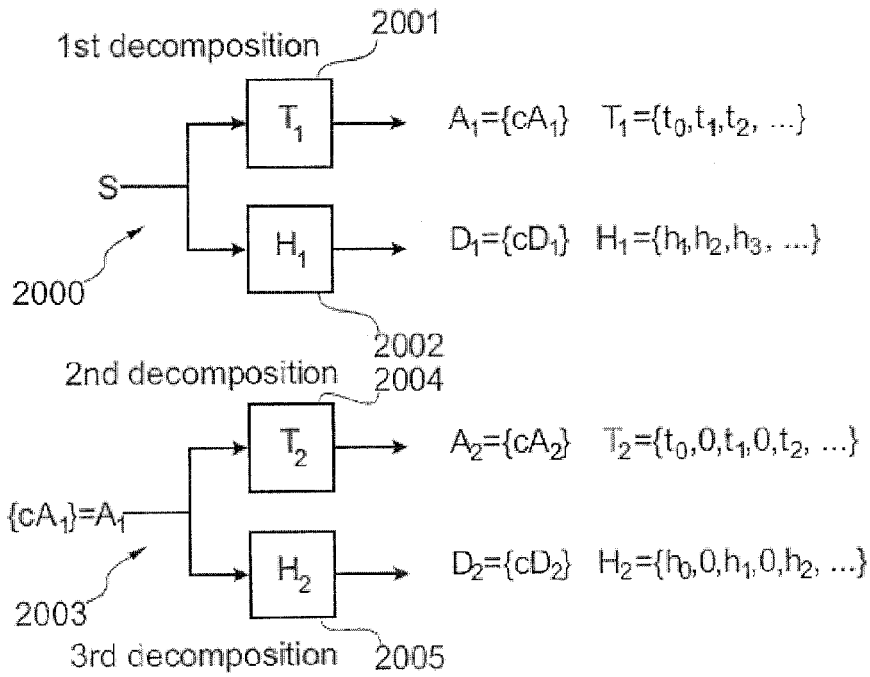
Fig. 20
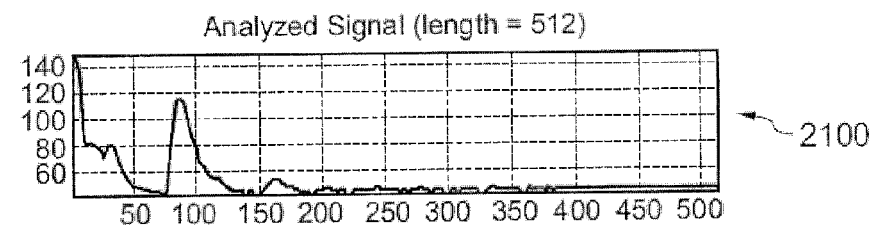
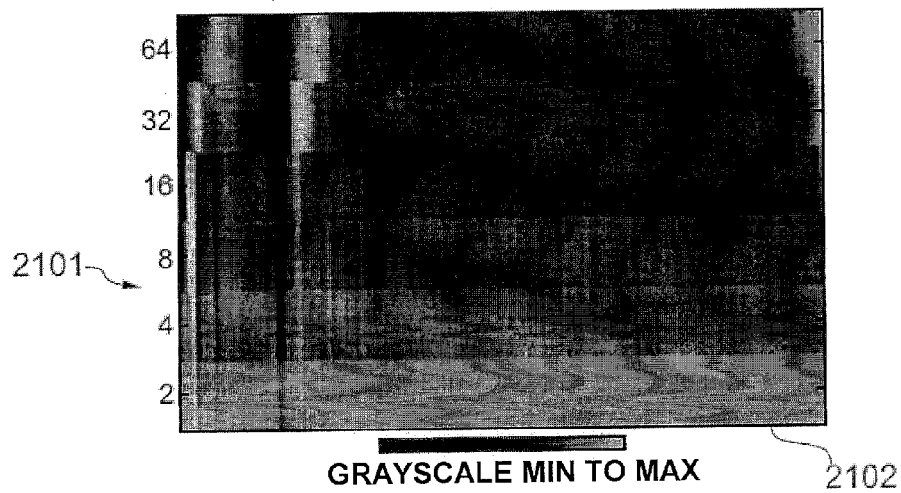
Fig. 21

| Echo -ID | Detail plane | Start region / cm min | max | Location / cm | End region / cm min | max |
|---|---|---|---|---|---|---|
| $e_1$ | D6 | 64 | 128 | 128 | 256 | 320 |
| $e_2$ | ⎫ D5 | 64 | 96 | 96 | 160 | 192 |
| $e_3$ | ⎭ | 192 | 224 | 288 | 288 | 320 |
| $e_4$ | | 64 | 80 | 96 | 128 | 144 |
| $e_5$ | | 144 | 160 | 160 | 146 | 192 |
| $e_6$ | | 192 | 208 | 208 | 208 | 224 |
| $e_7$ | ⎬ D4 | 224 | 240 | 240 | 256 | 272 |
| $e_8$ | | 272 | 288 | 288 | 288 | 304 |
| $e_9$ | | 304 | 320 | 336 | 368 | 384 |
| $e_{10}$ | ⎫ | 24 | 32 | 32 | 64 | 72 |
| $e_{11}$ | | 72 | 80 | 88 | 128 | 136 |
| $e_{12}$ | | 136 | 144 | 144 | 144 | 152 |
| $e_{13}$ | | 152 | 160 | 160 | 184 | 192 |
| $e_{14}$ | | 192 | 200 | 208 | 216 | 224 |
| $e_{15}$ | ⎬ D3 | 224 | 232 | 256 | 264 | 272 |
| $e_{16}$ | | 272 | 280 | 280 | 280 | 288 |
| $e_{17}$ | | 288 | 296 | 304 | 320 | 328 |
| $e_{18}$ | | 328 | 336 | 336 | 352 | 360 |
| $e_{19}$ | ⎭ | 360 | 368 | 368 | 376 | 384 |

⇓ Remove redundancy echoes      4100
                                4101

| Echo -ID | Detail plane | | | | | |
|---|---|---|---|---|---|---|
| $e_1$ | D6 | | | | | |
| $e_2$ | ⎬ D5 | | | | | |
| $e_3$ | | | | | | |
| $e_5$ | ⎬ D4 | | | | | |
| $e_9$ | | | | | | |
| $e_{10}$ | D3 | ---- | ---- | ---- | ---- | ---- |
| $e_{11}$ | D3,D4 | | | | | |
| $e_{12}$ | D3 | | | | | |
| $e_{13}$ | D3 | As above | | | | |
| $e_{14}$ | D3,D4 | | | | | |
| $e_{15}$ | D3,D4 | | | | | |
| $e_{16}$ | D3,D4 | | | | | |
| $e_{17}$ | D3 | | | | | |
| $e_{18}$ | D3 | | | | | |
| $e_{19}$ | D3 | | | | | |

Fig. 41

| ID | Start in m | Location in m | End in m | Ampl. in dB | Frontflank height/ Frontedge height in dB |
|---|---|---|---|---|---|
| $e_1$ | 7 | 6,8 | 7,6 | 58 | 12 |
| ~~$e_2$~~ | ~~7,61~~ | ~~8~~ | ~~10~~ | ~~65~~ | ~~22~~ |
| ~~$e_3$~~ | ~~10,1~~ | ~~10,5~~ | ~~12,5~~ | ~~65~~ | ~~3~~ |
| $e_4$ | 17 | 18 | 19 | 75 | 35 |
| $e_5$ | 19,1 | 20 | 22,5 | (82) | 21 |
| $e_6$ | 22,6 | 24 | 27,5 | 80 | 6 |
| $e_8$ | 7,6 | 10,5 | 12,5 | 64 | 18 |
| ~~$e_{12}$~~ | ~~6,7~~ | ~~10~~ | ~~16,5~~ | ~~45~~ | ~~11~~ |
| ~~$e_{13}$~~ | ~~16,6~~ | ~~21~~ | ~~23~~ | ~~63~~ | ~~29~~ |
| ~~$e_{16}$~~ | ~~17~~ | ~~23~~ | ~~31~~ | ~~57~~ | ~~24~~ |
| ~~$e_{17}$~~ | ~~9~~ | ~~21~~ | ~~32~~ | ~~55~~ | ~~12~~ |

Fig. 52

| ID | Start in m | Location in m | End in m | Ampl. in dB | Frontflank height/ Frontedge height in dB |
|---|---|---|---|---|---|
| $e_1$ | 6 | 6,8 | 7,6 | 58 | 12 |
| $e_4$ | 17 | 18 | 19 | 75 | 35 |
| $e_5$ | 19,1 | 20 | 22,5 | 82 | 21 |
| $e_6$ | 22,6 | 24 | 27,5 | 80 | 6 |
| $e_8$ | 7,6 | 10,5 | 12,5 | 64 | 18 |

Fig. 53

| | $e_1$ | $e_2$ | $e_3$ | $e_4$ | $e_5$ | $e_6$ | $e_8$ | $e_{12}$ | $e_{13}$ | $e_{16}$ | $e_{17}$ |
|---|---|---|---|---|---|---|---|---|---|---|---|
| $T_1$ | 7 | 6 | 6 | 12 | 15 | 21 | 3 | 10 | 15 | 22 | 28 |
| $T_2$ | 22 | 17 | 16 | 8 | 9 | 10 | 14 | 13 | 4 | 3 | 21 |
| $T_3$ | 29 | 21 | 19 | 8 | 8 | 7 | 17 | 16 | 4 | 4 | 18 |

Fig. 59A (S6605):

| | $e_1$ | $e_2$ | $e_3$ | $e_4$ | $e_5$ | $e_6$ | $e_8$ | $e_{12}$ | $e_{13}$ | $e_{16}$ | $e_{17}$ |
|---|---|---|---|---|---|---|---|---|---|---|---|
| $T_1$ | 1 | 0' | 0 | 6 | 9 | 15 | 0* | - | 12 | - | - |
| $T_2$ | 16 | 11 | 10 | 6 | 9 | 15 | 11 | - | (1) | - | - |
| $T_3$ | 22 | 14 | 12 | 1 | 1 | 0' | 13 | - | 0* | - | - |

(S6607):

| | $e_1$ | $e_2$ | $e_3$ | $e_4$ | $e_5$ | $e_6$ | $e_8$ | $e_{12}$ | $e_{13}$ | $e_{16}$ | $e_{17}$ |
|---|---|---|---|---|---|---|---|---|---|---|---|
| $T_1$ | 1 | 0' | 0 | 6 | 9 | 15 | 0* | - | 12 | - | - |
| $T_2$ | 15 | 10 | 9 | 1 | 2 | 3 | 10 | - | 0 | - | - |
| $T_3$ | 22 | 14 | 12 | 1 | 1 | 0' | 13 | - | 0* | - | - |

(S6605):

| | $e_1$ | $e_2$ | $e_3$ | $e_4$ | $e_5$ | $e_6$ | $e_8$ | $e_{12}$ | $e_{13}$ | $e_{16}$ | $e_{17}$ |
|---|---|---|---|---|---|---|---|---|---|---|---|
| $T_1$ | 1 | 0' | 0 | 6 | 9 | 15 | 0* | - | 12 | - | - |
| $T_2$ | 15 | 10 | 9 | 1 | 2 | 3 | 10 | - | 0' | - | - |
| $T_3$ | 22 | 14 | 12 | 1 | 1 | 0' | 13 | - | 0* | - | - |

(S6606):

| | $e_1$ | $e_2$ | $e_3$ | $e_4$ | $e_5$ | $e_6$ | $e_8$ | $e_{12}$ | $e_{13}$ | $e_{16}$ | $e_{17}$ |
|---|---|---|---|---|---|---|---|---|---|---|---|
| $T_1$ | 1 | 0' | 0 | 6 | 9 | 15 | 0* | - | 12 | - | - |
| $T_2$ | 15 | 10 | 9 | 1 | 2 | 3 | 10 | - | 0' | - | - |
| $T_3$ | 22 | 14 | 12 | 1 | 1 | 0' | 13 | - | 0* | - | - |

(S6604):

| | $e_1$ | $e_2$ | $e_3$ | $e_4$ | $e_5$ | $e_6$ | $e_8$ | $e_{12}$ | $e_{13}$ | $e_{16}$ | $e_{17}$ |
|---|---|---|---|---|---|---|---|---|---|---|---|
| $T_1$ | 1 | 0 | 0 | 6 | 9 | 15 | 0* | - | 12 | - | - |
| $T_2$ | 15 | 10 | 9 | 1 | 2 | 3 | 10 | - | 0* | - | - |
| $T_3$ | 22 | 14 | 12 | 1 | 1 | 0* | 13 | - | 0 | - | - |

(S6608): Resulting assignment proposal  
$T_1 \rightarrow e_8$  
$T_2 \rightarrow e_{13}$  
$T_3 \rightarrow e_6$

DETAILFUNCTION BASED MEASUREMENT

REFERENCE TO RELATED APPLICATIONS

This application claims the benefit of the filing date of U.S. Provisional Patent Application No. 60/973,914 filed Sep. 20, 2007. The disclosure of which is hereby incorporated herein by reference.

TECHNICAL FIELD

The present invention relates to the field of measuring technology. In particular, the present invention relates to a compression method for compressing an echo function, to a reconstruction method for reconstructing an echo function, to a computer-readable storage medium in which a program for compressing an echo function is stored, to a program element for compressing an echo function, to a computer-readable storage medium in which a program for reconstructing an echo function is stored, as well as to a program element for reconstructing an echo function, to a compression device, to a reconstruction device and to a measuring device comprising a compression device, and to a measuring device comprising a reconstruction device.

Furthermore, in particular, the present invention relates to an echo extraction method for extracting an echo from an echo function, to a computer-readable storage medium in which a program for extracting an echo from an echo function is stored, to a program element for extracting an echo from an echo function, to an echo extraction device for extracting an echo from an echo function, and to a measuring device comprising an extraction device.

Furthermore, in particular, the present invention relates to a method for finding an echo in an echo function, to a computer-readable storage medium in which a program for finding an echo in an echo function is stored, to a program element for finding an echo in an echo function, to a device for finding an echo in an echo function, and to a measuring device comprising a device for finding an echo in an echo function.

Furthermore, in particular, the present invention relates to a method for providing a plurality of echoes from an echo function, to a computer-readable storage medium in which a program for providing a plurality of echoes from an echo function is stored, to a program element for providing a plurality of echoes from an echo function, to a device for providing a plurality of echoes from an echo function, and to a measuring device comprising a device for providing a plurality of echoes from an echo function.

Furthermore, in particular, the present invention relates to a method for selecting echoes from an echo list, to a computer-readable storage medium in which a program for selecting echoes from an echo list is stored, to a program element for selecting echoes from an echo list, to a device for selecting echoes from an echo list, and to a measuring device comprising a device for selecting an echo from an echo list.

Furthermore, in particular, the present invention relates to a method for fill level measuring, to a computer-readable storage medium in which a program for fill level measuring is stored, to a program element for fill level measuring, and to a fill-level measuring device.

TECHNOLOGICAL BACKGROUND

Echo signals from the field of fill-level measuring technology can differ from signals from other fields of application of echo-processing sensors. Apart from the generally unfavourable signal-to-noise ratios, deformation of echoes as a result of application influences, and the presence of false echoes play a role. An echo curve as recorded by a fill-level measuring device can comprise reflected signal components that overlap, or interfere with, the actual valid echo which is generated by reflection, for example on a smooth fill-level surface. Even within the antenna of a fill-level measuring device, reflected signal components can arise. The effect that a false echo is caused by the own antenna is known as antenna ringing.

In real filling good containers one or several locations of interference may be present. Examples of locations of interference in a filling good container include built-in pipelines, agitators or ladders. Such locations of interference can cause false echoes. If the location of interference does not perpendicularly extend to the direction of propagation of the measuring signal, then by superpositioning of reflections that can arise at many small positions of a location of interference a widened false echo can arise. However, for example during operation, the width of the false echo remains almost constant.

If the filling good container comprises a liquid as the medium to be measured, then an disturbed surface or an unsteady surface can arise, for example by an agitator. For reflection measuring, thereby conditions can result, which conditions are similar to those encountered in measuring bulk solids (bulk materials). By irregularly discharging or filling of the filling good container fluctuations over time can occur. The echo form resulting from this is difficult to predict and can change at any time during operation of the fill-level measuring device.

Furthermore, in particular in the case of bulk solids a deficient signal-to-noise ratio can render echo curve evaluation more difficult. There may be various reasons for the absence of a signal-to-noise ratio (signal-to-noise S/N). On the one hand a large measuring range can cause a small portion of reflected energy at a receiver or however, an inadequate focussing in the case of small antenna diameters can result in a poor signal-to-noise ratio.

Furthermore, it can happen that during operation a false echo is slowly overlapped by an echo caused by a filling good. By constructive or destructive interference of the carrier waves that are used by the fill-level measuring device, pumping of the echo amplitudes in the region of superposition can arise. This can lead to that, for example, temporary two echoes are visible, while a short time later only one single echo, but for example a long echo without amplitude bumps, is visible. This means that the valid echo disappears in the false echo. Furthermore, echo measuring in a fill-level measuring device can be made difficult in that the above-described effects can also occur in combination.

From the document WO 01/75474 a method for differentiating between ultrasound echoes that are reflected by different objects in a tank is known.

From the document U.S. Pat. No. 7,054,227 a method for generating an echo profile is known which comprises transmitting transmission bursts of energy onto a reflective surface, and which method comprises carrying out recursive descent parsing of the echo profile.

From the document U.S. Pat. No. 5,956,663 a process control system having a sensor input, a sensor diagnosis circuit and a wavelet pre-processing circuit is known.

Furthermore, in the document U.S. Pat. No. 6,097,669 a method for wavelet filtering of a sodar signal is described.

Moreover, from US 2005/0066731 a method for generating an echo signal is known, which method comprises transmitting one or several bursts of energy onto a surface, receiving reflected pulses from the surface, converting the reflected pulses to an echo signal that comprises one or several potential echo pulses, applying an entropy filter on the echo signal, and differentiating the echo pulses that have been determined to comprise noise in the echo signal.

Furthermore, wavelets are known from the book Wavelets—Eine Einführung für Ingenieure, Oldenburg Verlag, 2002, Werner Bäni.

Furthermore, from the book Kristian Kroschel, Statistische Informationstechnik, 4th edition, Springer Verlag, 2004, modern methods of signal rerepresentation such as the wavelet transformation are known.

Moreover, from the book Bernd Jähne, Digitale Bildverarbeitung, 6th edition, Springer Verlag, 2005, the fast calculation of unitary transformations is known.

Furthermore, from Michel Misiti et al., Wavelet Toolbox 4 User's Guide, The Mathworks, Inc., 2007, scale aspects of wavelets are known.

Furthermore, from Samuel S. Blackman, Multiple-Target Tracking with Radar Applications, Artech House, 1986, fundamentals of multiple-target tracking are known.

Moreover, from EP 0 882 956 a method for measuring the fill level of a feed material in a container according to the radar principle is known.

Furthermore, from DE 42 34 300 A1 a fill-level measuring method is known, in which repeatedly in a transmission phase at least one pulse is emitted in the direction of the filling good surface to be detected.

Furthermore, U.S. Pat. No. 5,157,639 discloses a detector comprising a transducer, an A/D converter, gate generation means, a storage device, determination means and signal generation means.

Furthermore, from DE 10 2005 063 079 a method for determining and monitoring the fill level of a medium in a container according to a run-time measuring method is known.

When measuring a fill level an echo function or echo curve may arise. For further processing, this echo function is often digitalised with methods of the signal technology, and is presented in digital form. Depending on the selected resolution of the digitalised echo function, a plurality of digital data may arise. This plurality of digital data is, for example, to be transmitted to an evaluation device via a digital bus system, or the plurality of data is to be stored for subsequent further processing.

The echo function can be analysed for echoes by means of an echo extraction method. Due to an unsteady progression a real echo curve may lead to inaccurate results in determining the position of echoes, and consequently misinterpretation in the determination of echoes may occur.

Furthermore, the echo function is often digitalised, for further processing, with methods of signal technology, and is presented in digital form. Due to different reflections the progression of the echo function can be unsteady, in other words jagged. The unsteady progression of the echo function can make it difficult to find an echo in an echo function.

The echo function can comprise echoes from whose position the fill level in a container can be determined. However, the echo function can comprise a function progression that is similar to that of an echo but that has not been caused by a relevant echo. In conventional methods for echo determination from an echo function, such a region, which is difficult to distinguish from a true echo, may result in instances of misinterpretation. Misinterpretation may, however, mean that an echo is detected at a position at which there is no relevant echo. Since the position of the echo is used to determine the fill level, misinterpretation of the position of the echo may lead to an incorrect determination of the fill level.

For further processing of the current echo function, all the current echoes or potential echoes that are contained in the current echo function may be found and provided in an echo list, in particular a multiple echo list. Depending on the algorithm used for finding the current echoes, the multiple echo list may also comprise current echoes that do not correspond to any relevant echo or true echo. During evaluation of the current echoes that are stored in the multiple echo list it may not be possible to unambiguously identify a current echo as a relevant echo. In the interpretation of the current echoes from the echo list, instances of misinterpretation may occur.

The echo function can comprise a plurality of echoes, wherein based on the determination of the position of echoes a statement relating to the height of a fill level in a container is possible. A real threshold value curve may, however, due to undesired reflections comprise an unsteady progression, as a result of which the determination of the position of an echo may turn out to be incorrect, and as a result of which a provided statement relating to the height of a fill level may contain errors.

SUMMARY OF THE INVENTION

There may be a need, to provide a more efficient measuring.

Accordingly, a compression method for compressing an echo function, a reconstruction method, a computer-readable storage medium in which a program for compressing an echo function is stored, a program element for compressing an echo function, a computer-readable storage medium in which a program for reconstructing an echo function is stored, a program element for reconstructing an echo function, a compression apparatus, a reconstruction apparatus and a measuring device comprising a compression apparatus and a measuring device comprising a reconstruction apparatus are provided.

Furthermore, an echo extraction method, a computer-readable medium in which a program for extracting an echo from an echo function is stored, a program element for extracting an echo from an echo function, an echo extraction device, and a measuring device comprising a extraction device are provided.

Furthermore, a method for finding an echo in an echo function, a computer-readable storage medium in which a program for finding an echo in an echo function is stored, a program element for finding an echo in an echo function, a device for finding an echo in an echo function, and a measuring device with a device for finding an echo in an echo function are provided.

Furthermore, a method for providing a plurality of echoes from an echo function, a computer-readable storage medium in which a program for providing a plurality of echoes from an echo function is stored, a program element for providing a plurality of echoes from an echo function, a device for providing a plurality of echoes from an echo function, and a measuring device comprising a device for providing a plurality of echoes from an echo function are provided.

Furthermore, a method for selecting echoes from an echo list, a computer-readable storage medium in which a program for selecting echoes from an echo list is stored, a program element for selecting echoes from an echo list, a device for selecting echoes from an echo list and a measuring device comprising a device for selecting echoes from an echo list are provided.

Furthermore, a method for fill level measuring, a computer-readable storage medium in which a program for fill level measuring is stored, a program element for fill level measuring, and a fill-level measuring device are created.

According to an exemplary embodiment of the present invention, a compression method for compressing an echo function is stated, wherein the method comprises receiving the echo function. Thereby, the echo function comprises at least one echo of an echo measurement or an echo reading. Furthermore, a quality factor for compressing is determined, and the echo function is decomposed into at least one detail function, wherein the at least one detail function comprises a plurality of first coefficients. Each of the at least one detail functions represents a different degree of detail of the echo function.

Depending on the quality factor, at least one of the plurality of first coefficients of the at least one detail function is eliminated, wherein the at least one eliminated coefficient has a predeterminable relation (correlation) with the at least one echo of the echo function.

According to a further exemplary embodiment of the present invention, a reconstruction method for reconstructing an echo function is stated. The reconstruction method comprises receiving a plurality of coefficients and sorting the plurality of coefficients in order to form at least one detail function. Each of the at least one detail functions represents a different degree of detail of the echo function. The degree of detail relates to the form of a base function. For restoring the echo function a reconstruction rule (reconstruction regulation, reconstruction scheme) that depends on the form of the base function is applied, for example an inverse transformation rule (transformation regulation).

Each of the at least one detail functions may be assigned to a scale, and each scale may relate to a form of a base function.

The methods may be used for fill level measuring.

According to a further exemplary embodiment of the present invention, a computer-readable storage medium, for example, a DVD, a CD-ROM, a hard disk, a USB (universal serial bus) storage device or a hard disk is created, in which a program for compressing an echo function is stored.

According to a further exemplary embodiment of the present invention, a program element for compressing an echo function is stated, which program element, when it is executed on a processor, carries out the above-mentioned compression method.

Moreover, a computer-readable storage medium is provided in which a program for reconstructing an echo function is stored, which program, when it is executed on a processor, carries out the reconstruction method.

Furthermore, a program element for reconstructing an echo function is stated, which program element, when it is executed on a processor, carries out the reconstruction method.

According to a further exemplary embodiment of the present invention, a compression apparatus for compressing an echo function is created. The compression apparatus comprises an echo receiving device, a quality factor device, an echo decomposition device and an elimination device. The echo receiving device is adapted for receiving an echo function. The received echo function comprises at least one echo of an echo measurement, and the quality factor device is further adapted for setting a quality factor for compressing.

The echo decomposition device is coupled to the echo receiving device and to the elimination device, wherein the echo decomposition device is adapted for decomposing the echo function into a first detail function, wherein the first detail function comprises a plurality of first coefficients.

Each of the at least one detail functions represent a different degree of detail of the echo function.

The elimination device is adapted for eliminating at least one of the plurality of first coefficients, depending on the quality factor. The at least one eliminated coefficient has a predeterminable relation with the at least one echo of the echo function.

According to a further exemplary embodiment of the present invention, a measuring device is created which comprises a compression device. In particular, the measuring device may be a fill-level measuring device or a field device.

According to yet a further exemplary embodiment of the present invention, a reconstruction device for reconstructing an echo function is created. The reconstruction device comprises a receiving device and an echo-function generating device. The receiving device is connected with the echo-function generating device, and the receiving device is adapted such for receiving a plurality of coefficients. The echo-function generating device is adapted, by sorting the plurality of coefficients, for forming at least one detail function, wherein each of the at least one detail functions represents a different degree of detail of the echo function. The degree of detail relates to a form of a base function, and the echo-function generating device is adapted such, by applying a reconstruction rule that depends on the form of the base function, for restoring the echo function.

Each of the at least one detail functions may be assigned to a scale.

According to a further exemplary embodiment of the present invention, a measuring device is created which comprises the compression apparatus and/or the reconstruction apparatus. In particular, the measuring device may be a fill-level measuring device or field device.

The measuring device may determine fill levels according to the principle of the guided microwave, by ultrasound or by radar. Furthermore, the measuring device may be a sensor or an evaluation device.

According to a further exemplary embodiment of the present invention, an echo extraction method for extracting an echo from an echo function is provided. The method comprises receiving the echo function. Furthermore, the method comprises decomposing the echo function into at least one detail function, wherein the at least one detail function comprises a plurality of first coefficients. Each of the at least one detail functions represents a different degree of detail of the echo function. The degree of detail relates to a form of a base function.

Furthermore, the method comprises eliminating at least one of the plurality of first coefficients and applying a reconstruction regulation, which depends on the form of the base function, for generating a smoothed echo function. In addition, the echo extraction method involves determining at least one echo from the smoothed echo function.

The echo extraction method may be a threshold value method. In this arrangement the smoothed echo function may be compared to a threshold value curve in order to determine at least one echo of the echo function. The smoothed echo function may be a reconstructed echo function.

The method may be used for fill level measuring.

According to a further exemplary embodiment of the present invention, a computer-readable storage medium such as a hard disk, a floppy disk, a DVD (digital versatile disk) or a USB stick (universal serial bus) is provided, in which computer-readable storage medium a program for extracting an echo from an echo function is stored. The stored program executes the echo extraction method when it is executed on a processor.

According to yet a further exemplary embodiment of the present invention, a program element for extracting an echo from an echo function is created, which program element, when it is executed on a processor, carries out the echo extraction method.

According to a further exemplary embodiment of the present invention, an echo extraction device is stated, which extraction device is adapted for extracting an echo from an echo function. The echo extraction device comprises an echo receiving device, an echo decomposition device, an elimination device, and an echo determination device.

The echo receiving device is adapted for receiving an echo function, and the echo decomposition device is connected with the echo receiving device and with the elimination device. The echo decomposition device is adapted such that the echo decomposition device decomposes the echo function into at least one detail function, wherein the at least one detail function comprises a plurality of first coefficients.

Each of the at least one first detail functions represents a different degree of detail of the echo function, and each degree of detail relates to a form of a base function. The elimination device is adapted for eliminating at least one of the plurality of first coefficients. The echo determination device is connected to the elimination device, and the echo determination device is adapted, by applying a reconstruction regulation that depends on the form of the base function, to generate a smoothed echo function.

The echo determination device is further adapted for determining or extracting an echo from the smoothed echo function. For example for determining at least one echo, the echo determination device may compare the smoothed echo function with a threshold value curve or threshold value function.

Furthermore, each of the at least one first detail functions may be assigned to a scale, and each scale may relate to a form of a base function.

Moreover, a measuring device is created, for example a field device, a sensor, an evaluation device or a fill-level measuring device, that comprises an echo extraction device.

The measuring device may determine fill levels according to the principle of the guided microwave, by means of ultrasound or by means of radar.

According to a further exemplary embodiment of the present invention, a method for finding an echo in an echo function is provided, which method comprises receiving the echo function. Furthermore, the method comprises decomposition of the received echo function into at least two detail functions, wherein each of the at least two detail functions comprises a plurality of coefficients along a local axis, and wherein each of the at least two detail functions represents a different degree of detail of the echo function.

Furthermore, the method comprises finding a characteristic feature of an echo along the local axis of at least one of the at least two detail functions; determining an echo region by means of the found characteristic feature in the echo function; and providing the echo region, in particular the echo position, for locating the echo in the echo function.

The local axis may be a converted time axis. The characteristic feature may be a shared detail function. For decomposing the echo function into the at least two detail functions a wavelet transformation may be used.

The method may be used for fill level measuring.

According to a further exemplary embodiment of the present invention, a computer-readable storage medium is created in which a program for finding an echo in an echo function is stored. A computer-readable storage medium may be a readable storage medium such as a DVD (digital versatile disk), a CD-ROM, a hard disk, a USB storage device (universal serial bus) or a fixed disk.

According to another exemplary embodiment of the present invention, a program element for finding an echo in an echo function is created.

According to yet another exemplary embodiment of the present invention, a device for finding an echo in an echo function is created. The device for finding an echo in an echo function comprises an echo receiving device, an echo decomposition device, an echo determination device, and an echo provision device. The echo receiving device is adapted for receiving the echo function, and the echo decomposition device is connected both with the echo receiving device and with the echo determination device. The echo determination device is connected with the echo provision device.

The echo decomposition device is adapted for decomposing the echo function into at least two detail functions, wherein each of the at least two detail functions comprises a plurality of coefficients along a local axis. Each of the at least two detail functions represents a different degree of detail of the echo function.

The echo determination device is adapted for finding a characteristic feature of an echo along the local axis of at least one of the at least two detail functions, and for determining an echo region by means of the found characteristic feature in the echo function.

The echo provision device is adapted for providing the determined echo region for localising the echo or the echo position in the echo function.

According to a further exemplary embodiment of the present invention, a measuring device is created, wherein the measuring device comprises the device for finding an echo in an echo function.

The measuring device may be a fill-level measuring device that determines fill levels according to the principle of the guided microwave, by means of ultrasound or by means of radar. Furthermore, the measuring device may be a field device, a sensor or an evaluation device.

According to a further exemplary embodiment of the present invention, a method for providing a plurality of echoes from an echo function is provided, wherein the method comprises receiving the echo function, determining at least one first echo and determining at least one second echo. Furthermore, the method comprises providing the at least one first echo and the at least one second echo at an external interface. The at least one first echo and the at least one second echo comprise a relationship correlation.

The method may be used for fill level measuring.

According to a further exemplary embodiment of the present invention, a computer-readable storage medium, such as a hard disk, a floppy disk, a DVD (digital versatile disk) or a USB stick (universal serial bus) is created, in which computer-readable storage medium a program for providing a plurality of echoes from an echo function is stored. When it is executed on a processor, the stored program carries out the method for providing a plurality of echoes from an echo function.

According to yet another exemplary embodiment of the present invention, a program element for providing a plurality of echoes is created, which program element, when it is executed on a processor, carries out the method for providing a plurality of echoes from an echo function.

According to a further exemplary embodiment of the present invention, a device for providing a plurality of echoes from an echo function is created. The device comprises an echo receiving device, an echo determination device and an echo provision device. The echo determination device is connected with the echo receiving device, and the echo provision device is connected with the echo determination device. The echo receiving device is adapted for receiving the echo function, and the echo determination device is adapted for determining at least one first echo and at least one second echo.

The at least one first echo and the at least one second echo comprise a relationship correlation or a causal dependence.

The echo provision device is adapted for providing the at least one first echo and the at least one second echo at an external interface. In particular, the echo provision device is adapted for providing a plurality of determined echoes.

According to a further exemplary embodiment of the present invention, a measuring device is created which comprises the device for providing a plurality of echoes from an echo function. The measuring device may, for example, be a field device, a sensor, an evaluation device or a fill-level measuring device. In particular, the measuring device may be a fill-level measuring device that determines fill levels according to the principle of the guided microwave, by means of ultrasound or by means of radar.

According to a further exemplary embodiment of the present invention, a method for selecting echoes, in particular at least one echo, from an echo list is provided, which method comprises receiving an echo list. The echo list comprises a plurality of potential current echoes, wherein at least two of the current echoes of the plurality of current echoes comprise a relationship correlation.

The method further comprises weighting at least one assignment of at least one current echo of the plurality of current echoes to at least one past echo of at least one past echo function and, in particular, weighting an assignment of at least one current echo of the at least two current echoes to at least one past echo of at least one past echo function.

Furthermore, the method comprises selecting an assignment of at least one current echo to the at least one past echo from the at least one past echo function such that a predeterminable selection criterion is fulfilled.

In selecting the assignment of the at least one current echo to the at least one past echo of the past echo function, the relationship correlation between the at least two current echoes is taken into account. In particular, all the determined or available relationship correlations between the echoes of the multiple echo list may be taken into account.

The method may be used for fill level measuring.

According to a further exemplary embodiment of the present invention, a computer-readable storage medium such as a hard disk, a floppy disk, a DVD (digital versatile disk) or a USB stick (universal serial bus) is created, in which computer-readable storage medium a program for selecting echoes from an echo list is stored. The stored program carries out the method for selecting echoes from an echo list when it is executed on a processor.

According to yet a further exemplary embodiment of the present invention, a program element for selecting echoes from an echo list is created, which program element, when it is executed on a processor, carries out the method for selecting echoes from an echo list.

According to a further exemplary embodiment of the present invention, a device for selecting echoes from an echo list is provided, which device comprises a receiving device and a tracking device. The receiving device is connected with the tracking device, and the receiving device is adapted for receiving an echo list. The echo list comprises a plurality of current echoes, wherein at least two current echoes of the plurality of current echoes comprise a relationship correlation.

The tracking device is adapted for weighting at least one assignment of a current echo of the plurality of current echoes to at least one past echo of at least one past echo function, and for selecting an assignment of at least one current echo to the at least one past echo of the at least one past echo function such that a predeterminable selection criterion is fulfilled. The selection of the assignment may be provided as the position of the actual echoes or relevant echoes.

In selecting the assignment of the at least one current echo to the at least one past echo of the past echo function, the relationship correlation between the at least two current echoes of the plurality of current echoes is taken into account.

According to a further exemplary embodiment of the present invention, a measuring device is created, wherein the measuring device comprises the device for selecting echoes from an echo list.

The measuring device may be a fill-level measuring device that determines fill levels according to the principle of the guided microwave, by means of ultrasound or by means of radar. Furthermore, the measuring device may be a field device, a sensor or an evaluation device.

According to a further exemplary embodiment of the present invention, a method for fill level measuring is provided, which method comprises determining an echo function as well as determining a multiple echo list from the echo function. The multiple echo list comprises at least two echoes. Furthermore, the method comprises determining a relationship correlation between the at least two echoes. Furthermore, the method for fill level measuring assigns at least one of the at least two echoes to at least one past echo of a past echo function such that a predeterminable selection criterion is fulfilled. Furthermore, in the method the relationship correlation between the at least two echoes is taken into account in the assignment.

Thereafter, the provision of the at least one assigned echo takes place as a single echo list or in the form of a single echo list, and by means of this single echo list the fill level is determined.

Each form of the storage of the at least two determined echoes may be considered as a multiple echo list. The storage may be necessary to further process the two echoes independently of each other in the course of the method until a decision is made in relation to at least one echo, which echo essentially agrees with a relevant echo. Chained lists, arrays, registers and RAM (random access memory) modules are examples as to where and how multiple lists are stored.

According to a further exemplary embodiment of the present invention, a computer-readable storage medium is provided, for example a hard disk, a floppy disk, a DVD (digital versatile disk) or a USB stick (universal serial bus), in which computer-readable storage medium a program for fill level measuring is stored. The stored program carries out the method for fill level measuring when it is executed on a processor.

According to yet another exemplary embodiment of the present invention, a program element for fill level measuring is created, which program element, when it is executed on a processor, carries out the method for fill level measuring.

According to a further exemplary embodiment of the present invention, a fill-level measuring device is provided that comprises an echo function determination device, an echo determination device, a relationship determination device, a tracking device and a fill-level determination device. The echo determination device is connected with the echo function determination device and with the tracking device. The relationship determination device is connected with the echo determination device. Furthermore, the tracking device is connected with the relationship determination device and with the fill-level determination device.

The fill-level measuring device may be a fill level sensor or an evaluation device, or may be housed in an evaluation device.

The echo function determination device, for example a sensor or a front end, is adapted for determining an echo function. The echo determination device is adapted for determining a multiple echo list, wherein the multiple echo list comprises at least two echoes.

The relationship determination device is adapted for determining a relationship correlation between the at least two echoes. Furthermore, the tracking device is adapted for assigning at least one of the at least two echoes to at least one past echo of a past echo function such that a predeterminable selection criterion is fulfilled. In the assignment, the tracking device takes into account the relationship correlation between the at least two echoes, and the at least one assigned echo is provided as a single echo list to the fill-level determination device.

The fill-level determination device is adapted for determining the fill level by means of the single echo list.

A system for determining the fill level, in particular a fill-level determination device, may, for example, comprise an echo evaluation device which by means of a single echo list can determine a fill level. In other words this means that the echo evaluation device, for example a fill-level determination device, can determine an echo position, and can convert the position to a fill level if a single or unambiguous echo list is provided In the compression method a distinction may be made between loss-free compression methods and lossy compression methods. A loss-free compression method may reduce the data quantity of a file and in particular the data quantity of a digitalised function. A loss-free compression method may be in a position to restore the file and in particular the digitalised function in a loss-free manner.

Examples of loss-free compression methods may be entropy coding of the occurring amplitude values, or run-length coding. However, also the difference between two adjacent signal amplitudes within an echo function or echo curve may be used for compression. Furthermore, also merely the difference between two chronologically successive echo functions may be calculated in order to reduce the size of a file. A compressed file or a compressed echo function may be efficiently transmittable or storable.

A lossy compression may not reconstruct an original signal such as it was originally recorded. However, mostly it may be possible to accept the losses because the losses have no effect or only a small effect in a subsequent application.

Thus, for example, amplitude values may be quantised, wherein in particular by reducing the bit width a lossy compression may be implemented for quantising. But, also a sampling rate reduction (scanning rate reduction) may be used for lossy compression in that not every sampling value is transmitted.

An echo function, echo curve, measuring curve, measuring function, a signal, or an envelope may furnish a usable result for the evaluation of the echo function despite lossy compression and lossy reproduction. With a view to the accuracy relating to the reproduction of the original signal or of the original echo function it is possible to carry out application-dependent parameterising. Depending on an application, it may not be necessary to reproduce a very high detail resolution of an echo function.

For long term echo recordings, for example in a stand-alone measuring device or stand-alone field device, echo recordings may be carried out over an extended period of time. These echo recordings may comprise recording of echo functions in predeterminable chronological distances. From recording over an extended period of time an accumulation of a large quantity of data may arise. The collected data, which represents the measured values or signals of an echo function or a measuring function, may act as a database for the evaluation in the laboratory for trialling new signal processing algorithms.

In the evaluation of measuring functions it may often not be a matter of verifying the accuracy of a method, but instead it may be an objective to verify the ability to identify a correct fill level echo in the presence of false echoes. Consequently, accuracy requirements concerning the underlying raw material in the form of the recorded or reconstructed echo function may be small. Accordingly, it may be possible, with the use of a compression method, for an echo function to achieve a high data reduction, for example 70%.

By means of wavelets, in particular by means of a wavelet transformation, by eliminating superfluous coefficients, lossy compression may be achievable. However, the typical signal progression of the original function may be preserved.

If for the compressing the original echo signal or the original echo function is decomposed with a known wavelet, a perfect reconstruction at a later point in time may remain possible in principle. Suitable wavelet functions may be selected according to two considerations. A wavelet, a base or a base function may be selected such that the essential information of an echo function is concentrated to a few coefficients. However, the base may also be selected such that the base, the base function, the scaling function, the decomposition function or wavelet function comprises a progression that is similar to that of the echoes of an echo function that is to be compressed.

With non-loss-free compression and subsequent reconstruction the progression of the base function may reproduce itself in the reconstructed echo function. Consequently, a base function, a filter bank or a wavelet function that has a progression which is similar to the echoes of an echo function may allow to obtain a good reconstruction of the original signal.

With a Haar wavelet the reconstruction may, for example, result in rectangular artefacts because the Haar wavelet itself has a rectangular progression.

With echo functions that are supplied by an ultrasound application or a radar application, a bi-orthogonal wavelet may approximate the form of the echoes generated in these applications.

With an echo curve or echo function, and in particular with an apparatus which generates an echo function according to the principle of the guided microwave, a wavelet from the family of the coiflets may match the form of the echoes of the echo function well.

Decomposing the echo function into at least one detail function may represent a decomposition into an orthogonal function system. Representation of the echo function by an orthogonal function system may allow to present free of redundancy the function which has initially been decomposed. The decomposition may be redundancy-free so that each of the detail functions, in particular each of the coefficients of a detail function, may be required to perfectly reconstruct the output function or echo function.

Decomposing an echo function into a detail function may furthermore allow to present other characteristics of the echo function in the respective detail function. Decomposition into a plurality of detail functions may be comparable to scaling. For example different frequency components that are contained in the echo function may be able to be elucidated. But, it may also be possible to elucidate echoes comprising different widths.

Each of the at least one detail functions may be assigned to a scale, and each scale may relate to a form of a base function.

The amplitudes of the coefficients that arise during decomposition may represent a measure of the extent to which a base function that corresponds to a coefficient is contained in the output function, measured value function, measuring curve or echo function.

The base function may be selected such that the coefficients generated during decomposition, and in particular the amplitudes of the coefficients, are a measure of the echoes that are contained in the echo function. The position of an echo in the echo function may consequently be determinable by means of the at least one detail function. The at least one detail function comprises a plurality of coefficients generated during decomposition.

Since the amplitude of a coefficient may be a measure for the portion of the associated base function in the echo function, in the detail function the determination of the coefficients may be possible which coefficients do not have a strong influence on an echo in an echo function.

Since in the evaluation of an echo function the position of the echoes may matter, rather than the precise progression of the echo function, individual coefficients of the detail function may be able to be eliminated, selected or selectively removed, without the information relating to the position of an echo being lost.

Eliminating individual coefficients may, however, reduce the data quantity that may be required for the reconstruction of an echo function, and may ensure that compression with a predeterminable quality factor is possible. The quality factor may determine the extent to which coefficients may have to be removed. For example the amplitude of the coefficients may be a measure of removable coefficients.

Eliminating may also mean reducing a coefficient below a predeterminable maximum value. Thus while the coefficient may still be present, the value of said coefficient may, however, be so small that it substantially has no effect on the echo function during reconstruction.

It may thus be possible, for example, in a stand-alone measuring device, stand-alone field device or stand-alone sensor to record an echo function, to digitalise the echo function, and to decompose the echo function into at least one detail function with coefficients, wherein the decomposition into at least one detail function represents a redundancy-free decomposition of the echo function. In the at least one detail function, coefficients that are not used for a later further processing can be removed. By the removal of the coefficients the data quantity may be reducible, and the data quantity may be compressible. Compressed data or compressed echo curves may be storable or transmittable, whereby resources can be saved.

In a reconstruction with an inverse function it may be possible to reconstruct the function progression, which in spite of compression losses may be suitable for the respective application.

An echo curve or echo function that has been recorded with a fill-level measuring device, sensor or field device may be provided by a front end in digital form. A front end may comprise the hardware units and software units that are necessary for acquisition, preparation and conversion of an echo function into a digital form. For example a front end may be an ultrasound front end, a pulse-radar front end, an FMCW-radar front end, a laser front end or a front end which operates according to the principle of the guided microwave.

By the use of a fast A/D (analog/digital) converter, very fine sampling rates may be able to be generated. By fine sampling (scanning), the accuracy in determining a fill level may be increased. However, with this the data quantity accumulating for each echo function also increases. An echo function may be generated in regular chronological distances by a measuring device. A measuring device or field device or fill-level measuring device may be a two-wire measuring device. A two-wire measuring device may achieve sampling rates that make it possible to represent the echo function in a grid of 7 mm.

With a measuring range of up to 80 m, a signal vector in the magnitude of up to 10,000 samples may be generated in this way. A sample may be a digitalised sampling value. Due to the simultaneously high requirement relating to the resolution of the amplitude of the signal, in particular of the echo function, for example a resolution of up to 18 bit may be required for the digitalisation of the amplitude. Consequently, a large quantity of data may arise in the case of long term observations if an echo function and in particular several echo functions spaced apart in time are determined.

The field device itself may be able to process the large quantity of data; however, a storage (storage device) that has to store the large quantity of data may quickly be filled. A storage for the storage of spaced-apart echo functions may, for example, be used in a false-echo storage. Thereby, a field device may observe the progression of the echo function over several days in order to find out where interference signals or false echoes are generated in a filling good container.

Often, field devices may be connected with an observation point, a control room or an evaluation device. Thus, a data exchange of the recorded digitalised echo function with the control room may take place. This data exchange may, for example, take place via a bus system, in particular a field bus system such as the HART® bus or the field bus foundation bus. A field bus may be suitable for a low data throughput. Therefore, the compression may make it possible to transmit a large quantity of data in a compressed manner via a field bus. By the compressed transmission the required transmission time may be reduced.

Transmission of the data may, for example, be necessary if for diagnostic purposes measured echo functions are transmitted to the evaluation device. In the evaluation device the compressed echo function may either be visualized for an operator, or the compressed echo function may be converted for the later troubleshooting on a PC, and may be stored via the evaluation device on the PC. The transmission of the data may be effected wire-bound or by radio. If applicable, a communication device from the field of mobile radio may also be used.

With the availability of small pluggable memory components, for example an SD-card (silicon disc), an MMC-card (multi media card) or a USB stick may be used. With these modules, recording of echo functions that are spaced apart in time may take place directly in the sensor, in the field device or via a recording device that is locally connected with the sensor. The data accumulating in such a long term diagnosis may be reduced in that compression of the data may take place at each measuring.

According to a further exemplary embodiment of the present invention, the compression method further comprises that the echo function is decomposed into a further detail function, wherein the further detail function comprises a plurality of further coefficients. The further detail function represents a further degree of detail of the echo function. For example, the further detail function may be associated with a further scale, and the further scale may relate to a further form of a base function.

By the decomposing of an echo function into several different detail functions, different details of the echo function may be able to be presented. How strong (at which extend) a particular base function may be incorporated at a predeterminable location in an echo function may be one example of a different detail of an echo function. By the decomposition into various detail functions, which may be assigned to various base functions, physical interpretations of the echo curve may be presentable clearly arranged. The determination of a plurality of physical interpretations may, for example, become possible by the acquisition of the information as to how the width of an echo or the local position of a peak of a function changes from one detail function to another. Such changes can be presented clearly arranged if the various detail functions are arranged underneath each other. With an arrangement underneath each other, the axes representing a location of the functions may be aligned to each other so that the origins of the axes representing a location coincide.

By the decomposition into further detail functions the echo function may be able to be decomposed as long as the echo function is completely represented by the detail functions. The coefficients of a detail function may in turn correspond to the portion of the associated base function in the respective echo function.

According to a further exemplary embodiment of the present invention, the compression method further comprises eliminating of at least one further coefficient of the plurality of first coefficients, and/or eliminating of at least one further coefficient of the plurality of further coefficients depending on the quality factor. Thereby, the at least one further coefficient also has a predeterminable relation with the at least one echo.

Several coefficients of the decomposed echo function may be able to be eliminated if they have little influence on an echo of an echo function, whereby a degree of compression may be increased. Since the coefficients may be a measure of how strong a particular base function is incorporated in an echo function, and since, for example, an echo in an echo function may have a typical signal progression, it may be possible to selectively eliminate coefficients (to eliminate in a targeted manner coefficients) that may have little influence on the echo incorporated in the echo function.

In determining an echo, for example the local position and the amplitude of the echo may be of interest. Thereby, tails or superimposed noise signals that generate low-amplitude coefficients may be able to be eliminated, and may contribute to a reduction in the data quantity.

According to a further exemplary embodiment of the present invention, the predeterminable relation is a predeterminable little influence of the at least one eliminated coefficient on the at least one echo in the echo function.

For example a coefficient that is associated with a noise signal may have little influence on an echo. Therefore, a coefficient that is associated with a noise signal may be able to be eliminated. Furthermore, in a particular application the precise echo progression or the precise bight of the echo may not be relevant, as a consequence of which coefficients that contribute little to the progression or to the bight of an echo can be eliminated.

According to a further exemplary embodiment of the present invention, the predeterminable relation of the at least one eliminated coefficient on the at least one echo of the echo function is a relation of the coefficient with the amplitude of the at least one echo in the echo function.

For example, the coefficients that have little influence on the amplitude of the echo may be eliminated.

According to a further exemplary embodiment of the present invention, the predeterminable relation is that a change in the amplitude of the echo in a reconstruction of the echo function being below a predeterminable threshold when compared to the received echo function. The echo function is reconstructed at least with the first coefficients of the first detail function and/or with the further coefficients of the further detail function, wherein in the reconstruction the at least one coefficient that has been eliminated for the compression, and/or the at least one further coefficient that has been eliminated for the compression are/is eliminated.

If a comparison between the recorded echo function and a reconstructed echo function shows that certain coefficients have little influence on the reconstructed echo function, these certain coefficients may be left out without significantly interfere with the reconstruction. This, may be a matter of empirical values that have been obtained from comparative measurements.

On the other hand, leaving a coefficient out may have an influence on the amplitude of an echo that is of interest. However, if it is not the precise height but the position of an echo that matters, the precise height of an echo may not be of any interest, and consequently a change in the amplitude during reconstruction may be tolerable.

According to a further exemplary embodiment of the present invention, the predeterminable relation of the at least one eliminated coefficient to the at least one echo of the echo function is that the at least one eliminated coefficient being located outside a transition region between a negative coefficient sequence and a positive coefficient sequence, which transmission region is associated with the echo.

The transition of a negative coefficient sequence to a positive coefficient sequence may, in a presentation in the different detail functions, provide an indication to the position of an echo. By looking for transitions from negative coefficient sequences to positive coefficient sequences it may be possible to recognise in the detail function the locations at which an echo function comprises an echo. These may be locations or regions in which a strong influence of the coefficients of a detail function on the echo function exists. Elimination of these coefficients that have a strong influence on the echo function may thus not be reasonable. By looking for the regions of coefficients that have a strong influence on the echo function it may be possible to detect regions in which eliminating of coefficients may not be reasonable. On the other hand, regions in a coefficient field may be able to be determined, in which regions coefficients can reasonably be eliminated.

According to a further exemplary embodiment of the present invention, a wavelet transformation is used for decomposing the echo function. A wavelet transformation may generate detail signals that may arise by varying a form of the base function and by looking for conformities of the varied base function with the echo function. A detail function may relate to an elongation of a base function.

According to a further exemplary embodiment of the present invention, a bi-orthogonal wavelet is used for decomposing.

According to a further exemplary embodiment of the present invention, a coiflet is used for decomposing the echo function.

According to yet another exemplary embodiment of the present invention, a filter bank is used for decomposing the echo function.

According to yet another exemplary embodiment of the present invention, wavelet packets are used for decomposing the echo function.

According to yet another exemplary embodiment of the present invention, soft thresholding is used for eliminating a coefficient.

According to yet another exemplary embodiment of the present invention, for eliminating a coefficient the plurality of first coefficients and/or the plurality of further coefficients are reduced by the same amount as long as a predeterminable number of first coefficients and/or of further coefficients is zero.

Thus, soft thresholding may be achievable. By reducing the coefficients by the same amount those coefficients may be eliminated first, that have little influence on the echo function. Thereby, by means of a quality factor, the extent of reduction, i.e. up to what degree the amounts are to be reduced, may be settable. A high degree of reduction may correspond to a high degree of compression but to a low extent of quality and may also effect a vague signal progression of the reconstructed function. A low degree of compression or a high extent of quality may reconstruct an echo function progression, which substantially corresponds to the original progression of the echo function.

According to a further exemplary embodiment of the present invention, hard thresholding is used for eliminating a coefficient.

According to yet another exemplary embodiment of the present invention, for eliminating a coefficient of the plurality of first coefficients and/or of the plurality of further coefficients that coefficient is set to zero whose amount is the smallest amount of all the coefficients, and whose amount is other than zero. The remaining coefficients may remain unchanged.

By means of the quality factor, for example, the number of the coefficients that are eliminated may be settable, whereby in turn the quality of the reconstruction of an echo function may be settable.

According to a further exemplary embodiment of the present invention, after eliminating of the coefficients of the detail functions, compressing of the remaining coefficients may take place.

By means of eliminating coefficients of the detail function, selectively an influence of a coefficient on the echo function may have been taken into account. By means of employing a standard compression method with the remaining coefficients, conventional compression methods may be employed. A standard compression method may compress the remaining coefficients without taking into account the influence of coefficients to an echo function. The remaining coefficients may be those coefficients that have not been eliminated.

A standard compression method may, for example, take into account the occurring of binary values in groups and may use this occurring for compression. By means of the use of a standard compression method that is independent of the method of eliminating coefficients, additional compression of the remaining data may be achievable, in particular of the digital data or of the coefficients. By the combination of the scale-based compression method with a standard compression method the efficiency of the compression method or compressing method may be able to be increased.

According to yet another exemplary embodiment of the present invention, a loss-free compression method may be used for compressing the remaining coefficients.

In the application of loss-free compression, all remaining coefficients may be restored during a reconstruction. Consequently, additional compression may take place without the remaining coefficients being changed.

According to yet a further exemplary embodiment of the present invention, the run-length compression method is used for compressing.

According to yet another exemplary embodiment of the present invention, a lossy compression method is used for compressing the remaining coefficients. With a lossy compression method a higher degree of compression may be achievable. However, by means of a lossy compression method not all the coefficients that remain after elimination may be precisely reconstructable. Therefore a lossy compression method may also have an influence on the reconstructed signal. This influence may, however, not be foreseeable.

According to a further exemplary embodiment of the present invention, the coefficients that remain after eliminating or compressing may be stored.

Storage may, for example, take place on a memory module such as a USB stick. After compressing, in particular after the eliminating of coefficients, digital values may be present, for example in the form of a digital file, which digital values are storable on a storage device. A digital file may also be processable with conventional methods of data processing.

According to a further exemplary embodiment of the present invention, after eliminating and/or compressing transmitting of the coefficients takes/take place.

Transmitting of the coefficients may, for example, be necessary when an exchange between a field device and an evaluation device is to take place. If transmitting takes place after eliminating and/or compressing of coefficients of the echo function, the quantity of data to be transmitted may be reduced. It may thus be possible to transmit the recorded echo function, or a time sequence of recorded echo functions, also via a data transmission system comprising little bandwidth. A data transmission system comprising little bandwidth may, for example, be a field bus system such as a HART® bus system or a field bus foundation bus system.

Many further developments of the invention have been described with reference to the compression method. Below, further exemplary embodiments of the present invention are described with regard to the reconstruction method. These embodiments also apply to the compression method, to the computer-readable storage medium comprising a compression method, to the program element comprising a compression method, to the computer-readable storage medium comprising a reconstruction method, to the program element comprising a reconstruction method, to the compression apparatus, to the reconstruction apparatus and the measuring device comprising a compression apparatus, and to the measuring device comprising a reconstruction apparatus.

According to a further exemplary embodiment of the present invention, the reconstruction method further comprises sorting the plurality of coefficients in order to form a further detail function. The further detail function represents a further degree of detail of the echo function, and relates to the form of a base function. Thereafter, applying of a reconstruction rule that depends on a form of the base function takes place for restoring the echo function.

The detail function may be assigned to a scale, wherein the scale relates to a form of a base function.

By applying a reconstruction rule that depends on the first and/or further form of the base function it may be possible, from the coefficients, in particular from the coefficients present after an elimination, to reconstruct the echo function.

In the reconstruction method, too, the detail function may be assigned to a scale, wherein the scale relates to the form of the base function.

According to a further exemplary embodiment of the present invention, an inverse wavelet transformation is used for restoring the echo function.

According to yet another exemplary embodiment of the present invention, an inverse filter bank is used for restoring the echo function. With an inverse filter bank, the decomposition may be reversed by applying a filter bank.

According to yet another exemplary embodiment of the present invention, the reconstruction method comprises decompressing the plurality of coefficients.

Decompressing may be necessary if a compression method, in particular a standard compression method, has been applied to the remaining coefficients of a detail function. Decompressing the plurality of coefficients may make it possible for subsequent sorting or for subsequent inverse transformation to fall back to the coefficients that are provided for the respective step of the method of the reconstruction.

According to a further exemplary embodiment of the present invention, the reconstruction method comprises reading a plurality of coefficients from a storage.

It may thus be possible to leave a storage, in particular a USB stick, in a measuring device (measuring apparatus) in order to store long term measured values on the USB stick, in particular a sequence of echo functions. Thereafter it may be possible to remove the USB stick from the field device and to insert it into an evaluation device, and with the use of a reconstruction method to read the USB stick in order to access the data stored thereon.

According to a further exemplary embodiment of the present invention, the reconstruction method comprises receiving the plurality of coefficients in the transmission device.

Thereby, the coefficients may be received in a pure form or in a compressed form. For this purpose a receiving device, as for example an evaluation device, may apply a reconstruction method.

Below, further exemplary embodiments of the present invention are described with reference to the compression apparatus. These embodiments also apply to the reconstruction apparatus, the compression method, the reconstruction method, the computer-readable storage medium comprising a compression method, as well as to the program element comprising a compression method, the computer-readable storage medium comprising a reconstruction method, the program element comprising a reconstruction method, the reconstruction apparatus, the measuring device comprising a compression apparatus, and the measuring device comprising a reconstruction apparatus.

According to a further exemplary embodiment, the echo decomposition device of the compression device is further adapted to decompose the echo function into a further detail function, wherein the further detail function comprises a plurality of further coefficients, and wherein the further detail function represents a further degree of detail of the echo function. For example, the further detail function may be assigned to a further scale. The further scale may be linked to a further form of the base function.

According to a further exemplary embodiment of the present invention, the elimination device is further adapted to eliminate at least one further coefficient of the plurality of first and/or further coefficients depending on the quality factor. Thereby the at least one further eliminated coefficient has a predeterminable relation with the at least one echo of the echo function.

According to a further exemplary embodiment of the present invention, the predeterminable relation is a predeterminable small influence which the at least one eliminated coefficient has on the at least one echo of the echo function.

According to a further exemplary embodiment of the present invention, the predeterminable relation of the at least one eliminated coefficient with the at least one echo of the echo function is a relation with the amplitude of the at least one echo in the echo function.

According to a further exemplary embodiment of the present invention, a compression device is created, wherein the predeterminable relation of an eliminated coefficient to the at least one echo of the echo function is, that a change in the amplitude of the echo in a reconstruction of the echo function being under a predeterminable threshold when compared to the received echo function. In this reconstruction the echo function is reconstructed with the use of the first coefficients of the first detail function and/or of the further coefficients of the further detail function. In the reconstruction of the echo function the at least one coefficient that has been eliminated for compression, and/or the at least one further coefficient that has been eliminated for compression are/is eliminated.

According to a further exemplary embodiment of the present invention, the predeterminable correlation of the at least one eliminated coefficient of the at least one echo of the echo function is that the at least one eliminated coefficient is situated outside a transition region between a negative coefficient sequence and a positive coefficient sequence, which transition region is associated with the echo.

According to a further exemplary embodiment of the present invention, the echo decomposition device is adapted for decomposing the echo function by means of a wavelet transformation.

According to a further exemplary embodiment of the present invention, the echo decomposition device is adapted for decomposing the echo function by means of a bi-orthogonal wavelet.

According to yet another exemplary embodiment of the present invention, the echo decomposition device is adapted for decomposing the echo function by means of a coiflet.

According to yet another exemplary embodiment of the present invention, the echo decomposition device is adapted for decomposing the echo function by means of a filter bank.

According to yet a further exemplary embodiment of the present invention, the echo decomposition device is adapted for decomposing the echo function by means of wavelet packets.

According to yet another exemplary embodiment of the present invention, the elimination device is adapted for eliminating a coefficient by means of soft thresholding.

According to yet another exemplary embodiment of the present invention, the elimination device is adapted for eliminating a coefficient such that the plurality of first coefficients and/or the plurality of further coefficients are/is reduced by the same amount, until a predeterminable number of first coefficients and/or of further coefficients is zero.

According to another exemplary embodiment of the present invention, the elimination device is adapted for eliminating a coefficient by means of hard thresholding.

According to yet another exemplary embodiment of the present invention, the elimination device is adapted for eliminating a coefficient so that from the plurality of the first coefficients and/or from the plurality of the further coefficients the coefficient comprising the smallest amount other than zero is zeroed.

According to a further exemplary embodiment, the compression apparatus comprises a standard compression device, wherein the standard compression device is connected with the elimination device, wherein the standard compression device is adapted for compressing the coefficients that remain after elimination.

With compression by means of the standard compression device, a standard compression method may be used.

According to another exemplary embodiment of the present invention, the standard compression device is adapted for using a loss-free compression method.

According to yet another exemplary embodiment of the present invention, the standard compression device is adapted for using the run-length compression method.

According to a further exemplary embodiment of the present invention, the standard compression device is adapted for using a lossy compression method.

According to another exemplary embodiment of the present invention, the compression apparatus further comprises a storage device, wherein the storage device is adapted for storing the coefficients that remain after eliminating and/or compressing, for example on a USB stick.

According to another exemplary embodiment of the present invention, the compression apparatus further comprises a transmission device, wherein the transmission device is adapted for sending the coefficients that remain after eliminating and/or compressing, for example to a central control room or to an evaluation device.

According to a further exemplary embodiment of the present invention, the measuring device (measuring apparatus), which comprises a compression apparatus and/or a reconstruction apparatus, is a field device.

According to a further exemplary embodiment of the present invention, the measuring device, which comprises a compression apparatus and/or a reconstruction apparatus, is an evaluation device.

A real echo function or echo curve may comprise an unsteady progression; in other words noise signals may be superimposed on an echo function. A real echo function may be an echo function recorded by a measuring device. The noise signals by means of which a real echo function may be impeded, may, for example, be caused by filling noise in the container or by EMC interference.

A threshold value function may be a fixed predetermined function which, for example, depends on the structure of a container. In order to determine the threshold value function the echo behaviour of an empty container may be determined.

On the other hand, the threshold value function may be determinable from the echo curve. For example, the threshold value function may be determined from the echo function by applying low-pass filtering. As a result of determining the threshold value function from the echo function, the threshold value function may be correlated with the echo function.

In a comparison of the echo function with a threshold value curve it may be possible to determine which values of an echo function or which regions of an echo function are above a threshold value, above a stage or above a threshold. The progression of the threshold may be predetermined at a defined position by the threshold value function. The limits of an echo may be determined as two intersections of the echo function with the threshold value function. The intersections may be those positions at which the echo function intersects the threshold value function. The echo region may be the region between the two limits.

Decomposing the echo function into at least one first detail function, and eliminating at least one coefficient of the plurality of coefficients that form the at least one detail function, and in particular of at least one coefficient of a coefficient field, which coefficient field comprises the coefficients of a plurality of detail functions, may correspond to filtering. In this filtering, components of the echo curve may be eliminated, which components are caused by noise within the echo curve.

Eliminating may also mean reducing a coefficient to below a predeterminable maximum value. Thus while the coefficient may still be present, the value of said coefficient may, however, be so small that essentially it has no effect on the echo function during reconstruction.

By means of a suitable back transformation or inverse transformation the echo function may be able to be reconstructed, wherein in the back transformation a smoothed curve progression may result because components of the echo function are eliminated that are responsible for an unsteady progression of the echo function. If the coefficients that are responsible for the unsteady progression of the echo function can be determined, it may be possible in a targeted manner to eliminate these coefficients that cause the unsteady progression of the echo curve. With the smoothed progression of the echo function a comparison with the threshold value curve may be able to be carried out.

According to a further exemplary embodiment of the present invention, each of the at least one detail functions is assigned to a scale, wherein each scale relates to the form of a base function.

According to yet another exemplary embodiment of the present invention, the echo extraction method involves determining or extracting an echo from the smoothed echo function. Furthermore, comparing the smoothed echo function with a threshold value function takes place in order to determine or extract at least one echo from the echo function.

According to a further exemplary embodiment of the present invention, the echo extraction method comprises decomposing the echo function into a further detail function, wherein the further detail function comprises a plurality of further coefficients. The further detail function represents a further degree of detail of the echo function, and the further degree of detail relates to a further form of a base function. At least one further coefficient of the plurality of first coefficients and/or at least one coefficient of the plurality of further coefficients are/is eliminated. The further degree of detail may be a different degree of detail, in particular a higher degree of detail, than the degree of detail used for determining the first coefficients.

The echo extraction method further comprises the application of a reconstruction regulation, which depends on the further form of a base function, for generating the smoothed echo function.

Furthermore, the further detail function may be assigned to a further scale, wherein the further scale relates to a further form of the base function. In other words this means that the further detail function may be determined by applying a transformation that is based on the base function, or by applying a filter bank whose filter characteristic relates to the base function.

The plurality of first coefficients and/or of further coefficients may form a coefficient field. Eliminating at least one further coefficient of the plurality of coefficients, and in particular eliminating coefficients of the coefficient field, may make it possible in a targeted manner to eliminate factors that have an influence on an unsteady echo function progression. In particular, further coefficients that have an influence on the unsteady progression of the echo function may be able to be eliminated.

Furthermore, by decomposing and/or eliminating at least one coefficient or at least one further coefficient, the threshold value function may also be smoothed such that it can be used as a smoothed threshold value curve.

According to yet another exemplary embodiment of the present invention, comparing the smoothed echo function with a threshold value function comprises generating a threshold value function from the received echo function, comparing the smoothed echo function with the generated threshold value function, and determining at least one echo region as a region in which the smoothed echo function is above the threshold value function.

The threshold value function may, for example by means of low-pass filtering, have been generated from the echo function. If the threshold value function has been generated from the echo function, there may be a correlation between the threshold value function and the echo function. The threshold value function may also be able to be generated in several processing stages from the echo function. In particular, the threshold value function may be able to be generated from an already smoothed version of the echo function.

According to a further exemplary embodiment of the present invention, the threshold value function is generated by means of a filter from the received echo function.

According to a further exemplary embodiment of the present invention, the echo extraction method further comprises determining a quality factor. The quality factor is a measure of the smoothing of the smoothed echo function, and the echo extraction method further comprises eliminating the at least one of the plurality of coefficients and/or of the plurality of further coefficients, depending on the quality factor. In other words, at least one coefficient may be eliminated from the coefficient field that is formed from the plurality of first coefficients and/or from the plurality of further coefficients.

By means of a quality factor it may be possible to determine to what extent the echo curve is smoothed. The quality factor may correspond to the number of the coefficients that are to be eliminated.

According to a further exemplary embodiment of the present invention, a wavelet transformation is used for decomposition. A wavelet transformation may decompose an echo function into several detail signals that can be analysed separately. In particular in the case of a discrete wavelet transformation a coefficient field may be generated from which predeterminable coefficients can be eliminated.

According to yet another exemplary embodiment of the present invention, a bi-orthogonal wavelet is used for decomposing the echo function.

According to yet another exemplary embodiment of the present invention, a coiflet is used for decomposing the echo function.

As a result of using special wavelets, which may match the form or the progression of a typical echo of an echo function, a decomposition of the echo function, which decomposition matches the echo function, may be generated. In such a matching decomposition, coefficients that are not associated with an echo can be easily identifiable.

According to yet another exemplary embodiment of the present invention, a filter bank is used for decomposing the echo function into a detail function.

At the outputs of a filter bank different decompositions of an echo function may result that are assignable to different scales.

According to yet another exemplary embodiment of the present invention, wavelet packets are used for decomposing the echo function.

According to yet another exemplary embodiment of the present invention, the method of soft thresholding is used for eliminating a coefficient.

The method of soft thresholding may make it possible to eliminate a coefficient, depending on the influence of the coefficient on the echo function.

According to yet another exemplary embodiment of the present invention, for eliminating a coefficient the plurality of first coefficients and/or the plurality of further coefficients are reduced by the same amount until a predeterminable number of first coefficients and/or of further coefficients is zero.

In that all the coefficients are reduced by the same amount, elimination of coefficients may be achieved, which elimination depends on the lowest coefficient value of the coefficient field.

According to yet another exemplary embodiment of the present invention, the method of hard thresholding is used for eliminating a coefficient.

According to yet another exemplary embodiment of the present invention, an echo extraction method is created, wherein for eliminating a coefficient of the plurality of first coefficients and/or of the plurality of further coefficients that coefficient is zeroed whose amount is the smallest amount of all the coefficients, and whose amount is other than zero.

In other words the value of a coefficient with the smallest influence factor may be eliminated.

According to a further exemplary embodiment of the present invention, an echo extraction method is created, wherein the echo extraction method further comprises eliminating the at least one coefficient of the plurality of first coefficients and/or of the at least one coefficient of the plurality of further coefficients such that the coefficient that was eliminated has a predeterminable influence on the at least one echo.

In other words, at least one coefficient of the plurality of first coefficients and/or of the plurality of further coefficients into which the echo function has been decomposed may be eliminated such that the coefficient that was eliminated has a predeterminable influence on the at least one echo.

As a result of taking into account the influence of a coefficient on an echo, it may be possible in a smoothed function to leave the progression of the echo, and in particular the distance values of the echo or the positions of the echoes, essentially unchanged. It may thus be possible to filter out only noise components. At the same time it may be possible to essentially preserve the position of the echoes in the reconstructed echo function. Consequently, the position of an echo may be precisely determinable.

According to yet another exemplary embodiment of the present invention, an echo extraction method is stated, which echo extraction method comprises filtering of the smoothed echo function.

According to yet another exemplary embodiment of the present invention, an echo extraction method is created, wherein a filter from the group of filters comprising median filters, edge-selective filters and linear filters is used for filtering. By means of the targeted use of filters the smoothed echo function may be able to be further smoothed.

According to a further exemplary embodiment of the present invention, the echo extraction method comprises providing a multiple echo list.

A multiple echo list may comprise a plurality of echoes of an echo function, wherein at least two of the echoes contained therein comprise a causal correlation. Moreover, a multiple echo list may comprise a relationship correlation that describes a causal correlation between individual echoes of the multiple echo list. The relationship correlation may, for example, be shown as a relationship graph.

According to yet another exemplary embodiment of the present invention, the echo extraction method comprises determining at least one search region as a region between two intersections, which intersections arise as a result of the intersection of the smoothed echo function with the threshold value function. In addition to determining the intersections, the echo extraction method comprises determining up to one or a predeterminable number of local echoes within the at least one search region, and furthermore comprises providing a list of found or determined echoes and/or of certain search regions as a multiple echo list.

Providing a multiple echo list may make it possible in a later analysis phase to carry out an evaluation of an echo list and in this process if applicable take into account various physical interpretations of different echoes.

According to a further exemplary embodiment of the present invention, the echo extraction method further comprises determining a relationship correlation between the echoes of the multiple echo list. After the relationship correlation has been determined, the relationship correlation can be provided.

According to yet another exemplary embodiment of the present invention, an echo extraction method is created which provides a single echo list.

By means of a selection it may be possible to generate a single echo list from a multiple echo list. A single echo list comprises a list of unambiguously found echoes for further processing.

According to yet another exemplary embodiment of the present invention, an echo extraction method is created which further comprises generating the single echo list from a multiple echo list.

Above, embodiments of the invention have been described have been described have been described with reference to the echo extraction method. These embodiments analogously also apply to the computer-readable storage medium, to the program element, to the echo extraction device and to the measuring device.

Below, further exemplary embodiments of the present invention are described with regard to the echo extraction device. These embodiments also apply to the echo extraction method, to the computer-readable storage medium, to the program element and to the measuring device.

According to a further exemplary embodiment of the present invention, each of the at least one detail functions is assigned to a scale. Each scale relates to a form of a base function.

According to a further exemplary embodiment of the present invention, the echo determination device is adapted for determining at least one echo by comparing the smoothed echo function with a threshold value function.

According to a further exemplary embodiment of the present invention, the echo decomposition device is adapted for decomposing the echo function into a further detail function, wherein the further detail function comprises a plurality of further coefficients. The further detail function provides a further degree of detail of the echo function, and relates to a further form of a base function.

The elimination device or echo elimination device is adapted for eliminating at least one further coefficient of the plurality of first coefficients and/or at least one coefficient of the plurality of further coefficients, and the echo determination device is adapted, by applying a reconstruction regulation that depends on a further form of a base function, for generating the smoothed echo function.

As a result of eliminating further coefficients of a plurality of detail functions into which the echo function has been decomposed, the degree of smoothing of the reconstructed echo function may be able to be influenced. The coefficients of the detail functions may have a different influence on the echo. Consequently, in a targeted manner that coefficient may be able to be eliminated that has a slight influence on the echo but considerable influence on unwanted irregular progressions of the echo function.

Furthermore, the further detail function may be assigned to a further scale, wherein the further scale relates to a further form of a base function.

According to yet another exemplary embodiment of the present invention, the echo determination device is adapted, by comparing the smoothed echo function and the threshold value function, for generating the threshold value function from the received echo function. Furthermore, the echo determination device is adapted for comparing the smoothed echo function with the generated threshold value function, and for determining at least one echo region as a region in which the smoothed echo function according to amount is situated above the threshold value function.

The threshold value function may also be able to be generated in several processing stages from the echo function. In particular, the threshold value function may be able to be generated from an already smoothed version of the echo function.

It may be possible to determine intersections of the threshold value function and of the echo function at those positions at which the echo function intersects the threshold value function, and to determine the intersections as regional boundaries of echo regions.

According to yet another exemplary embodiment of the present invention, the echo determination device is adapted for generating the threshold value function from the received echo function by means of a filter.

For example, the application of a low-pass filter may make it possible to generate a progression of a threshold value function, which progression makes it possible to determine echoes of the echo function.

Likewise, the threshold value function may be able to be generated from the echo function by means of eliminating coefficients of the decomposed echo function. After determining a threshold value function as a smoothed echo function, it would be possible, for example, to compare an unchanged echo function, or an echo function smoothed to some other extent, with the threshold value function determined in this manner, and in this way echo regions could also be determined.

According to a further exemplary embodiment of the present invention, the echo extraction device comprises a quality factor device, wherein the quality factor device is connected with the elimination device.

For the purpose of determining a quality factor, the quality factor device is adapted for receiving or storing a quality factor. The quality factor is a measure of the smoothing of the smoothed echo function to be generated. The elimination device is adapted for eliminating the at least one coefficient of the plurality of first coefficients and/or the at least one coefficient of the plurality of further coefficients, depending on the quality factor.

A high quality factor may, for example, permit elimination of a smaller number of coefficients, while a low quality factor may permit the elimination of a larger number of coefficients.

According to a further exemplary embodiment of the present invention, the echo decomposition device is adapted for decomposing the echo function by means of a wavelet transformation.

For the purpose of decomposing the echo function by means of a wavelet transformation, the echo decomposition device may have implemented, for example, an algorithm for wavelet transformation, for fast wavelet transformation or for discrete wavelet transformation. Accordingly, the echo determination device may have implemented the complementary method for decomposition as an inverse transformation in order to reconstruct the smoothed echo function.

According to a further exemplary embodiment of the present invention, the echo decomposition device is adapted for decomposing the echo function by means of a bi-orthogonal wavelet.

According to a further exemplary embodiment of the present invention, the echo decomposition device is adapted for decomposing the echo function by means of a coiflet.

According to a further exemplary embodiment of the present invention, the echo decomposition device is adapted for decomposing the echo function by means of a filter bank.

According to a further exemplary embodiment of the present invention, the echo decomposition device is adapted for decomposing the echo function by means of wavelet packets.

According to a further exemplary embodiment of the present invention, the elimination device is adapted for eliminating a coefficient by means of soft thresholding.

According to a further exemplary embodiment of the present invention, for eliminating a coefficient the echo extraction device is adapted for reducing the plurality of first coefficients and/or the plurality of further coefficients by the same amount until a predeterminable number of first coefficients and/or of further coefficients is zero.

According to a further exemplary embodiment of the present invention, the elimination device is adapted for using a hard-thresholding method for eliminating a coefficient.

According to yet another exemplary embodiment of the present invention, for eliminating a coefficient of the plurality of first coefficients and/or of the plurality of further coefficients, the echo extraction device is adapted for zeroing the smallest coefficient according to amount, which coefficient is other than zero. In this way a hard-thresholding method may be able to be implemented.

According to a further exemplary embodiment of the present invention, the elimination device is adapted for eliminating the at least one of the plurality of first coefficients and/or the at least one further coefficient such that the coefficient which is eliminated has a predeterminable small influence on the at least one echo.

In order to determine the influence of an eliminated coefficient on the echo of an echo function, an empirical value may be used that has been determined from preceding experiments.

However, it may also be possible to use a heuristic method, in other words, by repeated decomposing, eliminating and reconstructing it may be determinable which coefficient has strong or little influence on the at least one echo of the echo function. In order to find out the influence, the original echo function may be compared to the respective reconstructed echo function, and the influence of the elimination may be determined.

According to a further exemplary embodiment of the present invention, the echo determination device is further adapted for filtering the smoothed echo function.

After carrying out smoothing, it may be possible to apply further filter operations to the smoothed echo function.

According to a further exemplary embodiment of the present invention, a filter from the group of filters comprising median filters, edge-selective filters and linear filters is used for filtering.

According to a further exemplary embodiment of the present invention, the echo determination device is further adapted for providing a multiple echo list.

In order to provide a multiple echo list, a storage region of the echo determination device, and in particular a storage region of an echo provision device, may be reserved in order to be able to store a plurality of found echoes of an echo function.

According to a further exemplary embodiment of the present invention, the echo determination device is further adapted for determining at least one search region as a region between two intersections of the smoothed function with a threshold value function, wherein the echo determination device furthermore is adapted for determining a predeterminable number of local echoes within the at least one search region, and for providing a list of found echoes or determined echoes as a multiple echo list. Furthermore, at least one determined echo and/or one of the determined or found search regions may be provided in the multiple list.

According to a further exemplary embodiment of the present invention, the echo determination device is further adapted for providing a relationship correlation between the echoes of the multiple echo list, and for providing the relationship correlation, for example in the form of a relationship graph or of a storage region.

By means of a relationship correlation or a causal correlation between the plurality of echoes of a multiple echo list, different physical interpretations of echoes may be determinable.

According to a further exemplary embodiment of the present invention, the echo determination device is further adapted for providing a single echo list.

According to a further exemplary embodiment of the present invention, the echo determination device is further adapted for generating the single echo list from a multiple echo list.

For generating the single echo list from a multiple echo list, the relationship correlation between the individual echoes and a selection algorithm may be used.

With the method for finding an echo, finding at least one echo in the echo function may be possible. The echo function may be able to be decomposed into several detail functions so that various physical interpretations of the echo function can be worked out. By means of decomposing the echo function into detail functions, a characteristic feature of an echo along a local axis may be made visible, wherein by means of an analysis thereof the position of an echo may be determined. Thus, for example, a widely swinging echo that contains many small echoes may be detectable in one detail stage, while the many small echoes that are contained in the large echo may be visible in another detail plane. As a result of a comparison of the different planes and the different meanings of the planes it may be possible to determine various physical interpretations of the echo progression.

A large echo may be a rise in the level in the echo function, which rise comprises several further rises in the level, or local maxima. Such a large echo or wide echo may arise if echoes are superimposed, for example if two echoes converge.

As a result of finding a characteristic feature in a detail function, for example a transition of coefficients in a shared detail function of negative values to positive values, a position or a region of an echo in the echo function may be able to be determined. Furthermore, a characteristic feature of an echo in an echo function may be a transition between a positive and a negative coefficient sequence of a shared detail function along a local axis.

The detail function may have the same local resolution as the echo function so that a position of the echo, which position has been determined in the detail function, may also correspond to the position of the echo in the echo function.

The form of the transitions of negative coefficients and positive coefficients may be different in extent, and for this reason, after elimination of coefficients that have already been used in determining a position of an echo, the method can also be applied repeatedly to further characteristics which are, however, less pronounced. The transition may take place between adjacent negative coefficient sequences and positive coefficient sequences.

By means of finding these further echoes at different positions, a single echo list may be able to be generated which in relation to a subsequent evaluation algorithm may unambiguously provide the different positions of the echoes found with this method. In other words this means that the subsequent algorithm may not undertake any consideration concerning the interpretation of the position of the echoes. The algorithm may assume that the position of the found echoes is given. Possible misinterpretations of the position of the echoes may not be investigated any further.

The found single echo list may be an unambiguous list of all those echoes that are to be found by means of the method described above. As a result of the specification of a maximum number of found echoes the method may be terminated before all the echoes have been found.

It may be possible to determine a start region and an end region of an echo region so that an unsharp definition of an echo region can be stated. With an unsharp definition of an echo region a subsequent algorithm may find it possible to determine the position of the start and end of an echo region within the start region and end region.

However, it may also be possible to state a fixed position of a potential echo. If a precise position is stated, it may no longer be possible for a subsequent algorithm to be able to make any decision about the position of the echoes, even within regions.

According to a further exemplary embodiment of the present invention, each of the at least one detail functions is assigned to a scale. Each scale relates to a different form of a base function. A base function may be a wavelet function or a filter characteristic of a filter bank.

A scale may be used for differentiating between different details, for example the echoes in the echo function. A scale may furthermore comprise a local axis.

According to a further exemplary embodiment of the present invention, the method comprises providing a single echo list, wherein the single echo list comprises at least one echo region.

According to a further exemplary embodiment of the present invention, the method comprises determining a multiple echo list, wherein the multiple echo list comprises at least two causally dependent echo regions. In other words, the method comprises determining a multiple echo list, wherein the multiple echo list comprises at least two echo regions, which two echo regions are connected by way of a relationship correlation.

From a determined multiple echo list a single echo list is generated in that unambiguous echoes are selected from the multiple echo list.

Following determination of the single echo list from the multiple echo list the provision of the single echo list with the positions of the found echoes takes place.

According to a further exemplary embodiment of the present invention, the method comprises determining the echo region as a transition region between a negative coefficient of the plurality of coefficients and a positive coefficient of the plurality of coefficients.

In the decomposition of the echo function into a detail function, in the detail function a plurality of negative and positive coefficients may arise. The coefficients of a detail function may be situated along a local axis. The coefficients, and in particular the values of the coefficients, may determine the extent to which a form of a base function is contained in the echo function at a local region. In particular, the transition region may be along a local axis in a shared detail function.

A transition or a transition region between a negative coefficient and a positive coefficient, in particular along a local axis, may be a characteristic feature that indicates the position of an echo. Consequently, by means of finding such a transition region, locating echoes or at least potential echoes may be possible.

The direction in which the transition takes place may play a subordinate role in finding a transition. The transition from a negative coefficient to a positive coefficient may be a characteristic feature of an echo position, as may a transition from a positive coefficient to a negative coefficient.

According to a further exemplary embodiment of the present invention, the transition region comprises at least one zero coefficient. The at least one zero coefficient is situated between the negative coefficient and the positive coefficient.

The zero coefficients that are arranged between a positive coefficient and a negative coefficient may not be taken into account for finding a transition region.

According to a further exemplary embodiment of the present invention, determining an echo region as a transition region comprises determining a negative coefficient sequence from the plurality of coefficients, and determining a positive coefficient sequence from the plurality of coefficients such that the negative coefficient sequence and the positive coefficient sequence are situated in a first shared detail function or on a first shared scale. The negative coefficient sequence and the positive coefficient sequence are found such that the difference between the negative coefficient sequence and the positive coefficient sequence is the maximum of all the possible differences of coefficient sequences of all the available detail functions or scales, in particular of the respective detail functions. The echo region is then determined such that the echo region comprises the negative coefficient sequence and the positive coefficient sequence.

The first detail function may be one of the at least two detail functions that have been determined during decomposition.

In other words this means that the negative coefficient sequence and the positive coefficient sequence, between which sequences the difference is formed, may be situated on a shared detail function. The maximum may be determined between all the differences, which have been formed in this way, of all the detail functions.

The region of a negative coefficient sequence together with the subsequent positive coefficient sequence may determine the region of the echo in the echo function. Therefore, finding a transition between a negative coefficient sequence and a positive coefficient sequence or between a positive coefficient sequence and a negative coefficient sequence in a detail function may determine the associated local region or the local position of the echo in the associated echo function.

According to a further exemplary embodiment of the present invention, the method comprises determining the echo region such that a position of a start coefficient is determined at the start of the negative coefficient sequence, and that, furthermore, a position of an end coefficient at the end of the positive coefficient sequence is determined, and that finally the position of the start coefficient and the position of the end coefficient is provided as an echo region.

Providing the position of a start coefficient and the position of an end coefficient may sharply define an echo region. The start and the end of the echo may be determined by means of the start coefficient and end coefficient.

According to a further exemplary embodiment of the present invention, determining an echo region comprises determining a position of a start coefficient at the end of the negative coefficient sequence, and determining a position of an end coefficient at the start of the positive coefficient sequence. The thus found position of the start coefficient, and the position of the end coefficient are provided as an echo region.

As a result of finding the position of the start coefficient and of the end coefficient, a sharp definition of the echo region may be possible.

According to another exemplary embodiment of the present invention, the method further comprises determining an echo start region as a region of influence of the start coefficient of the negative coefficient sequence. Furthermore, the method comprises determining an echo end region as a region of influence of the end coefficient of the positive coefficient sequence. With a determination of the echo start region and echo end region, the echo start region and the echo end region can be provided as the echo region.

The region of influence of a coefficient may be defined by a section of an axis, which section extends from the middle of the segment of the position of the respective coefficient to the position of its predecessor coefficient to the middle of the segment of the position of the respective coefficient to the position of its successor coefficient.

When viewed from the respective coefficient, the predecessor coefficient may be situated in the direction of decreasing distance values. The successor coefficient may be situated in the direction of increasing distance values.

The position in the middle of the segment of the position of the coefficient to the respective predecessor coefficient may still form part of the region of influence of the coefficient, whereas the position in the middle of the segment of the position of the coefficient to its successor coefficient may no longer form part of the region of influence of the coefficient.

This definition of the echo region by means of an echo start region and echo end region may make it possible to determine the echo region as an unsharp definition.

According to yet another exemplary embodiment of the present invention, the method comprises determining an echo start position as the middle of the echo start region, and determining an echo end position as the middle of the echo end region, wherein providing the echo start region and the echo end region is providing the echo start position and the echo end position.

Determining the echo start position from the echo start region, and determining the echo end position from the echo end region, may make it possible to convert an unsharp definition of an echo region to a sharp definition if a subsequent algorithm expects a sharp definition of the echo region.

According to yet another exemplary embodiment of the present invention, the method for finding an echo in an echo function comprises determining an echo start position as the middle of the distance between the position of the start coefficient and the position of the predecessor coefficient of the start coefficient, and furthermore determining an echo end position as the middle of the distance between the position of the end coefficient and the position of the successor coefficient of the end coefficient, wherein the echo region is the region between the echo start position and the echo end position.

The start and the end of a coefficient sequence may relate to a coordinate system with increasing distance values in the direction of the increasing local values. This means that in the direction of increasing local values of a shared local axis, first there may be the start of a coefficient sequence, and then the end. In the direction of decreasing local values, first there may be the end of a coefficient sequence, and then the start.

The start of the negative coefficient sequence (ANK) may be determined as the middle of the distance between the position of the first coefficient of the negative coefficient sequence and the position of the predecessor coefficient of the first coefficient of the negative coefficient sequence.

Furthermore, the end of the positive coefficient sequence (EPK) may be determined as the middle of the distance between the position of the last coefficient of the positive coefficient sequence and of the position of the successor coefficient of the last coefficient of the positive coefficient sequence.

By means of this determination of the start of the negative coefficient sequence (ANK) or, as an alternative, of an echo start position and the determination of the end of the positive coefficient sequence (EPK) or, as an alternative, of an echo end position, finding the location of an echo may be improved.

According to a further exemplary embodiment of the present invention, the method comprises determining a further detail function such that the further detail function represents a higher degree of detail of the echo function than does the first detail function. The further detail function may be assigned to a further scale, which may be connected with a further form of a base function.

The echo start position that was found in a detail function of a lower degree of detail is projected onto the further detail function. Likewise, the echo end position that was found in a detail function of a lower degree of detail is projected onto the further detail function.

Furthermore, the position of a further start coefficient is determined. In the determination of the position of the further start coefficient the further start coefficient is that start coefficient of a negative coefficient sequence of the plurality of coefficients of the further detail function, which negative coefficient sequence of the further detail function is encountered during projecting.

If no negative coefficient sequence is encountered, the further start coefficient is determined by the negative coefficient sequence, which negative coefficient sequence starts within the echo start position and the echo end position, and whose start position comprises the shortest distance to the echo start position, wherein the start position is the position of the start coefficient of a negative coefficient sequence of the further detail function.

In other words this may mean that in the determination of the position of the further start coefficient the further start coefficient is that start coefficient of a negative coefficient sequence of the plurality of coefficients of the further detail function, which negative coefficient sequence starts within the echo start position and the echo end position. Furthermore, the start position of the corresponding negative coefficient sequence comprises the shortest distance to the echo start position, wherein the start position is the position of the start coefficient of a negative coefficient sequence.

Determining a position of a further end coefficient takes place such that the further end coefficient is that end coefficient of a positive coefficient sequence of the plurality of coefficient sequences of the further detail function, which positive coefficient sequence of the further detail function is encountered during projecting.

As an alternative, determining the position of a further end coefficient takes place such that the further end coefficient is that end coefficient of a positive coefficient sequence of the plurality of coefficient sequences of the further detail function, which positive coefficient sequence starts within the echo start position and the echo end position, and whose start position comprises the shortest distance to the echo end position, wherein the start position is the position of the start coefficient of a positive coefficient sequence of the further detail function.

Furthermore, the echo region of the further detail function is determined such that the echo region of the detail function comprises a transition from the negative coefficient sequence to the positive coefficient sequence.

The echo region of the further detail function is provided for locating the echo in the echo function.

The further detail function may be one of the at least two detail functions that have been determined during decomposition, for example during decomposition by means of the wavelet transformation.

By means of projecting the echo region of a detail function of a lower degree of detail onto a detail function of a higher degree of detail, the resolution of the echo region may be increased. It may be possible to determine the limits of an echo region for an echo function so that they are narrower or finer. Finer determination of the local region may increase the local resolution of the echo region, and the echo position may be able to be stated more precisely than it is in the detail function of the lower degree of detail. Finally, as a result of continuous projection, an echo position may be determined. The echo position may be provided in addition to an echo region.

The further form of the base function may be able to be generated from the form of the base function. For example, the base function may be a wavelet function or mother function. The decomposition may then be a wavelet transformation.

According to yet another exemplary embodiment of the present invention, the method comprises determining a negative partial coefficient sequence from the plurality of coefficients of the further detail function, and determining a positive partial coefficient sequence from the plurality of coefficients of the further detail function. Determining the partial-coefficient sequence takes place such that the difference of the negative partial-coefficient sequence and of the positive partial-coefficient sequence is the maximum of all the possible differences of coefficient sequences that are situated within the echo region of the further detail function.

Furthermore, a main coefficient sequence is determined such that the main coefficient sequence comprises the negative partial-coefficient sequence and the positive partial-coefficient sequence. Thereafter, the echo region is provided as a region of the main coefficient sequence.

The partial coefficient sequences may in turn originate from a shared detail function.

According to another exemplary embodiment of the present invention, a position is determined at the location or the position of the middle of the distance of the last coefficient of a negative coefficient sequence or negative partial-coefficient sequence and of the position of the successor coefficient of the last coefficient of the negative coefficient sequence or negative partial-coefficient sequence as a position of an echo. The negative coefficient sequence is situated within the echo region of a predeterminable detail function. Thereafter, providing the position of the echo takes place.

By means of fixing or of determining the position of the echo, the location of an echo may be able to be unambiguously defined for incorporation into a single echo list. Providing a position of an echo may replace and/or supplement providing a region for an echo. In particular, providing an echo position may make possible more accurate location of a location of an echo than does an echo region.

According to a further exemplary embodiment of the present invention, the method further comprises predetermining a number of echoes to be found, and determining the specified number of echoes.

As a result of predetermining a number of echoes, always only a maximum number of echoes may be found. In other words this means that the number of the found echoes may not exceed the maximum value. Thus, the extent of a single echo list that is to be prepared may be able to be limited.

According to a further exemplary embodiment of the present invention, the method comprises zeroing all the coefficient sequences that have been identified for determining the echo region and/or the echo position of an echo. Furthermore, all the coefficients are zeroed that are redundant to the coefficients that have been identified for determining the echo region and/or the position of an echo, i.e. coefficients in higher-order scales are also zeroed.

As a result of zeroing, the method for finding echoes may be iteratively applicable. After the coefficients that comprises the maximum difference between negative and positive coefficient sequences have been zeroed, in a coefficient field of the plurality of coefficients of detail functions another maximum difference between a negative and a positive coefficient sequence along a local axis may be found. Thus the method may be repeatable until such time as all the findable echoes have been unambiguously identified, or until the maximum number of echoes to be found have been identified.

According to a further exemplary embodiment of the present invention, a further detail function is determined such that the further detail function represents another, for example a higher, degree of detail of the echo function than does the first detail function. For example, the further detail function may be assigned to a further scale, wherein the further scale may correspond to a higher degree of detail of the echo function.

Furthermore, a multiple echo list is determined such that the multiple echo list comprises at least two echoes, wherein each of the at least two echoes is associated with another detail function, or is assigned to another detail function. Furthermore, determining a relationship degree between the at least two echoes takes place.

Determining the echoes of the multiple list may take place by finding a characteristic feature of an echo in a detail function. In other words, for finding the echoes of the multiple list the same steps may be used as may be used for finding echoes of a single list. However, projecting may also be done without so that a plurality of echoes, and in particular all the echoes, can be found.

Furthermore, it may be possible to prepare a relationship graph, and to provide the relationship graph together with a multiple echo list. This means that it may be possible to prepare a multiple echo list and a relationship correlation that is embedded therein, provided a subsequent echo-processing algorithm also manages to handle ambiguous echo lists or multiple echo lists.

However, if the subsequent algorithm expects an unambiguous echo list or a single echo list, then by means of the selection a reduction to a single echo list may be made possible.

In order to generate a single echo list, by means of evaluating the relationship degree, selecting the echoes and the single echo list generated in this manner is provided.

By means of finding the multiple echo list it may be possible to find all the findable echoes of the echo function. During the finding of all the findable echoes, echoes may also be found which due to physical boundary conditions cannot be echoes, or which are not to be recognised as echoes.

As a result of applying defined selection criteria, for example crossing out echoes whose width is below a predeterminable minimum width, or crossing out echoes whose width exceeds a maximum width, from the plurality of the multiple echoes a single echo list may be able to be generated.

Furthermore, a relationship correlation or relationship assessment of remaining echoes may be taken into account in that echoes are deleted whose ancestors are still present in the list. Redundancies or physical ambiguities in the single echo list may thus be correctable. In other words this means that echoes may be eliminated which in the selection of a particular echo or a relevant echo can causally no longer be used as echoes. The elimination of echoes and the analysis of the relationship correlations may signify subsequent treatment of the echo data.

According to a further exemplary embodiment of the present invention, the further detail function may be associated to a further scale. Each scale may be connected with a different form of a base function.

Iteratively all the echoes may be provideable which within a scale or a detail function can be found on the basis of characteristic features. Determining the echo regions within a scale or detail function may take place until such time as no further echo regions can be found within the same scale. If within the same detail function no further echoes or echo regions are found any longer, there may be a transition to a further detail function in order to also find a plurality of echoes in this further detail function.

According to yet another exemplary embodiment of the present invention, an echo position is determined at the position of the middle of the distance of the position of the last negative coefficient of the negative coefficient sequence and of the position of the subsequent coefficient of the last coefficient of the negative coefficient sequence. Thereafter, providing the position of the echo takes place.

As a result of providing the echo position, a sharper position of an echo may be determinable. Thus a more precise position of the echo may be provideable.

According to yet another exemplary embodiment of the present invention, the method further comprises storing an echo region and/or a position of at least one echo in a list.

As a result of storing the echo region and/or the position of an echo in a list or in a multiple echo list it may be possible to provide a single echo list or a multiple echo list to a further algorithm or to a further device. The single echo list may comprise relevant echoes. The multiple echo list may comprise a plurality of echoes or all the echoes that can be found by means of decomposing an echo function into detail functions. Thus several echoes that relate to each other may be found, which echoes can be evaluated by a subsequent algorithm. The echoes of the multiple echo list may provide several physical interpretations for further processing.

According to a further exemplary embodiment of the present invention, the method further comprises storing the echo region and/or the position of the at least one echo, wherein the at least one echo fulfils a predeterminable selection condition.

By means of selecting an echo with a selection condition, the storage requirement for an echo list or multiple echo list may be reduced in that information defined in advance is not stored.

According to a further exemplary embodiment of the present invention, the method comprises selecting the echo region and/or the position of the at least one echo from the list such that a predeterminable selection condition is fulfilled.

By means of selecting from a list of echo regions or echo positions that fulfil a predeterminable selection condition, from a multiple echo list only a selection may be made. It may thus be possible to provide a subsequent algorithm with only a limited number of the plurality of echoes.

According to a further exemplary embodiment of the present invention, the selection condition for selecting from the list of the echo region and/or of the position of the echo is the provision of redundancy-free echoes.

By means of the selection condition of providing redundancy-free echoes it may be possible, taking into account a relationship correlation of echoes, to provide only those echoes that are considered for an evaluation of echoes.

According to a further exemplary embodiment of the present invention, the method comprises storing a relationship correlation between echoes, which relationship correlation is associated with different echo regions and/or different positions of echoes.

By means of storing a relationship correlation it may be possible for relationships between individual echoes to be stored. Thus the evaluation of echoes may be made easier in that, for example, covering echoes may not be taken into account.

According to yet another exemplary embodiment of the present invention, the method further comprises eliminating echoes with the use of history information.

As a result of the use of history information, in particular in the form of a prepared track or of several prepared tracks, it may be able to be determined which found echoes can sensibly continue a plurality of past tracks. Thus, further information or physical interpretation may be able to be used to eliminate echoes that are not sensible.

According to yet another exemplary embodiment of the present invention, at least two base functions form an orthogonal function system.

According to a further exemplary embodiment of the present invention, the base function makes possible redundancy-free decomposition of the echo function.

By means of redundancy-free decomposition an echo function may be able to be decomposed into a plurality of detail functions, wherein the number of the determined detail functions comprises all the detail functions that are necessary for reconstructing the echo function.

According to a further exemplary embodiment of the present invention, for decomposition the echo function is scanned with different frequencies.

According to a further exemplary embodiment of the present invention, decomposing the echo function takes place by means of filters, wherein the filters comprise different limit frequencies.

By means of scanning the echo function, and filtering with filter cores that remain constant, limit frequencies of the filters may be changed. For example, the scanning rate of the echo function from one scale to another may be increased by a factor of $2^m$.

By means of changing the limit frequency by changing the scanning rate, a plurality of detail functions of an echo function may be able to be generated.

Many improvements of the invention have been described with reference to the method for finding an echo in an echo function. These embodiments also apply to the device for finding an echo in an echo function, to the computer-readable storage medium with a program for finding an echo in an echo function, to the program element for finding an echo in an echo function, and to the measuring device with a device for finding an echo in an echo function.

Below, further exemplary embodiments of the present invention are described with regard to the device for finding an echo in an echo function. These embodiments also apply to the method for finding an echo in an echo function, to the computer-readable storage medium with a program for finding an echo in an echo function, to the program element for finding an echo in an echo function and to the measuring device with a device for finding an echo in an echo function.

According to a further exemplary embodiment of the present invention, the echo provision device is adapted such that it provides a single echo list, wherein the single echo list comprises at least one echo region.

According to yet another exemplary embodiment of the present invention, the echo determination device is adapted for determining a multiple echo list, wherein the multiple echo list comprises at least two causally dependent echo regions. Furthermore, the echo determination device is adapted for selecting a single echo list from the multiple echo list, and the echo provision device is adapted for providing a single echo list.

Causally dependent echo regions may in this context comprise a relationship correlation.

According to a further exemplary embodiment of the present invention, the echo determination device is adapted for determining the echo region as a transition region between a negative coefficient of the plurality of coefficients and a positive coefficient of the plurality of coefficients, or between a positive coefficient of the plurality of coefficients and a negative coefficient of the plurality of coefficients.

According to a further exemplary embodiment of the present invention, the transition region comprises at least one zero coefficient. The zero coefficient may be situated between the negative coefficient and the positive coefficient.

According to a further exemplary embodiment of the present invention, the echo determination device is adapted for determining an echo region as a transition region. Furthermore, the echo determination device is adapted for determining a negative coefficient sequence from the plurality of coefficient sequences, and for determining a positive coefficient sequence from the plurality of coefficients such that the negative coefficient sequence and the positive coefficient sequence are situated in a first detail function or on a first scale.

Furthermore, the echo determination device is adapted for determining the negative coefficient sequence and the positive coefficients such that the difference between the negative coefficient sequence and the positive coefficient sequence is the maximum of all the possible differences of coefficient sequences of the respective detail function or of all the analysed detail functions.

Furthermore, the echo determination device is adapted for determining the echo region such that the echo region comprises the negative coefficient sequence and the positive coefficient sequence that were found.

According to yet another exemplary embodiment of the present invention, the echo determination device for determining the echo region is adapted for determining a position of a start coefficient at the start of the negative coefficient sequence. Furthermore, the echo determination device for determining the echo region is adapted for determining a position of an end coefficient at the end of the positive coefficient sequence.

The echo provision device is adapted for providing the determined position of the start coefficient and the determined position of the end coefficient as an echo region for locating the echo in the echo function.

According to a further exemplary embodiment of the present invention, the echo determination device for determining the echo region is adapted for determining a position of a start coefficient at the end of the negative coefficient sequence. Furthermore, the echo determination device is adapted for determining a position of an end coefficient at the start of the positive coefficient sequence. And, furthermore, the echo provision device is adapted for providing the position of the start coefficient and the position of the end coefficient as an echo region.

According to a further exemplary embodiment of the present invention, the echo determination device is further adapted for determining an echo start region as a region of influence of the start coefficient of the negative coefficient sequence. And, furthermore, the echo determination device is adapted for determining an echo end region as a region of influence of the end coefficient of the positive coefficient sequence.

The echo provision device is adapted for providing the echo start region and the echo end region as the echo region. Furthermore, the echo provision device may be adapted, in addition, for providing the segment or the distance between the echo start region and the echo end region.

According to a further exemplary embodiment of the present invention, the echo determination device is further adapted for determining an echo start position as the middle of the echo start region, and for determining an echo end position as the middle of the echo end region, wherein providing the echo start region and the echo end region is providing the echo start position and the echo end position.

For the purpose of providing, for example the echo provision device may be used.

According to a further exemplary embodiment of the present invention, the echo determination device is further adapted for determining an echo start position as the middle of the distance between the position of the start coefficient and the position of the predecessor coefficient of the start coefficient, and for determining an echo end position as the middle of the distance between the position of the end coefficient and the position of the successor coefficient of the end coefficient, wherein providing the echo start region and the echo end region is providing the echo start position and the echo end position.

For the purpose of providing, for example the echo provision device may be used.

According to a further exemplary embodiment of the present invention, the echo determination device is further adapted for determining a further detail function such that the further detail function represents a higher degree of detail of the echo function than does the first detail function. The further detail function may be assigned to a further scale, which further scale is connected with a further form of the base function.

Furthermore, the echo determination device is adapted for projecting the echo start position onto the further detail function. And, furthermore, the echo determination device is adapted for projecting the echo end position onto the further detail function.

Furthermore, the echo determination device is adapted for determining a position of a further start coefficient, wherein the further start coefficient is that start coefficient of a negative coefficient sequence of the plurality of coefficient sequences of the further detail function, which negative coefficient sequence is encountered during projection. As an alternative, the start of the negative coefficient sequence is within the echo start position and the echo end position. The negative coefficient sequence may be determined such that the start of the negative coefficient sequence comprises the shortest or most minimal distance of all the negative coefficient sequences of the further detail function to the echo start position.

Furthermore, the echo determination device is adapted for determining a position of a further end coefficient, wherein the further end coefficient is that end coefficient of a positive coefficient sequence of the plurality of coefficients of the further detail function, which positive coefficient sequence is encountered during projection. As an alternative, the start of the positive coefficient sequence is within the echo start position and the echo end position. The positive coefficient sequence may be determined such that the start of the positive coefficient sequence comprises the shortest or most minimal distance of all the positive coefficient sequences of the further detail function to the echo end position.

Furthermore, the echo determination device is adapted for determining a negative coefficient sequence as a coefficient sequence that starts with the further start coefficient, and, moreover, is adapted for determining a positive coefficient sequence that ends with the further end coefficient.

Furthermore, the echo determination device is adapted for determining an echo region of the further detail function such that the echo region of the further detail function comprises a transition from the negative coefficient sequence to the positive coefficient sequence.

By means of the echo provision device the echo region of the further detail function is provided for locating the echo in the echo function.

According to a further exemplary embodiment of the present invention, the echo determination device is further adapted for determining a negative partial coefficient sequence from the plurality of coefficients of the further detail function, and for determining a positive partial coefficient sequence from the plurality of coefficients of the further detail function such that the difference of the negative partial-coefficient sequence and the positive partial-coefficient sequence is the maximum of all the possible differences of coefficient sequences that are situated within the echo region of the further detail function.

Furthermore, the echo determination device is adapted for determining the negative partial-coefficient sequence and the positive partial-coefficient sequence such that the negative partial-coefficient sequence and the positive partial-coefficient sequence are situated within the echo region of the further detail function. Furthermore, to determine a coefficient sequence such that the main coefficient sequence comprises the negative partial-coefficient sequence and the positive partial-coefficient sequence. The echo provision device is adapted for providing the echo region as a region of the main coefficient sequence.

According to a further exemplary embodiment of the present invention, the echo determination device is further adapted for determining the position in the middle of the distance of the position of the last coefficient of a negative coefficient sequence or negative partial-coefficient sequence and of the position of the successor coefficient of the last coefficient of the negative coefficient sequence or negative partial-coefficient sequence as the position of an echo, wherein the negative coefficient sequence is situated within the echo region of a predeterminable detail function, and for providing the position of the echo by way of the echo provision device.

According to a further exemplary embodiment, the echo determination device is further adapted for determining a predeterminable number of echoes. For determining the predeterminable number of echoes the number of the echoes to be determined may be predetermined for the echo determination device.

According to a further exemplary embodiment of the present invention, the echo determination device is further adapted for zeroing all the coefficient sequences that have been identified for determining the echo region and/or the position of an echo. Furthermore, the echo determination device is further adapted for zeroing all the coefficient sequences that are redundant to the coefficients that have been identified for determining the echo region and/or the position of an echo.

According to a further exemplary embodiment of the present invention, the echo determination device is further adapted for determining a further detail function such that the further detail function represents another degree of detail of the echo function than does the first detail function. The further detail function may be assignable to a scale, and the scale may relate to a form of a base function.

Furthermore, the echo determination device is adapted for determining a multiple echo list such that the multiple echo list comprises at least two echoes, wherein each one of the at least two echoes is associated with another scale, and furthermore is adapted for determining a relationship degree or a relationship correlation between the at least two echoes. The echo determination device is further adapted for selecting a single echo list by means of evaluating the relationship degree, and for providing the single echo list by way of the echo provision device.

According to a further exemplary embodiment of the present invention, the echo determination device is further adapted for determining the position of the echo at the location in the middle of the distance of the position of the last coefficient of the negative coefficient sequence and of the position of the subsequent coefficient of the last coefficient of the negative coefficient sequence, and for providing the position of the echo by way of the echo provision device.

According to a further exemplary embodiment of the present invention, the device for finding an echo in an echo function comprises a storage device, wherein the storage device is adapted for storing an echo region and/or a position of at least one echo in a list. To this effect the storage device may be connected with the echo provision device.

According to a further exemplary embodiment of the present invention, the storage device is adapted for storing the echo region and/or the position of the at least one echo, wherein the at least one echo fulfils a predeterminable selection condition.

According to a further exemplary embodiment of the present invention, the storage device is adapted for selecting from the list the echo region and/or the position of the at least one echo so that a predeterminable selection condition is fulfilled.

According to a further exemplary embodiment of the present invention, the selection condition is the provision of redundancy-free echoes.

According to a further exemplary embodiment of the present invention, the storage device is adapted for storing a relationship correlation between echoes that belong to different echo regions and/or different positions of echoes, which echoes relate to each other.

According to a further exemplary embodiment of the present invention, the echo determination device is further adapted for eliminating echoes with the use of history information.

According to a further exemplary embodiment of the present invention, at least two base functions form an orthogonal function system.

According to a further exemplary embodiment of the present invention, the at least two base functions make redundancy-free decomposition of an echo function possible.

According to a further exemplary embodiment of the present invention, the echo decomposition device is adapted for scanning the echo function for decomposition at different frequencies.

According to a further exemplary embodiment of the present invention, the echo decomposition device is further adapted for decomposing the echo function by means of filters of different limit frequencies.

The term providing may, in particular, refer to providing to an external device or display device.

The term providing may also refer to providing to an external interface. An interface may be external if the device for providing echoes from an echo function comprises a housing in which all the devices are housed which the device comprises.

Furthermore, providing all the found echoes may take place by way of the external interface. In other words, providing may mean that a list of the echo positions and/or echo regions is output without the echoes being analysed more closely. As it were, raw data may be output. Although echoes are related or redundant, the echoes may be output.

An external interface may be a hardware interface or a software interface at which the multiple echo list is provided. The idea of the external interface may be, by way of this interface, to provide a non-evaluated list of found echoes to other devices, processes or algorithms. In particular, the list may contain all the found echoes.

Providing may take place in the form of predeterminable hardware parameters or in the form of an API (application programming interface). Furthermore, providing may take place as a predeterminable signal sequence, for example to the output or pin of an integrated circuit or of a microprocessor. Furthermore, the signal sequence may be provided to an output of a sensor or field device. The echo list may be provided as a signal sequence at the external output.

For example, the signal sequence may comprise a format, wherein the format corresponds to the $I^2C$ (inter integrated circuit) standard or to a field bus standard such as field bus foundation or HART®. On the other hand, the external interface may be designed as a display device or monitor.

A real echo function or echo curve may comprise an unsteady progression; in other words, as a result of a plurality of micro-reflections, or as a result of noise influence, a plurality of small local maximums may be superimposed on an echo function. In this arrangement the plurality of micro-reflections may be superimposed such that echoes or that the form of echoes is imitated as a result of the superposition of the individual micro-reflections. This means that in positions at which there is actually no relevant echo, an echo may be detected. Algorithms which according to specified criteria determine unambiguous echo lists or echoes may in such positions indicate a relevant echo although at these positions in reality there is no relevant echo.

If all the possible echoes of an echo function are found, then it may be possible to compare the variously found echoes with each other and to weigh up which of the found echoes are in fact actual echoes. In other words this means that all the found echoes may be able to be made to relate to each other, and it may further be possible to find out correlations or redundancies of the echoes. To this effect, various physical ways of analysing, or various decompositions of an echo function may determine different physical interpretations of the individual echoes.

In conjunction with history information it may be possible to make plausible judgements and to determine which interpretation of an echo of the plurality of found echoes is sensible as an actual echo according to physical principles and plausibility considerations.

History information may represent the past or the development or change of echoes for a progression over time.

In order to arrive at a sensible interpretation it may be necessary to analyse several combinations or physical interpretations, and to arrive at a sensible judgement by comparing the possible assignments or interpretations of the echoes, in particular of the position of the echoes.

In order to make this judgement, past information, history information, tracks or progressions of the echoes may be used so that it is possible with a certain degree of probability to determine which ones of the plurality of all found echoes are relevant echoes. In the identification of relevant echoes from the plurality of found echoes it may be a matter of determining which echoes most probably coincide with the relevant echoes or actual echoes.

In contrast to evaluating an echo function with only one evaluation algorithm, which in the case of certain echo constellations can lead to incorrect results, by means of multiple echo lists it may be possible to investigate all the combinations of all possible echoes. A multiple echo list may comprise a plurality of findable echoes. This plurality of findable echoes may have been determined by applying a plurality of methods or a plurality of different analyses of the echo function.

In the analysis of the plurality of found echoes it may appear sensible to recognise certain redundancies in advance in order to reduce the number of echoes to be analysed. Using the redundancies to advantage may save resources in the implementation of the method.

The plurality of detectable echoes may be determinable by means of various methods for echo extraction, and may be provided at an external interface. In particular, the plurality of detectable echoes may be detectable by means of different methods for echo extraction. Examples of various extraction methods are a threshold value method, in particular with a smoothed echo function and/or with a smoothed threshold value function, as well as an extraction method that is based on a wavelet transformation.

According to a further exemplary embodiment of the present invention, the method comprises determining the relationship correlation between the at least one first echo and the at least one second echo, as well as providing the relationship correlation that has been determined.

Providing the relationship correlation may take place by way of the same external interface by way of which the multiple echo list is provided. However, providing the relationship correlation may also take place by way of a separate external interface.

The representation of the relationship correlation between echoes may show up redundancies and interdependencies of the echoes. Furthermore, a knowledge of the relationship correlation, in particular of the type of the relationship correlation, may simplify the interpretation of the position of an echo. Echoes may comprise a relationship correlation if they are due to the same cause.

According to a further exemplary embodiment of the present invention, the first and the second echo overlap. In particular, the echoes partly overlap.

According to a further exemplary embodiment of the present invention, the method comprises the provision of at least two determined echoes as a multiple echo list, and in particular the provision of all the determined echoes as a multiple echo list.

As a result of providing at least two or all the found echoes, it may make it possible, independently of an interpretation of the echoes, to provide a plurality of potential echoes of an echo function for subsequent algorithms. This may make it possible to investigate different constellations or combinations of the echoes in order to find the most probable constellation that reflects an actual reflector arrangement. Reflectors may be those positions in a container that reflect a signal. A constellation may be an assignment of found echoes or current echoes to actual echoes. Providing may take place by way of an external interchange point, for example an external interface. There the information relating to the echoes and/or to the relationship correlation of the echoes may be provided in a predefined format.

If an unambiguous echo list is provided, an interpretation that still leaves space for assignment may no longer be possible because a decision relating to echoes has already been made depending on the algorithm used. If the algorithm used cannot handle a progression of an echo function, thus resulting in misinterpretation of the position of the echo, the algorithm may always return an incorrect result when this progression occurs.

According to a further exemplary embodiment of the present invention, a list of the relationship correlations of the echoes is provided.

By means of the relationship correlation of the echoes, in particular of part of the echoes among themselves, redundant echoes or correlated echoes can be determined. Furthermore, it may be possible to find echo groups. Furthermore, it may become possible to find converging echoes. As a result of providing a relationship correlation or a causal dependence between echoes, the possibility of determining correlations between echoes for the evaluation of the probability of an actual echo constellation may also be provided.

According to a further exemplary embodiment of the present invention, the multiple echo list comprises a relationship correlation.

The relationship correlation may be embedded in the multiple echo list. Thus, a correlation between the multiple echo list and in particular the echoes of the plurality of echoes of the multiple echo list and the relationship correlation at a shared position may be available.

According to a further exemplary embodiment of the present invention, the method comprises generating a single echo list by means of eliminating at least one echo from the multiple echo list, depending on a predeterminable selection condition.

If a multiple echo list with a plurality of possible echoes is provided, by means of a selection of echoes the number of existing echoes may be reduced. In this way senseless combinations of echoes may be precluded from the outset in the further analysis of the plurality of echoes. It may be possible to select how much of the existing information is removed by means of the selection.

According to a further exemplary embodiment of the present invention, the selection condition is at least one condition selected from the group of conditions comprising crossing out an echo of a determined width, crossing out echoes whose amplitude is lower than a minimum amplitude that can be derived from a maximum amplitude, and crossing out echoes whose ancestor is contained in the multiple echo list.

By means of the selection conditions, from the group of the echoes the echoes that fulfil certain preconditions can be selected. For example, it may be known that occurring echoes need to exceed a certain amplitude in order to have a recognisable influence on the echo function.

Consequently, crossing out the echoes whose amplitude is lower than a predeterminable minimum amplitude may reduce the number of the echoes to be analysed. Crossing out echoes whose ancestor is contained in the multiple echo list may eliminate redundant echoes or ambiguities. This means that those echoes may be crossed out that are already represented by a clearer echo. Ambiguities may be different interpretations of the same physical fact or circumstance.

A predeterminable minimum amplitude may, for example, be predefined in that the maximum amplitude of all the existing echoes is determined and is reduced by a predeterminable amount, for example, by 30 dB.

According to yet another exemplary embodiment of the present invention, determining the first echo and/or determining the second echo comprises decomposing the echo function into at least one detail function. Each of the at least one detail functions comprises a plurality of coefficients.

Each of the at least one detail functions represents a different degree of detail of the echo function.

Furthermore, the method comprises finding a characteristic feature of an echo in the detail function, and determining an echo region by means of the found characteristic feature in the echo function. Furthermore, the method comprises providing the echo region.

By means of decomposing the echo function into a plurality of detail functions, which detail functions may represent a different degree of detail of the echo function, it may be possible to represent different physical effects or physical interpretations of an echo function progression. For example, it may be possible, in different detail functions to represent echoes of different width of the echo function. In this arrangement it may be possible in a detail function to show small humps. It may further be possible in a further detail function to separately represent a large hump that contains the small humps.

Decomposition may, for example, refer to a wavelet transformation. The different physical interpretations or the echoes that have been determined from the different detail functions may be able to be provided in a multiple echo list. As a result of finding correlations between the individual found echoes it may be possible to form echo combinations that may make it possible to determine a position of an echo or an echo position, wherein the determined echo position with predeterminable probability may correspond to the actual echo position.

For determining echoes or echo regions or echo positions, in the various detail functions characteristic features may be found that indicate the presence of an echo at the corresponding position.

According to a further exemplary embodiment of the present invention, each of the at least one detail functions is assigned to a scale, wherein each scale relates to a different form of a base function.

According to yet another exemplary embodiment of the present invention, the method further comprises determining the echo region as a transition region between a negative coefficient of the plurality of coefficients and a positive coefficient of the plurality of coefficients.

A transition or transition region between a negative coefficient and a positive coefficient may indicate the presence of an echo at the position or in the region of the transition independently of the direction from which the transition is viewed. In other words, a change in the operational sign of the coefficients of a detail function may point to a position of an echo independently of the number of zero coefficients that are situated in between.

According to a further exemplary embodiment of the present invention, the transition region comprises at least one zero coefficient.

Zero coefficients may not play a role in the analysis of a transition between a negative coefficient and a positive coefficient.

According to a further exemplary embodiment of the present invention, determining an echo region as a transition region comprises determining a negative coefficient sequence from the plurality of coefficients, and determining a positive coefficient sequence from the plurality of coefficients such that the negative coefficient sequence and the positive coefficient sequence originate from a shared detail signal. In other words this means that the negative and positive coefficient sequences may be part of a shared detail function, and in particular are situated on a shared scale.

Furthermore, the method comprises determining an echo region such that the echo region comprises the negative coefficient sequence and the positive coefficient sequence.

According to a further exemplary embodiment of the present invention, determining the echo region comprises determining a position of a start coefficient at the start of the negative coefficient sequence, and, furthermore, determining a position of an end coefficient at the end of the positive coefficient sequence, and providing the position of the start coefficient and the position of the end coefficient as an echo region.

According to a further exemplary embodiment of the present invention, determining an echo region comprises determining a position of a start coefficient at the end of the negative coefficient sequence, and determining a position of an end coefficient at the start of the positive coefficient sequence.

If the start coefficient and the end coefficient have been determined, the position of the start coefficient and the position of the end coefficient can be provided as an echo region.

According to a further exemplary embodiment of the present invention, the method further comprises determining an echo start region as a region of influence of the start coefficient of the negative coefficient sequence. Furthermore, the method comprises determining an echo end region as a region of influence of the end coefficient of the positive coefficient sequence. By determining an echo start region and an echo end region it is possible to provide the echo start region and the echo end region as the echo region.

The region of influence of a coefficient may be defined by a section of an axis, which section extends from the middle of the segment of the position of the respective coefficient to the position of its predecessor coefficient to the middle of the segment of the position of the respective coefficient to the position of its successor coefficient.

When viewed from the respective coefficient, the predecessor coefficient may be situated in the direction of decreasing distance values. The successor coefficient may be situated in the direction of increasing distance values.

The position in the middle of the segment of the position of the coefficient to the respective predecessor coefficient may still form part of the region of influence of the coefficient, whereas the position in the middle of the segment of the position of the coefficient to its successor coefficient may no longer form part of the region of influence of the coefficient.

As a result of the definition of a start region and of an end region an unsharp definition of an echo region may be possible, as a result of which locating the echo with a certain probability may be stated. For example, no sharp limits or precise limits may be provided. A subsequent algorithm may determine the sharp limits. An unsharp definition may be sensible if subsequent algorithms with unsharp regions are able to handle unsharp regions in order to delay the decision as to the position of the echo as long as possible in the method.

According to a further exemplary embodiment of the present invention, the method comprises determining an echo start position as the middle of the echo start region, and determining an echo end position as the middle of the echo end region. Providing the echo start region and the echo end region is providing the echo start position and the echo end position.

As a result of providing the echo start position and the echo end position, precise or sharp definition of an echo region may be possible.

According to a further exemplary embodiment of the present invention, the method further comprises determining an echo start position as the middle of the distance between the position of the start coefficient and the position of the predecessor coefficient of the start coefficient. Furthermore, the method comprises determining an echo end position as the middle of the distance between the position of the end coefficient and the position of the successor coefficient of the end coefficient. The echo region is the region between the echo start position and the echo end position and is provided.

According to a further exemplary embodiment of the present invention, the method further comprises determining a further detail function such that the further detail function represents a different degree of detail of the echo function than does the first detail function.

Furthermore, the method comprises determining the multiple echo list such that the multiple echo list comprises at least two echoes, wherein each of the at least two echoes is assigned to another detail function. Furthermore, the at least two echoes comprise a relationship degree or a relationship correlation. The method may also provide for determining the relationship correlation and providing the relationship correlation.

Determining different detail functions, in other words detail functions with a different degree of detail, may make it possible to provide different physical interpretations for found possible echoes.

For example, the further detail function may be assigned to a further scale. In particular, the echo regions, which are associated with the at least two echoes, may be situated on different scales.

As a result of finding all the characteristic transitions within a detail function, iteratively all the echoes may be able to be provided which can be found within a scale or a detail function. Determining the echo regions within a detail function may take place until such time as no further echo regions, i.e. no further transition regions between negative and positive coefficients, can be found within the same detail function. If no longer any further echoes or echo regions can be found within a detail function, a transition to a further detail function may be made in order to also find a plurality of echo regions or echoes in this further detail function.

As a result of the transition to a further detail function it may be possible to iteratively find the echoes or echo regions for all the detail functions. Thus within the different detail functions the different echoes may be able to be determined which can mean different physical interpretations of the associated echoes of the echo function.

The plurality of echo regions for the echoes of a multiple echo list, which plurality are provideable in a multiple echo list, may iteratively be found over all the detail functions.

According to a further exemplary embodiment of the present invention, the further detail function is assigned to a further scale. Each scale is connected with a different form of a base function.

According to a further exemplary embodiment of the present invention, the method comprises determining the position of the echo at the location in the middle of the distance of the position of the last negative coefficient of the echo region, and the position of the successor of the last negative coefficient of the echo region, and providing the position of the echo as an echo region.

According to yet another exemplary embodiment of the present invention, decomposing the echo function takes place by means of a continuous wavelet transformation.

According to a further exemplary embodiment of the present invention, decomposing the echo function takes place by means of a discrete wavelet transformation.

According to a further exemplary embodiment of the present invention, decomposing the echo function takes place by means of a fast wavelet transformation.

According to a further exemplary embodiment of the present invention, decomposing the echo function takes place by means of wavelet packets.

According to a further exemplary embodiment of the present invention, decomposing the echo function takes place by means of a filter bank.

According to yet another exemplary embodiment of the present invention, the filter bank comprises a Gauss filter characteristic.

The Gauss filter characteristic may be matched to the progression of a real echo.

According to yet another exemplary embodiment of the present invention, determining the first echo and/or determining the second echo comprises determining a threshold value function. Furthermore, determining the first echo and/or determining the second echo comprises determining the at least one first echo as an at least one search region, wherein the at least one search region is a region between two intersections of the echo function with the threshold value function. And, furthermore, the method comprises determining at least a second echo as at least one of the existing local maxima of the echo function, which maxima are situated within the at least one search region. Between the at least one search region and the local maximum a relationship correlation or a causal correlation may exist. In other words, determining the first echo and/or determining the second echo comprises determining at least one search region as a region between two intersections of the echo function with the threshold value function, and determining the local maxima of the echo function within the at least one search region.

The gradient of the echo function at the two intersections may comprise different values and in particular a different operational sign.

According to a further exemplary embodiment of the present invention, the method comprises determining the relationship correlation between the at least one search region and the at least one local maximum.

By means of finding local maxima within a search region, smaller echoes may be assignable to a large echo. A group of echoes may be determinable that comprises a large echo and small echoes.

A detailed examination of the echoes may be possible, which echoes are able to be found, by means of a threshold value method, without the actual echo position being prematurely determined to the position of the large echo or to the position of the local maxima.

According to a further exemplary embodiment of the present invention, the method comprises determining the at least one search region as a predecessor, and determining the at least one local maximum as its successor. In this arrangement predecessors are parent echoes in the sense of a relationship correlation, while successors are children echoes in the sense of a relationship correlation.

Consequently, by means of this threshold value method a multiple echo list with a relationship correlation may be able to be prepared. In particular, the method may comprise determining all the local maxima as successors of the search region.

According to a further exemplary embodiment of the present invention, determining the threshold value function takes place by means of low-pass filtering the echo function.

According to a further exemplary embodiment of the present invention, determining the threshold value function takes place by means of a wavelet transformation of the echo function.

For example, by eliminating coefficients in a wavelet decomposition of the echo function a smoothed threshold value function may be determinable.

Above, embodiments of the invention have been described have been described have been described with reference to the method for providing a plurality of echoes from an echo function. These embodiments analogously also apply to the computer-readable storage medium, to the program element, to the device for providing a plurality of echoes from an echo function, and to the measuring device.

Below, further exemplary embodiments of the present invention are described with regard to the device for providing a plurality of echoes from an echo function. These embodiments also apply to the method for providing a plurality of echoes from an echo function, to the computer-readable storage medium, to the program element and to the measuring device.

According to a further exemplary embodiment of the present invention, the device further comprises a relationship determination device or relationship-correlation determination device and a relationship provision device. The relationship determination device is connected with the echo determination device. Furthermore, the relationship determination device is connected with the relationship provision device.

The relationship determination device is adapted for determining the relationship correlation between the at least one first echo and the at least one second echo, wherein the echo provision device is adapted for providing a plurality of determined echoes, and wherein the relationship provision device is adapted for providing the relationship correlation.

Determining the relationship correlation may take place in parallel or at the same time with the determination of the echoes. Consequently, the multiple echo list may be able to be provided separately of the relationship correlation or together with the relationship correlation.

According to a further exemplary embodiment of the present invention, the at least one first echo and the at least one second echo overlap.

According to a further exemplary embodiment of the present invention, the echo provision device is further adapted for providing at least two of the determined echoes as a multiple echo list.

The relationship provision device may also be an external interface.

According to a further exemplary embodiment of the present invention, the relationship provision device is further adapted for providing a list of the relationship correlation.

According to yet another exemplary embodiment of the present invention, the multiple echo list comprises a relationship correlation. For example, the relationship correlation may be embedded in the multiple echo list.

According to a further exemplary embodiment of the present invention, the echo provision device is further adapted for providing a single echo list by means of eliminating at least one echo from the multiple echo list, depending on a predeterminable selection condition.

According to a further exemplary embodiment of the present invention, the selection condition is at least one condition selected from the group of conditions comprising crossing out an echo of a determined width, crossing out echoes whose amplitude is lower than a minimum amplitude that can be derived from a maximum amplitude, and crossing out echoes whose ancestor or predecessor is contained in the multiple echo list.

According to a further exemplary embodiment of the present invention, the device for determining the first echo and/or for determining the second echo further comprises an echo decomposition device. The echo decomposition device is connected with the echo receiving device and the echo determination device.

The echo decomposition device is adapted for decomposing the echo function into at least one detail function, wherein each of the at least one detail functions comprises a plurality of coefficients.

Each of the at least one detail functions represents a different degree of detail of the echo function, and the echo determination device is further adapted for finding a characteristic feature of an echo in the at least one detail function, and for determining an echo region by means of the found characteristic feature in the echo function. The echo provision device is further adapted for providing the echo region.

Furthermore, it may be possible to decompose the echo function into at least two detail functions.

According to a further exemplary embodiment of the present invention, each of the at least one detail functions is assignable to a scale. Each scale relates to a different form of a base function.

According to a further exemplary embodiment of the present invention, the echo determination device is further adapted for determining the echo region as a transition region between a negative coefficient of the plurality of coefficients and a positive coefficient of the plurality of coefficients.

According to a further exemplary embodiment of the present invention, the transition region comprises at least one zero coefficient.

According to a further exemplary embodiment of the present invention, the echo determination device for determining an echo region as a transition region is further adapted for determining a negative coefficient sequence from the plurality of coefficients, and for determining a positive coefficient sequence from the plurality of coefficients such that the negative coefficient sequence and the positive coefficient sequence originate from a shared detail function.

The echo determination device is further adapted for determining the echo region such that the echo region comprises the negative coefficient sequence and the positive coefficient sequence.

According to a further exemplary embodiment of the present invention, the echo determination device for determining the echo region is further adapted for determining a position of a start coefficient at the start of the negative coefficient sequence, and for determining a position of an end coefficient at the end of the positive coefficient sequence. The echo provision device is further adapted for providing the position of the start coefficient and the position of the end coefficient as an echo region.

According to a further exemplary embodiment of the present invention, the echo determination device for determining the echo region is further adapted for determining a position of a start coefficient at the end of the negative coefficient sequence, and for determining a position of an end coefficient at the start of the positive coefficient sequence. The echo provision device is further adapted for providing the position of the start coefficient and the position of the end coefficient as an echo region.

According to a further exemplary embodiment of the present invention, the echo determination device is further adapted for determining an echo start region as a region of influence of a start coefficient of the negative coefficient sequence, and furthermore for determining an echo end region as a region of influence of an end coefficient of the positive coefficient sequence. The echo provision device is adapted for providing the echo start region and the echo end region as the echo region.

According to a further exemplary embodiment of the present invention, the echo determination device is further adapted for determining an echo start position as the middle of the echo start region, and for determining an echo end position as the middle of the echo end region. The echo provision device is further adapted for providing the echo start position and the echo end position as the echo start region and the echo end region.

According to a further exemplary embodiment of the present invention, the echo determination device is further adapted for determining an echo start position as the middle of the distance between the position of the start coefficient and the position of the predecessor coefficient of the start coefficient. Furthermore, for determining an echo end position as the middle of the distance between the position of the end coefficient and the position of the successor coefficient of the echo end coefficient, wherein the echo region is the region between the echo start position and the echo end position.

According to a further exemplary embodiment of the present invention, the echo decomposition device is further adapted for determining a further detail function such that the further detail function represents another degree of detail of the echo function than does the at least one detail function.

The further detail function may be assigned to a further scale.

The echo determination device is further adapted for determining the multiple echo list such that the multiple echo list comprises at least two echoes, wherein each of the at least two echoes originates from another detail function.

The relationship determination device may be adapted for determining a relationship degree between the at least two echoes.

According to a further exemplary embodiment of the present invention, the echo determination device is further adapted for determining the position of the echo at the location in the middle of the distance of the position of the last negative coefficient of the negative coefficient sequence of the echo region, and for determining the position of the subsequent coefficient of the last coefficient of the negative coefficient sequence, wherein the echo provision device is adapted for providing the position of the echo as the echo region.

According to a further exemplary embodiment of the present invention, the echo decomposition device is adapted for decomposing the echo function by means of a continuous wavelet transformation.

According to yet another exemplary embodiment of the present invention, the echo decomposition device is adapted for decomposing the echo function by means of a discrete wavelet transformation.

According to a further exemplary embodiment of the present invention, the echo decomposition device is adapted for decomposing the echo function by means of a fast wavelet transformation.

According to a further exemplary embodiment of the present invention, the echo decomposition device is adapted for decomposing the echo function by means of wavelet packets.

According to yet another exemplary embodiment of the present invention, the echo decomposition device is adapted for decomposing the echo function by means of a filter bank.

According to a further exemplary embodiment of the present invention, the filter bank comprises a Gauss filter characteristic.

According to yet another exemplary embodiment of the present invention, the device for determining the first echo and/or for determining the second echo further comprises a threshold value device.

The threshold value device is connected with the echo receiving device, with the relationship determination device and the echo determination device. The threshold value device is further adapted for determining a threshold value function. Furthermore, the threshold value device is adapted for determining at least one search region as a region between two intersections of the echo function with the threshold value function, and for providing this region as the first echo. Furthermore, the threshold value device is adapted for determining or providing at least one of the local maxima of the echo function within the at least one search region as the at least one second echo. In other words this means that the threshold value device is adapted for determining at least one search region as a region between two intersections of the echo function with the threshold value function, and for determining the local maxima of the echo function within the at least one search region. Furthermore, the threshold value device is adapted for determining the search region as at least one first echo, and for determining the at least one local maximum as at least one second echo.

The at least one first echo and the at least second echo are determined such that between the at least one search region and the at least one local maximum there is a relationship correlation.

According to a further exemplary embodiment of the present invention, the threshold value device is connected with the relationship determination device. Furthermore, the relationship determination device is adapted for determining the relationship correlation between the at least one search region and the at least one local maximum.

According to a further exemplary embodiment of the present invention, the relationship determination device is adapted for determining the at least one search region as a predecessor, and for determining the local maxima as successors. Or the relationship determination device is adapted for determining the at least one search region as a predecessor, and the at least one local maximum as a successor. In this context the term predecessor relates to parent echoes in the sense of a relationship correlation, and the term successor relates to children echoes in the sense of a relationship correlation.

According to yet another exemplary embodiment of the present invention, the threshold value device is further adapted for determining the threshold value function by means of low-pass filtering.

According to a further exemplary embodiment of the present invention, the threshold value device is further adapted for determining the threshold value function by means of a wavelet transformation.

A multiple echo list may be an echo list that comprises a plurality of echoes or a plurality of current echoes. The echoes of the multiple echo list, in particular the positions of the echoes, may be able to be assigned to past echoes in that the assignments are evaluated with costs. The costs may be dependent on the quality of an assignment. A good assignment may be evaluated with low costs, while a bad assignment may be evaluated with high costs.

The plurality of the echoes in the echo list may have been determined by various methods for echo determination or echo extraction. In this process if only costs are considered in the assignment of echoes to past echoes or in the assignment to tracks, an assignment may be found as being associated with the most minimal costs, which assignment makes no sense for physical reason.

By means of different methods for echo determination, for example two echoes may have been determined at the same position, which echoes according to cost consideration alone may be assigned to two different tracks.

By means of additionally looking at relationship correlations between the echoes it may be possible to prevent senseless assignments, and to iteratively check the assignment of current echoes to tracks from the past. It may be considered to be an idea of the invention, alternately to make assignments of echoes to tracks, and to check these assignments by means of additional information such as a relationship correlation or a physical interpretation. Consequently, the aspect of finding an assignment with low costs may be taken into account while at the same time physical aspects are fulfilled.

Methods that merely implement cost optimisation for an assignment of echoes to tracks may be able to be improved by means of taking into account relationship correlations.

In the evaluation of the costs of an assignment of at least one current echo to the at least one past echo, an assignment may be weighted. For example, for weighting, the location difference between a current echo and a past track may be determined, as may the difference of the echo width between a current echo and a past track, the amplitude difference between a current echo and a past track, or the difference of the front edge height of a current echo to a past track. The measure for weighting may be a correlation measure for the assignment of the current echo to the past track.

The relationship correlation of the echoes of the plurality of current echoes among each other may describe a causal correlation of the echoes. By means of the relationship correlation a relationship graph may be able to be prepared, and by means of the relationship correlation various echoes that comprise shared features or a relationship correlation may be able to be grouped to form a group of echoes.

By means of repeated monitoring of assigning on the one hand due to weighting of the assignment of a current echo to a past echo, and on the other hand due to evaluation of a relationship correlation between the current echoes, during the determination of echoes of the echo function or during the selection of echoes from an echo function or from an echo list, constant monitoring of the selection for plausibility may take place.

In other words this means that parallel to the weighting of an assignment of current echoes to a past echo the relationship correlation of the echoes among each other may be analysed.

A predeterminable selection criterion for an assignment may, for example, be the selection of an echo constellation or the selection of a combination of echoes, which combination most favourably continues an existing track or a plurality of existing tracks. The evaluation as to whether a track is continued in a favourable manner may, for example, be a continuation of tracks with the lowest overall costs.

This means that each combination of echoes from the plurality of current echoes of the multiple echo list, which combination can be determined taking into account the relationship correlation, may continue the existing tracks. Each combination of echoes for continuing tracks may be evaluated with costs. After evaluation of all the possible combinations, the combination which involves the lowest overall costs may be determined.

Since the number of combinations of current echoes of the plurality of current echoes from the echo list may exponentially increase with an increasing number of echoes, the computing time for finding all the possible combinations may increase exponentially.

In order to prevent or attenuate an exponential rise in the computing time, and in order to be able to do with few resources in the calculation of the assignment of the echoes from the echo list to past echoes, parallel analysis of the relationship correlation may reduce the number of combinatorial solutions which would have to be analysed in a complete analysis. In other words, taking into account the relationship correlation, a solution that for causal reasons is not expedient to an assignment of echoes to tracks may quickly be discarded.

Assignment to tracks may furthermore make it possible to determine echoes from an echo function, and to remove interference in the echo function. Consequently, a position of the echoes may be determinable, as a result of which, for example, a fill level in a container may be determinable.

According to a further exemplary embodiment of the present invention, at least one progression over time of at least one echo of a plurality of past echo functions forms a track.

If past echo functions are stored, wherein the echo functions comprise similar echo progressions, it may be possible to monitor echoes over time. In particular, changes of echoes over time may become visible. The time interval of determining the echo function may be selected so as to be short so that excessive changes of the echo within the time interval may be prevented. Determining the echo functions may be considered to be scanning of the current situation in a container, i.e. in each instance the past echo functions may represent a momentary snapshot of the situation in the container.

According to a further exemplary embodiment of the present invention, the method further comprises deleting a track if over a predeterminable time no assignment of at least one current echo to the track is determinable.

Due to changes within the tank or the container, echoes that previously existed may disappear. The method may detect such a disappearance of echoes and may cross out from monitoring any echoes that are no longer present.

According to a further exemplary embodiment of the present invention, the method further comprises reinitialising a track for monitoring a current echo, which current echo has not yet been able to be assigned to a past echo.

A new echo can arise as a result of a changed state in the container. For example, new adherence of the feed material to the container wall may arise. Due to the new adherence a new echo may arise. As a result of taking into account a new echo in the form of a reinitialised track, the addition of an echo may be tolerable by the method.

According to a further exemplary embodiment of the present invention, weighting the assignment of the at least one current echo to the at least one past echo of the at least one past echo function comprises weighting the assignment with costs.

For example, an echo that is situated in the region of, or near, an already present echo or track, for continuing the adjacent track may be evaluated to involve little in the way of costs. By evaluating the assignment by means of costs, a favourable assignment constellation or an assignment of various echoes to tracks may be able to be found.

According to yet another exemplary embodiment of the present invention, selecting the assignment of at least one current echo to the at least one past echo from the at least one past echo function comprises finding a cost minimum over a plurality of possible assignments of current echoes to the past echoes or tracks. In particular, the method comprises finding a cost minimum over all the possible assignments of current echoes to the past echoes.

In this way those echoes may be able to be determined from the multiple echo list, which echoes may continue the tracks with the lowest costs of all combinations. Determining the lowest costs may represent determining within the container the actual echoes that have occurred. As a result of this determination, providing the determined echoes as a single echo list may be possible.

According to yet another exemplary embodiment of the present invention, weighting the assignment of the at least one current echo to the at least one past echo from the at least one past echo function takes place depending on a degree of agreement of the current echo with the echo of the past echo function.

The degree of agreement may, for example, be a location difference, a difference of the echo width, an amplitude difference or a difference of the front edge height of the echoes and tracks.

According to a further exemplary embodiment of the present invention, weighting the at least one assignment of the at least one current echo to the at least one past echo from the at least one past echo function takes place depending on an amplitude difference of the current echo and the echo of the past echo function.

According to yet another exemplary embodiment of the present invention, weighting the at least one assignment of the current echo to the at least one past echo of the at least one past echo function takes place depending on a location difference of the current echo and the echo of the past echo function.

According to yet another exemplary embodiment of the present invention, selecting the assignment of the at least one current echo to the at least one past echo comprises carrying out the Munkres algorithm in combination with taking into account a relationship correlation.

The combination of the Munkres algorithm with taking into account the relationship correlation or causal dependence of the echoes may make it possible not only to find an assignment with low costs, but at the same time to also find causally sensible and physically interpretable assignments of echoes to past echoes.

Even in the case of a present irregular progression of a determined echo function it may be possible to determine the associated positions or regions of the situation of an echo or of a plurality of echoes.

According to yet another exemplary embodiment of the present invention, selecting the assignment of at least one current echo to the at least one past echo comprises forming at least one echo combination from the plurality of current echoes, taking into account the relationship correlation. Thereafter, determining a favourable echo combination, and selecting the echo combination from the at least one echo combination take place such that the echo combination comprises the lowest overall costs.

By means of taking into account the relationship correlation not all the possible echo combinations may have to be taken into account, so that the computing effort can be reduced, as can the necessary computing resources.

According to yet another exemplary embodiment of the present invention, the relationship correlation between the at least two current echoes of the plurality of current echoes provides a possible physical interpretation of a group of several local maxima of at least two concrete imaginable variants for further processing.

The plurality of existing echoes may be regarded from various aspects, in other words with different physical interpretations, before an evaluation of the assignment of current echoes to tracks may take place. Thus real factors and physical boundary conditions may be able to be taken into account. Subsequently, physically sensible and physically less sensible interpretations may be taken into account in the evaluation.

According to a further exemplary embodiment of the present invention, the relationship correlation between the at least two current echoes of the plurality of current echoes is related to a different degree of detail of a decomposition of the echo function.

For example, a different physical analysis may be able to be achieved in that a different degree of detail is determined by applying a wavelet transformation to the echo function. In the various scalings, various details of the echo function may be visible at different locations or at the same locations. Taking together all the found positions of the echoes may result in a multiple echo list with a corresponding relationship correlation.

According to yet another exemplary embodiment of the present invention, the relationship correlation is related to the position relative to a threshold value function.

After a threshold value method has been carried out, in other words after a comparison of the echo function with a threshold value function, search regions and local maxima may be able to be determined. The search region and the local maxima may relate to each other by means of a relationship correlation.

According to yet another exemplary embodiment of the present invention, the relationship correlation between the at least two current echoes of the plurality of current echoes is a correlation between an ancestor and a descendant or successor.

An ancestor- and successor relationship may be able to be represented in a relationship graph.

According to yet another exemplary embodiment of the present invention, the ancestor and descendant relate to a shared local region which the ancestor and descendant comprise.

According to yet another exemplary embodiment of the present invention, the method comprises determining a cost matrix, wherein the cost matrix represents the weighted assignment of at least one current echo of the plurality of current echoes to the at least one past echo.

As a result of preparing a cost matrix, methods for cost optimisation may be carried out, which methods re-arrange the cost matrix correspondingly.

Above, embodiments of the invention have been described have been described have been described with reference to the method for selecting echoes from an echo list. These embodiments analogously also apply to the computer-readable storage medium, to the program element, to the device for selecting echoes from an echo list, and to the measuring device.

Below, further exemplary embodiments of the present invention are described with regard to the device for selecting echoes from an echo list. These embodiments also apply to the method for selecting echoes from an echo list, to the computer-readable storage medium, to the program element and to the measuring device.

According to a further exemplary embodiment of the present invention, at least one progression over time of at least one echo of a plurality of past echo functions forms a track.

According to a further exemplary embodiment of the present invention, the tracking device is further adapted for deleting a track if over a predeterminable period of time no assignment of at least one current echo to the track is determinable.

In order to determine the passing of time, the tracking device may comprise a timer.

According to yet another exemplary embodiment of the present invention, the tracking device is further adapted for re-initialising a track for monitoring a current echo, which current echo has not yet been able to be assigned to a past echo.

According to yet another exemplary embodiment of the present invention, the tracking device is adapted for weighting the assignment of the at least one current echo to at least one past echo from the at least one past echo function with costs.

According to another exemplary embodiment of the present invention, the tracking device is adapted for selecting the assignment of at least one current echo to at least one past echo of the at least one past echo function by means of finding a cost minimum by way of a plurality of possible assignments of current echoes to the past echoes.

The plurality of possible assignments may also comprise all the assignments.

According to yet another exemplary embodiment of the present invention, the tracking device is further adapted for weighting the assignment of at least one current echo to at least one past echo from the at least one past echo function depending on a degree of agreement of the current echo with the echo of the past echo function.

According to yet another exemplary embodiment of the present invention, the tracking device is adapted for weighting the assignment of the at least one current echo to the at least one past echo from the at least one past echo function depending on an amplitude difference between the current echo and the echo of the past echo function.

According to yet another exemplary embodiment of the present invention, the tracking device is adapted for weighting the assignment of at least one current echo to the at least one past echo of the at least one past echo function depending on a location difference of the current echo and the echo of the past echo function.

According to yet another exemplary embodiment of the present invention, the tracking device is adapted for selecting the assignment of at least one current echo to the at least one past echo of the past echo function by means of carrying out the Munkres algorithm in combination with taking into account the relationship correlation between the echoes.

According to yet another exemplary embodiment of the present invention, the tracking device is adapted for selecting the assignment of at least one current echo to at least one past echo of the at least one past echo function by forming at least one echo combination from the plurality of current echoes, taking into account the relationship correlation. Furthermore, the tracking device can select the assignment by means of determining a favourable echo combination and selecting an echo combination from the at least one echo combination so that the echo combination comprises the lowest overall costs in the assignment.

According to yet another exemplary embodiment of the present invention, the relationship correlation between the at least two current echoes of the plurality of current echoes provides a possible physical interpretation of a group of several local maxima of at least two concrete imaginable variants for further processing.

According to yet another exemplary embodiment of the present invention, the relationship correlation between the at least two current echoes of the plurality of current echoes relates to a different degree of detail of a decomposition of the echo function.

According to yet another exemplary embodiment of the present invention, the relationship correlation relates to the position in relation to a threshold value function.

According to yet another exemplary embodiment of the present invention, the relationship correlation between the at least two current echoes of the plurality of current echoes is a correlation between an ancestor and a descendant.

According to yet another exemplary embodiment of the present invention, the ancestor and the descendant relate to a local region which two echoes comprise.

The shared local region may represent overlapping of the local region.

According to yet another exemplary embodiment of the present invention, the tracking device is further adapted for determining a cost matrix, wherein the cost matrix represents the weighted assignment of at least one current echo of the plurality of current echoes to the at least one past echo.

It may be considered to be an idea of the invention to determine the largest possible number of echoes to be found. For the purpose of finding the echoes, different echo extraction methods may be used. The found echoes may be analysed separately from each other as long as possible. For separate analysis the echoes may be stored in the multiple echo list.

In the analysis of the echoes, different physical interpretations of causes for the echoes may be used. After weighing up possible physical interpretations, the history progression and/or the relationship correlation of the echoes, a decision as to the position of the echo function at which the echo is situated may be made. This situation or position of the echo may be converted to a fill level. As an alternative, the determined echo may be provided as a single echo list.

The echo extraction from an echo function may be inaccurate, and thus the single echo list may also comprise inaccurate positions or regions of echoes. This inaccuracy, which, for example may be caused by an unsteady signal progression due to interference or false echoes, or due to the superposition of a plurality of micro reflections, may lead to an inaccurate determination of a fill level height. Furthermore, misinterpretations of echoes, for example the detection of echoes at positions where there are no relevant echoes, may lead to incorrectly determined fill levels.

By means of determining a multiple echo list and tracking a progression over time of an echo in an echo function it may be possible to determine a precise position of an echo. For this determination of the precise position it is possible to use history information, and furthermore an echo combination or a selection from the multiple echo list can take place such that with a high degree of probability the found echoes correspond to the relevant echoes.

By means of providing a single echo list that is as accurate as possible, a subsequent evaluation algorithm or echo evaluation algorithm for determining a fill level may provide an accurate fill level.

To determine an echo function, an ultrasound signal, a pulse radar signal, an FMCW-radar signal (frequency modulated continuous wave), a guided microwave or a laser signal may be used. These methods may be based on the principle of run time measuring. The echo function may be provided by an echo function determination device, or may be read out from a storage device.

According to a further exemplary embodiment of the present invention, the at least two echoes comprise at least one first echo and at least one second echo. In this arrangement the at least one first echo and the at least one second echo may overlap.

In this context the terms overlap or overlapping may refer to partial overlapping so that the two echoes may not cover each other or so that the two echoes are not redundant echoes. Partially overlapping echoes may return a different interpretation relating to the position of an echo. From the partially overlapping echoes a relationship correlation may be derivable.

According to a further exemplary embodiment of the present invention, the multiple echo list comprises a relationship correlation.

The echoes or echo positions that are stored in a multiple echo list may be in a causal correlation by means of a relationship correlation. As a result of the knowledge of a relationship correlation between the echoes it may be possible to eliminate individual echoes early if it may be a matter of finding a real echo or true echo. The relationship correlation may be embedded in the multiple echo list. A multiple echo list may be a file with a predefined structure or an array that is stored in an electronic storage device. In other words, a multiple echo list may be any possible form of the representation of a plurality of, or of all, the determined echoes and/or of the associated relationship correlation of the echoes among each other. A multiple list may be received at a software interface or at a hardware interface.

According to a further exemplary embodiment of the present invention, the method for fill level measuring comprises generating the single echo list by means of eliminating at least one echo from the multiple echo list depending on a predeterminable selection condition.

A predeterminable selection condition may be at least one condition selected from the group of conditions comprising crossing out an echo of a determined width, crossing out echoes whose amplitudes are lower than a minimum amplitude that can be derived from a maximum amplitude, and crossing out echoes whose ancestor is contained in the multiple echo list.

According to a further exemplary embodiment of the present invention, determining the at least two echoes, in particular determining the multiple echo list, may comprise decomposing the echo function into at least two detail functions, wherein each of the at least two detail functions comprises a plurality of coefficients, and wherein each of the at least two detail functions represents a different degree of detail of the echo function.

In a first detail function at least one characteristic feature of an echo is found, and in a further detail function at least one further characteristic feature of an echo is found. Thereafter, by means of the found characteristic features, at least two echo regions in the echo function are determined, which echo regions are provided as at least two echoes.

The degree of detail of each of the at least two detail functions may relate to a different form of a base function.

The first detail function may be one of the at least two detail functions, and the further detail function may be the other of the at least two detail functions. The first detail function may comprise a plurality of first coefficients, and the further detail function may comprise a plurality of further coefficients. The plurality of first coefficients and the plurality of further coefficients may form a coefficient field that comprises the plurality of coefficients. The characteristic feature, for example a transition between a negative coefficient sequence and a positive coefficient sequence, may be found along a local axis of a detail function.

According to a further exemplary embodiment of the present invention, each of the at least two detail functions is assigned to a scale, wherein each scale relates to a different form of a base function.

A scale may be used for differentiating between different details, for example the echoes in the echo function.

According to a further exemplary embodiment of the present invention, the method comprises determining an echo region as a transition region between a negative coefficient of the plurality of coefficients and a positive coefficient of the plurality of coefficients.

Each of the at least two echo regions or each of the at least two echoes may be found by means of determining a transition region between a negative coefficient and a positive coefficient. Finding the echo regions may also be referred to as extracting echoes from the echo function.

According to a further exemplary embodiment of the present invention, decomposing the echo function takes place by means of at least one transformation, wherein the transformation is selected from the group of transformations comprising a continuous wavelet transformation, a discrete wavelet transformation, a fast wavelet transformation, and wavelet packets.

According to yet another exemplary embodiment of the present invention, decomposing the echo function takes place by means of a filter bank. The filter characteristic of the filter bank may be connected with a base function.

According to yet another exemplary embodiment of the present invention, the filter bank comprises a Gauss filter characteristic.

The Gauss filter characteristic may be matched to a progression of an echo in an echo function.

According to yet another exemplary embodiment of the present invention, determining the at least two echoes, and in particular determining the multiple echo list, comprises determining a threshold value function, after which at least one search region is determined as a region between two intersections of the echo function with the threshold value function. Thereafter, determining at least one local maximum of the echo function within the at least one search region takes place. Furthermore, the relationship correlation between the at least one search region and the at least one local maximum is determined.

Both the echo function and the threshold value function may be smoothed functions. The smoothed functions may be determined from the original function by means of a wavelet transformation, by means of eliminating wavelet coefficients, and by means of retransformation.

According to yet another exemplary embodiment of the present invention, the at least one search region is determined as a predecessor, and the at least one local maximum is determined as a successor.

In this arrangement, predecessors are parent echoes in the sense of a relationship correlation, while successors are children echoes in the sense of a relationship correlation.

As a result of the determination of a predecessor and of a successor, a relationship graph may be predeterminable, as a result of which a relationship correlation between different maxima, echoes or troughs may be representable.

According to yet another exemplary embodiment of the present invention, determining the threshold value function is by means of low-pass filtering of the echo function.

According to yet another exemplary embodiment of the present invention, determining the threshold value function is by means of a wavelet transformation of the echo function.

By means of the wavelet transformation of the echo function, i.e. by means of decomposing the echo function into wavelet coefficients, and by means of subsequent targeted eliminating of wavelet coefficients and back-transforming the remaining wavelet coefficients, a smoothed threshold value function may be able to be generated.

According to yet another exemplary embodiment of the present invention, at least one progression over time of at least one echo of a plurality of past echo functions forms a track.

A track may arise in that several echo functions that have been determined successively are strung together, and the progression of characteristic maxima is tracked. These characteristic maxima may be identified as valid echoes.

According to yet another exemplary embodiment of the present invention, the method comprises deleting a track if over a predeterminable period of time no assignment of at least one current echo to the track is detectable.

A current echo may be an echo that has been determined from a currently determined echo function. For example, a current echo may also be an echo from a current multiple echo list.

The echo function may have been recorded by means of a sensor. From the echo function the multiple echo list may be determinable. On the other hand, a multiple echo list may have been determined by receiving an echo list or by selecting an echo list from a storage device.

According to yet another exemplary embodiment of the present invention, the method comprises reinitialising a track for monitoring a current echo, which current echo has not yet been assignable to a past echo.

If changes occur within a container, a new echo may arise, or an existing echo may disappear. As a result of the reinitialisation of tracks, or as a result of the deletion of tracks it may be possible to flexibly react to changes within the container.

According to yet another exemplary embodiment of the present invention, assigning at least one of the at least two echoes or at least one of the at least two echo regions to at least one past echo comprises carrying out a Munkres algorithm in combination with taking into account a relationship correlation. As an alternative, assigning at least one of the at least two echoes or at least one of the at least two echo regions to at least one past echo comprises carrying out a method of reduction to single assignments.

Above, embodiments of the invention have been described with reference to the method for fill level measuring. These embodiments analogously also apply to the computer-readable storage medium, to the program element, and to the fill-level measuring device.

Below, further exemplary embodiments of the present invention are described with regard to the fill-level measuring device. These embodiments also apply to the method for fill level measuring, to the computer-readable storage medium, and to the program element.

According to a further exemplary embodiment of the present invention, the at least two echoes comprise at least one first echo and at least one second echo. Furthermore, the at least one first echo and the at least one second echo overlap.

According to yet another exemplary embodiment of the present invention, the multiple echo list comprises a relationship correlation.

According to a further exemplary embodiment of the present invention, the echo determination device furthermore is adapted for generating the single echo list by means of eliminating at least one echo from the multiple echo list, depending on a predeterminable selection condition.

According to yet another exemplary embodiment of the present invention, the echo determination device furthermore is adapted for determining the multiple echo list, and for decomposing the echo function into at least two detail functions, wherein each of the at least two detail functions comprises a plurality of coefficients. Each of the at least two detail functions represents a different degree of detail of the echo function.

The echo determination device is further adapted, in a first detail function, for determining or finding a first characteristic feature of an echo, and in a further detail function for finding a further characteristic feature of an echo. Furthermore, the echo determination device is adapted, by means of the found characteristic features, for determining at least two echo regions in the echo function, and for providing the echo regions.

The at least two echo regions or the at least two echoes may differ. A different degree of detail may relate to a different form of a base function.

According to a further exemplary embodiment of the present invention, each of the at least two detail functions is assigned to a scale. Each scale in turn relates to a different form of a base function.

For example, each of the at least two detail functions may be assigned to a different scale.

According to a further exemplary embodiment of the present invention, the echo determination device is further adapted for determining an echo region as a transition region between a negative coefficient of the plurality of coefficients and a positive coefficient of the plurality of coefficients.

A transition between a negative coefficient and a positive coefficient may also be a transition of a negative coefficient sequence and of a positive coefficient sequence. Any zero coefficients that may be situated between the at least one negative coefficient and the at least one positive coefficient are ignored in the analysis of the transitions.

According to yet another exemplary embodiment of the present invention, the echo determination device is further adapted for decomposing the echo function by means of at least one transformation selected from the group of transformations comprising a continuous wavelet transformation, a discrete wavelet transformation, a fast wavelet transformation and wavelet packets.

According to yet another exemplary embodiment of the present invention, the echo determination device is further adapted for decomposing the echo function by means of a filter bank.

According to a further exemplary embodiment of the present invention, the filter bank comprises a Gauss filter characteristic.

According to yet another exemplary embodiment of the present invention, the echo determination device is adapted for determining a threshold value function. Furthermore, the echo determination device is adapted for determining at least one search region as a region between two intersections of the echo function with the threshold value function, and for determining at least one local maximum of the echo function within the at least one search region.

By means of the threshold value function the at least two echoes of the multiple echo list may be determined.

The relationship determination device is adapted for determining and providing the relationship correlation between the at least one search region and the at least one local maximum.

According to yet another exemplary embodiment of the present invention, the relationship determination device is further adapted for determining the at least one search region as a predecessor, and for determining the at least one local maximum as a successor.

In this context the term predecessor refers to parent echoes in the sense of a relationship correlation, and the term successors refers to children echoes in the sense of a relationship correlation.

According to yet another exemplary embodiment of the present invention, the echo determination device is adapted for determining the threshold value function by means of low-pass filtering from the echo function.

According to yet another exemplary embodiment of the present invention, the echo determination device is adapted for determining the threshold value function by means of a wavelet transformation of the echo function and for eliminating coefficients.

As a result of eliminating coefficients a smoothed echo function may arise.

According to a further exemplary embodiment of the present invention, at least one progression over time of at least one echo of a plurality of past echo functions forms a track.

According to a further exemplary embodiment of the present invention, the tracking device is further adapted for deleting a track if over a predeterminable period of time no assignment of at least one current echo to the track is determinable.

According to a further exemplary embodiment of the present invention, the tracking device is further adapted for re-initialising a track for monitoring a current echo that has not yet been able to be assigned to a past echo.

According to a further exemplary embodiment of the present invention, the tracking device is further adapted for assigning at least one of the at least two echoes to at least one past echo, in that the tracking device carries out the Munkres algorithm in combination with taking into account a relationship correlation. As an alternative, the tracking device is further adapted for assigning at least one of the at least two echoes to at least one past echo in that the tracking device carries out the method of reduction to single assignments.

According to yet another exemplary embodiment of the present invention, the fill-level measuring device is at least one fill-level measuring device selected from the group of the fill-level measuring devices comprising a radar fill-level measuring device, an ultrasound fill-level measuring device, a fill-level measuring device according to the principle of the guided microwave, and a laser fill-level measuring device.

The emitted signal may, for example, be a radar signal, an ultrasound signal, a radar pulse signal, a microwave signal or a laser signal.

BRIEF DESCRIPTION OF THE DRAWINGS

Below, advantageous exemplary embodiments of the present invention are described with reference to the figures.

FIG. 20 shows a block diagram of various filter banks for decomposition by means of a straddling algorithm.

FIG. 21 shows the representation of a decomposition of an echo function by a straddling algorithm.

FIG. 41 shows a multiple echo list and a multiple echo list reduced by redundancies.

FIG. 52 shows a multiple echo list with crossed-out echoes.

FIG. 53 shows a simplex echo list that has been generated from a multiple echo list.

FIG. 59 shows a change in a cost matrix during carrying out the modified Munkres algorithm, taking into account relationship relations (relationship correlations).

DETAILED DESCRIPTION OF EXEMPLARY EMBODIMENTS

Figure 1:
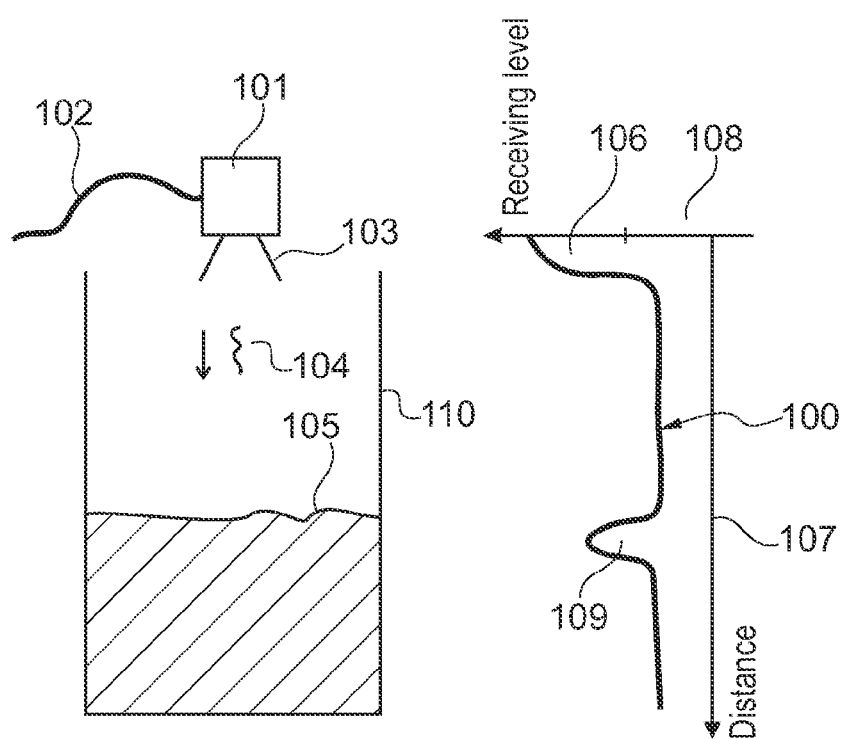
FIG. 1 shows an echo function of a fill-level measuring device with a measuring arrangement.

The illustrations in the figures are schematic and not to scale. In the following description of FIG. 1 to FIG. 67f the same reference characters are used for identical or corresponding elements.

FIG. 1 shows an echo function of a fill-level measuring device with a measuring arrangement. Signals from the field of fill-level measuring technology can differ from the signals from other fields of application of echo-processing sensors. Apart from generally poor signal-to-noise ratios, deformation of echoes by application influences and the presence of false echoes play a role.

FIG. 1 further shows an echo curve 100, echo function 100, envelope 100, measuring curve 100 or measuring function 100. The echo function 100 corresponds to an echo curve 100 that has been recorded with a fill-level measuring device 101 under ideal conditions.

The fill-level measuring device 101, field device 101 or the sensor 101 are connected, via the transmission line 102, with a control room or an evaluation device (not shown in FIG. 1). The transmission line 102 can be a field bus system, for example a HART® bus or a field bus-foundation bus.

The field device 101 can be any type of measuring device 101, for example a fill-level measuring device 101, a pressure measuring device 101 or a limit-level acquisition measuring apparatus (level switch apparatus) 101. For acquiring measured values, different physical effects can be utilised with the different measuring devices. The acquisition of measured values can be effected with the aid of a radar beam, by means of ultrasound, by vibration, by means of a guided microwave (TDR, time domain reflection) or as well by means of laser light.

The field device 101 comprises a transmitting and receiving device 103. The transmitting and receiving device may be implemented by an antenna 103. From the antenna 103 signals 104 are emitted in the direction of the filling good surface 105. The emitted signals 104, for example electromagnetic waves, are reflected by the filling good surface 105 and are guided to the antenna 103. Within the antenna 103, too, signal components can be reflected that generate the so-called antenna ringing 106. This antenna ringing 106 is comprised at the start of the echo function 100.

The echo function 100 is entered in a diagram. On the abscissa 107 of the diagram the distance to the object measured is entered. On the ordinate 108 of the diagram the receiving level of the echo signal in the form of an amplitude of the reflected signal is entered. The distance is determined from a run time (delay) of the signal 104 from the antenna 103 via the fill good surface 105 and back to the antenna 103.

The actual valid echo 109 is comprised in the echo function at the position of the distance of the filling good surface 105 from the antenna 103. The valid echo 109 is shown by a rise in the level of the amplitude of the reflected signal 100.

The valid echo 109 is generated by reflection at the plane fill level surface 105 and the valid echo comprises a standard echo form that is determinable in advance. This standard echo form of the echo function 100 is determined by the system assembly, in particular by the embodiment of the transmitting and receiving electronic within the field device.

Figure 2:
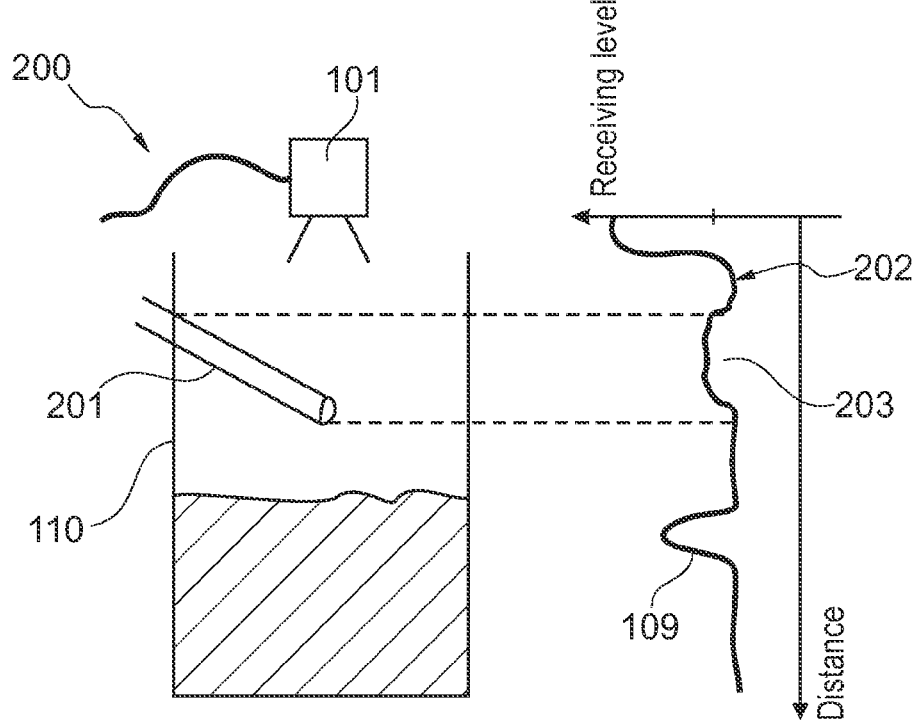
FIG. 2 shows an echo function of a fill-level measuring device with a false echo and a measuring arrangement.

FIG. 2 shows an echo function 202 of a fill-level measuring device with a false echo 203 with an associated measuring arrangement 200. In addition to the field device 101, the measuring arrangement 200 comprises a location of interference 201 (an interferer 201). The location of interference 201 is caused by an inclined pipe that projects into the filling good container 110. In real filling good containers such a location of interference can, for example, occur as an installed pipeline, as an agitator or in the form of a ladder.

The widened false echo 203 arises by the superposition of a plurality of reflections that can arise due to the inclined installation of the pipe 201, wherein the reflections occur at many small locations of the interfering object 201. During operation the width of the false echo 203 remains almost constant. From this it follows, that the width of the false echo 203 needs to be determined only once, for example during setting up the container.

Figure 3:
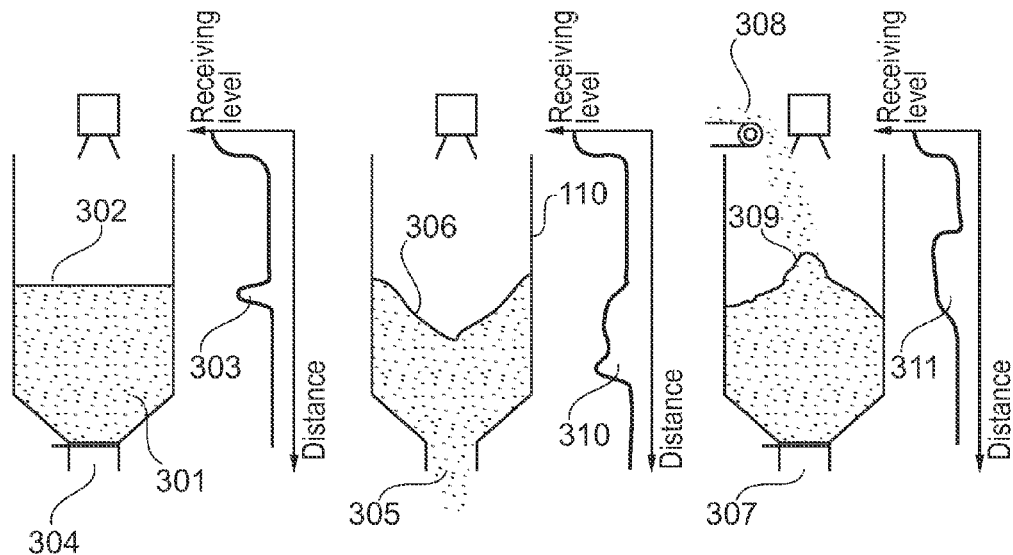
FIG. 3 shows three echo functions of a fill-level measuring device with associated measuring arrangements for bulk solids.

FIG. 3 shows three echo functions of a fill-level measuring device with associated measuring arrangements for bulk solids. If instead of a liquid, the fill level of a bulk solid 301 is measured, then various constellations of the bulk solid can result. The conditions resulting during measurements of bulk solids are comparable to those in the case of a disturbed liquid surface that is, for example, caused by an agitator.

The bulk solid surface can form a plane surface 302, like the surface of a liquid. Consequently, in the case of a plane bulk solid surface 302 a standard echo form 303 results, as in the case of a liquid surface. A plane bulk solid surface can result in the case of a closed closure 304 when the components of the bulk solid can planely distribute (can distribute to form a plane surface, can distribute on a level).

During a closure 304 is open (During open closure 304), a negative bulk solid cone 306 can arise in the container 110 due to the discharging bulk solid 305.

In the case of a closed closure 307, yet with supply of a bulk solid by the conveyance device 308, a positive bulk solid cone 309 can form. Due to the formation of a negative 306 or positive 309 bulk solid cone, the valid echo 310, 311 may widen. The form of the valid echo 310, 311 thus differs from the form of the standard echo 109, 303. The signal progression in the region of the valid echo 310, 311 depends, for example, on the form of the bulk material cone 306, 309 and the signal progression may not be able to be predicted, or may be predicted only with difficulty.

Figure 4:
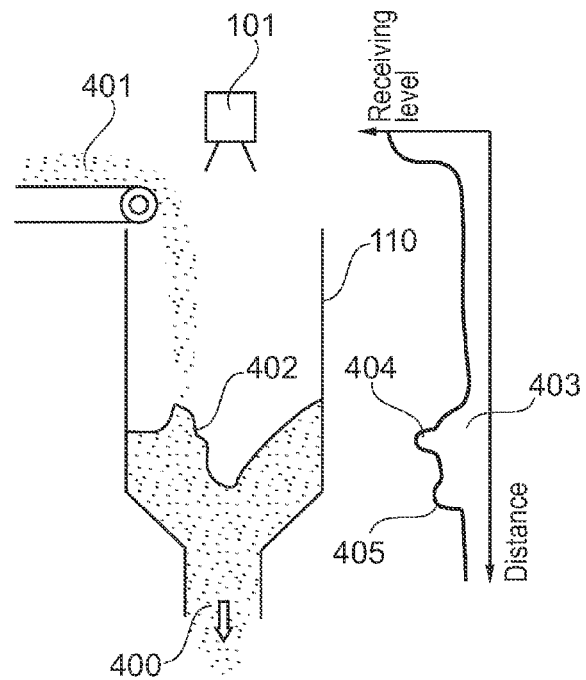
FIG. 4 shows an echo function of a fill-level measuring device with a measuring arrangement, during concurrent filling and emptying.

FIG. 4 shows an echo function of a fill-level measuring device with an associated measuring arrangement during concurrent filling and emptying. In the case of emptying 400 and concurrent filling 401, any form 402 of the bulk solid surface can arise within the container 110. The form of the echo resulting with concurrent filling and emptying, in particular the form of the valid echo 403 resulting thereby, is difficult to predict, and, furthermore, can fundamentally change at any time during operation of the fill-level measuring device 101. As shown in FIG. 4, the valid echo 403 comprises two small bumps or humps 404, 405.

Depending on the markedness of the corresponding location of interference 201 within the container 110, false echoes in the echo curve comprise a more or less strongly marked standard echo form. Other conditions may arise in the region of false echoes if these are slowly being overlapped by the filling good or feed material. I.e. if the filling good climbs in the container, the filling good may overlap or cover the interference location, Consequently, the corresponding echoes may also overlap. Slow overlapping can occur during slow filling of a container. Due to constructive and destructive interference to the carrier wave 104 that is used by the fill-level measuring device 101, "pumping" of the echo amplitudes in the region of superposition (overlap) may occur. This pumping can lead thereto (can lead to a situation) that temporary two echoes can be seen, while shortly thereafter only one single echo, but for example a long echo without amplitude drop, can be seen.

The various interferences to the echo function 203, 310, 311, 403 can also occur in combination. Due to the combination of interferences, real curves, seen over a chronological progression, can comprise a disturbed (an unsteady) curve progression. This disturbed curve progression mostly is caused by constructive or destructive superposition of a plurality of very small reflections. The large number of small reflections is caused by the plurality of reflection surfaces that are present in the case of inhomogeneous surfaces.

Figure 5:
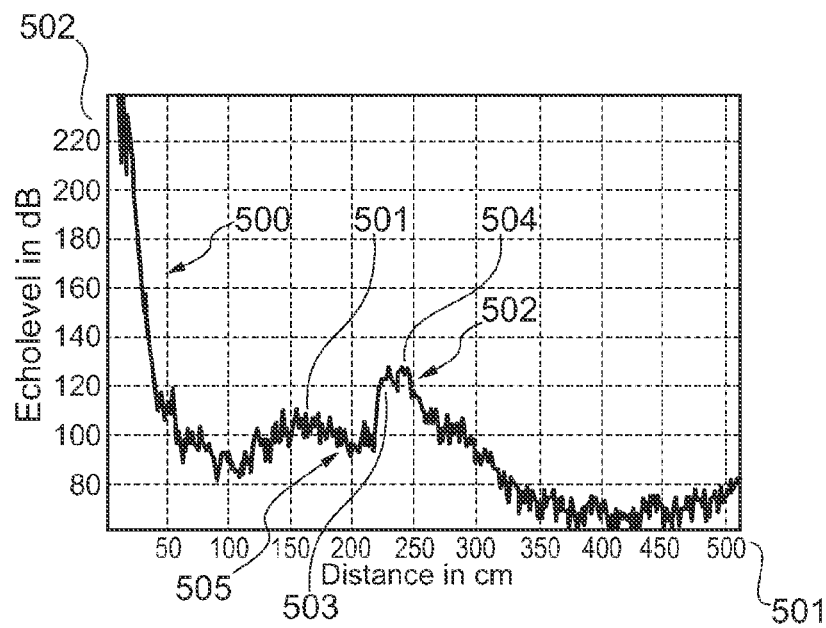
FIG. 5 shows an echo function of an ultrasound measuring device.

FIG. 5 shows an echo function 500 of an ultrasound measuring device. The real echo function 500 is again entered into a coordinate system whose abscissa 501 indicates the distance in centimetres, while the ordinate 502 indicates the echo level in decibels (dB). The echo level corresponds to an amplitude or to an echo amplitude.

In the region from one metre to two metres the echo function comprises a so-called blurred echo 501. In a region of 2.20 m the echo function 500 comprises a rise in the level 502. For this rise in the level 502 several possibilities of interpretation exist. The rise in the level 502 might involve a single echo or it might involve the superposition of a false echo 503 (in the region of 2.20 m to 2.40 m) with a valid echo 504 (in the region of 2.40 m to 2.60 m). Consequently, several different physical interpretations of the rise in the level 502 are possible.

Without having further background information it is only hardly possible to directly decide, which physical interpretation of the rise in the level 502 is appropriate. For example, the entire rise in the level 505 in the region between 1 m and 3.00 m might involve an entire echo band, i.e. the superposition of many small individual reflections to form an overall echo, that is caused by a very large bulk (bulk solid) cone.

Figure 6:
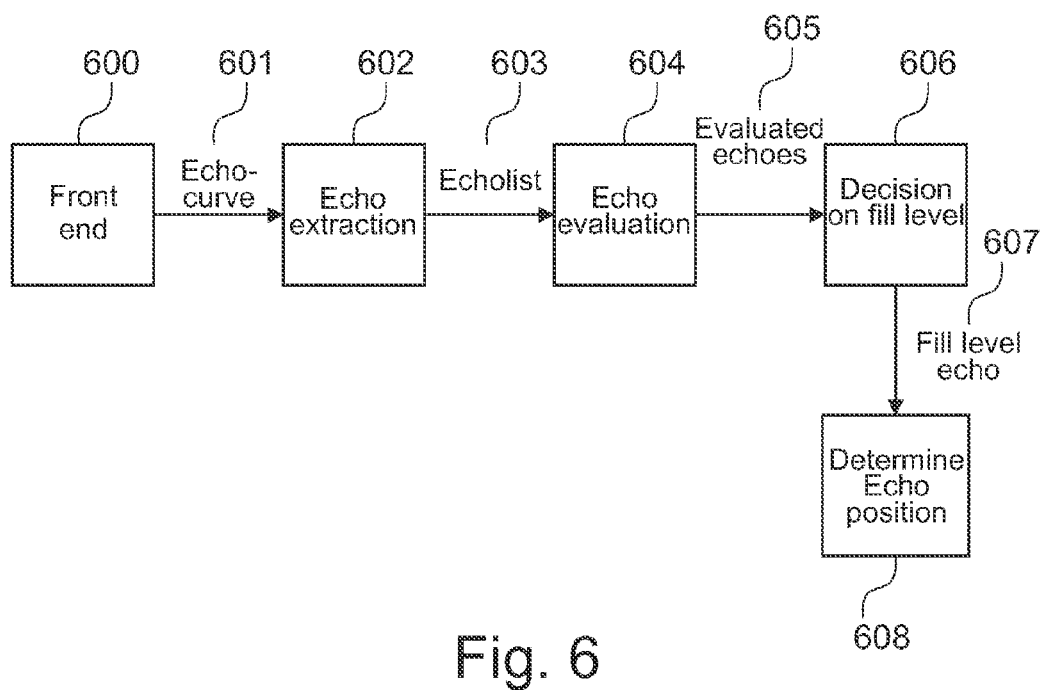
FIG. 6 shows a block diagram for echo function evaluation in a fill-level measuring device.

FIG. 6 shows a block diagram for echo function evaluation in a fill-level measuring device. The front end 600 comprises the hardware units and software units that are necessary to provide an echo curve in digital form. The front end can, for example, be designed (implemented) as an ultrasound front end, as a pulse radar front end, as an FMCW-radar front end (frequency modulated continuous wave) or as a front end according to the principle of the guided microwave. However, a laser front end 600 is also imaginable.

While for ultrasound, pulse radar and guided microwave the echo curve is provided by direct sampling of an analogue echo curve 500, 100, 202, for an FMCW-radar the echo curve or echo function only arises by the formation of the Fourier transform or Fourier transformed (the function which is associated to a given function by applying the Fourier transform) of the sampled beat signal.

Via the connection 601 the front end conveys the determined echo curve or echo function in digital form to the echo extraction device 602. The echo extraction device 602 identifies a plurality of reflection positions in the container by means of an increase in the level, i.e. by means of certain criteria of an amplitude progression of the echo function 500, 100, 202. Furthermore, the echo extraction device 602 determines increases in the echo function 500, 100, 202, which increases arise only due to the influences of noise, in order to ignore them.

The echo extraction device 602 generates an echo list 603 which the echo extraction device conveys to the echo evaluation device 604 (echo rating device 604) that is connected with the echo extraction device 602. The generated echo list 603 can be a simplex echo list (a single echo list) or a multiple echo list 603. A simplex echo list 603 makes it possible after completion of the echo extraction to make an unambiguous statement as to where echoes are present and where no echoes are present. Accordingly the simplex echo list does not comprise alternative interpretations of the identified increases in the levels. The quality of the statement as to the position where the echo is present depends on the echo extraction method that was applied for the determination of the simplex echo list 603.

In contrast to the above, in the case of a multiple echo list 603 a plurality of potential echoes is passed to the subsequent stage 604. The multiple list comprises at least two mutually excluding physically imaginable interpretations of a found arrangement of local maxima of the received echo function. For example, the echoes can be combined into groups of several echoes and can be incorporated in the echo list, wherein the echo groups can be regarded as an alternative physical interpretation of the echoes comprised in the list.

Based on the echo list 603 that comprises the current echoes, in the context of echo evaluation a comparison of the found echoes among each other is carried out in the echo evaluation device 604. For carrying out the comparison, the echo list 603 comprises characteristic features of the found echoes, as for example the start, the end or the amplitude of the echo. The start of an echo is the region of the distance scale 501, 107, from which region with increasing distance from the ordinate of a diagram of the echo function a remarkable increase in the level of the echo function is detectable. The echo end is a region that is situated spaced apart at an increased distance from the echo start, in which region the echo level has dropped again.

Depending on the embodiment of the method, based on the characteristic features of the found echoes, a comparison of the found echoes with the echoes found in the past is realized. In this comparative analysis the echoes can be evaluated with regard to their probability of representing the fill level echo. Different methods provide different positions of echoes and different physical interpretations.

After echo evaluation in the echo evaluation device 604, the evaluated echoes or rated echoes are passed to the decision device 606, via the connection 605. In the decision device 606 a decision regarding the fill level (a decision on the fill level) is made on the basis of the evaluated echoes 605. In other words, the position of the echo 109, 303 is identified, which echo with the highest probability originates from those reflections of the signal 104 that best correspond with the filling good surface.

Following a decision concerning the fill level, via the connection 607 the result of the decision regarding the fill level is passed on to the echo-position determination device 608. With the use of the identified fill level echo, in the echo-position determination device 608 the precise distance between the echo and the sensor 101 is determined by means of special algorithms. Thereto (for this purpose) a measured run time of the signal 104 is converted to a distance.

Figure 7:
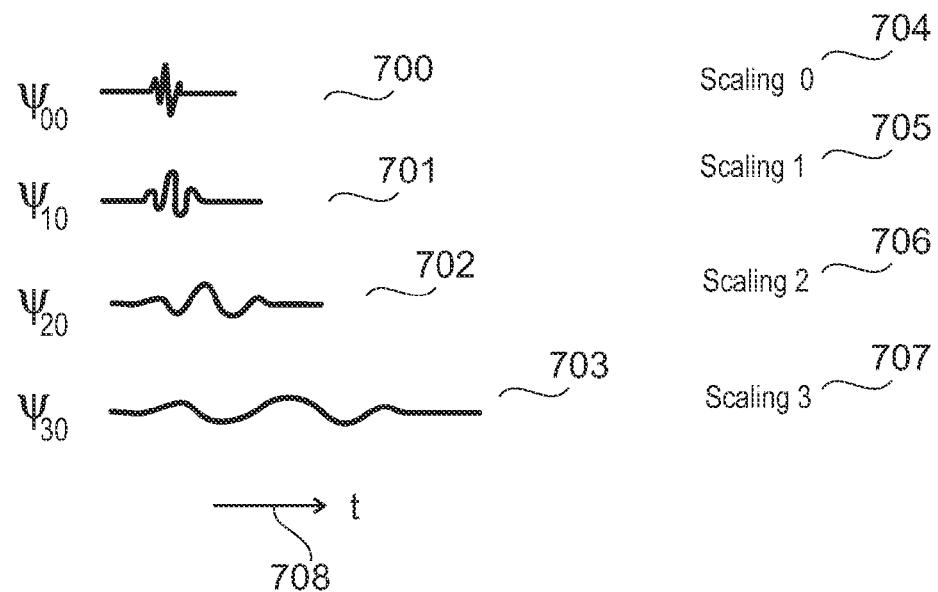
FIG. 7 shows an assignment of the form of a base function to a scale.

FIG. 7 shows the assignment of a form of a base function to a scale. FIG. 7 shows the various forms of a base function 700, 701, 702 and 703, wherein the base functions 701, 702 and 703 originate by extension or elongation from the basic form 700. The first form of the base function 700 is assigned to the scaling 0 704, the second form of the base function 701 is assigned to the second scaling 1 705, the third form of the base function 702 is assigned to the third scaling 2 706, and the fourth form of the base function 703 is assigned to the fourth scaling 3 707. Consequently, the scaling or scales 704, 705, 706, 707 are related to, or linked with, various forms of the base function 700, 701, 702, 703.

The various forms of the base function 700, 701, 702 and 703 are various forms of appearance of a wavelet, which forms of appearance can be used for a wavelet transformation or wavelet transform. The base functions of a wavelet transformation all originate from a previously defined signal form 700 that is limited in time, the so-called mother wavelet 700, the basic wavelet 700 or the base wavelet 700. In a manner similar to the harmonic base functions of a Fourier transformation or a Fourier transform, the further function progressions 701, 702, 703 are generated by extension in the direction of the time axis 708 from the mother wavelet 700. These further function progressions 701, 702, 703 are also used as base functions of the wavelet transformation.

Figure 8:
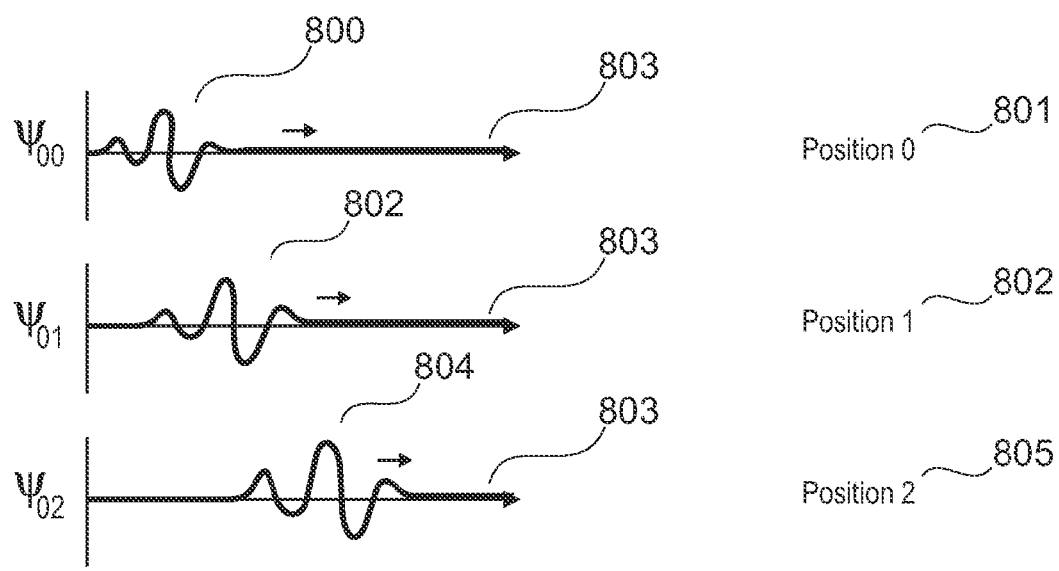
FIG. 8 shows the assignment of a base function to a position.

In addition, by displacement or movement of the wavelets, as shown in FIG. 8, a plurality of further base functions may be generated. I.e., by displacement 800, 802, 804 of the mother wavelets 700 and of the extended variants of the mother wavelet 701, 702, 703 a plurality of further base functions can be generated.

The function progression of the mother wavelet 700 can be described as (t). By scaling and displacing this mother wavelet, a system of base functions can be generated which system is described by the following equation:

$$\Psi_{k,l}(t) = \frac{1}{\sqrt{|k|}} \cdot \Psi\left(\frac{t-l}{k}\right)$$

The parameter k characterises the scaling of the mother wavelets 700 along the time axis 708, and l characterises the displacement of the mother wavelet on the abscissa 803, i.e. in the direction of the local axis 803 (the axis representing a location). Generally, due to the possibility of the arbitrary selection of the parameters k and l, the base function system is not an orthogonal function system. Therefore, the coefficients obtained by the transformation are not redundancy-free.

In order to make it possible to use a given wave form as a mother wavelet for the construction of a family of base functions, a few mathematical characteristics should be met.

The term base function can designate a mother wavelet. Furthermore, the term base function can comprise all the functions that can be generated from a mother wavelet by scaling and displacement. However, the term base function can also describe a filter characteristic of a filter bank, or it can describe a filter characteristic derived from the base function.

FIG. 8 shows the assignment of a base function to a position 801, 802, 805 or to a distance 801, 802, 805. Thereby, the position 801, 802, 805 relates to displacement of the mother wavelet 700.

The wavelet function $\Psi_{00}$ 800 shows a starting position, namely position 0 801. The wavelet function $\Psi_{01}$ 802 is a function 802 that has been displaced by the local value l=1 relative to the mother wavelet function $\Psi_{00}$ 800. The scaling of $\Psi_{01}$ is k=0, wherefrom it is apparent that it ($\Psi_{01}$) is the displaced mother wavelet function that has not been elongated. This function that has been displaced along the ordinate 803 corresponds to a position 1 with l=1 802.

The wavelet function 804 $\Psi_{02}$ shows a further displaced wavelet function, whose displacement is assigned to the position 2 with l=2 805.

Figure 9:
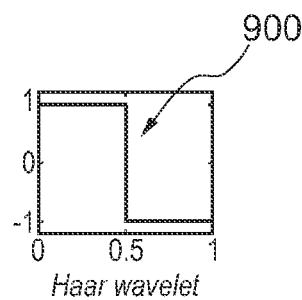
FIG. 9 shows a Haar wavelet.

FIG. 9 shows the Haar mother wavelet. The progression of the Haar wavelet 900 corresponds to a step function which with a local value of 0.5 comprises a jump from the amplitude value 1 to the amplitude value −1.

Figure 10:
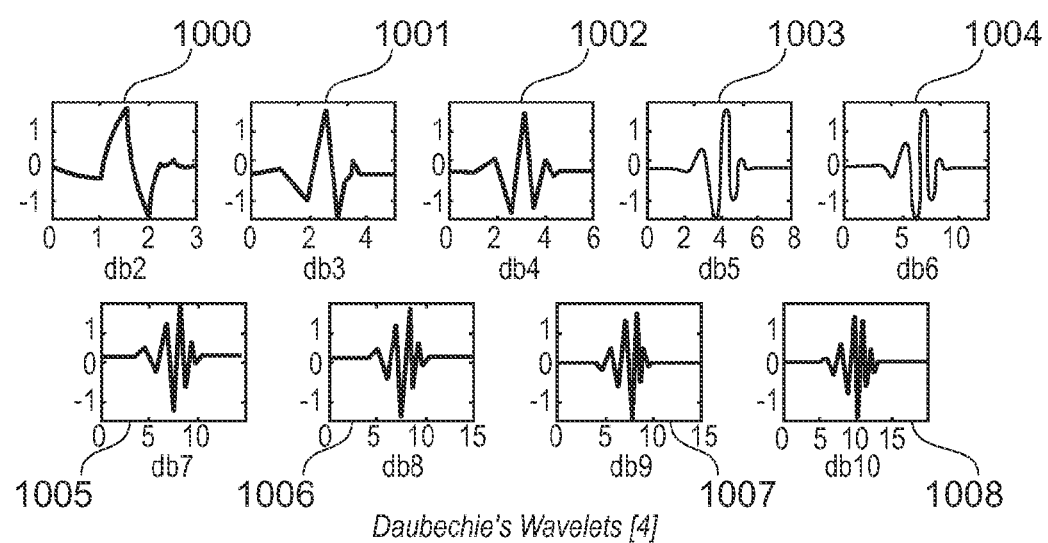
FIG. 10 shows nine different mother wavelets from the family of the Daubechie wavelets.

FIG. 10 shows nine different variants of a mother wavelet from the family of the Daubechie wavelets. By means of corresponding displacement and extension, the mother wavelets 1000, 1001, 1002, 1003, 1004, 1005, 1006, 1007 and 1008 can form a base function system.

Figure 11:
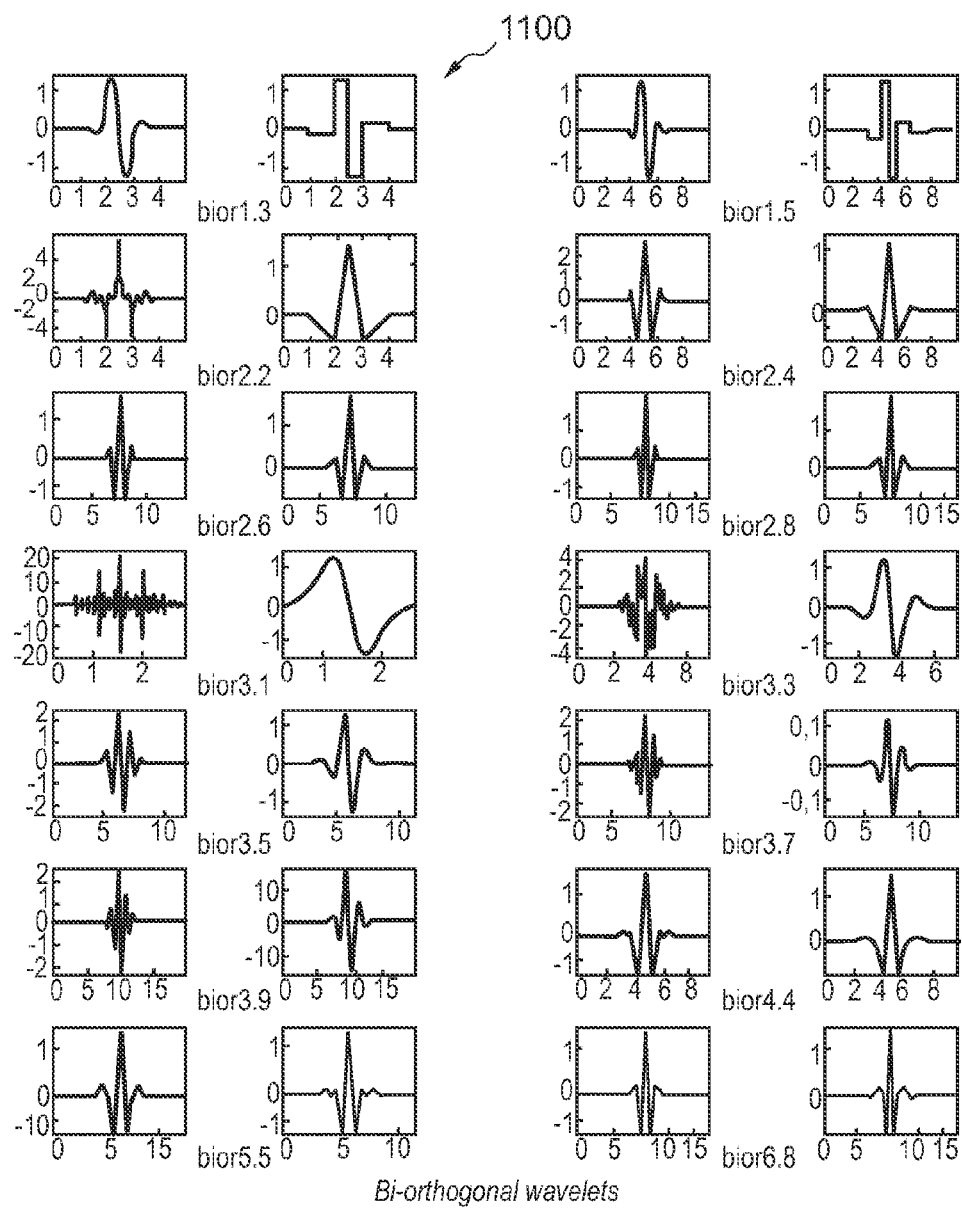
FIG. 11 shows 28 different mother wavelets from the family of the bi-orthogonal wavelets.

FIG. 11 shows 28 different variants of a mother wavelet from the family of the bi-orthogonal wavelets. By means of corresponding displacement and extension, the mother wavelets 1100 can form a base function system.

Figure 12:
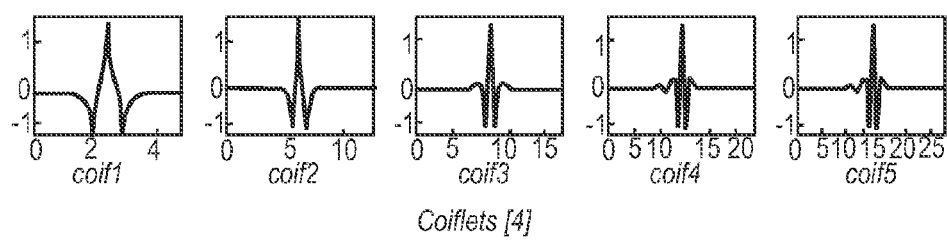
FIG. 12 shows 5 different mother wavelets from the family of the coiflets.

FIG. 12 shows five different variants of a mother wavelet from the family of the coiflets. The five various forms 1200 can also be used as a mother wavelet for the purpose of generating a base function system.

The coefficients of a continuous wavelet transformation are determined by the following equation:

$$C(k, l) = \int_{-\infty}^{\infty} f(t) \cdot \Psi_{k,l}(t)\,dt$$

The parameter k is used as a scaling parameter k. The meaning of this equation is illustrated in FIG. 13.

Figure 13:
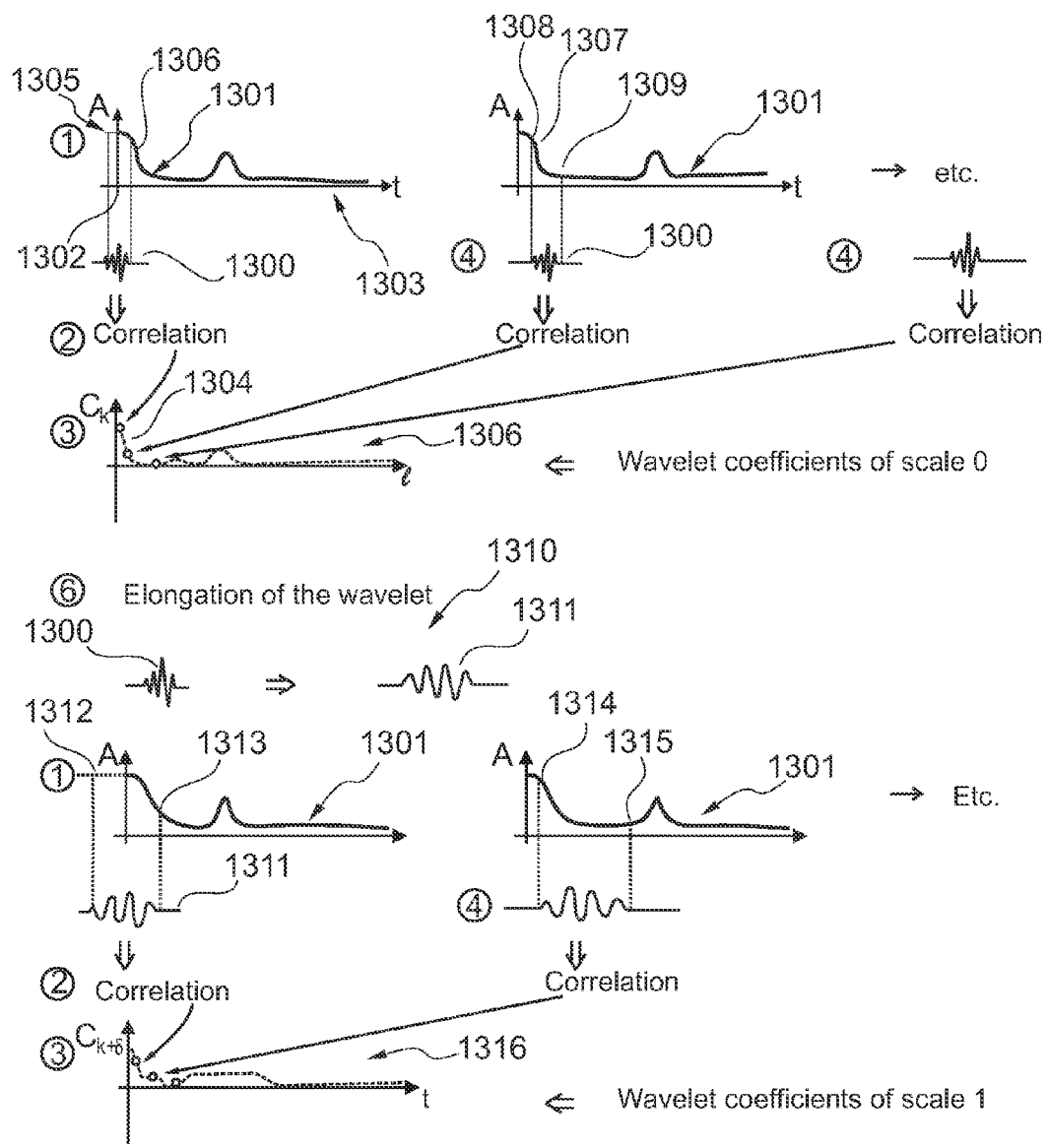
FIG. 13 in an exemplary manner shows the steps for carrying out a continuous wavelet transformation.

FIG. 13 exemplarily shows the steps for carrying out a continuous wavelet transformation. Since the width of a wavelet that is used for the analysis is narrow, the integration within the above equation (the integral which is used inside the equation) can be concentrated in good approximation to the region around the wavelet.

The resulting coefficient C(k, l) and in particular its amplitude is a measure of how well the wavelet $\Psi_{k,l}$ in its current scaling k matches the signal f(t) of the echo function f(t) or of the echo curve f(t) at the respectively analysed location l. A well-matched form manifests itself in a high wavelet coefficient-value. In other words this means that a coefficient with a high amplitude results if the analysis wavelet that has been used in its current scaling for a particular location fits well into the signal progression of the envelope 100, 500 or echo function 100, 500. The analysis wavelet is the correspondingly displaced and scaled mother wavelet. The respective coefficient thus relates to a form of a base function, wherein the analysis wavelet corresponds to the base function.

The less well-matched the form (the worse the fit), the lower the amplitude of the wavelet coefficient.

The individual steps that arise in carrying out the wavelet transformation are shown below. Firstly the wavelet 1300 is positioned at the start of the signal 1301 that is to be analysed, or at the start of the echo function 1301. In FIG. 13 the origin of the time axis 1303 represents the start 1302 of positioning.

At the corresponding position 1302 the wavelet coefficient 1304 is calculated by correlation of the extended and displaced wavelet 1300 with the corresponding signal sections between the positions 1305 and 1306 of the signal 1301 to be analysed. Since the value is to be calculated in the origin 1302, displacement is set to l=0. The similarity value that has been determined in the correlation is entered as a coefficient 1304 in the detail function 1306 to be determined.

The wavelet 1300 used is displaced, without any changes to its form, in the direction of increasing time on the time axis to a new position 1307 and is calculated within (charged with, allocated to, offset against) the new section of the echo function 1301 between the positions 1308 and 1309. The result is also entered as a coefficient of the detail function 1306 at the displaced position. The time axis 1303 t can be converted to a local axis l.

The displacement takes place until the end of the echo function 1301 has been reached. Thus, the detail function of the scale 0 or of the scaling 0 can be determined. The scale 0 comprises the coefficients of the detail function that relates to the form of the base function 1300.

Thereafter, as shown at 1310, the elongation of the wavelet function 1300 takes place and a new form of a base function 1311 is generated.

Now follows a correlation with the wavelet function 1311, which as a result of expansion is wider than the wavelet base function 1300. As a result of the expansion (elongation) a wider signal section between the points 1312 and 1313 is analysed.

Thereafter the next region of the function 1301 is analysed. This next region is situated between the positions 1314 and 1315. In this manner the detail function is generated that is associated with a scale 1 1316. As a result of further expansions, further scales can be analysed, and in particular further coefficients can be calculated which are related to an expansion of a base function or to a form of a base function. The totality of all the coefficients of all the detail functions forms a coefficient field which in the case of the continuous wavelet transformation, which is illustrated here, is continuous in the direction of scaling (scaling parameter k) as well as in the direction of displacement (displacement parameter l).

Corresponding to the calculation rule (calculation regulation) relating to the continuous wavelet transformation, consequently any finely-graded values are allowed in relation to the scaling parameter k and the displacement parameter l.

Figure 14:
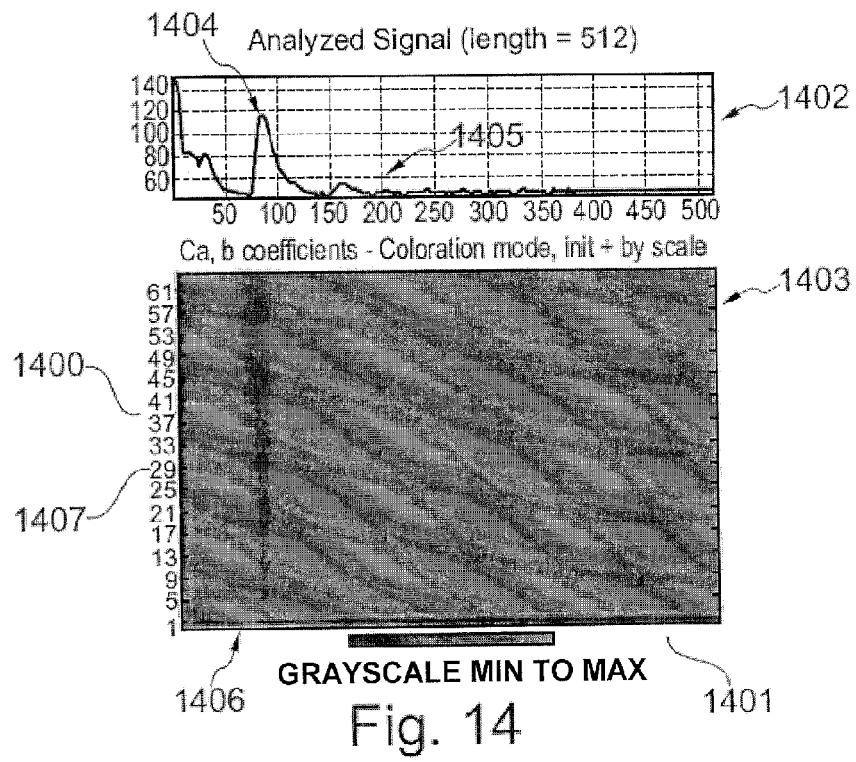
FIG. 14 shows a continuous wavelet transformation of an echo function.

FIG. 14 shows a continuous wavelet transformation of an echo function 1405. FIG. 14 clarifies the calculation of a decomposition of the echo function 1405 based on continuous scaling as well as on continuous displacements. Thereby the ordinate 1400 of the decomposition region 1403 shows the continuous scale values in the region of 1 to 61, and the abscissa 1401 shows the continuous distance of the echo to the antenna 103, or the reflection duration of the signal 104 in the region of 0 to 500 cm.

The diagram 1402 shows the measured echo function 1405 from which the continuous wavelet transformation 1403 has been generated. For the sake of clear arrangement the wavelet coefficients of the various scales 1400 are arranged one underneath the other. The amplitude of the wavelet coefficients is indicated as a greyscale image. Thereby, the coding in black colour means a low amplitude, while a bright region represents a high amplitude. Thereby, the highest negative value denotes the lowest amplitude, or, in other words, since negative values are also permitted, the highest negative amplitude is shown in black, and the highest positive amplitude is shown in white. The grey values arising between black and white are evenly distributed to the corresponding amplitude values. In the region of an echo 1404 of the measuring function 1405 it is visible that the coefficient values, in particular the amplitudes of the coefficients, comprise high values 1406 and thus a bright region.

The echo 1404 lies in a region between 75 cm and 100 cm and is, for example, shown well by the wavelet 1407 that has been scaled with a factor of 29. Towards larger scales, in other words towards higher values on the ordinate 1400, based on (starting from) the scale 29 1407, the coefficient value, and thus the matched form (and thus the fit) of the wavelet, declines again.

In the case of continuous wavelet transformation, due to the plurality of combination possibilities in the calculation of the wavelet coefficients, a considerable computing effort can arise. This computing effort can be reduced by using a discrete wavelet transformation.

Figure 15:
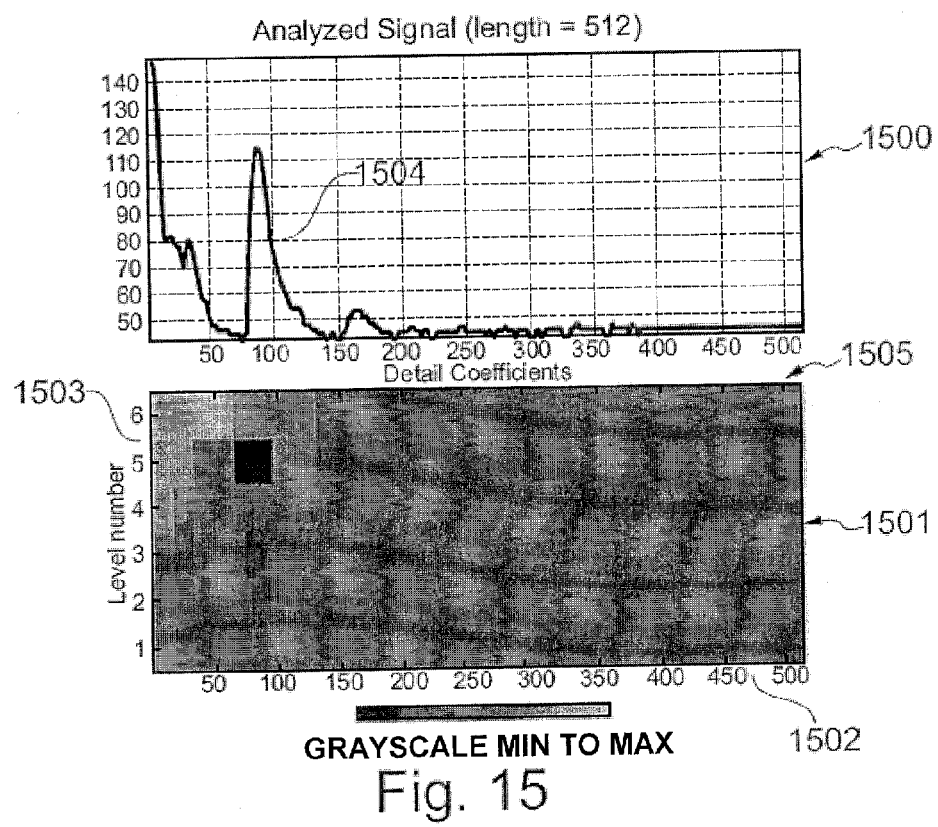
FIG. 15 shows a discrete wavelet transformation of an echo function.

FIG. 15 shows a discrete wavelet transformation of an echo function 1504. In the discrete wavelet transformation no continuous values are permitted anymore for the scaling parameter and displacement parameter k and l, but instead, discrete grading (gradations) in increments to the power of 2 are used. Thus $k=2^m$ and $l=n \times 2^m$ are used, wherein m and n denote integers.

The discrete coefficients of the discrete wavelet transformation are calculated with the following equation:

$$C_{m,n} = \int_{-\infty}^{\infty} f(t) \cdot \Psi_{m,n}(t) \, dt$$

It can be shown that decomposition of a signal with these discrete stages, or that dyadic decomposition, may be completely adequate for characterising any signal forms and, if applicable, for reconstructing the associated signal form from the wavelet coefficients. The discrete wavelet transformation represents the signal or echo signal in a redundancy-free manner. The base functions, which are generated from a mother wavelet, taking into account the power of two discretisations, are orthogonal in relation to each other.

The calculations to be carried out are analogous to those of continuous transformation. However, in the calculation the continuous parameters k and l are replaced with the discrete parameters m relating to scaling, and n relating to displacement.

FIG. 15 is divided into the echo function region 1500 and the coefficient region 1501. The coefficient region 1501 shows the discrete decomposition of the echo function 1504. The echo function 1504 is a currently recorded echo function. The decomposition 1505, shown in FIG. 15, of the echo function 1504 has resulted both from displacement and from scaling, in each case in discrete increments (grading).

This means that the abscissa 1502 and the ordinate 1503 of the coefficient region 1501 or coefficient field 1501 are discreetly graded. Due to the discrete gradation, the coefficient region 1501, in which the decomposition 1505 of the echo function 1504 is shown, appears strongly segmented. Segmentation is above all evident in the upper decomposition stages or upper scales. The upper decomposition stages comprise high scale numbers or level numbers on the scale 1503. The upper decomposition stages correspond to wide wavelet functions or wide base functions and as a result of the dyadic discretisation of the displacement parameter l the spaces between the coefficients widen. As a result of this widening, segmentation or coarse resolution in the upper regions results. The distance between the coefficients increases from one scale to another by a factor of 2.

The coefficient region 1501 shown in FIG. 15 is also referred to as the detail region 1501 of the echo function 1504. The detail region shows the decomposition of the echo function 1504 into detail functions 1505. In particular, in this example the detail region shows a wavelet decomposition of the echo function 1504.

The detail functions 1505 are represented by coefficients that arise during decomposition. The plurality of coefficients form the coefficient field 1505. The coefficients of the coefficient field 1505 are the discrete wavelet coefficients of the decomposition of the echo function 1504. FIG. 15 shows the amplitudes of the coefficients as greyscale blocks. The width of the respective blocks is determined by 2', while the middle position of the respective blocks is determined by $2^{m-1}+(n-1)\times 2^m$. These dimensions are shown in FIG. 16.

Figure 16:
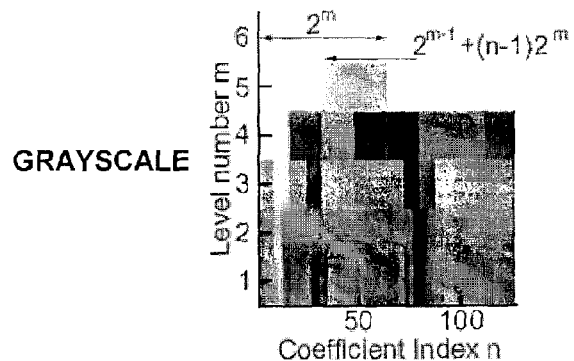
FIG. 16 shows the position of blocks for carrying out a discrete wavelet transformation.

FIG. 16 shows the position of blocks to represent a discrete wavelet transformation. In the discrete case, often, instead of displaying the wavelet coefficients in the form of greyscale images, a hierarchic representation by means of a row of bar charts is shown, as shown, for example, in FIG. 17.

Figure 17:
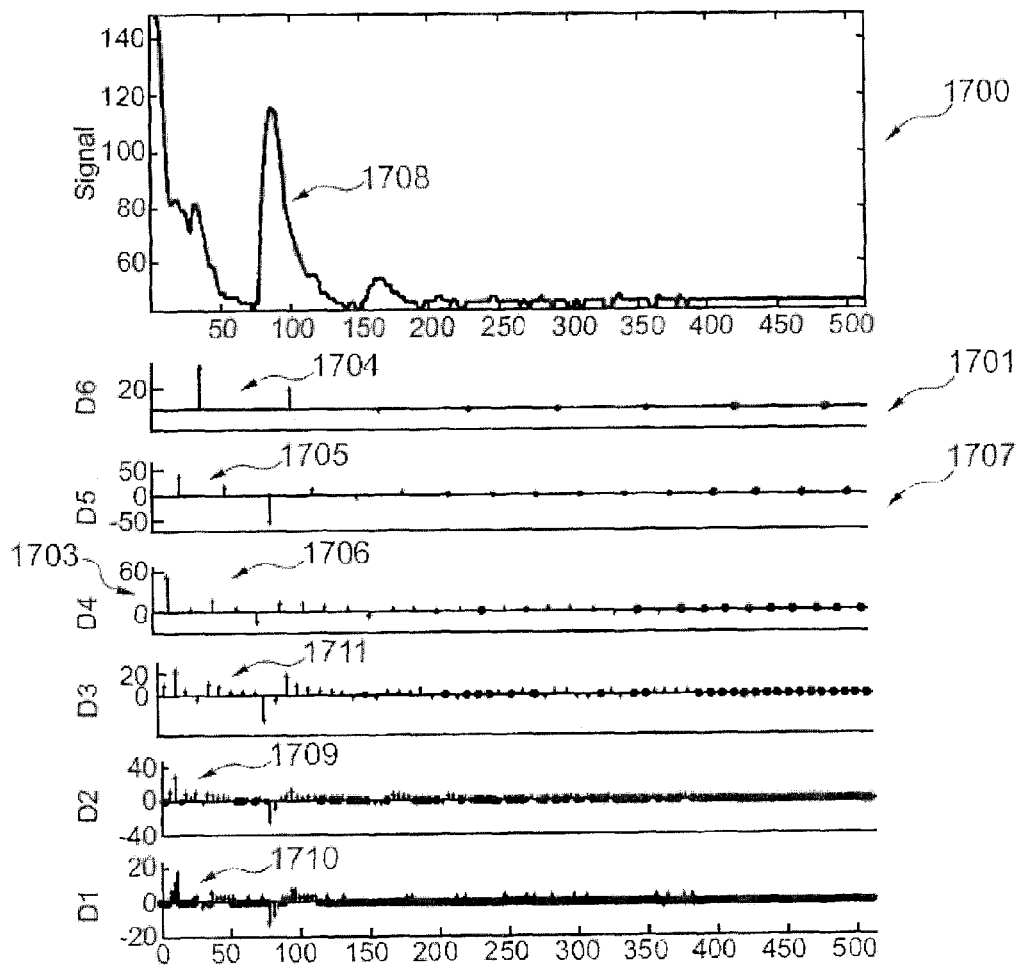
FIG. 17 shows the representation of discrete wavelet coefficients of an echo function with hierarchic bar charts.

FIG. 17 shows the representation of discrete wavelet coefficients 1707 of the echo function 1708 in hierarchic bar charts. The echo function 1708 is shown in the echo function region 1700 or in the echo diagram 1700 which was recorded by means of a sensor 101. Below it, in FIG. 17, the detail region 1701 is shown. On the abscissa 1702 of the detail region 1701 the distance of the echo value from the sensor 101 is shown.

The detail region 1701 shows the 6 detail functions D1, D2, D3, D4, D5 and D6, one below the other along an axis 1703 perpendicular to the abscissa 1702. The detail functions D1 to D6 are also referred to as detail planes or detail stages of the signal. As shown in FIG. 17, the detail functions D1, D2, D3, D4, D5 and D6 are shown at an increased distance from the abscissa 1702 at an increasing index. In the discrete wavelet transformation the index that is associated with a detail function corresponds precisely to the scaling parameter m of the respectively used analysis wavelets. $D_m$ or Dm is consequently the detail function that is associated with the scaling parameter m.

The detail functions D1, D2, D3, D4, D5 and D6 which are nearest to the ordinate form part of the narrowest wavelet base functions. These scales comprise coefficients that are in close proximity to each other. For example, the distance between the coefficients of the detail function D1 is smaller than that of the coefficients of the detail function D6.

The amplitude values of the coefficients 1704, 1705, 1706, 1711, 1709, 1710 of the detail functions are shown as columns in FIG. 17. High coefficient values indicate a high degree of correlation between the associated wavelet base function and the echo function.

Determining the coefficients in the discrete wavelet transformation can be further accelerated with the use of a fast calculation algorithm. This calculation algorithm is referred to as a fast wavelet transformation; strictly speaking it does not involve a new transformation, but instead it supplies as a result the same coefficients as can be calculated using the discrete wavelet transformation.

The fast wavelet transformation is calculated with the use of the Mallat algorithm, wherein filters are applied to the signal to be analysed.

Figure 18:
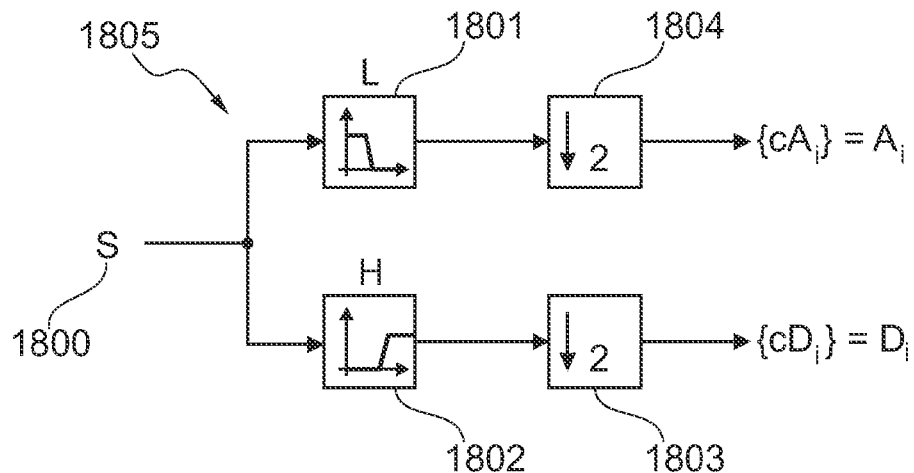
FIG. 18 shows a block diagram of a filter bank for the fast wavelet transformation.

FIG. 18 shows a block diagram 1805 of a filter arrangement 1805 or filter bank 1805 by means of which the fast wavelet transformation can be carried out. The filter arrangement 1805 shows the signal S, 1800, the echo function S, 1800 or the envelope S, 1800, the latter being distributed to the low-pass filter 1801 and the high-pass filter 1802. The two filters 1801, 1802 are, for example, implemented as digital filters. The parameters or coefficients of the filters depend on the wavelet used. In other words the parameters relate to the form of a base function.

At the output of the high-pass filter 1802, H the detail coefficients {cD} of the detail signal D or of the detail function D are generated in that the echo function S, 1800 is filtered with the high-pass filter H, 1802, and is downsampled with the downsampling block 1803; in other words it has been spread by a specified time factor. In FIG. 18 the downsampling factor is 2. Downsampling reduces the scanning rate of the signal.

The detail coefficients {cD} are identical to the wavelet coefficients in the detail signals or detail functions D1, D2, D3, D4, D5 and D6 in FIG. 17.

The approximation coefficients {cA} of the approximation signal A or of the approximation function A are generated in that the echo function S, 1800 is filtered by the low-pass filter 1801, L, and the output signal of the low-pass filter 1801, L is downsampled in the downsampling block 1804. The downsampling block 1804 reduces the scanning rate of the output signal of the low pass 1801, L by a factor of 2. The approximation signals A essentially then only contain small frequency components, i.e. the signal components in the region of 0 Hz to half the Nyquist frequency of the signal before filtering.

Calculation of the wavelet coefficients or detail coefficients that are associated with a further scale takes place by a further pass of the approximation signal through the filter arrangement 1805. In other words this means that with each pass of the signal S, 1800, and in particular of the signal components A through the filter bank 1805, a further detail function Di and a further approximation function Ai of the echo function are generated. In this arrangement the approximation function Ai shows the original signal in the respective scale i, whereas the detail function comprises the wavelet coefficients of a discrete wavelet transformation with scaling or expansion of the mother wavelet, which scaling or expansion is associated with the scale. Consequently, by a recurrent use of the filter arrangement 1805 the echo function can be decomposed into its coefficient representation.

Before the wavelet coefficients that are associated with the next scale are calculated, the approximation signal A in block 1804 is reduced by a factor of 2 in relation to the number of its support locations. Since the approximation signal A essentially no longer comprises any frequencies larger than half the Nyquist frequency, no significant errors are caused by aliasing during this scanning reduction step.

The approximation signal A, whose scanning rate has been reduced, is again made available as a signal S to the input S, 1800 of the filter arrangement 1805. This fed-back signal S again passes through the filter bank 1805.

Figure 19:
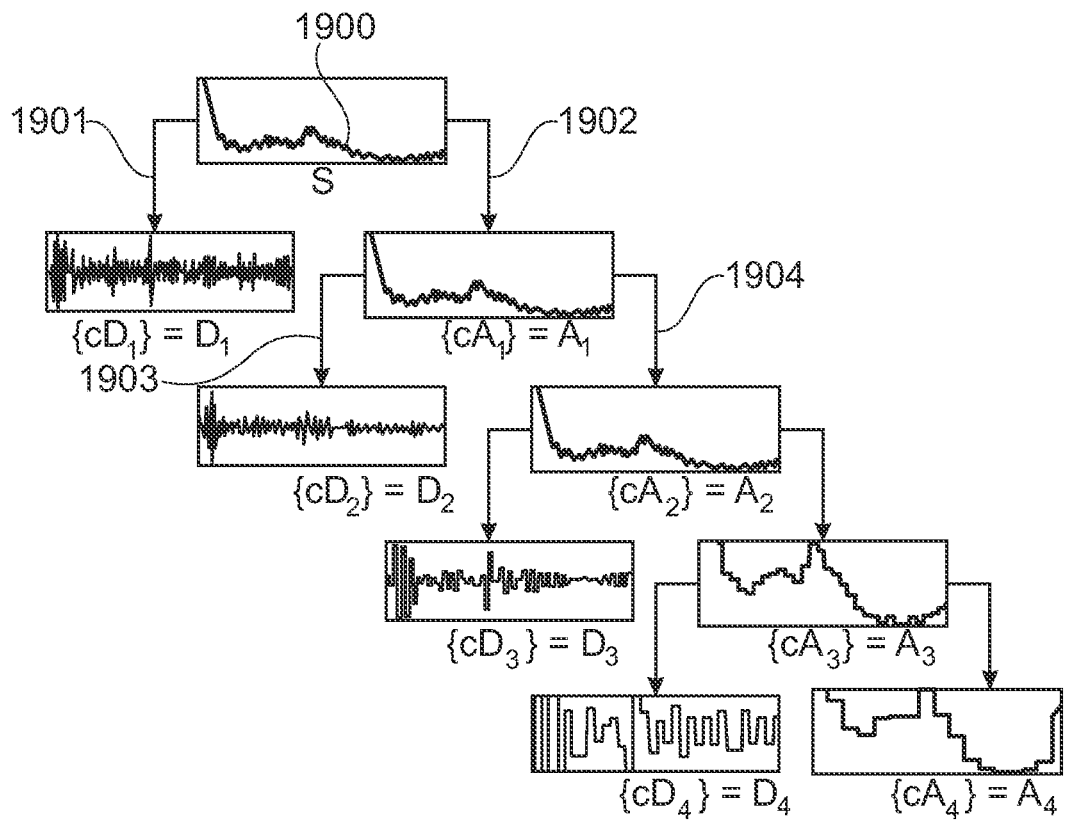
FIG. 19 shows the decomposition of an echo function with the fast wavelet transformation.

The function of the filter bank 1805 is shown in FIG. 19. FIG. 19 shows the decomposition of an echo function with the fast wavelet transformation. For the sake of clarity, in the representation of the discrete signals Di the individual scanning values have been supplemented by a constant progression of the amplitude of a scanning value to the next-following scanning value to form a continuous signal, as a result of which the discrete functions Di appear as continuous functions. FIG. 19 shows the echo curve S, 1900 which has been determined by means of a sensor 101. The left-hand side in FIG. 19 shows the path 1901 that represents the high pass filtered signal D from FIG. 18. The signal D1 corresponds to the first scaling stage.

On the right-hand side in FIG. 19, by way of the path 1902, generation of the approximation signal A as an output of the low-pass filtered signal of the filter bank 1805 is shown.

The approximation signal A1 is fed back within the filter arrangement 1805, and from this fed-back signal the high-pass filtered detail signal D2 of the next scaling stage is generated, as indicated by way of path 1903. Parallel to it, by way of feedback of the signal A1 via the low-pass filter L, 1801 the approximation signal A2 of the next stage is generated, as shown in path 1904 of FIG. 19.

As a result of repeated application of the filter bank 1805, from the echo function 1900, 1800, S a decomposition of the echo function 1900, 1800, S into the detail signals D1, D2, D3 and D4 thus arises. Furthermore, the approximation signals A1, A2, A3 and A4 arise. The approximation signals A1, A2, A3, A4 or the approximation functions A1, A2, A3, A4 represent the progression of the echo function 1900, 1800, S in various detailing stages. The function progression of the original function is essentially recognisable again in the approximation functions. The coefficients of the detail signals D1, D2, D3, D4 represent the coefficients {cD1}, {cD2}, {cD3}, {cD4} into which the original function has been decomposed.

The detail signals D1, D2, D3 and D4 form the detail functions D1 1710, D2 1709, D3 1708 and D4 1706 from FIG. 17. The index of the detail signals D1, D2, D3, D4 and the index of the approximation signals A1, A2, A3 A4 indicate the stage, and in particular the scale, to which the coefficients relate.

The scale, and in particular the index of the scale, consequently corresponds to a number of the repetitions of the pass of signal S through the filter bank 1805, or to the number of instances of feedback. Furthermore, the detail coefficients are identical to the wavelet coefficients of the discrete wavelet transformation. Consequently, the coefficient field that is formed from all the generated detail coefficients {cD1}, {cD2}, {cD3} and {cD4} is the coefficient field of the decomposition 1701 from FIG. 17. The coefficients of the coefficient field {cD1}, {cD2}, {cD3} and {cD4} are discrete detail coefficients. The expression {cD1} refers to the quantity of all the coefficients of the detail function D1.

As a result of the continuing reduction of the scanning rate by the downsampling devices 1804 and 1803, both the computing effort and the required size of the storage device are reduced.

The field 1501 of discrete wavelet coefficients, which field 1501 is shown as a greyscale image in FIG. 15, can be understood to be a scanned version of the continuous coefficient field 1403 from FIG. 14. In the upper detail planes, in other words in detail planes with a high scale number, it seems, however, that in a direct comparison of the scanned coefficient field 1501 with the continuous coefficient field 1403 information is lost. In discrete transformation the assignment of a coefficient value to a precise location may become more blurred, because in contrast to a continuous transformation, the scanning resolution or calculation resolution is reduced from one scale to another by a factor of 2. In some algorithms of echo signal analysis this loss of information may be tolerable.

However, since in the echo signal analysis most often it is the location, the regional position, the position, the location or position of an echo that is of interest, any loss of resolution on the local axis 1502 may be less tolerable than a loss of information as a result of discretisation of the scale axis 1503. At the same time, however, the computing effort to carry out the transformation is to be reduced.

The à trous algorithm (a straddling algorithm) makes it possible to determine the wavelet coefficients at any position. This means that the à trous algorithm always operates with a continuous local resolution, which makes possible very accurate location determination. However, the à trous algorithm also uses discrete scaling parameters 1503 so that the computing effort can be reduced.

FIG. 20 shows a block diagram of various filter banks to determine the wavelet coefficients by means of an à trous algorithm. FIG. 20 clarifies the calculations carried out in the application of the à trous algorithm. FIG. 20 shows the block diagram of a first filter bank 2000 which forms part of a first decomposition of the echo function S, 1800, 1900. The filters 2001, 2002 of the filter bank 2000, which filters correspond to the filters used in the fast wavelet transformation, decompose the echo function S into the detail signal D1 and the approximation signal A1.

However, in contrast to the fast wavelet transformation, in the case of the à trous algorithm there is no reduction in the scanning rate after filtering. Doing without a reduction in the scanning rate preserves the local resolution of the detail coefficients, of the detail functions or of the detail signals. The low-pass filter T1 2001 comprises the filter coefficients $D1 = \{t_0, t_1, t_2, \ldots\}$. The high-pass filter 2002 comprises the filter parameters $H1 = \{h_1, h_2, h_3, \ldots\}$.

Prior to the next transformation step or the next decomposition with the next filter bank 2003, the limit frequencies of the filters are changed. For the second decomposition, the changed filter bank 2003, which comprises the low-pass filter T2, 2004 and the high-pass filter H2, 2005, receives the approximation signal from the first decomposition A1 as an input signal. The change in the limit frequency of the filters comprises widening of the filter cores.

As a result of widening the filter cores by means of increasing the scanning rate of the filter coefficients by a factor of $2^m$ the limit frequency of the filters is changed. In this process the filter cores are changed such that between the actual coefficients of the original filter $2^m - 1$ zeroes are introduced. Thus the filter core or the filter coefficients for the low pass are $T2 = \{t_0, 0, t_1, 0, t_2, \ldots\}$. For the high pass for the second decomposition H2 the filter core is $H2 = \{h_0, 0, h_1, 0, h_2, \ldots\}$.

Further processing for determining the wavelet coefficients by means of the à trous algorithm of the next stages takes place analogously to the approach used in the fast wavelet transformation. Recursively, the approximation signal A1, A2, etc. is decomposed into further detail signals, detail coefficients and approximation signals, approximation coefficients. Decomposition of an echo function, which decomposition is achieved by means of the à trous algorithm, is shown in FIG. 21.

FIG. 21 shows a diagram of a decomposition of an echo function 2100 by means of the à trous algorithm. The echo function 2100 is decomposed into the 6 scales of the scale axis 2101. While the ordinate 2102 shows continuous values of the location, the scale axis 2101 is discretised in powers of two. The displacement parameter, which is shown on the location-, distance- or position axis 2102, has a continuous character.

By means of inverse transformation of the found transformation coefficients, into which the source signal, original signal, echo signal or current signal has been decomposed, the original signal can be reconstructed. Reconstruction of signals plays an important role with regard to applications in the field of filtering and compression of the echo function.

For the purpose of reconstruction it is possible, for example, to use an inverse wavelet transformation, an inverse discrete wavelet transformation or a fast inverse discrete wavelet transformation. In the reconstruction process, a reconstruction regulation that depends on the form of the base function is applied for restoring the echo function. In the inverse wavelet transformation the original signal or the original echo function can be determined by means of the following calculation regulation:

$$f(t) = c \cdot \int_{-\infty}^{\infty} \int_{0}^{\infty} C(k, l) \cdot \Psi_{k,l}(t) \cdot \frac{1}{k^2} dk dl$$

By means of this equation, based on the coefficient or detail coefficient 1403, the original signal is reconstructed by means of the summation of all the wavelet base functions, weighted with the associated wavelet coefficients. The constant c is a standardisation factor that depends on the wavelet used.

The inverse wavelet transformation can, however, involve considerable computing effort.

Due to the orthogonality of the base functions that are used in the discrete wavelet transformation, the coefficients calculated in the discrete wavelet transformation represent a redundancy-free decomposition or a redundancy-free description of the original signal. A precise reconstruction or perfect reconstruction of the original signal or of the echo function is therefore also possible with the inverse discrete wavelet transformation. The calculation regulation is stated in the following equation:

$$f(t) = c \cdot \int_{n=-\infty}^{\infty} \int_{m=0}^{\infty} C_{m,n} \cdot \Psi_{m,n}(t)$$

In this calculation only the coefficients $C_{m,n}$ that have been determined at discrete locations are taken into account. Discrete calculation reduces the computing effort without there being a need to accept a reduction in the quality of the reconstructed signal.

A base function may be a wavelet mother function. Furthermore, the term base function can comprise all the functions that can be generated from a mother wavelet by scaling and displacement. However, the term base function may also refer to a filter bank. A filter bank can, for example, be implemented as hardware in the form of an integrated circuit.

Figure 22:
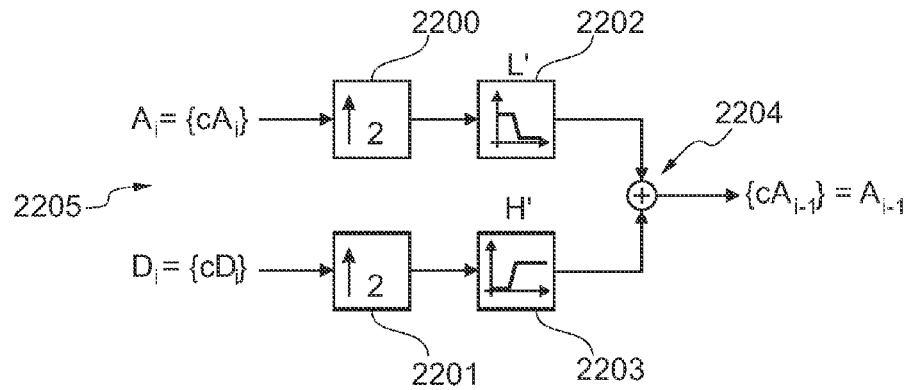
FIG. 22 shows a block diagram of a filter bank for the fast inverse discrete wavelet transformation.

FIG. 22 shows a block diagram of a filter bank for the fast inverse discrete wavelet transformation. In the reconstruction of the signal S or in the reconstruction of the echo function S the coefficients of, in each case, a stage or a scale are summed, thus forming the approximation coefficients of the preceding decomposition stage.

The approximation coefficients $\{cA_i\}$ of each i-th stage are fed to a device for increasing the scanning rate 2200. The detail coefficients $\{cD_i\}$ that are associated with the stage i or scale i are fed to a device for increasing the scanning rate 2201. In the devices for increasing the scanning rate 2200, 2201, for the purpose of increasing the scanning rate between two coefficients of the signals that are present, a zero is inserted in each case.

The approximation coefficients $\{cA_i\}$, which were increased in the scanning rate, are fed to the low-pass filter L' 2202, and the detail coefficients $\{cD_i\}$, which were increased in the scanning rate, are fed to the high-pass filter H' 2203. The low-pass filtered signal and the high-pass filtered signal are added in the adder 2204 and are provided as approximation coefficients $\{cA_{i-1}\}$. In other words this means that the approximation coefficients $\{cA_i\}$, which have been supplemented with zeroes, are filtered with a low-pass filter L', or that the detail coefficients $\{cD_i\}$, which have been supplemented with zeroes, are filtered with a high-pass filter H', wherein the coefficients of the filters, or the filter parameters, depend on the wavelet used. The filtered signal or signals are added in the adder 2204; they thus provide the approximation coefficients $\{cA_{i-1}\}$ 2204 of the preceding stage.

If fast inverse discrete wavelet transformation filtering 2205 is gradually carried out over all the available scales, over all the existing detail functions or over all the existing coefficients, then as the last approximation signal the original signal arises, which has been reconstructed without any error. This reconstructed signal is designated a perfect reconstructed signal.

Figure 23:
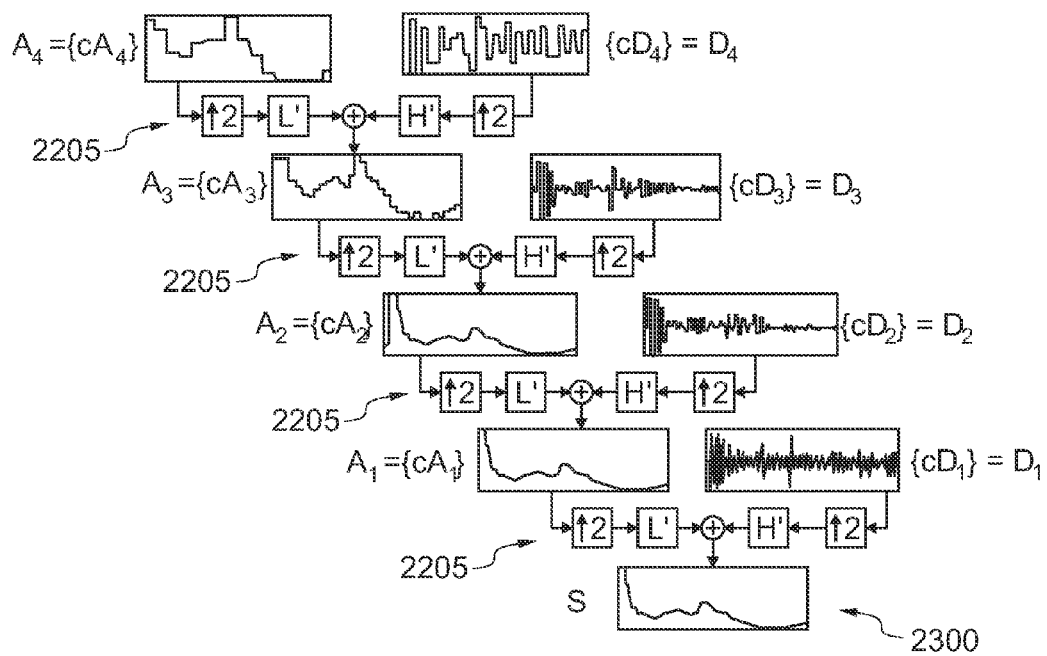
FIG. 23 shows the reconstruction of an echo function with the fast wavelet transformation.

FIG. 23 shows the reconstruction of an echo function with the fast inverse wavelet transformation. FIG. 23 shows the way in which by means of the filters of the fast inverse discrete wavelet transformation filter bank 2205 from the approximation signals A1, A2, A3, A4 of four scales, and the way in which from the detail signals D1, D2, D3 and D4 of the respective associated scales, the original signal S, 2300 is reconstructed. The index i–1 signifies a scale below the scale i, wherein the scale i–1 comprises a higher degree of detail or a higher resolution than does the scale i. For the sake of clarity, in the representation of the discrete signals Ai, Di and S the individual discrete amplitude values have been supplemented by a constant progression to the subsequent amplitude value to form a continuous signal.

Figure 24:
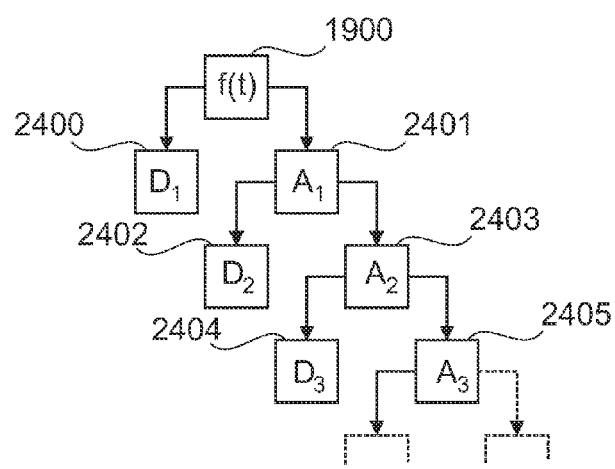
FIG. 24 shows a further representation of a decomposition of an echo function with the fast wavelet transformation.

FIG. 24 shows a further representation of a decomposition of an echo function. The diagram in FIG. 24 is an abbreviating representation of FIG. 19. FIG. 24 shows the detail signal D1 2400 of the first stage with the approximation signal A1 2401 of the first stage, the detail signal D2 2402 with the approximation signal A2 2403 of the second stage, and the detail signal D3 2404 with the approximation signal A3 2405 of the third stage.

The representation of FIG. 24 shows the gradual separation of detail information D1, D2, D3 from the signal A1, A2, A3 to be analysed. This means that on the scales 1, 2 and 3 information is gradually removed from the signal 1900 in order to form the approximation functions A1, A2 and A3, wherein the removed information is found again in the detail coefficients. The respective detail information is removed from the approximation signal, i.e. from the representation of the original function in the respective scale. Thus, for example, the detail information D1 is removed from the signal f(t) or from the signal S on the first stage, so that the approximation function A1 on the first stage results.

Figure 25:
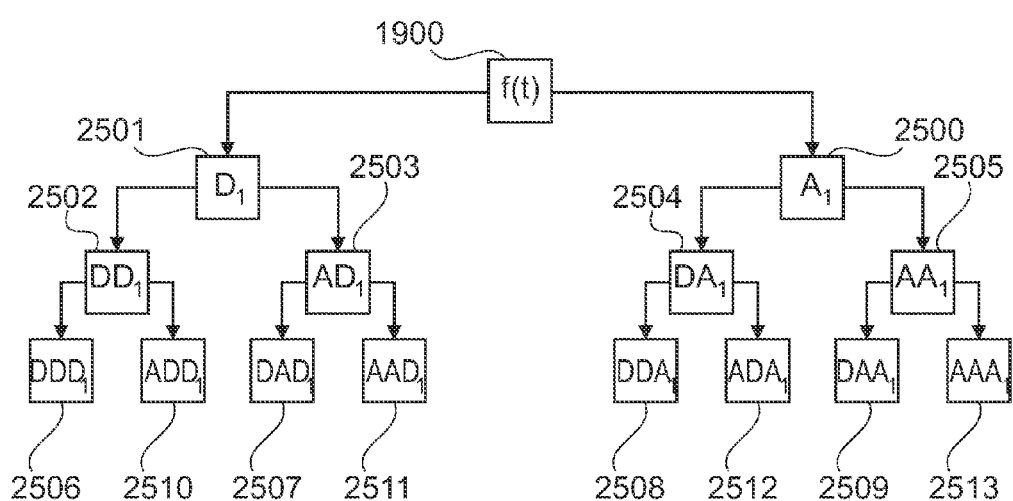
FIG. 25 shows a representation of the decomposition of an echo function with wavelet packets.

FIG. 25 shows a representation of the decomposition of an echo function with wavelet packets. In the analysis with wavelet packets the split-off detail information is again treated as a new signal; in other words the detail information, too, is subjected to an independent analysis. The function f(t) 1900 or the signal S, 1900 is split into the approximation signal A1 2500 and the detail signal D1 2501.

During separation, depending on the objective, at each stage in relation to each signal it can be decided anew whether or not further decomposition is to take place. FIG. 25 shows that, for example, the detail signal D1 2501 is decomposed into the detail signal DD1 2502 and into the approximation signal of the detail signal D1, namely AD1 2503. Likewise, the approximation signal A1 2500 of the first stage is decomposed into the detail signal DA1 2504 and into the approximation signal AA1 2505. This is continued in a similar manner on the next stage, and thus the detail signals DDD1 2506, DAD1 2507, DDA1 2508 and DAA1 2509 are generated. Furthermore, again, the approximation signals ADD1 2510, AAD1 2511, ADA1 2512 and AAA1 2513 are generated. In this manner a plurality of decompositions of the echo function are applicable, wherein the reconstruction characteristics of the method are preserved.

Figure 26:
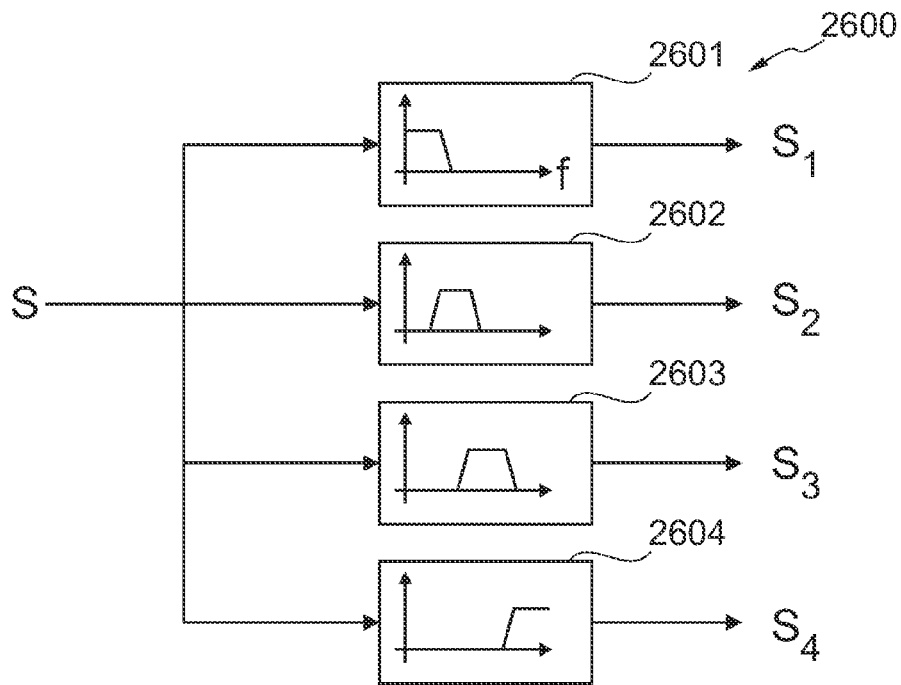
FIG. 26 shows a block diagram of a filter bank for the decomposition of an echo function.

FIG. 26 shows a block diagram of a filter bank 2600 for decomposing an echo function S. A filter bank is an arrangement that is used to decompose a signal S or an echo function S into various components. For example, a signal can be decomposed into two or several frequency bands.

From various components into which the original signal has been decomposed, an inverse filter bank that matches the filter bank 2600 can reconstruct the original signal.

FIG. 26 shows the signal S, the source signal S, the original signal S or the echo function S, which echo function is distributed to the four filters of the filter bank 2600. The filters of the filter bank are: a low-pass filter 2601, a band-pass filter 2602, a further band-pass filter 2603 and a high-pass filter 2604. After filtering the signal S by means of the low-pass filter 2601, the signal S1 is generated. After filtering the signal S with the band-pass filter 2602, the signal S2 is generated. After filtering the signal S by means of the further band-pass filter 2603, the signal S3 is generated. After filtering the signal S with the high-pass filter 2604, the signal S4 is generated. In FIG. 26 the filters are shown as a function of the frequency f.

Since the separation power of the real filters for separating a signal into components of several frequency bands does not provide any desired definition, generally speaking, aliasing effects can be expected in the reconstruction of the original signal S. Real filters do not provide any desired definition because real filters comprise a finite edge steepness. By means of the use of special filters 2601, 2602, 2603, 2604 in the filter bank 2600 it is possible for overlapping frequency components to just be eliminated during reconstruction. As a result of this, aliasing effects can disappear. In other words, the filter characteristics of the filters 2601, 2602, 2603 and 2604 are adapted such that overlapping frequency components are just eliminated during reconstruction.

If reconstruction of the original signal S is possible without any loss, this is referred to as a PR-filter bank (perfect reconstruction). PR filter banks are, for example, used in the fast wavelet transformation.

If particular characteristics of the signal, in particular of the receiver of the signal, can be taken into account, then it is possible to use sub-band coders that implement sub-band decomposition. In this process the receiving options at the receiver are taken into account in the design of a filter bank.

Figure 27:
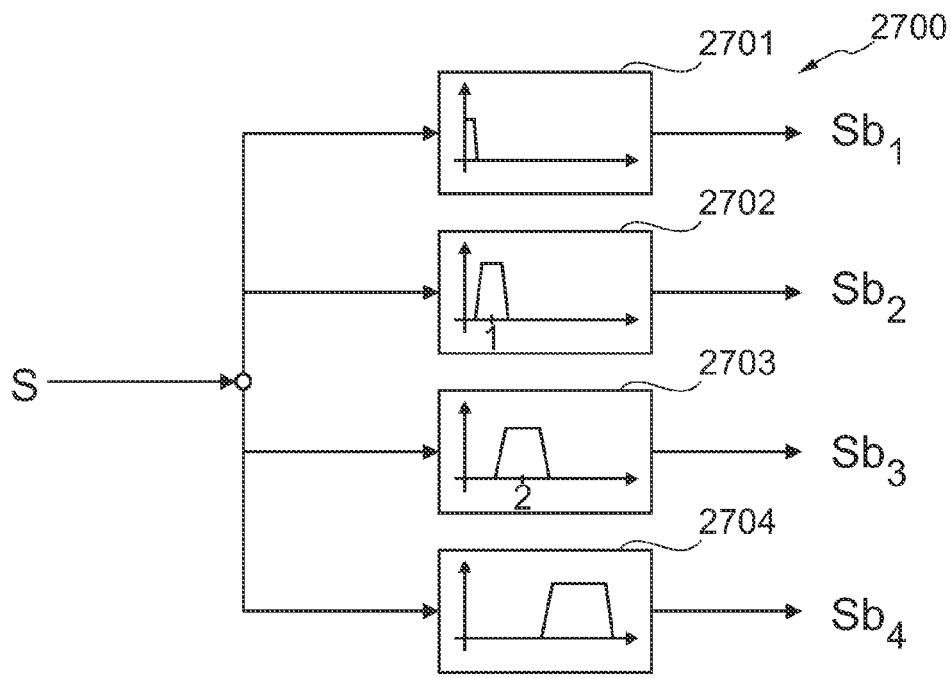
FIG. 27 shows a block diagram of a sub-band coder.

FIG. 27 shows a block diagram of a sub-band coder 2700. The sub-band coder 2700 comprises the four filters 2701, 2702, 2703 and 2704. The sub-band coder 2700 comprises the low-pass filter 2701, the band-pass filter 2702, the further band-pass filter 2703 and the band-pass filter 2704. These four filters decompose the input signal S into the four scale signals Sb1, Sb2, Sb3 and Sb4. From one scale to another, i.e. from one filter stage to another, both the central frequency and the bandwidth of the filters are doubled.

Methods that are based on decomposition of a function into several scale functions are referred to as multi-scale methods. Multi-scale methods support a multi-scale analysis of a function. The term multi-scale analysis refers to a method that makes it possible to analyse a given function, for example an echo function, at any desired position, at a freely-selectable resolution or enlargement on any desired scale. A function to be analysed can be iteratively imaged to several scales, for example by means of a smoothing filter. The function imaged to a scale, for example the imaged echo function, is referred to as an approximation function.

At each pass the filter banks that are used in the multi-scale analysis generate the detail signal and the approximation signal to the currently analysed scale, as is shown for example in FIG. 19. The approximation coefficients or the approximation signal show/shows the representation of the original function S in the respective scale, whereas the detail coefficients or the detail signal just represent the characteristic features of a signal in a scale.

For example in the case of the wavelets, the calculation of the various approximations A1, A2, A3 corresponds to a scale decomposition.

After decomposition into scales, based on the found approximation signals, further processing, for example high-pass filtering to determine the wavelet coefficients, can be carried out. This analysis of the approximation signals, for example by means of high-pass filtering, may result in the detail signals D1, D2, D3.

Imaging a function, an echo function or a signal S, 100, 200, 1402, 1500 in various scales or detail functions according to a multi-scale analysis may require that certain mathematical characteristics be fulfilled. These mathematical characteristics may have to be fulfilled by the filter core that is used, and by the scaling function that corresponds to it.

The fast wavelet transformation is calculated with perfect reconstruction filter banks 2600 that implicitly implement sub-band coding 2700 of the signal that is present. The filters for calculating the multi-scale analysis are filters that originate from the filter class of square mirror filters. These filters share a characteristic feature in that the amplitude characteristics of the analysis- and reconstruction filters are identical except for displacement on the frequency axis.

In the case of a wavelet transformation, in addition, the partial signals D1, D2, D3 etc. that arise during decomposition are shown in a redundancy-free manner with the use of special filter banks. The approximation coefficients {cA1}, {cA2}, {cA3} of the wavelet transformation are the weighting factors of an orthogonal function system, of the so-called scaling function $\Phi$. The scaling function $\Phi$ is used as a base function system in the depiction of the original curve in the various scales. The scaling function $\Phi$ makes it possible to reconstruct the original signal from the determined approximation signals A1, A2, A3.

The detail coefficients {cD1}, {cD2}, {cD3} or wavelet coefficients {cD1}, {cD2}, {cD3} are the weighting factors of a second or further orthogonal function system, the so-called wavelet functions $\Psi$. The second function system, the wavelet functions $\Psi$, exists parallel beside the scaling functions $\Phi$. If all the detail coefficients or wavelet coefficients of a signal are known, perfect reconstruction of the original signal can be carried out.

In the design of a filter bank for carrying out a multi-scale analysis, in order to preserve the analysis characteristics that are, for example, shown in FIG. 19, and in order to preserve the synthesis characteristics that are, for example, shown in FIG. 23, a predetermined framework of rules is adhered to. This framework of rules ensures the reconstruction characteristics shown in FIG. 23. For the purpose of pure analysis of the information contained in the signal, it may, however, be possible that filter banks are suitable that do not comply with the framework of rules of multi-scale analysis.

Figure 28:
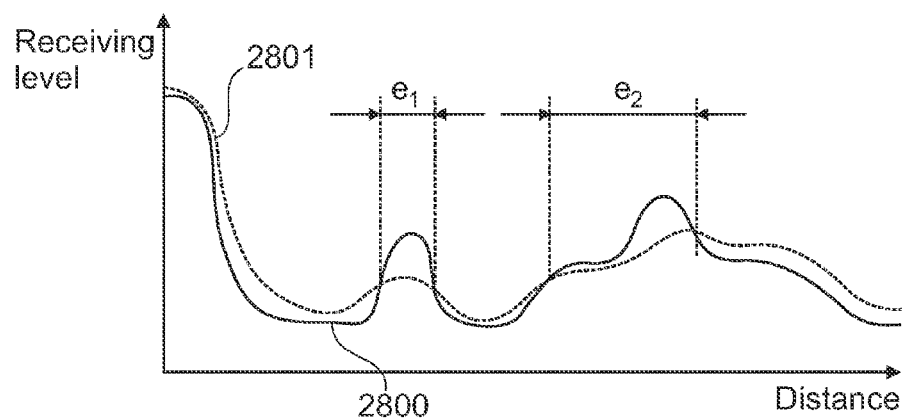
FIG. 28 shows an echo function with a threshold value function.

FIG. 28 shows a determination of the echoes e1 and e2 from the echo function 2800 and from the threshold value function 2801. The threshold value function 2801 can be determined from the echo function 2800 by means of low-pass filtering. Regions of the echo function, which regions are above the threshold value function 2801, are identified as echo regions e1, e2.

Since a real echo function 500, which is shown in FIG. 5, can comprise many superimposed maxima, the threshold-value curve method or the threshold value method can result in a very large number of intersections. Consequently, a very large number of echoes would be detected by means of the threshold value method.

Superposition of many local maxima of the echo curve may render it difficult to carry out other echo extraction methods.

Therefore the echo curve 2800, which comprises an unsteady progression, is smoothed prior to the application of an echo extraction method, for example a threshold value method, by means of digital filters, for example FIR (finite impulse response) filters, IIR-(infinite impulse response) filters or median filters. Subsequently the smoothed curve or the smoothed echo function 2800 is analysed for echoes.

When smoothing the echo function 500, 2800 it is important that as few required details of the curve progression as possible be suppressed as a result of excessive filtering. Since in an echo function the position of the echoes can be of interest, essentially an attempt is made to avoid any excessive falsification of the location information or of the progression of the echo curve in the region of the echoes during filtering.

Figure 29:
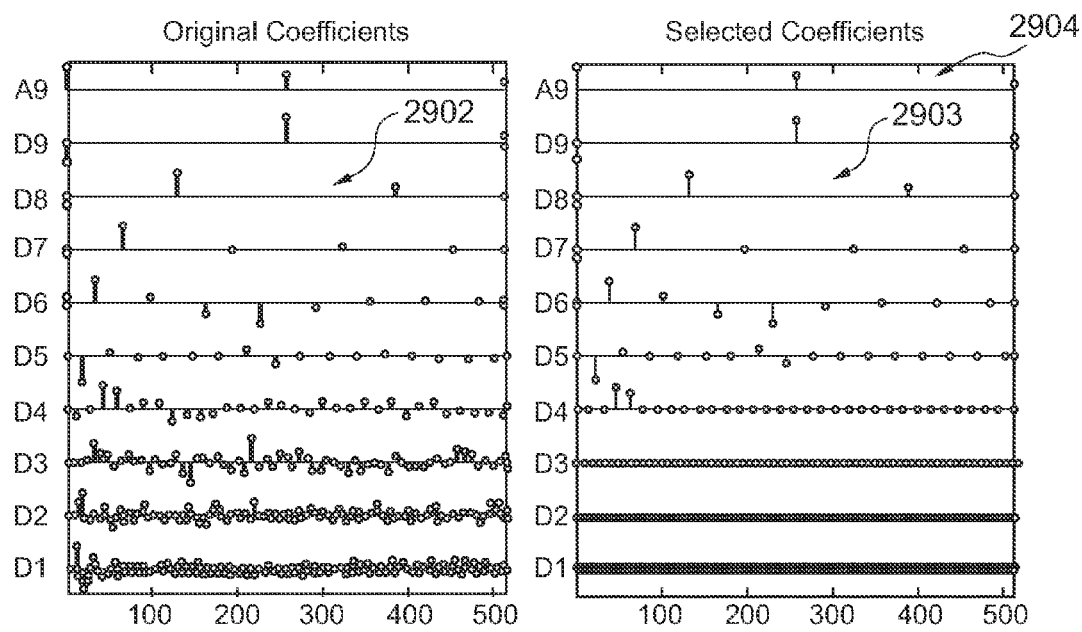
FIG. 29 shows an echo function with a smoothed echo function.

FIG. 29 shows an echo function 2900 and a smoothed echo function 2901. By means of wavelet transformation and by means of eliminating coefficients it is possible to generate from the echo function 2900 with an unsteady progression a smoothed echo function 2901 with a steady progression. In the context of echo curve smoothing, the notion of eliminating coefficients may not only refer to a reduction in the amount, but also to zeroing the coefficients. As a result of the use of the wavelet transformation, steep signal edges of relevant echoes remain in the smoothed echo function 2901 so that echoes remain able to be located. In a subsequent echo extraction by means of the method of the threshold curve it is easy to detect echoes.

Apart from smoothing the echo function 2901 it is also possible to determine the threshold value function by means of eliminating wavelet coefficients of an echo function.

Smoothing an echo curve by means of wavelets takes place in several steps. First an echo function 2900, 500 is received, wherein the echo function 2900, 500 comprises at least one echo of an echo reading, and a quality factor is defined that determines the degree of smoothing of the echo curve.

Thereafter, decomposition of the echo function into at least one detail function D1, D2, D3, D4, D5, D6, D7, D8, D9 and the approximation function of the last stage A9 take place, wherein the at least one detail function comprises a plurality of first coefficients 2902. Each of the at least one detail functions D1, D2, D3, D4, D5, D6, D7, D8, D9 may be assigned to a scale.

The approximation function of the last scale A9 can be used for initialising a filter for back transformation.

Since the form of the wavelet used has an effect on the progression of the synthesised signal 2901, it is possible to use in a targeted manner suitable mother wavelets to generate the detail signals 2902. In the case of echo curves 2900, 500 from an ultrasound application or a radar application, bi-orthogonal wavelets may represent a suitable analysis function for processing the signal. In the treatment of an echo function that has been generated with devices that operate according to the principle of the guided microwave, wavelets from the family of the coiflets may be suitable.

After decomposition of the echo function 2900, 500, elimination of at least one of the plurality of coefficients 2902 depending on the selected quality factor takes place.

Preferably, in this step between 80% and 90% of the coefficients 2902 of the decomposition D1, D2, D3, D4, D5, D6, D7, D8, D9 are zeroed. As a result of this elimination the number of the originally available coefficients 2902 is reduced to a suitable number of coefficients 2903. Elimination of the coefficients may, for example, take place by hard thresholding or soft thresholding.

In hard thresholding, starting with the wavelet coefficient whose amount is the smallest amount of a coefficient field 2902 and whose amount is other than zero, iteratively the coefficients whose amount is the smallest amount other than zero are zeroed until such time as a residual component of K coefficients that do not equal zero is reached. The component K is determined by the quality factor K.

In other words this means that in hard thresholding, for the purpose of eliminating coefficients, that coefficient is zeroed whose amount is the smallest amount of all coefficients and whose amount is other than zero.

In soft thresholding the amounts of all the wavelet coefficients 2902 are at the same time reduced until a residual component of K coefficients that do not equal zero is reached. However, it is also possible to eliminate entire scales D1, D2, D3 in the coefficient field 2902.

In the application of a fast wavelet transformation, decomposition may take place only to a predeterminable scale. This scale may be designated with the index n. For example, the index n in FIG. 29 has been selected as the value 9. Therefore in FIG. 29 the detail signals D1, D2, D3, D4, D5, D6, D7, D8 and D9 of the scales 1 to 9 are shown. When eliminating scales it may be necessary to obtain the coefficients of a predeterminable number of scales, and to eliminate the coefficients of the remaining scales.

The coefficients 2903 that remain after elimination are then only formed by the detail signals D4, D5, D7, D8 and D9. The detail signals D1, D2 and D3 of the scales 1, 2 and 3 have been eliminated. Furthermore, for reconstruction it may be necessary to obtain approximation coefficients that belong to a particular scale. In FIG. 29 approximation coefficients A9 that belong to the uppermost scale 9 are obtained. The approximation coefficients roughly reflect the progression of the original curve 2900. In other words in a decomposition up to a predeterminable scale n, for example with n=9, apart from the detail coefficients Dn the approximation coefficients An or the approximation signal An is also formed, for example, A9.

The approximation coefficients An 2904 that remain in a decomposition up to scale n are required for the reconstruction of the smoothed echo curve 2901.

As a result of a subsequent inverse wavelet transformation the filtered signal can be synthesised, i.e. reconstructed. After reconstruction the smoothed echo curve 2901 is available which corresponds to the synthesised signal. In addition to smoothing the curve progression, a further signal processing method can be applied, for example median filtering, edge-selective filtering or linear filtering.

Since eliminating coefficients can be tantamount to reducing data, wavelet decomposition can be used in combination with targeted elimination of coefficients for compressing an echo function. The method for compressing is similar to the method for smoothing the echo function. An echo function 2900 is received, wherein the echo function comprises at least one echo of an echo reading, and a quality factor for compression is determined. Thereafter decomposition of the echo function into at least one detail function D1, D2, D3, D4, D5, D6, D7, D8, D9 takes place, wherein the at least one detail function comprises a plurality of first coefficients 2902, and wherein each of the at least one detail functions is assigned to a scale.

After decomposition of the echo function, eliminating at least one of the plurality of detail coefficients depending on the quality factor takes place. In the context of compression of the echo curve, elimination may preferably mean zeroing the coefficient. The at least one eliminated coefficient has a predeterminable correlation with the at least one echo of the echo function.

Figure 30:
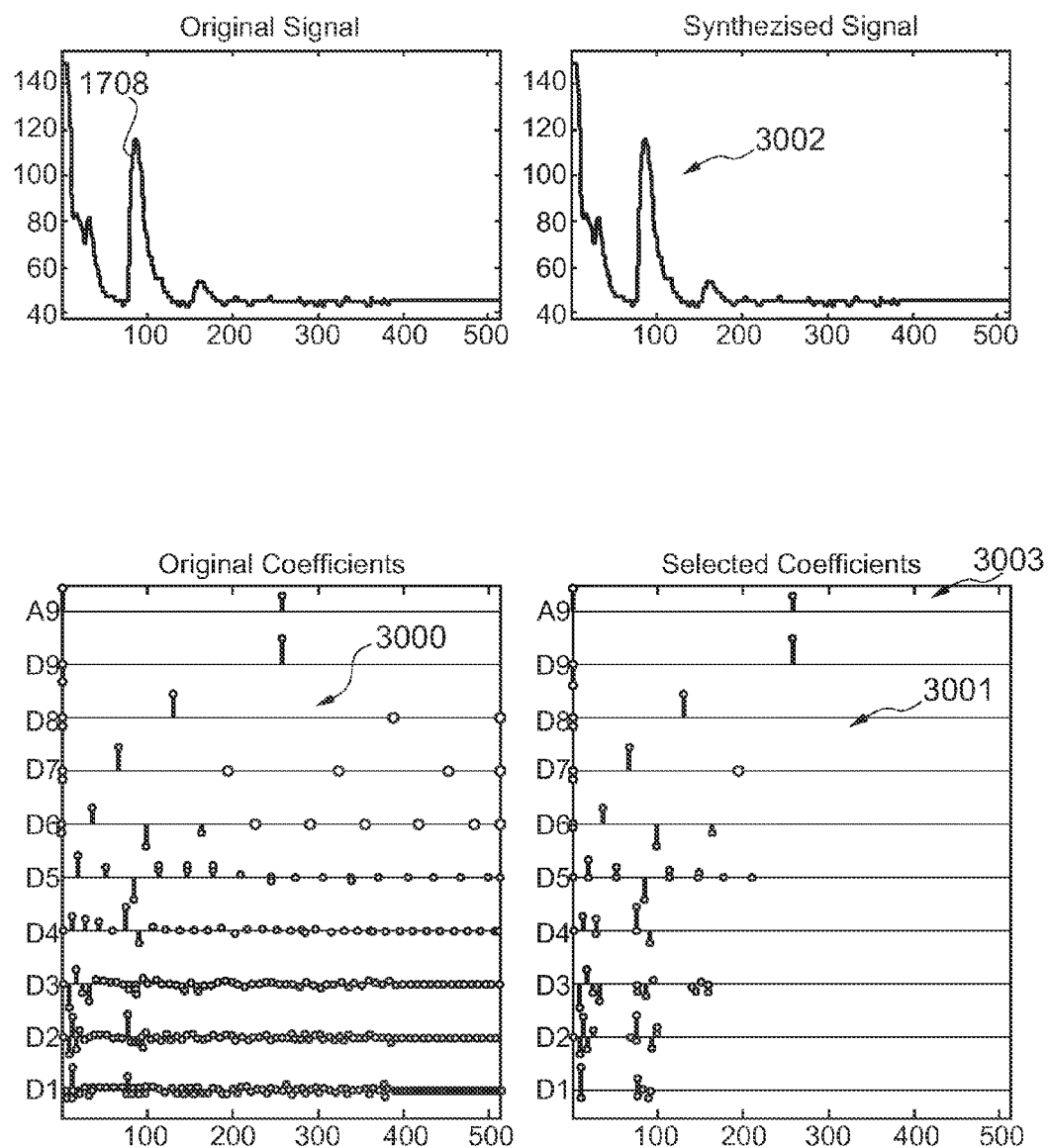
FIG. 30 shows an echo function and a function reconstructed after a compression.

FIG. 30 shows an echo function 1708, and a function 3002 that has been reconstructed following compression. In the case of echo curves from an ultrasound application or a radar application, bi-orthogonal wavelets may represent a suitable analysis function. In the treatment of an echo function that has been generated with devices that operate according to the principle of the guided microwave, wavelets from the family of the coiflets may be well suited.

Figure 60:
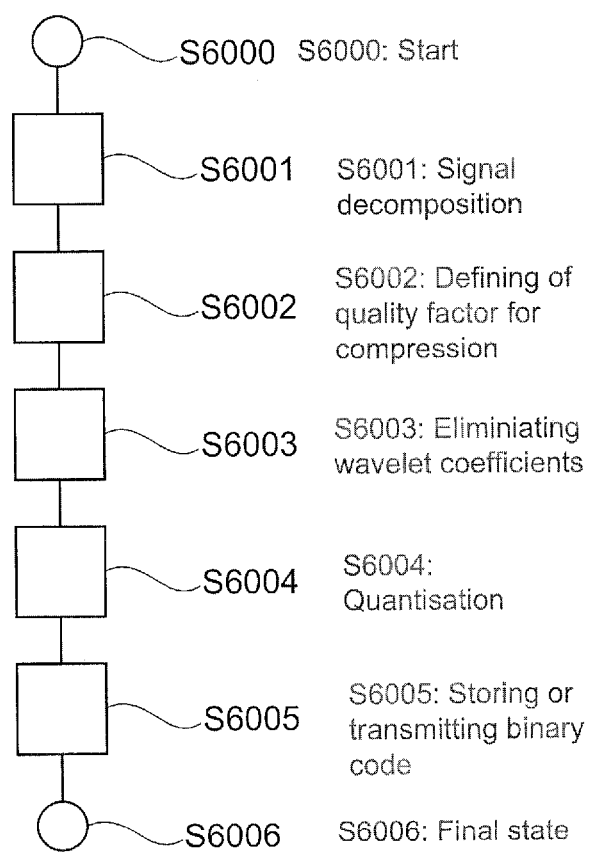
FIG. 60 shows a method for compressing an echo function.

FIG. 60 shows a method for compressing an echo function 2900, 1708. The compression method starts in step S6000. In step S6001 first decomposition of the signal 2900, 1708 takes place with a wavelet 900, 1000, 1001, 1002, 1003, 1004, 1005, 1006, 1007, 1008, 1100, 1200 or with a wavelet function that is suitable for the corresponding echo function 1708, as a result of which the coefficient-representation 3000 of the function 1708 is generated. The coefficient-representation 3000 comprises the detail signals of the different scales of the decomposed echo function 1708.

In step S6002 the definition of a quality factor K for compression takes place, which quality factor is between 0 and 100% and has a typical value of 15%.

In step S6003 eliminating wavelet coefficients of low amplitude takes place, for example by hard thresholding or soft thresholding. When eliminating wavelet coefficients, care is taken that the eliminated wavelet coefficients 3001 have little influence on the original signal.

In hard thresholding, starting with the wavelet coefficient whose amount is the smallest amount of a coefficient field 3000 and whose amount is other than zero, iteratively coefficients are zeroed until such time as a component of K coefficients that do not equal zero is reached. The component K is determined by the quality factor K.

The comparison of the coefficient field 3000 that belongs to the original signal 1708 with the coefficient field 3001 that is present after elimination shows that coefficients 3001 are still present on all the scales D1, D2, D3, D4, D5, D6, D7, D8, D9, but that coefficients at a greater distance, for example exceeding 300 cm, have been eliminated.

In soft thresholding all the wavelet coefficients 3000 are at the same time reduced, as far as their amount is concerned, until such time as a component of K coefficients that do not equal zero has been reached.

It should be noted that in the application of a fast wavelet transformation for decomposition up to an upper scale n, the approximation coefficients An 3003 that belong to the upper scale n are preserved, because they are required for the reconstruction of the echo curve 3002.

The remaining approximation coefficients 3003, A9 may in their forms be transmitted and stored as well. The approximation coefficients 3003, A9 are not eliminated. For the purpose of transmission or storage of the remaining approximation coefficients 3001, 3003, further special compression may be used, for example by way of transmitting differences.

In step S6004 a reduction by means of quantisation takes place in the bit width of the coefficient sequences that remain after the elimination of coefficients. This quantisation contributes to further compression. For example, an amplitude is quantised with 4 bit instead of with 8 bit so that the jumps between individual amplitudes are larger, while the arising data-quantity is reduced. Quantisation is a lossy compression.

The step S6004 may also comprise entropy coding of the remaining coefficient sequences, for example by means of run-length coding. For example, a detail coefficient sequence could comprise the following sequence: 0, 0, 0, 12, 3, 0, 1, 0, 0, 0, 0, 12, 32, 0, 0, 0, 0, 1. In the case of coding the run lengths, a coefficient sequence is prepared which, for example, states the number of zeros that are present in a sequence until a component that does not equal 0 occurs. Thus by means of run-length coding, the above example would be coded as a run-length code of 3 0 1 0 4 0 0 4 0. This means that the three consecutive zeroes would be coded using a 3. Since no zeroes occur after this, the run-length code comprises a zero, and the one zero that occurs is represented by a 1.

In addition, the sequence of values is specified which remain at positions that do not equal 0. In this process in the above example the value code 12 3 1 12 32 1 is generated. Run-length coding and value coding can furthermore be converted to binary representation, for example according to a Huffman code.

Subsequently, in step S6005 storing the binary code or transmitting the binary code for example by way of a bus system to an observation point takes place. Thereafter the method proceeds to step S6006, which represents the final state of the method according to FIG. 60.

In the synthesis of the data 3002 the indicated steps for coding, in particular of special compression, are carried out in an inverse manner in order to preserve the wavelet coefficient sequences 3001 or generally the echo function 3002. The wavelet coefficient sequences 3001 no longer contain the eliminated coefficients. The wavelet coefficient sequence is sorted according to the scales. After the wavelet coefficient sequence is available, the echo signal is reconstructed by means of the inverse fast wavelet transformation, wherein any remaining approximation coefficients 3003 are incorporated.

In a modification of the compression method another type of compression is implemented. For example, if from an echo extraction within the sensor 101 or within the field device 101 the positions of relevant echoes are known, then, for the purpose of eliminating the wavelet coefficients, the region of the relevant echo can be masked in each scale so as to prevent the associated relevant coefficients from being eliminated. Consequently, the relevant coefficients are preserved, and the progression of the echo function in the region of the relevant echoes can be reconstructed well. The detail coefficients whose region of influence projects into the region of a relevant echo, in other words into the region between the echo start and the echo end, are not eliminated, because they have the greatest influence on the signal form in the region of the echo. However, other regions can incur a loss of quality as a result of elimination.

The region of influence of a coefficient, in particular the region of influence of a detail coefficient, the region of influence of a start coefficient or the region of influence of an end coefficient, is defined by a section of the abscissa of the coefficient field 3000, 3001, which section extends from the middle of the segment of the position of the respective coefficient to the position of its predecessor coefficient to the middle of the segment of the position of the respective coefficient to the position of its successor coefficient.

When viewed from the respective coefficient, the predecessor coefficient is situated in the direction of decreasing distance values. The successor coefficient is situated in the direction of increasing distance values.

The position in the middle of the segment of the position of the coefficient to the respective predecessor coefficient still forms part of the region of influence of the coefficient, whereas the position in the middle of the segment of the position of the coefficient to its successor coefficient no longer forms part of the region of influence of the coefficient.

In set notation this means that the region of influence E can be defined as follows:

E=[position of the middle of the segment of the position of the coefficient to the predecessor coefficient; position of the middle of the segment of the position of the coefficient to its successor coefficient[

The value at the position of the middle of the segment of the position of the coefficient to the successor coefficient is thus not contained in the quantity.

If the analysed coefficient is the first coefficient of a detail signal, then its region of influence extends from the signal start to the middle of the segment from the coefficient to its successor coefficient.

If the analysed coefficient is the last coefficient of a detail signal, then its region of influence extends from the middle of the segment from the respective coefficient to its predecessor coefficient to the position which, starting from the position of the coefficient has been extended by half the distance between adjacent coefficients of the respective scale. On a scale, all the coefficients are spaced apart equally due to the discretisation of the local region.

The segment between two coefficients is the distance from the position of the first coefficient to the position of the second coefficient. The position relates to the local axis of an echo function or of a detail function. The direction and thus also the designation of a predecessor or a successor relate to the direction of increasing local values.

In a further modification of the method, certain scales are completely left out, i.e. not taken into account, in the elimination of coefficient values. For example, it is imaginable that the upper scales, which comprise only a low degree of detail, for example in FIG. 30 the scales D7, D8 and D9, in any case be preserved in the way they were originally generated, so that the rough gradient of the curve is preserved. The upper scales with a low degree of detail comprise a correlation with the rough progression of the echo function 1708. In this process the achievable compression rate may become only marginally worse.

It is also possible to combine compression by means of a wavelet transformation with known methods of compression or with standard compression methods, i.e. additionally to use special compression. For example, it would also be possible to compress an echo curve with differences between adjacent scanning values or samples for each wavelet, wherein in this process it may be necessary to adjust the selected wavelet.

Also possible is time multiplexing between the wavelet compression and other compression methods. If a curve changes only slightly, by means of differential coding the change can be transmitted by means of a differential coding method. If the echo curve changes very markedly, for example if filling commences, it would be possible to change compression to the wavelet method. In this way the compression method used would be dependent on the speed of the change of the echo function and would be switchable in time.

The compression method by means of eliminating wavelet coefficients may also be possible in combination with continuous wavelet transformation. Coding by means of a filter bank may also be possible for compression.

The coefficient field 3000 has been generated from the echo function 1708. As shown in FIG. 30 on the right-hand side, in the coefficient field 3001 a plurality of small coefficients have been zeroed. The zeroed coefficients are no longer recognisable in the coefficient field 3001.

Reconstruction from the coefficients 3001 by means of the inverse wavelet transformation results in the echo function 3002. A comparison of the echo function 1708, as originally received by the sensor 101, with the reconstructed echo function 3002 shows that the principal structure of the echo function 1708 in the region of the echoes has been preserved.

Apart from smoothing and compressing an echo function, decomposition of the echo function by means of a wavelet transformation can also be used for finding echoes in the echo function. For the purpose of finding echoes an echo of the echo function 1708 can be determined directly from the coefficient field 1701, 3000. Consequently, the computing-intensive step of inverse wavelet transformation can be rendered superfluous, in which step first the signal is reconstructed, and then, for example in the case of the threshold value method, the progression of the reconstructed echo function is evaluated.

Since it is possible to do without the inverse transformation if echoes can be determined directly from the coefficient field 3000, reconstruction from the coefficient field 3000 or reconstruction from the reduced coefficient field 3001, in which coefficients were zeroed, is no longer at the focus of the application. However, if it is possible to do without reconstruction, it is possible to look for a wavelet from the plurality of known wavelets, which wavelet is suitable for echo extraction, without there being a need to take into account that the wavelet used comprises favourable characteristics with regard to any reconstruction.

Due to the required location determination of echoes, which has to be as accurate as possible, it may be sensible to use a continuous coefficient field 1403, as for example shown in FIG. 14, for analysis, or to use a coefficient field which in relation to the local scale is at least partially continuous, for example in the à trous algorithm. FIG. 21 shows a partially continuous coefficient field.

For the purpose of echo extraction it may, however, also be possible to efficiently use a method based on the discrete coefficient field of a fast wavelet transformation, which discrete coefficient field, due to the orthogonality of the base functions used, basically represents the entire information of the respective echo function. This means that the echo function is shown in a redundancy-free manner by means of the coefficient field 3000.

Figure 31:
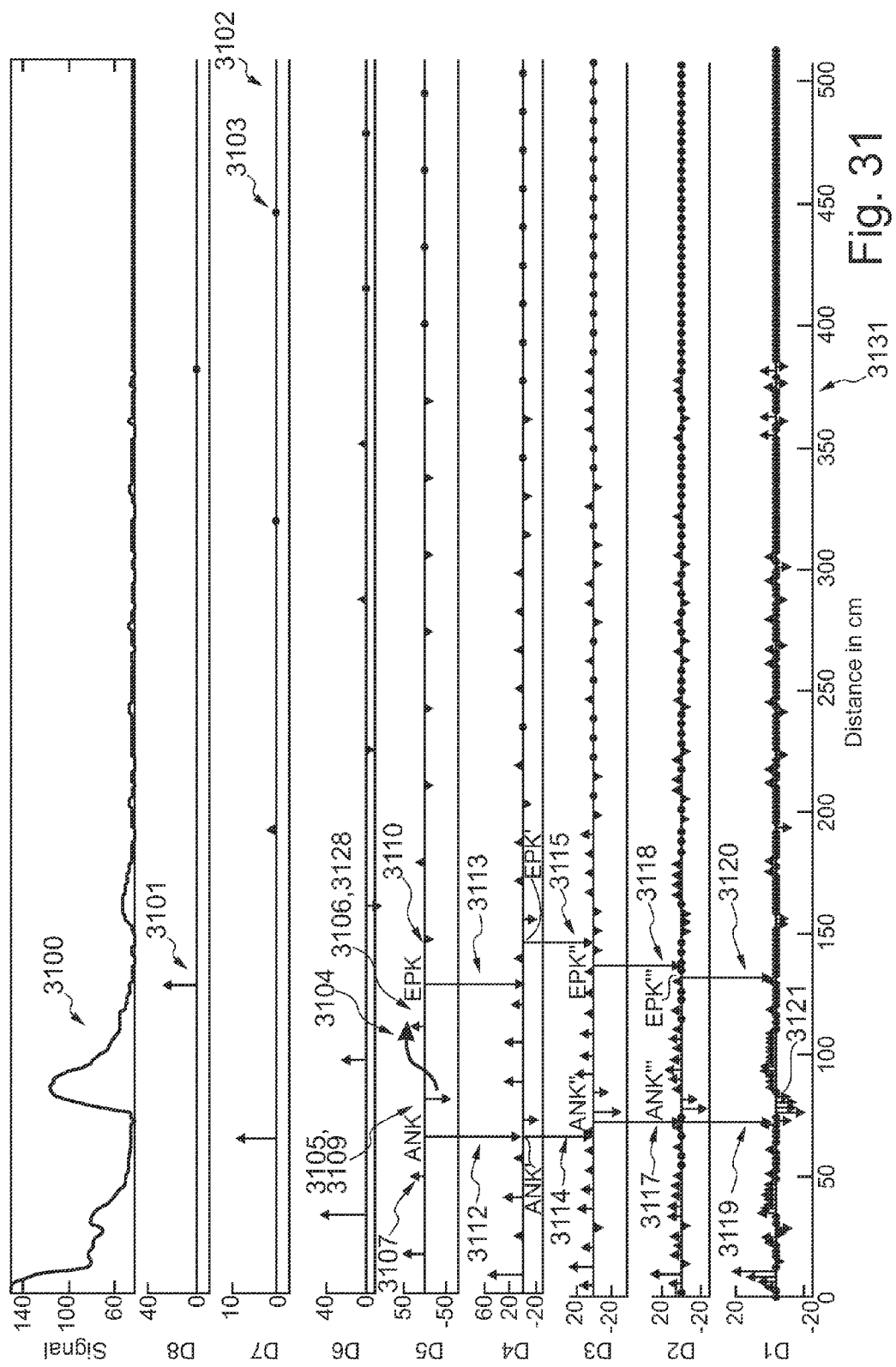
FIG. 31 shows a projection between detail signals of different scales of a decomposed echo function for finding an echo.

FIG. 31 shows a projection between detail signals of different scales of a decomposed echo function for finding an echo. Decomposition of an echo function or echo curve 3100 into its detail coefficients 3101, which in FIG. 31 are shown as arrows 3101, is the starting point for echo extraction. In this arrangement, decomposition may be carried out by means of a wavelet transformation. However, it may also be possible to accomplish decomposition by means of a filter bank. Positive as well as negative wavelet coefficients 3101 result. The plurality of all the coefficients 3101 form the coefficient field 3102.

FIG. 31 shows a coefficient field 3102, which is the result of decomposition of the functions 3100 into the eight scales D1, D2, D3, D4, D5, D6, D7 and D8. In FIG. 31, black dots 3103 denote zero-coefficients, in other words coefficients which due to decomposition by means of wavelet transformation are given the value of zero. Due to the good location of information in the time domain, which information can be converted to a local region, the application of the Haar wavelet may be suitable as a starting point of the decomposition of the echo curve 3100 into its wavelet coefficients 3101.

Figure 61A:
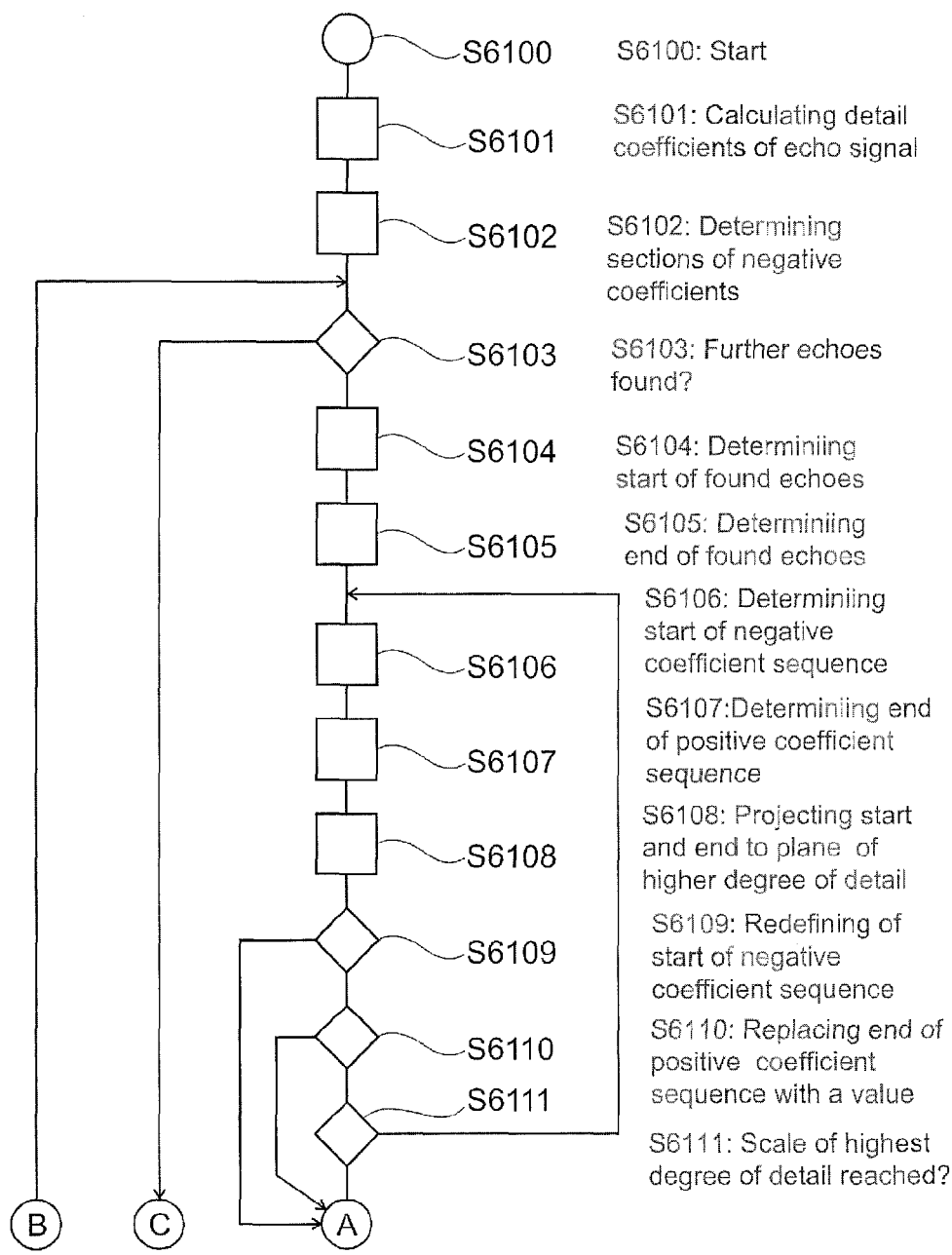
FIG. 61 shows a method for finding an echo in a decomposed echo function.
Figure 61B:
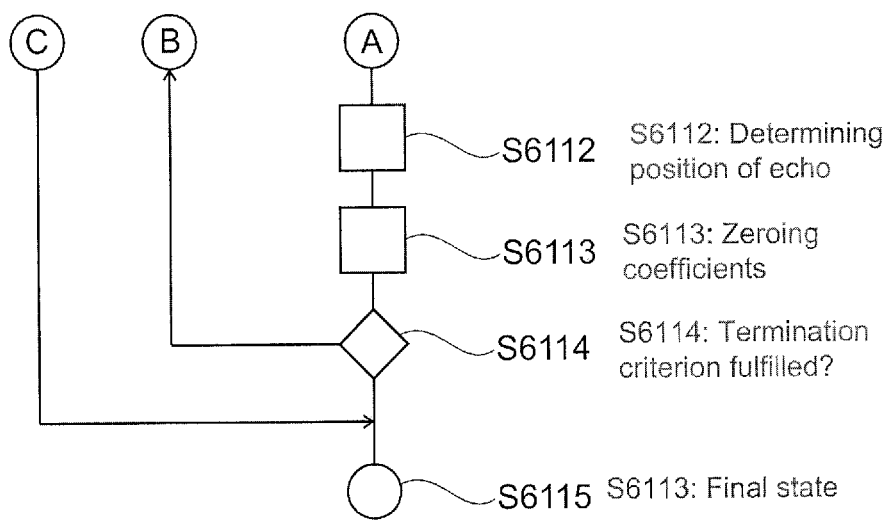

FIG. 61 shows a method for finding an echo in a decomposed echo function. The method starts at the starting point S6100. First, in step S6101, the detail coefficients 3101, 3102 of the echo signal 3100 are calculated.

Subsequently, in step S6102, the determination of sections of negative coefficient sequences takes place in relation to each of the determined detail planes, in other words in FIG. 31 in relation to each of the detail functions D1, D2, D3, D4, D5, D6, D7 and D8.

A negative coefficient sequence is a consequence of coefficients whose amplitude value is less than zero, wherein said coefficients in the direction of an increasing distance or in the direction of a decreasing distance of the abscissa 3131 after any number of zero-coefficients 3103 are followed by a positive coefficient. Instead of a coefficient following, it is also possible for a start or for the respective end of the detail signal D1, D2, D3, D4, D5, D6, D7 or D8 to follow.

Generally speaking, a coefficient sequence can comprise a single coefficient.

In FIG. 31 the direction of increasing distance values is the direction along the abscissa 3131 to the right-hand side. In FIG. 31 the direction of decreasing distance values is the direction along the abscissa 3131 to the left-hand side. Any number of zero-coefficients can be in position in front of the negative coefficients. The negative coefficient sequence is delimited by a negative start coefficient and a negative end coefficient. This means any zero-coefficients that follow are not taken into account in the assessment of a negative coefficient sequence. In other words, a negative coefficient sequence is a coefficient sequence in which one or several negative coefficients comprises/comprise any number of coefficients smaller than zero or equal to zero.

The values of the corresponding negative coefficient sequences are added up.

Thereafter in relation to each of the determined detail planes the determination of sections of positive coefficient sequences takes place. Positive coefficient sequences are sequences of coefficients 3102, which on the left-hand side and on the right-hand side after any number of zero-coefficients are followed by a negative coefficient or a start or end of the respective detail signal D1, D2, D3, D4, D5, D6, D7 or D8. A positive coefficient sequence is delimited by a positive start coefficient and a positive end coefficient. This means that any following zero-coefficients are not taken into account. In other words a positive coefficient sequence is a coefficient sequence in which one or several positive coefficients comprises/comprise any number of coefficients greater than zero or equal to zero.

The values of the corresponding positive coefficient sequences are added up.

Subsequently the difference of adjacent negative coefficient sequences to positive coefficient sequences is calculated by subtraction of the added-up values of the negative sequence of the added-up values of the positive sequence. The negative coefficient sequence and the positive coefficient sequence are situated in the same detail signal.

In other words this means that a transition between a negative coefficient sequence and a positive coefficient sequence is found on a shared scale so that the transition is situated along a local axis 3131 of a detail function.

For the purpose of extracting echoes, iteratively, starting with S6103 the identification of the largest difference of a negative coefficient sequence to a positive coefficient sequence takes place over all the scales. For example, in FIG. 31 the transition 3104 is determined as the largest difference of a negative to a positive coefficient sequence in the detail signal D5. The found transition 3104 represents an echo, in particular a region of an echo or of an echo position, with the width of the associated negative and positive coefficient sequences. The negative coefficient sequence 3105 is surrounded by two positive coefficient values 3107, 3106, while the positive coefficient sequence 3106 is surrounded by two negative coefficient values 3105, 3110.

Between the transition of a negative coefficient 3109 up to a positive coefficient 3128 it is also possible for any number of zero-coefficients to be present within a shared scale. Zero-coefficients that are situated between negative coefficients 3109 and positive coefficients 3128 are ignored in the analysis of a transition.

If no further echo is found in step S6103, then the method stops and ends in the final state S6115.

Depending on the approach for determining the detail coefficients in step S6101, in particular depending on the methods applied for generating the detail coefficients, the identification of echo regions is also possible by searching for transitions from positive to negative coefficient sequences. The method for finding an echo, which method is described in this document, may be modified in a suitable manner.

In a found position of an echo or of an echo region, often there is a lack of definition relating to the position of the echo.

In step S6104 determining the start of the found echo takes place by an unsharp definition. An unsharp definition is the definition of a region in which the position of a characteristic value is suspected. A precise definition of a position is intentionally avoided. An unsharp definition of an echo region presupposes that an algorithm, which further processes the found region, can handle this unsharp definition. An unsharp definition means that no precise start position or end position is determined, but that instead of this a start- or end region is determined.

The unsharp definition of the start of the found echo provides for identification of the first coefficient of the negative coefficient sequence. The first coefficient of the negative coefficient sequence is designated the start coefficient. The start coefficient 3109 of the negative coefficient sequence 3105 is the first coefficient of the negative coefficient sequence 3105.

The start region of the echo is defined by the region of influence of the detail coefficient or of the start coefficient 3109 of the currently analysed negative coefficient sequence.

In the next step S6105 determination of the end of the found echo takes place. In this process an unsharp definition can be used. For an unsharp determination of the end of a found echo the last coefficient 3128 of the positive coefficient sequence 3106 is identified. The last coefficient of the positive coefficient sequence 3106 is the last coefficient of the analysed sequence in a direction of increasing distance; the last coefficient of the positive coefficient sequence 3106 is thus the coefficient 3128.

The end region of the echo is defined by the region of influence of the detail coefficient or end coefficient 3128 of the currently analysed positive coefficient sequence.

In FIG. 31 the designations of predecessor and successor are defined in relation to the direction in increasing distance values; they should not be interpreted in the context of taking into account a relationship correlation. In other words this means that with reference to FIG. 31 a predecessor comprises a lower distance value relative to the current position, while a successor comprises a higher distance value relative to the current position.

More precise location of the position of the found echo may become possible by iterative application of projections. Projection takes place on planes or detail planes D1, D2, D3, D4, D5, D6, D7, D8, which represent a higher degree of detail in relation to the current detail plane, in which the transition 3104 of the negative 3105 to the positive 3106 coefficient sequence was found. In the arrangement of FIG. 31 the plane of the highest degree of detail is arranged in a lower region. Accordingly, when the transition 3104 between the negative coefficient sequence 3105 and the positive coefficient sequence 3106 was found in the detail signal D5 or in the detail stage D5, projection is onto the stage D4, which comprises a higher degree of detail than does the stage D5.

For projecting the region of the found echo, in step S6106 the start of the negative coefficient sequence ANK is determined. The start of the negative coefficient sequence ANK, relative to FIG. 31, coming from the left-hand side, in other words coming from low distance values, is situated in the middle between the first negative coefficient 3109 and its predecessor 3107.

In step S6107 the end EPK of the positive coefficient sequence 3106 is determined. The end EPK of the positive coefficient sequence, coming from the left-hand side, in other words coming from low distance values, is situated in the middle between the last positive coefficient 3128 and its successor 3110. In this context the term successor again relates to a direction coming from the left-hand side, in other words in the direction of increasing distance values.

In step S6108 a projection of ANK and EPK onto the detail plane below it takes place. This means that the position ANK of the detail plane D5 is projected onto the corresponding position of the detail plane D4, while the found position EPK of the detail plane D5 is projected onto the corresponding position of the detail plane D4. In FIG. 31 the projection of the start of the negative coefficient sequence ANK is shown by means of the projection arrow 3112, while the projection of the end of the positive coefficient sequence is shown by means of the projection arrow 3113.

In step S6109 a redefinition of the start of the negative coefficient sequence ANK takes place by replacement with the start value ANK' of the found negative coefficient sequence. If no negative coefficient sequence is encountered in the projection, then the redefinition of the start of the negative coefficient sequence is implemented by replacement of the start value ANK with the start value ANK' of the negative coefficient sequence situated nearest to the right-hand side, which coefficient sequence starts within the region between the start of the negative coefficient sequence ANK and the end of the positive coefficient sequence EPK. In the case where to the right-hand side of the value encountered in the projection the start of a positive coefficient sequence is found at a shorter distance than the start of the negative coefficient sequence situated nearest to the right-hand side, a transition to step S6112 takes place. The orientations right-hand side and left-hand side relate to the diagram in FIG. 31, and in particular to the orientation of the abscissa 3131. The right-hand side is situated in the direction of increasing local values, while the left-hand side is situated in the direction of decreasing local values.

Otherwise, transition to step S6110 takes place. In step S6110 the end of the positive coefficient sequence EPK is replaced with a new final value EPK'. The end of the positive coefficient sequence EPK is defined by replacement with the final value EPK' of the positive coefficient sequence encountered in the projection 3113. If no positive coefficient sequence has been encountered in the projection 3113, then the end of the positive coefficient sequence EPK is replaced with the final value EPK' of the positive coefficient sequence situated nearest to the left-hand side, which coefficient sequence starts within the region between the start of the negative coefficient sequence ANK and the end of the positive coefficient sequence EPK. In the case where to the left-hand side of the position encountered in the projection 3113 the end of a negative coefficient sequence follows, which end comprises a shorter distance to the found position than does the end of a positive coefficient sequence situated nearest to the left-hand side, then a transition to step S6112 takes place.

In other words this means that the projection defines a new section between ANK' and EPK' along the distance axis 3131. This newly defined section is situated on a scale that comprises a higher degree of detail D4.

In step S6111 a search of the largest transitions from negative coefficient sequences to positive coefficient sequences is carried out between ANK' and EPK'. The negative coefficient sequences along the newly defined section are also referred to as negative partial-coefficient sequences, while the positive coefficient sequences along the newly defined section are also referred to as positive partial-coefficient sequences.

In the search for the largest transitions the biggest difference between transitions from negative to positive coefficient sequences is determined. The transition from a negative coefficient sequence to a positive coefficient sequence determined in this way defines a main coefficient sequence. The main coefficient sequence comprises those coefficients of a negative and of a positive coefficient sequence, and possibly zero coefficients situated in between, which achieve the biggest detected transition between a negative and a positive coefficient sequence.

The following analysis is then limited to this main coefficient sequence.

If the lowermost scale in step S6111 has not yet been reached, in other words the scale of the highest degree of detail D1, then a transition to step S6106 takes place, and further projections are carried out. The further projections are indicated by means of the projection lines 3114 and 3115, which extend from the detail plane D4 to the detail plane D3, and which lead to the start of the negative coefficient sequence ANK" to D3 and to the end of the positive coefficient sequence EPK" to D3.

The start of the negative coefficient sequence in the detail signal D3 or of the detail plane D3 ANK" is used as a starting point for the projection 3117 onto the new detail plane D2, while the end of the positive coefficient sequence EPK" of the detail signal D3 is used as the starting point for the projection 3118 onto the detail plane D2. In the detail signal D2 the start of the negative coefficient sequence ANK''' and the end of the positive coefficient sequence EPK''' is determined on the scale 2. These are in turn used as the starting point for the projections 3119 and 3120 onto the detail signal D1 of the lowermost scale.

With the projections 3119 and 3120 the lowermost scale 1 has been reached, and in step S6112 the position of the echo 3100 at position 3121, at the echo position 3121 or at the distance 3121 is determined, which is situated between the position of the last coefficient of the negative coefficient sequence within the main coefficient sequence and of the position of the subsequent. The found echo 3121, in particular the associated position, is entered in an echo list.

In step S6113 coefficients are zeroed. To this effect, first, the largest-possible region of extension of the found echoes is determined, which region results as the segment between the smallest possible echo start and the biggest possible echo end. This is followed by identifying the largest scale s, D5 at which in step S6104 or S6105 the echo start- and echo end regions have been defined. Based on the determined scale value s, scale 5 in all the detail signals with a lower degree of detail, namely in the coefficient field 3102 the detail signals of the scales 6, 7 and 8, all the coefficients whose region of influence extends into the region of the largest-possible extension of the echo are zeroed. This elimination is shown in FIG. 32 in the regions 3123, 3124 and 3125.

In addition, from the scale s, e.g. scale 5 D5 descending to the scale 1 D1, all the negative coefficient sequences whose last coefficient is situated in the region of the largest-possible extension of the echo, as well as the positive coefficient sequence that respectively follows in increasing distance direction, are zeroed. This elimination is shown in the regions 3126, 3127, 3128, 3129 and 3130 in FIG. 32.

Figure 32:
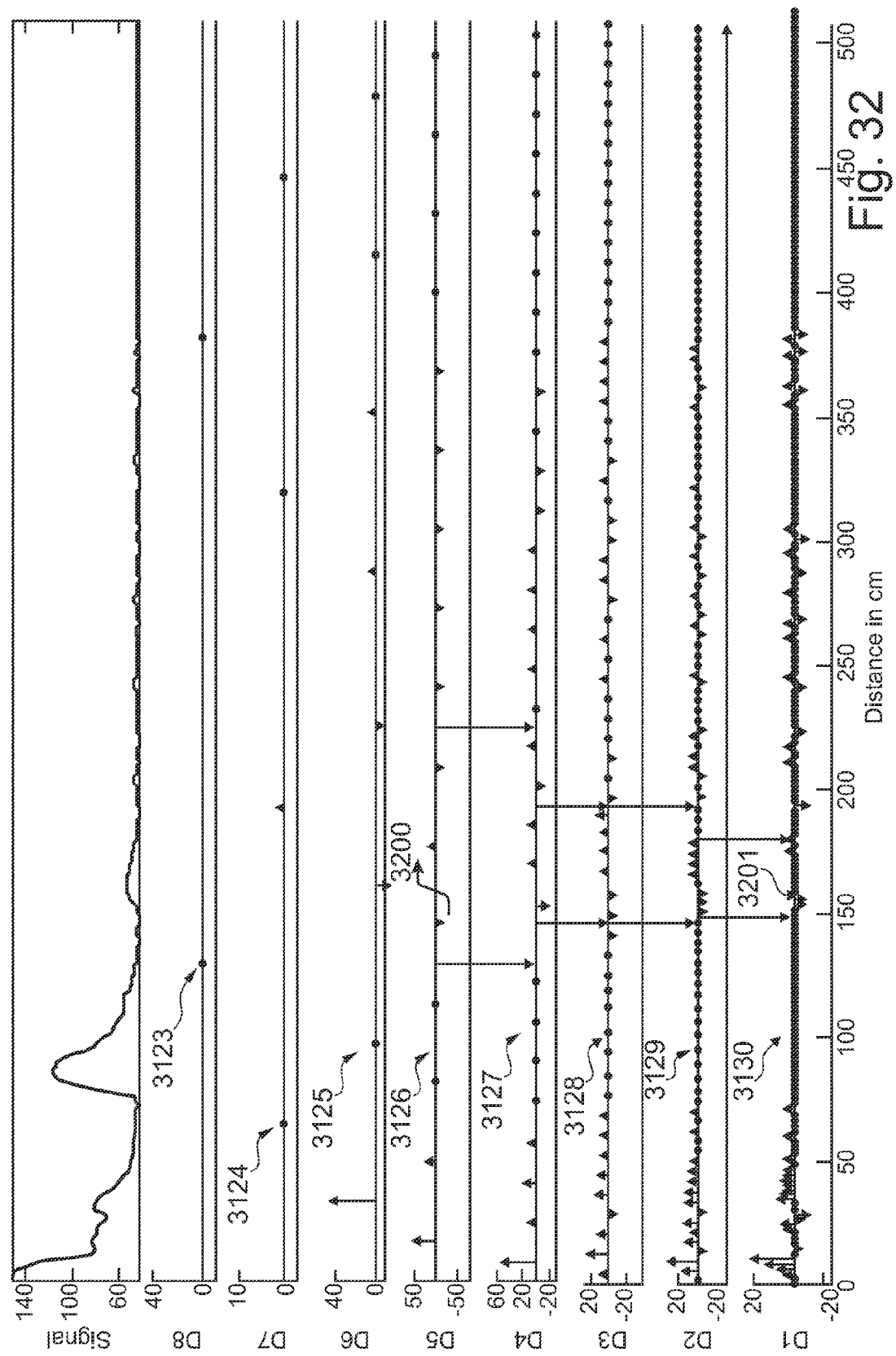
FIG. 32 shows a further projection between detail signals of different scales for finding an echo.

FIG. 32 shows a further projection between different scales for finding an echo.

In the case where in step S6114 the termination criterion has not yet been fulfilled, further echoes are determined in that a jump back to step S6103 occurs. The termination criterion could, for example, be that transitions between negative coefficient sequences and positive coefficient sequences exist, but that the predeterminable number of echoes has been found.

Zeroing the already found coefficients in already used coefficient sequences takes place in order to generate a single echo list or an unambiguous echo list. In a single echo list all the unambiguously found echoes are entered; this means that the method found precisely this combination of echoes, and that the echo list does not permit any further possible physical interpretation of the echoes. As a result of repeated implementation of the method, in FIG. 61 as a result of finding the transition region 3200 and by means of projecting the transition region onto scales situated below, the echo position 3201 of a further echo is determined, as shown in FIG. 32.

Figure 33:
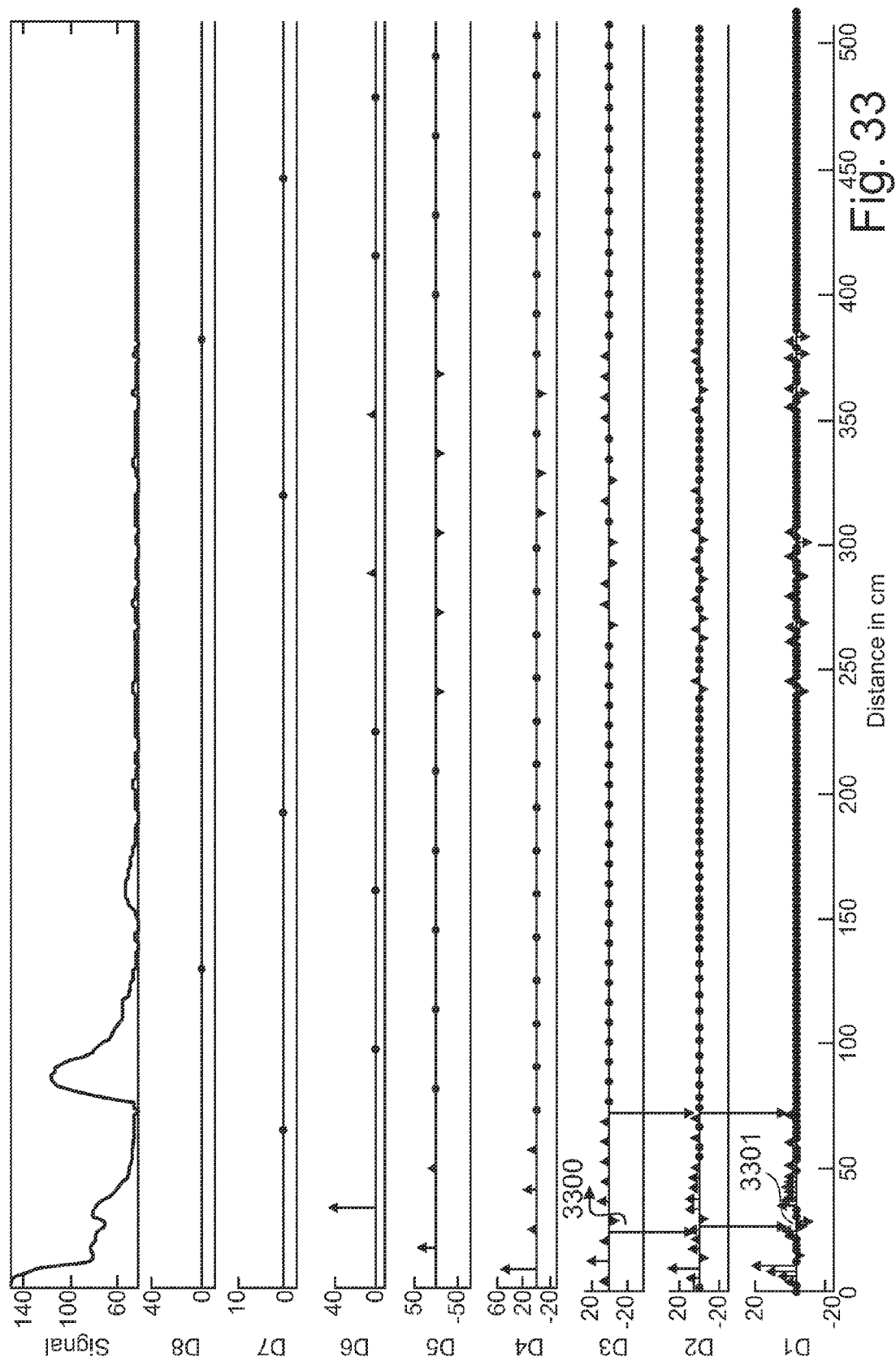
FIG. 33 shows yet a further projection between detail signals of different scales for finding an echo.

FIG. 33 shows yet a further projection between different scales for finding an echo. After the coefficients associated with the further echo position 3201 in FIG. 32 have been zeroed, the transition 3300 is found, and by means of projection the echo position 3301 is found, as shown in FIG. 33, so that there is a list comprising three different echo positions 3121, 3201, 3301. After all the echoes have been found, the method is in the final state S6115.

The definition of a termination criterion can take place according to various aspects. Termination of the method is imaginable, for example, in the case of a predeterminable number of n found echoes. In the present case, as shown in FIG. 31 to FIG. 33, the number would thus be the number n=3. Selection of the number n of the echoes to be observed may depend on the specific application.

Often there is no definition of a termination criterion. If there is no termination criterion, the described method of FIG. 61 extracts all the echoes from the echo curve 3100. A subsequent echo-processing algorithm, for example in the echo evaluation device 604, can be in a position, with the plurality of available echoes, to implement a reliable classification of the echoes. In this context the term classification refers to the echo evaluation 604 and to the decision concerning a fill level 606.

The provision of the echoes can take place in various ways. For example, if the echo-processing unit, for example the echo evaluation device 604, expects a fixed definition of the start and the end of the echo, i.e. no unsharp definition of a start region and of an end region, then the middle of the respective tolerance region, start region or end region can be issued as a fixed start position or end position of the echo.

If the determination of start and end is to be carried out with more precision, then still further steps can be carried out in the method according to FIG. 61. For example, step S6104, which determines an unsharp start region, can be carried out if the sum of the analysed negative coefficient sequence in the current detail signal according to amount is larger than or equal to the sum of the coefficient sequences that have last been analysed in step S6104. Furthermore, step S6105 could be carried out if the sum of the analysed positive coefficient sequences according to amount is larger than or equal to the sum of the coefficient sequence that has last been analysed in S6105.

As a result of this new determination of the echo start- and echo end regions in the further iterations of the method, it is possible to reduce the regions of uncertainty relating to the echo start or echo end, and by location of the characteristic values in the finer detail planes to gradually arrive at a more precise determination of the echo start region and of the echo end region, and in this way to reduce the uncertainty.

If the echo-processing algorithm that is to be carried out subsequently is in a position to also process tolerance regions in relation to the position of the echo, then the algorithm of step S6112 can be modified in that the position of the found echoes is determined by subsequent definition, which is again unsharp. The last coefficient of the negative coefficient sequence LKNK is identified, and the first coefficient of the positive coefficient sequence EKPK is identified. The definition of the first coefficient and of the last coefficient relates to a direction in increasing distance values.

Thereafter, the position of the echo as a region between the middle of the segment of LKNK to its successor to the middle of the segment of EKPK to its predecessor is determined.

The middle of an unsharply defined echo position can also be used as a determined echo position or fixed echo position for outputting, in order to make it possible for a subsequent algorithm that cannot process any unsharp definitions to process the echoes found.

If for further signal processing the heights of the ascending or descending edges of an echo are required, then these values result on the basis of the doubled cumulative values of the coefficient sequences analysed in the steps S6104 and S6105. The value of the original signal 100, 202, 500, 3100 at the determined position is used as an echo amplitude. As an alternative to this, it is also possible to use the average of the amplitude values in the region of uncertainty of the echo position, in other words in the unsharply defined region of the echo position.

Based on smoothing the signal progression with wavelets it is also possible to carry out an advance selection of relevant coefficients prior to implementing the method according to FIG. 61. Thus by eliminating small coefficient values, according to the standards of signal smoothing, quietening of the signal progression and suppression of noise components in the echo signal may be possible.

Moreover, it is also possible from the knowledge of the application, to limit the echo extraction 602 to defined detail planes D1, D2, D3, D4, D5, D6, D7 that in main points represent echoes of a width that corresponds to a respective local quantisation. The local quantisation in the scales results from the distances between adjacent coefficients of a scale, and consequently increases from one scale to another. For example, an echo search could only be carried out in the detail signals D3 to D6.

Moreover, by means of supplementation it is possible to improve the reliability in the separation of converging echoes.

Figure 34:
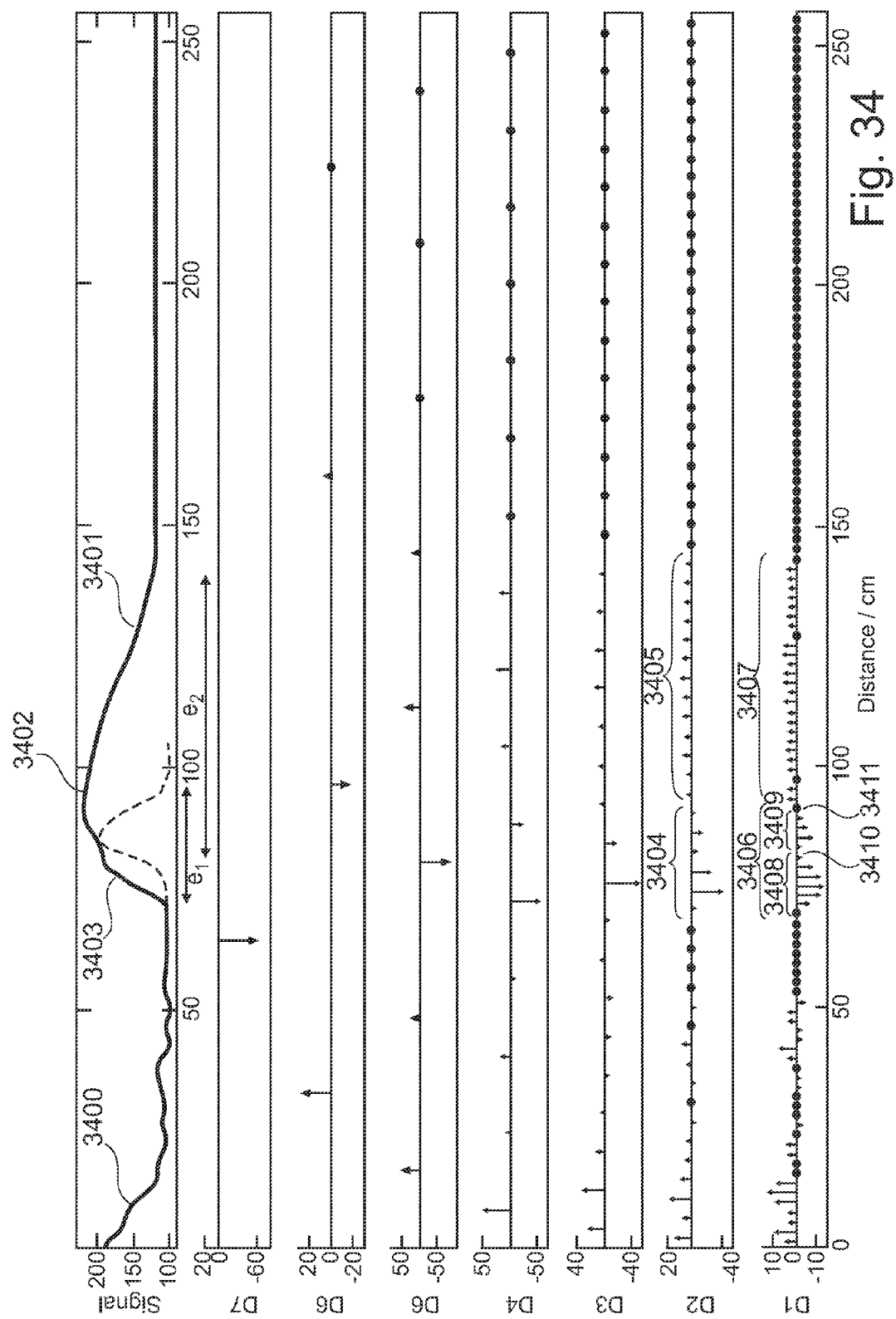
FIG. 34 shows a decomposed echo function in the case of converging echoes.

FIG. 34 shows a decomposed echo function in the case of converging echoes. If based on an echo movement monitored over time it has been determined that two echoes are in the process of converging, it is possible to search in a targeted manner for characteristic patterns in the detail coefficients of the lower detail planes D1, D2, D3, D4, D5, D6, D7. These samples can make it possible to separate the echoes. FIG. 34 shows a characteristic pattern of a converging echo in the two lower planes D1 and D2.

FIG. 34 shows the echo function 3400 with an increase in the level 3401 that is composed of the converging echoes e1 and e2. The increase in the level 3401 comprises the two humps 3402 and 3403. In the scales D1, D2, D3, D4, D5, D6, D7 the decomposition of the echo function 3400 is shown. In a converging echo the coefficients of a negative coefficient field 3404, 3406 first increase according to amount, before decreasing according to amount and then increasing again, before the transition to the associated positive coefficient field 3405, 3407 takes place. In other words, the negative coefficient field 3404, 3406 in the region of converging echoes comprises more than a single local maximum when the progression according to amount of the detail coefficients is analysed.

In the case of converging echoes e1, e2, in the region of negative coefficients after a first increase and decrease of the amount of the detail coefficients in the region 3408, there is a renewed increase of the amounts of the coefficient values in the region 3409, which increase is caused by the second echo e2. Analogous to the representation in FIG. 34 it is possible to search in a targeted manner for patterns that exist in the lower detail planes, so that based on these patterns reliable separation of the echoes is possible. The pattern or the characteristic feature can be found in a shared detail plane.

During the analysis, the negative coefficient sequence 3406 is divided into the two partial coefficient sequences 3408 and 3409. Since the partial coefficient sequence 3408 arises from the progression of the echo e1, the position 3410 of the echo e1 is defined at the location between the last coefficient of the partial coefficient sequence 3408 and the successor coefficient. Consequently, the position of the echo e2 is just at location 3411 between the last coefficient of the partial coefficient sequence 3409 and the successor coefficient.

In an alternative constellation in which the amplitude of the second echo e2 is lower than the amplitude of the first echo e1, a change in the positive coefficient field according to the form described above may be able to be observed. The method for separating echoes therefore requires continuous observation of the amplitude situation of the corresponding echoes so that correct evaluation of the patterns in the negative or positive coefficient field can be carried out.

The characteristic of wavelet transformation, which characteristic can be utilised in the context of a signal analysis, in particular of an echo signal analysis, consists of its ability to provide, in parallel, characteristic features of a present signal from different degrees of detail or from different scales.

Figure 35:
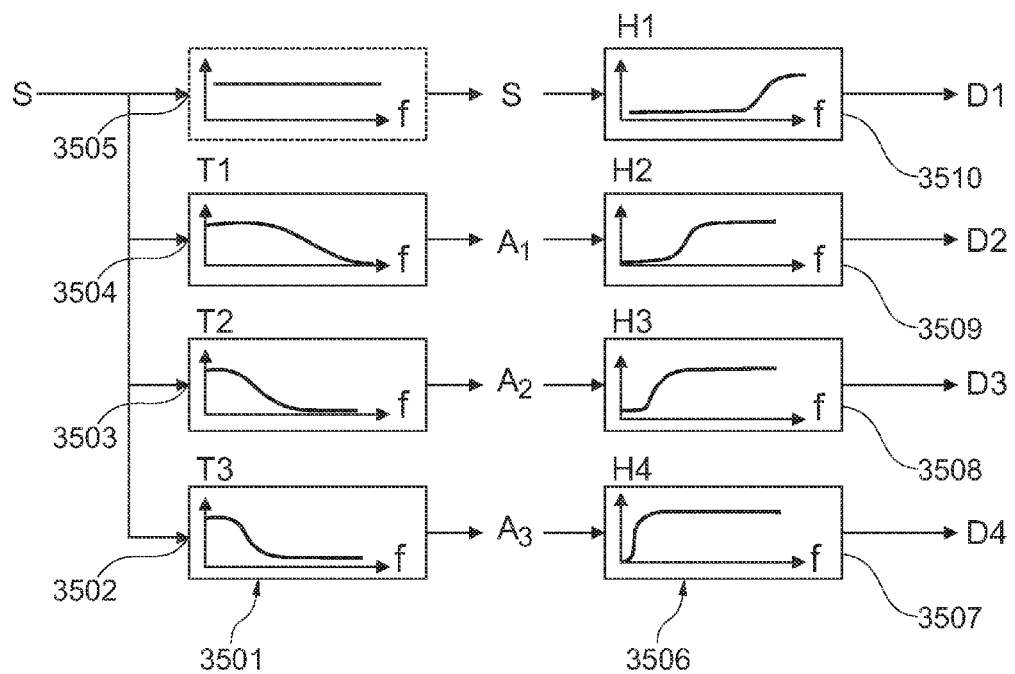
FIG. 35 shows a filter bank for determining approximation signals and detail signals.

Apart from the methods from the field of wavelet theory, further methods may be suitable for carrying out a decomposition of a signal that is present into different degrees of detail, detail functions or various scales. Decomposition of an echo curve or of a measured value function can take place with the use of at least one filter bank. FIG. 35 in an exemplary manner shows a suitable arrangement. Decomposition of the present echo function s into the various approximation functions A1, A2, A3 takes place by filtering the signal s by means of the filter bank 3501.

The low-pass filters 3502, 3503 and 3504 shown in FIG. 35 can be implemented depending on the form of representation of the signal s both in digital form and in analog form. With the generated signals s, A1, A2, A3, subsequently, by means of the filter bank 3506, an analysis of the detail information contained in the respective signal s, A1, A2, A3 can be implemented. Depending on the form of representation of the signals that are present, the high-pass filters 3507, 3508, 3509 and 3510 that are used in this process may be implemented in analog or digital form.

In the context of echo signal processing, the detail signals D1, D2, D3 and D4 may be used directly for identification of echoes contained in the signal. If the detail signals D1, D2, D3 and D4 are present in digital form, then the coefficients, after suitable arrangement, may be able to form a coefficient field that is comparable to the detail coefficient field of the discrete wavelet transformation. If the signals are present in analog form, then, after analog-to-digital conversion that is to be carried out in addition, it may also be possible to generate a detail coefficient field. Based on this coefficient field a method for finding echoes in a decomposed echo function may be applied.

The filters of the filter bank 3501 have different limit frequencies, with the limit frequency from one filter to the other preferably being changed precisely by the factor of 2.

The allpass 3505 that is shown in FIG. 35 is optional and only shown in the diagram to illustrate the similarity of the structures of the approximation filter bank 3501 to that of the detail filter bank 3506.

The coefficients of a wavelet transformation make possible a perfect reconstruction of the analysed signal from the totality of the wavelet coefficients. If it is possible to do without a perfect reconstruction, the approach for decomposition of a function into detail signals may be defined under other aspects.

It may thus appear sensible to combine very good local resolution behaviour of the method with special selectivity with regard to real echo forms encountered, for example a bell-shaped Gauss curve.

Thus the filters 3502, 3503, 3504 used in FIG. 35 have a Gauss-shaped filter characteristic that may be well-suited to emphasise the echoes contained in the signal in the individual approximations A1, A2 and A3. Furthermore, the frequency selectivity of the filters of the detail filter bank 3506 can also be matched to the expected Gauss forms.

Like any other filter characteristic of a filter bank, this filter bank or Gauss-shaped filter characteristic can form a base function for the decomposition of an echo function, in particular if the filter bank has been derived from a mother function, for example from a Gauss-function.

The filter characteristic can be functionally represented, in particular as a digital filter. Furthermore, the filter characteristic may be able to be derived from a mother wavelet function.

Figure 36:
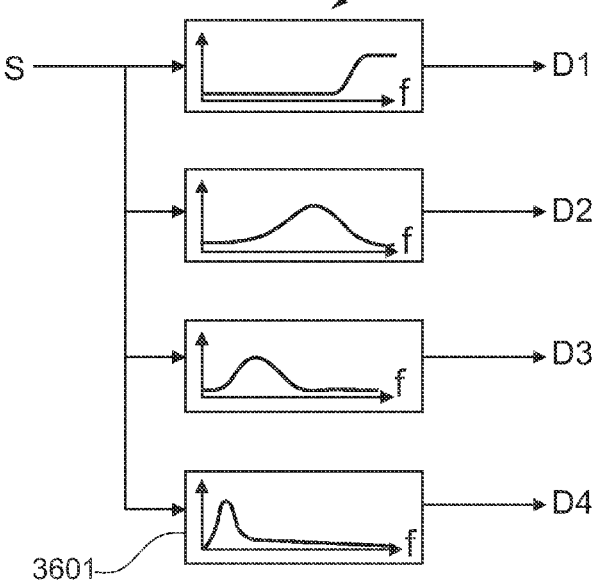
FIG. 36 shows a filter bank for the direct generation of the detail signals.

If in the context of echo signal processing the approximation signals Ai are not required, for example in the implementation of a method for finding echoes in a decomposed echo function, then decomposition of the signal into its detail signals can also be carried out with the use of a filter bank according to FIG. 36. FIG. 36 shows a filter bank for the direct generation of detail signals.

The band-pass filters used in FIG. 36 result, for example, from the superposition of the filter characteristics of a filter bank according to FIG. 35. The band-pass filter 3601 comprises, for example, a frequency selectivity that may result from the superposition of the characteristic filter curves of the filters 3502 and 3507 from FIG. 35. The filters of a filter bank according to FIG. 36 can be implemented depending on the representation form of the signal s or of the echo function s in analog or digital form.

In an embodiment of an arrangement for the decomposition of an echo function it may furthermore be possible to implement the applied frequency-selective filters of the filter bank 3501 and 3506 or of the filter bank 3602 by iterative analysis of a signal by means of a single filter or by means of several adjustable filters. In a first pass the filter characteristics of the filters 3505, 3510 may be implemented by means of the adjustable filters, thus generating the signals s and D1. In further passes, after adjustment of the filters to the filter characteristics of the filters 3504, 3509 the signals A1 and D2 may be generated. In the same manner A2, D3 and A3, D4 can be generated.

Figure 37:
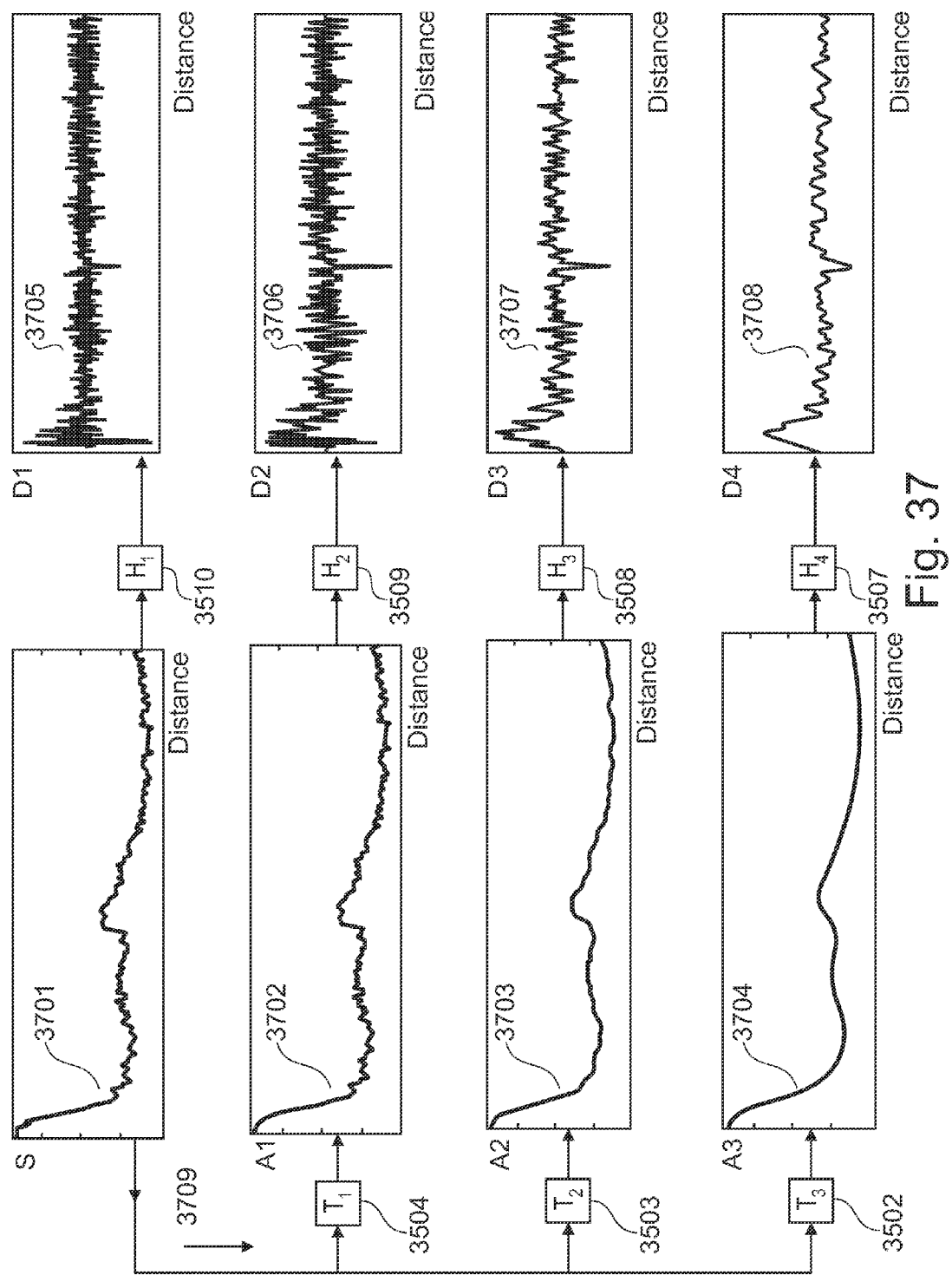
FIG. 37 shows the application of a Gauss-filter bank on a real echo curve.

FIG. 37 shows the application of a Gauss-filter bank to a real echo function. FIG. 37 shows furthermore the decomposition of an echo function 3701 by means of a filter bank according to FIG. 35, wherein the filters 3502, 3503, 3504, 3507, 3508, 3509 and 3510 comprise a Gauss-shaped progression of the characteristic filter curve. The arising approximation signals 3702, 3703 and 3704 can be both in analog and in digital form. Likewise, the determined detail functions or detail signals 3705, 3706, 3707 and 3708 may be present in analog or digital form, depending on the representation form of the echo function s.

Figure 38:
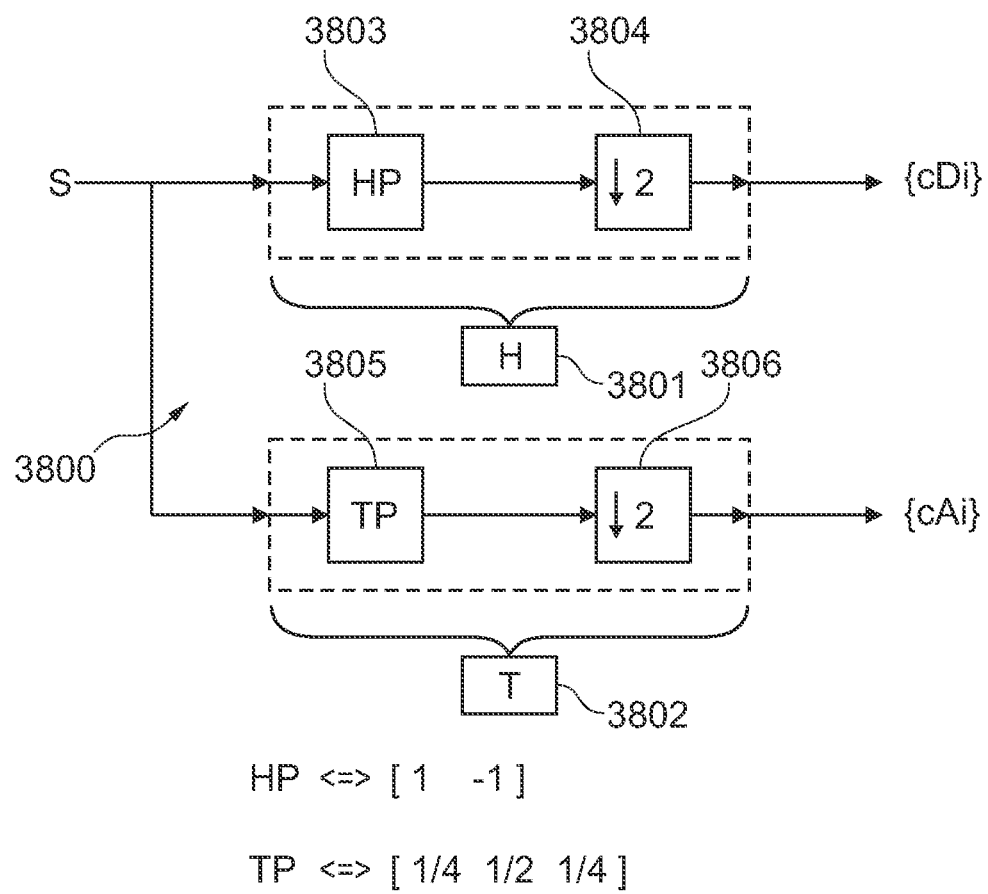
FIG. 38 shows a digital implementation of a Gauss-filter bank.

Furthermore, there is the possibility of decomposition of a signal into its detail signals by applying a filter bank according to FIG. 38. FIG. 38 shows a digital implementation of a Gauss-filter bank. The filter bank 3800 is used to decompose the original signal S. The original signal S in turn is split in the filter bank 3800 into a high-pass filter stage H, 3801 and a low-pass filter stage T, 3802. The high-pass filter HP, 3803 is connected with the downsampling device 3804, from which the detail coefficients $\{cD_i\}$ arise. The low-pass filter TP, 3805 is connected with the downsampling device 3806, from which the approximation coefficients $\{cA_i\}$ arise.

Figure 39:
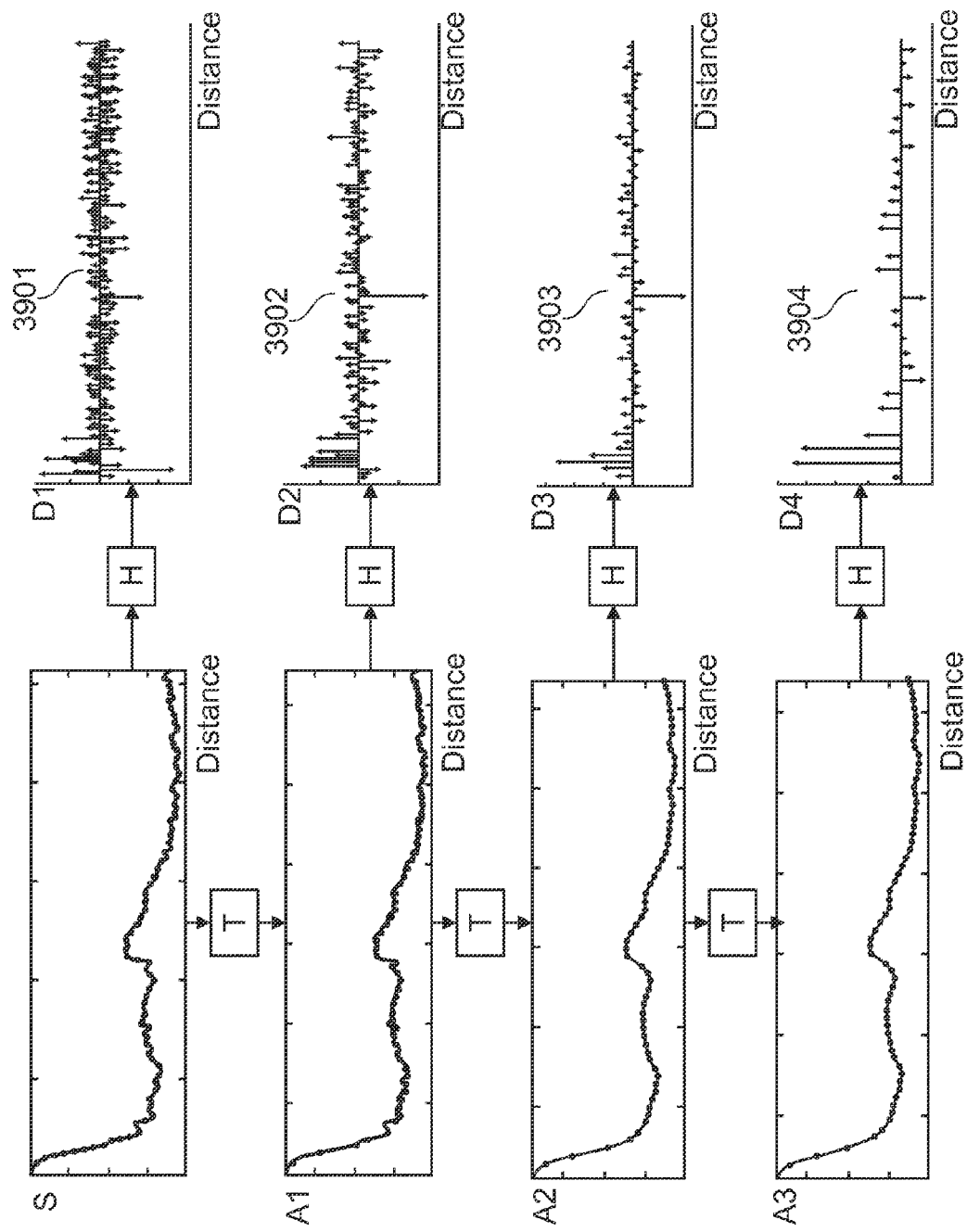
FIG. 39 shows the application of the digital Gauss-filter bank on a real echo curve.

The high-pass filter 3801 comprises, for example, a filter characteristic of HP=[−1 1], while the low-pass filter 3805 comprises, for example, a filter characteristic TP=¼×[1 2 1]. In a manner that is similar to that of a fast wavelet transformation, after low-pass filtering 3805 the scanning rate of the signal is reduced 3806. The approximation signal A, is again supplied or fed back as the original signal S, and in the next pass, for the purpose of generating a further scale, is fed to the same filter bank 3800. As a result of this repeated feed-in, a sequence of approximation signals $A_i$, A1, A2, A3 arises, as shown in FIG. 39. Furthermore, the detail signals D1, D2, D3, D4 arise.

FIG. 39 shows the application of a digital Gauss filter bank to a real echo function. Furthermore, FIG. 39 shows the decomposition of an echo function S according to a filter bank according to FIG. 38, which is iteratively applied to the signal or to the resulting approximations. In a situation that is similar to the application of the à trous algorithm of the wavelet transformation, instead of a reduction in the scanning rate 3804, 3806 it is also possible to implement widening of the filters HP 3803 and TP 3805 by inserting zeroes or by means of convolution or convolution into itself. The signals A1, A2, A3, D1, D2, D3, D4 that have been generated with the filter bank 3800 then comprise the full local resolution.

The approximation signal A1 is on the lowermost scale and provides the highest degree of detail, in other words the finest resolution. FIG. 39 shows that the distance between the coefficients increases with a reduction in the degree of detail in the direction from the scaling 1 of the signal A1 to the scaling 3 of the signal A3.

The approximation low pass 3805 can, for example, be achieved with the use of a binomial filter of a width of 3 samples, which carries out the binary approximation of a Gauss filter. However, higher-order binomial filters can also be used. It has, however, been shown that approximation of the Gauss filter with a filter TP=¼×[1 2 1], which, for example, carries out two shift operations and two additions, involves reduced computing effort while still returning satisfactory results. In the same manner, approximation of the Gauss filter in the high-pass component with a filter HP=[−1 1] involving a single subtraction leads to satisfactory results.

In a further embodiment of the method, in the high-pass branch 3801 the scanning-rate reduction device 3804 may be eliminated. With the use of the filters HP=[−1 1], construction of the approximation details then takes place directly by way of forming the first derivation of the approximation function.

The high-pass filter stage 3801 is used to extract the detail information contained in the respective approximation signal A1, A2, A3. The calculated coefficients of the detail signals 3901, 3902, 3903, 3904 can be shown in a clear manner by applying the same arrangement regulation as in the fast wavelet transformation in the form of a coefficient field 2902.

Figure 40:
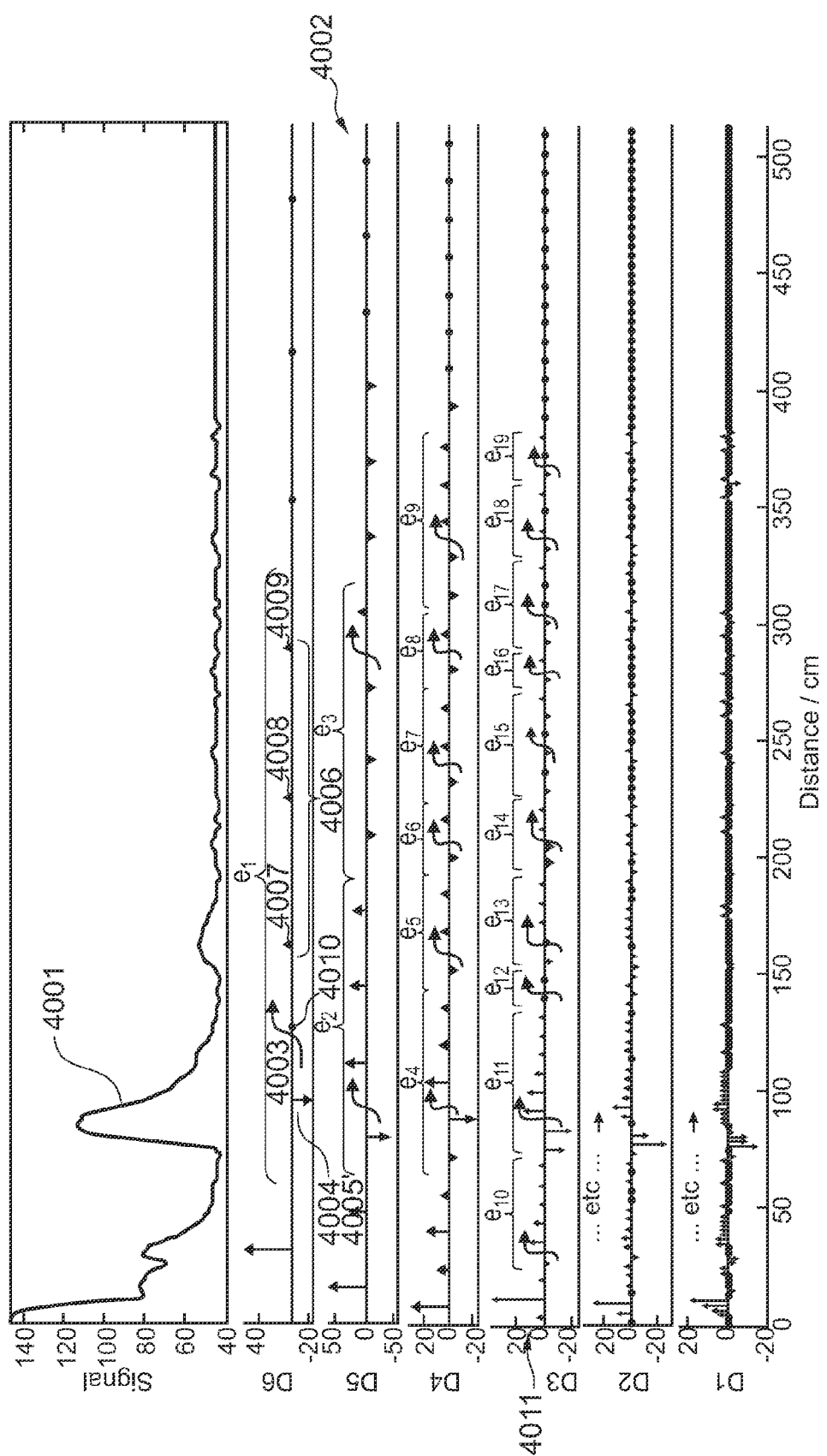
FIG. 40 shows detail signals of an echo function with determined echo regions.

FIG. 40 shows detail signals of an echo function with echo regions that have been determined. FIG. 40 further shows a coefficient field 4002 that has been generated with an arrangement according to FIG. 38. From the decomposition of the function 4001, for example by means of a wavelet transformation or a filter bank, the six detail signals 4011, D1, D2, D3, D4, D5 and D6 have resulted.

Figure 62:
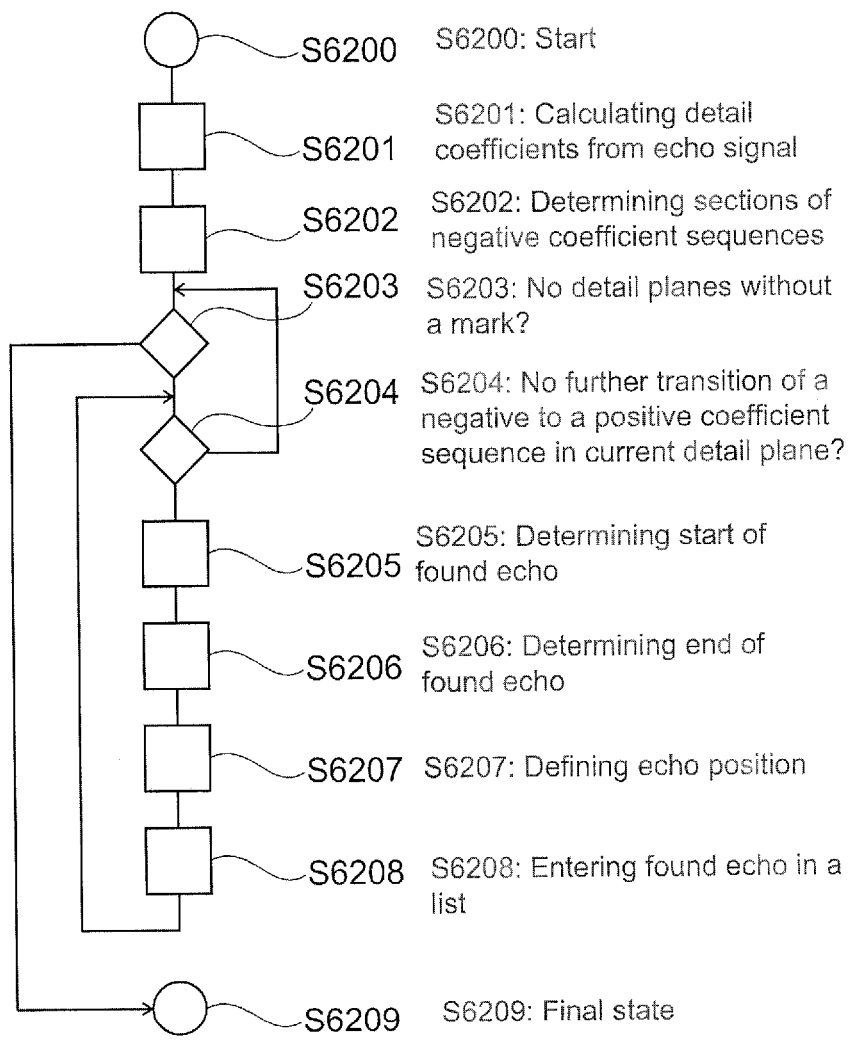
FIG. 62 shows a method for the extraction of echo data from a coefficient field that has been generated by means of a filter bank.

FIG. 62 shows a method for extracting echo data from a coefficient field 4002. The method commences at the starting point S6200. First, in step S6201, the detail coefficients 4002 of the coefficient field are calculated from the echo signal 4001. The coefficient field 4002 may be generated with the use of a Gauss filter according to FIG. 38. However, it may also be possible to generate the coefficient field with methods of the wavelet transformation or with the use of other filter arrangements.

Thereafter, in step S6202, in relation to each of the detail signals D1, D2, D3, D4, D5, D6 that have been determined, the determination of sections of negative coefficient sequences takes place.

The values of the negative coefficient sequences that have been identified are added up.

Thereafter, in relation to each of the detail planes that have been determined, determination of sections of positive coefficient sequences takes place. Determining sections of positive and negative coefficient sequences takes place along the abscissa of the scale.

The values of the identified positive coefficient sequences are added up.

For the purpose of extracting echoes, subsequently in step S6203 the highest-value detail plane is determined that has not yet been marked with a processing mark or a flag. The detail plane found is defined as the current detail signal. Additionally, the detail plane is marked with a processing mark.

If in step S6203 no further detail planes without a processing mark are detected, then the method ends after transition to the final state S6209.

In step S6204, in the current detail signal a search is carried out for a transition of a negative to a positive coefficient sequence. For example, in FIG. 40 the transition 4003 is determined. The found transition 4003 represents an echo, in particular a region of an echo or a region of an echo position, with the width of the associated negative coefficient sequence 4005 that comprises the coefficient 4004, and with the width of the associated positive coefficient sequence 4006 that comprises the positive coefficients 4007, 4008, 4009.

Between the transition of a negative coefficient sequence 4005 to a positive coefficient sequence 4006 any number of zero-coefficients may be present. Zero-coefficients that are situated between the negative and the positive coefficient sequence are ignored in the analysis of a transition.

If in step S6204 in the current detail plane no further transition of a negative to a positive coefficient sequence is found, then a transition to step S6203 takes place. Otherwise the coefficients of the negative and positive coefficient sequences involved in a transition are defined as a current coefficient sequence. In the diagram of FIG. 40 it is precisely the coefficients 4004, 4007, 4008, 4009 that define the current coefficient sequence.

Depending on the approach for determining the detail coefficients in step S6201, in particular depending on the methods applied to generate the detail coefficients, identification of echo regions may also be possible by a search for transitions from positive to negative coefficient sequences. The presently described method for finding an echo may be modified in a suitable manner.

In a found position of an echo or of an echo region e1, e2, e3, e4, e5, e6, e7, e8, e9, e10, e11, e12, e13, e14, e15, e16, e17, e18, e19 there is often a lack of definition in relation to the position of the echo.

Generally speaking, the term echo region also refers to an echo position, wherein an echo position is an infinitely narrow echo region. Furthermore, the echo position may be determined by means of the selection of the position of a characteristic feature within the echo region, and in particular by means of the selection of the position of a coefficient that forms part of the characteristic feature.

In step S6205 determination of the start of the found echo takes place by unsharp definition. The start region of the echo is just determined by the region of influence of the first coefficient of the current coefficient sequence. In the example of FIG. 40 the region of influence of the coefficient 4004 defines the start region of the analysed echo.

In step S6206 determination of the end of the found echo takes place by unsharp definition. The end region of the echo is just determined by the region of influence of the last coefficient of the current coefficient sequence. In the example of FIG. 40 the region of influence of the coefficient 4009 defines the end region of the analysed echo.

In step S6207 the echo position is defined at the location in the middle between the last negative coefficient of the current coefficient sequence and the successor of said coefficient. In the example of FIG. 40 the echo position is defined at the location 4010 between the coefficients 4004 and 4007.

In step S6208 entry of the found echo in a list takes place. In the list either the echo position 4010 and/or the echo region e1, e2, e3, e4, e5, e6, e7, e8, e9, e10, e11, e12, e13, e14, e15, e16, e17, e18, e19 are/is provided. Moreover, further characteristic values of an echo can be entered in the list. Subsequently the coefficients of the current coefficient sequence are zeroed, and a transition to step S6204 takes place.

As a result of gradual entry in the list, a multiple echo list can be found that comprises a plurality of echoes.

FIG. 40 shows the echo regions e1, e2, e3, e4, e5, e6, e7, e8, e9, e10, e11, e12, e13, e14, e15, e16, e17, e18, e19 that have been determined from iterative implementation of the method up to the detail plane D3. FIG. 40 shows the detail signals D1, D2, D3, D4, D5 and D6. The detail signals shown in FIG. 40 correspond to the detail coefficients $\{cD_i\}$ that are generated by means of the filter bank 3800.

If in step S6203 no detail plane without a processing mark can be detected, then in the final state S6213 the echo search is terminated, and a multiple echo list is provided. It may, however, also be possible to end the echo search in a detail plane situated higher up, or even to end the search during analysis of the coefficients of a detail signal.

The provision of the echoes can take place in various ways. For example, if the echo-processing unit, for example the echo evaluation device 604, expects a fixed definition of the start and the end of the echo, i.e. no unsharp definition of a start region and of an end region, then the middle of the respective tolerance region, start region or end region can be issued as a fixed start position or end position of the echo.

If for further signal processing the heights of the ascending or descending edges of an echo are required, then these values are obtained on the basis of the cumulative values of the negative or of the positive coefficient sequences from step S6204. The value of the original signal 4001 at the determined position is used as an echo amplitude.

If a multiple echo list is present, subsequent treatment of the echo data or of the echo list can take place. Such subsequent treatment can comprise the step of eliminating redundant echoes, and the step of analysing relationship correlations between the echoes.

In a method for eliminating redundant echoes, first there is a check whether the information relating to the echo start and to the echo end is contained in the multiple echo list only as a result of an unsharp definition of an echo start region and of an echo end region. If this is the case, in relation to each of the echoes of the multiple echo list a precise value relating to the echo start, which results from the position of the shortest possible distance within the echo start region, and a precise value relating to the echo end, which results from the position of the largest possible distance within the echo end region, is defined.

Subsequently, in the elimination of redundant echoes, the first echo of the provided echo list is selected as a comparison echo. A number N of echoes is determined, which echoes were found in the next-lower detail plane, i.e. in the detail signal of the next-lower decomposition stage, whose location is in the region between the start and the end of the comparison echo.

If the number N does not equal 1, in other words if the current comparison echo in the next-lower detail plane disintegrates into several echoes or is no longer present at all, then the current comparison echo is not redundant and cannot be removed from the echo list.

Otherwise the comparison echo is deleted, since the information of the echo is fully represented by the echo of the next-lower detail plane at increased local resolution. Additionally, in the echo list, information is added to the echo whose location is in the region between the start and the end of the deleted comparison echo, with the information denoting that the echo can also be found in the detail plane with which the deleted comparison echo was associated. To subsequent algorithms it may thus appear as if the echo can also be found in the detail plane of the comparison echo.

Subsequently a transition to the next echo of the echo list takes place, which echo is selected as the comparison echo. If the end of the echo list has not yet been reached, the method is repeated.

In an alternative embodiment of a method to eliminate redundant echoes, first a relationship correlation or a causal dependence between the various echoes of the multiple echo list is analysed. In the resulting relationship graph the redundant echoes are characterised precisely in that they comprise only a single child echo. The elimination of redundant echoes can therefore also be carried out on the basis of the relationship graph of the redundant multiple echo list.

Figure 42:
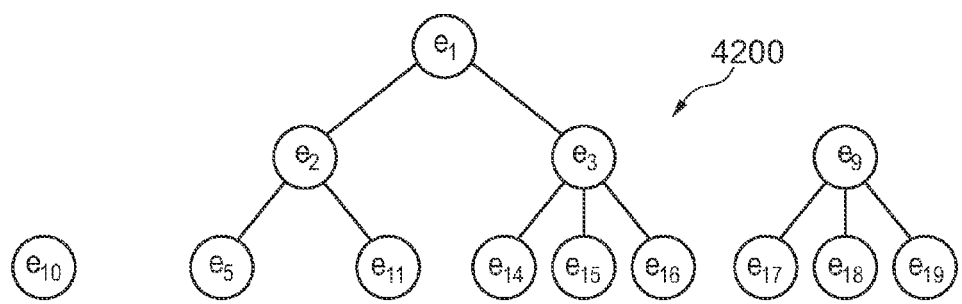
FIG. 42 shows a relationship graph of the determined echoes in FIG. 41.

A child echo or a children echo of an echo ei is a descendant which in a relationship graph according to the diagram of FIG. 42 is positioned precisely one stage below the echo ei. A parent echo of an echo ei is an echo that is positioned precisely one stage above the echo ei.

In FIG. 40, for example, the echo e4 is recognised as a redundancy echo. The echo e11, which has been found in the detail plane D3 located directly underneath, describes the same information as does the echo e4. As it were, the echo e4 covers the echo e11, and the echo e4 is removed from the list.

FIG. 41 shows a multiple echo list 4100 and a multiple echo list 4101 from which redundancies have been removed. The multiple echo list is obtained directly from the coefficient field 4002 by the finding of transition regions 4003. FIG. 41 shows a section of the multiple echo list 4100, which has been extracted according to the method of FIG. 40, and the resulting redundancy-free multiple echo list 4101. It should be pointed out that additional information about the detail plane, in which information the respective echoes can be found, has been added to the echoes ell, e14, e15, e16. The list 4100, 4101 comprises the echo ID and the detail plane, and furthermore the start region, determined by the minimum start value and the maximum start value, which, however, according to the definition are no longer to be added to the start region of an echo. The echo ID is a consecutive number of the found echoes. Furthermore, the list comprises the location of the echo and the end region, determined by the minimum final value and the maximum final value, which according to the definition are no longer to be added to the end region of an echo.

For subsequent treatment it is furthermore possible to analyse a relationship correlation or a causal dependence between the various echoes of the multiple echo list.

Figure 63:
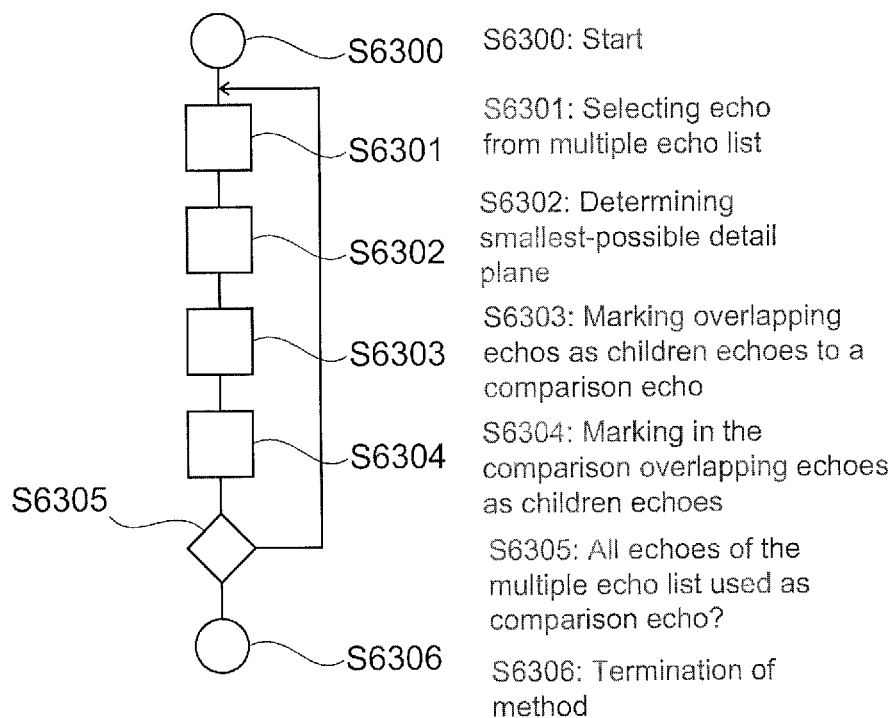
FIG. 63 shows a method for determining relationship relations between echoes of a multiple echo list.

FIG. 63 shows a method for determining relationship correlations amongst echoes of a multiple echo list. The method commences at the start point S6300.

In step S6301 an echo is selected from the available multiple echo list, which echo in the context of the method has not yet been used as a comparison echo. The echo is defined to become the current comparison echo.

In step S6302 first the smallest-possible detail plane of the comparison echo is determined from the echo list. The smallest-possible detail plane is the plane with the highest degree of detail, in which plane the echo can be found. Subsequently the ID's or echo ID's of those other echoes of the echo list are determined, which ID's or echo ID's can be found in the next-lower detail plane. The echoes of the determined ID's or echo ID's of the next-lower detail plane are iteratively checked as to whether their location or their echo position is in the region between the start and the end of the comparison echo. In the case of an unsharp definition, a check is made as to whether the echo position is located between the smallest-possible location within the echo start region and the largest-possible location within the echo end region of the comparison echo. If the echo position is located in the echo region of the comparison echo, then the respective echo is indicated with the determined ID or echo ID.

In other words this means that first, in a detail plane, an echo is found, and the start position and the end position of the found echo is determined. Thereafter there is a jump to a lower detail plane, and all the echoes are indicated whose location or position is situated in the low detail plane, i.e. in the detail plane with the higher degree of detail, in the region between the start position and end position of the comparison echo. For the purpose of indexing, the echoes are marked with an index. Those echoes are determined whose location is situated in the region between the start and the end of the comparison echo.

Subsequently those echoes of the next-lower detail plane are indexed which in any form or shape overlap with the region between the start position and the end position of the echo of the detail plane situated above.

In step S6303, in the overlapping echoes of the next-lower detail plane, which echoes are indexed, supplementation or marking is carried out in order to mark these echoes as children echoes to the comparison echo, to the parent echo or to the predecessor echo. Subsequently indexing is reversed.

In step S6304, in the comparison echo, the ID's or echo ID's of the found overlapping echoes of the plane situated below are marked to the effect that they are children echoes of the comparison echo.

In step S6305 a check is made whether all the echoes of the multiple echo list in the context of implementing the method have already been used as comparison echoes. If this is not the case then the transition to step S6301 takes place. Otherwise a transition to step S6304 takes place.

In step S6304 the method for determining relationship correlations is terminated.

After completion of the analysis of the relationship correlations, the logic correlation between all the found echoes is unequivocally established and can be displayed in the form of a relationship graph.

FIG. 42 shows a graph that represents a relationship graph 4200 between the various found echoes. The echoes, which in FIG. 42 are shown as a relationship graph, are the echoes e1, e2, e3, e5, e9, e10, e11, e14, e15, e16, e17, e18 and e19 from FIG. 41.

As shown in FIG. 42, for example, the echo e4 is not included, since it is, for example, represented by the echo e11 of the detail plane situated underneath.

Echo e1 is, for example, the parent echo of echo e2 and e3. Echo e2 is a child echo or children echo of the echo e1. The graph 4200 of FIG. 42 shows that between the echoes e1 and e2 a relationship correlation exists, as does also between e1 and e3, but not between e1 and e10.

Furthermore, by means of the relationship correlation the ancestors of an echo ei can be defined. The ancestors of an echo ei result from the quantity of echoes that in the relationship graph according to the diagram of FIG. 42 are situated above the analysed echoes ei. Thus, the ancestors of the echo e15 are precisely formed by the quantity e3, e1.

Furthermore, defining the descendants of an echo is possible. The descendants of an echo ei result from the quantity of echoes that in the relationship graph according to the diagram of FIG. 42 are situated below the analysed echo ei. Thus, the descendants of the echo e1 are defined by the quantity e2, e5, e11, e3, e14, e15, e16.

Figure 43:
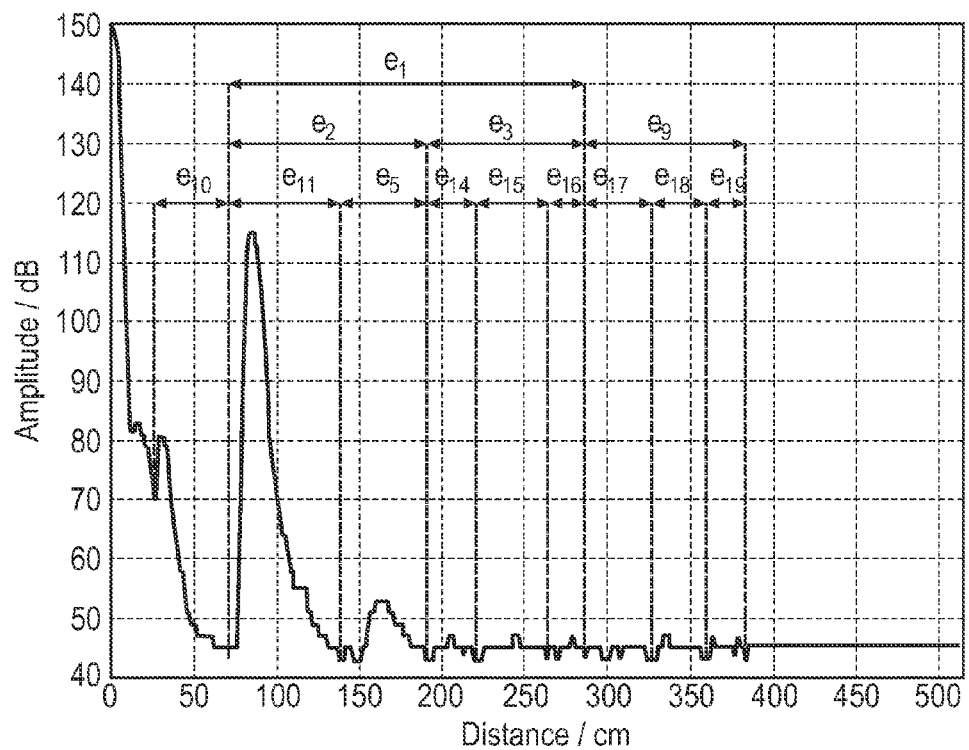
FIG. 43 shows a diagram of an echo function wherein echo regions are marked.

FIG. 43 shows an echo function with the echo regions also shown. FIG. 43 shows the result of a scale-based echo extraction from the example of FIG. 40, FIG. 41 and FIG. 42. FIG. 43 shows that a plurality of mutually covering echoes are produced. At this point the method for scale-based echo extraction can be terminated with the hand-over of the generated multiple echo list and of the associated relationship correlations, provided the echo-processing algorithm, which is to be applied subsequently, for example the echo evaluation device 604, can reliably handle even ambiguous echo lists.

However, if the subsequent algorithm expects an unambiguous echo list, then the scale-based echo extraction has to be expanded by a suitable selection routine. A suitable method would, for example, be a method which from the plurality of echoes in the echo list declares relevant echoes with reference to predefined criteria. Predefined criteria could, in turn, be the extent of the amplitude or the height of the front edge.

Relevant echoes, actual echoes or real echoes may be those echoes of an echo list, which echoes with the highest probability correspond to a reflector area 302, 306, 309 that actually exists in a container 110. Echoes of an echo list or current echoes may be interpretations of an echo extraction method in relation to the position of echoes, which interpretations are based on an analysis of a received echo function. Reflectors may be those positions in a container that reflect a signal.

Subsequently the selection routine, by means of evaluating the associated relationship correlations, would iteratively delete all the echoes situated above and below. In other words, all the ancestors and all the descendants of an echo have to be removed from the echo list. For example, if in FIG. 43 the large echo e2 between the start position at 0.80 m and the end position at 1.80 m is selected, then for causal reasons the echo e1 situated above, and the echoes e5 and e11 situated below, would have to be immediately deleted from the echo list.

Based on an echo extraction algorithm according to any functional principle, which algorithm at its output produces several echoes that causally influence each other, for example in the form of a multiple echo list, relevant echoes are to be reliably selected.

On the basis of a single echo function, for example the echo function 500 from FIG. 5, it is not possible, without further knowledge or without further additional knowledge, to find out which humps that are contained in the curve progression represent a relevant echo. For example, the echo between 2.20 m and 2.70 m in FIG. 5 could be identified as a relevant echo.

On the other hand, taking into account the history of the echo function, a conclusion might be drawn that these are two converging echoes, because there are two humps 503 and 504. Accordingly, two echoes would have to be identified. Consequently, an echo function 500 allows several sensible physical interpretations of the progression of the echo function 500, from which interpretations the relevant physical interpretation is to be found.

In order to find out the relevant physical interpretation, an echo extraction method with the ability of determining a multiple echo list may be helpful. Processing a multiple echo list requires an algorithm for selecting relevant echoes from the multiple echo list.

A possible implementation of an algorithm for selecting relevant echoes from multiple echo lists identifies echoes with the use of previously obtained history information. The history information may include past gradients of the echo function 500. The process of observing history information and a method for analysing echoes in echo functions is referred to as tracking.

Figure 44:
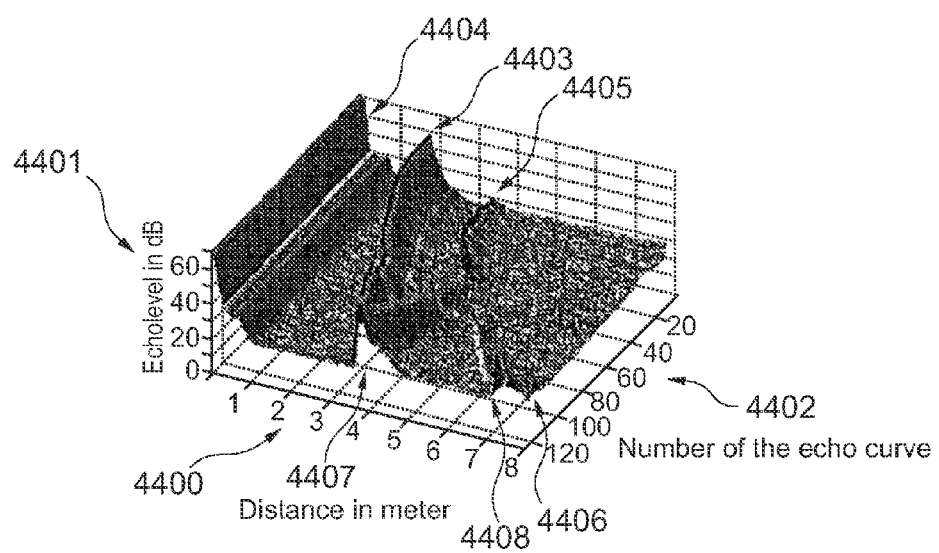
FIG. 44 shows a chronological progression of an echo function.

FIG. 44 shows the progression over time of an echo function. In FIG. 44 the local component of an echo function is shown on the abscissa 4400, which is also the case, for example, in FIG. 5. Also as is the case in FIG. 5, on the ordinate the amplitude 4401 is shown. Furthermore, in FIG. 44 the time 4402 or the time axis 4402 is shown. Showing the time as a dimension makes it possible to show past echo functions.

In the present case the time axis 4402 shows the number of echo curves that relate to a progression over time. In this presentation the highest number of the echo function corresponds to the most recent, and in particular to the current, echo function. The highest distance value corresponds to the location that is furthest removed from the field device or sensor 101, while the largest value on the amplitude axis 4401 corresponds to the largest amplitude value of the echo function.

Due to the recording of the echo functions over time it is possible, for example, to detect a travelling echo 4403. The echo 4403 travels from oldest values in a small distance region to a large distance region in more recent echo functions. In addition, antenna ringing 4404 is evident as being constant over time 4402. Furthermore, an echo whose amplitude is lower is shown as the echo 4403. Said echo is an echo 4405 which has also traveled from low distance values to higher distance values.

With each current measured value recording, in other words with each current echo function or current echo curve 4406, an assignment of the currently found echoes 4407, 4408 to the hitherto found tracks 4403, 4405 takes place. In order to find an optimal assignment of the current echoes to tracks, the Munkres algorithm can be used.

The calculation of a cost matrix for the assignment of an echo to a particular track serves as the starting point in the assignment of echoes to tracks. If echo 4407, 4408 and track 4403, 4405 match well, then little in the way of expenditure arises in the assignment. If the echo and the track match, they comprise similar amplitudes, similar widths or similar distance values.

If the echo and the track do not match, then the assignment causes very considerable costs. The measure of costs can be calculated combinatorially in relation to each possible assignment of an echo to a track, and can be displayed or visualized in the form of a cost matrix.

On the basis of a cost matrix the Munkres algorithm calculates an essentially optimal assignment of the echoes that are present to the tracks that are present, wherein the costs have been globally minimised. A single echo list, in which all the echoes contained are causally independent is a prerequisite for the above. In other words, in a single echo list there are no relationship correlations whatsoever among the echoes.

A modification of the Munkres method can be the subject of the method of multiple selection, in other words of the selection of suitable echoes from the multiple echo list. The Munkres algorithm is adapted so that it is able to generate assignment proposals also from multiple echo lists with a relationship correlation.

Figure 45:
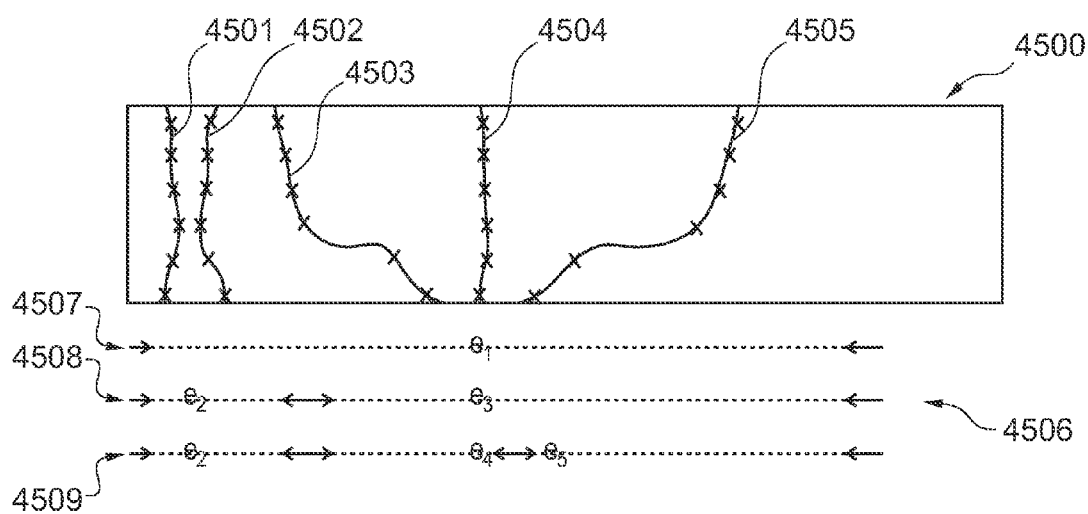
FIG. 45 shows an example for continuing of chronological progressions of an echo function with found echoes.

FIG. 45 shows an example of the continuation of progressions over time of an echo function with found current echoes e1, e2, e3, e3, e4, e5. The history region 4500 contains five tracks 4501, 4502, 4503, 4504, 4505. Moreover, an echo region 4506 is shown in which the current echoes, which can be found in various detail stages 4507, 4508 and 4509, are shown. The highest detail stage 4507 only comprises the echo e1; the middle detail stage 4508 comprises the echoes e2 and e3; and the lowermost detail stage 4509 comprises the echoes e2, e4 and e5.

The echoes e1, e2, e3, e4, e5 are to be assigned to the history gradients 4501, 4502, 4503, 4504, 4505 so that the lowest-possible costs are incurred. The echoes e1, e2, e3, e4, e5 are contained in a multiple echo list and comprise causal relationships. In other words, the five currently found echoes e1, e2, e3, e4, e5 from a multiple echo list, taking into account the causal relationships, are to continue the already found tracks 4501, 4502, 4503, 4504, 4505.

If an assignment of one of the tracks 4501, 4502, 4503, 4504, 4505 to the echo e1 were to be implemented, then due to the existing relationship correlations the echoes e2, e3, e4, e5 would have to be deleted, because e1 covers the echoes e2, e3, e4, e5. Consequently, it would not be possible to continue the remaining tracks. In the sense of globally viewed cost minimisation, an unsatisfactory result would thus arise. Therefore, in the assignment of the echoes to a multiple echo list, taking into account the causal relationships, such assignment is to be calculated with minimisation of the global costs. In this assignment various physical interpretations of the echo function are evaluated.

For the purpose of assignment a method could be used which first prepares a cost matrix that takes into account the costs of continuing the existing tracks with the various echoes of the multiple echo list. Thereafter the relationship graph relating to the multiple echo list could be determined, and by calling up a modified Munkres algorithm an assignment with minimal cost could be found.

Ancestors in a relationship graph 4200 are defined by the quantity of all the iteratively determined parent echoes of an echo, as well as of their parent echoes. For example, in FIG. 45 e1 and e3 are ancestors of e4.

Moreover, the term descendants refers to the quantity of all the iteratively determined children of an echo as well as their children echoes. Accordingly, in FIG. 45 the echoes e3, e4 and e5 are descendants of e1.

On the basis of the multiple echo list the modified Munkres method calculates a valid selection by assigning found echoes to existing tracks. The existence of a track history 4500 is a prerequisite for applying the selection.

The method can also be terminated if the resulting total costs exceed a predefined threshold. As a result of such a termination criterion it is possible, for example, to ensure that, if an echo that has been tracked so far disappears, the selection of the echoes does not necessarily generate a successor, and consequently the remaining echoes can be continued without any interference.

Figure 46:
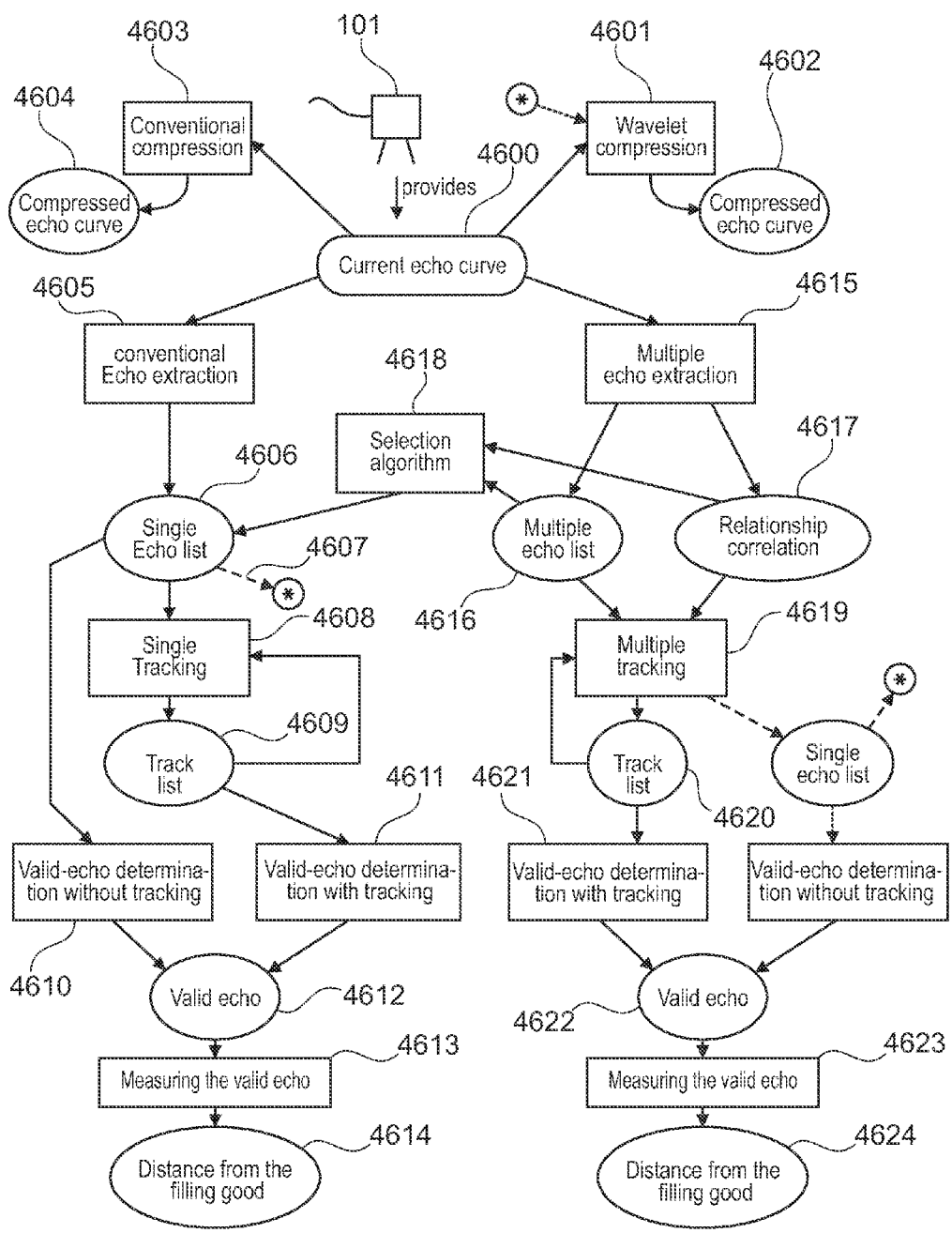
FIG. 46 shows a method for fill level measuring.

FIG. 46 shows a method for fill level measuring. The sensor 101 provides a current echo curve 4600 from a reading. Various processing and analysis operations can be carried out with this echo curve.

On the one hand the current echo curve 4600 can be forwarded to the wavelet compression device 4601, which generates a compressed echo curve 4602 by means of wavelet compression.

On the other hand the current echo curve 4600 can be forwarded to the compression device 4603, which compression device 4603 generates the compressed echo curve 4604. By way of the function block 4605, which describes an echo extraction method for generating a single echo list, the single echo list 4606 can be generated. A threshold value method in which the echo curve or echo function has been smoothed by means of wavelet transformation may be one example of an echo extraction which generates a single echo list.

Based on a single echo list 4606 there is the possibility, as indicated by the dashed line 4607, by means of the wavelet compression device 4601 to generate a compressed echo function or echo curve. As shown in the function block 4608, a simple tracking method can be applied to a single echo list in order to generate a track list 4609, in other words a list that comprises tracks or history information.

Based on the single echo list 4606, by way of the function block 4610 echo determination or valid-echo determination can take place without evaluation of track information.

Generating the track list can lead to step 4611 in which valid-echo determination takes place in conjunction with the track information. Both valid-echo determination without track information 4610 and valid-echo determination with track information 4611 lead to the valid echo 4612. Valid-echo determination takes place, for example, in the echo evaluation device 606.

After valid-echo determination, in other words after determination of the position of the echo, measuring of the valid echo can take place in step 4613, and in this way the distance to the feed material 4614 can be determined. Determining the distance to the feed material 4614 takes place in the echo-position determination device 608.

Based on the current echo curve 4600, multiple echo extraction 4615 by means of determining a multiple echo list 4616 can also take place. Parallel to determining the multiple echo list 4616 the relationship correlation 4617 of the individual echoes among themselves can be determined. Determining a relationship correlation can produce a relationship graph, for example the relationship graph 4200.

The information of the multiple echo list 4616 and of the relationship correlation 4617 can be converted to a single echo list 4606 by means of the function block of the selection algorithm 4618 with the application of a selection algorithm. However, it is also possible, by means of multiple tracking 4619, to generate a track list 4620, in particular by means of parallel evaluation of the multiple echo list 4616 and of the relationship correlation 4617.

The track list or track information that has been generated in step 4620 can in turn be applied, with the use of a correspondingly adapted echo evaluation device 606, to determine a valid echo by means of track information 4621.

From this determination the valid echo 4622 is obtained, which again, in a suitably adapted echo-position determination device 608, can be applied to measure the valid echo, as shown in step 4623. This is followed by outputting the distance to the feed material 4624.

Figure 47:
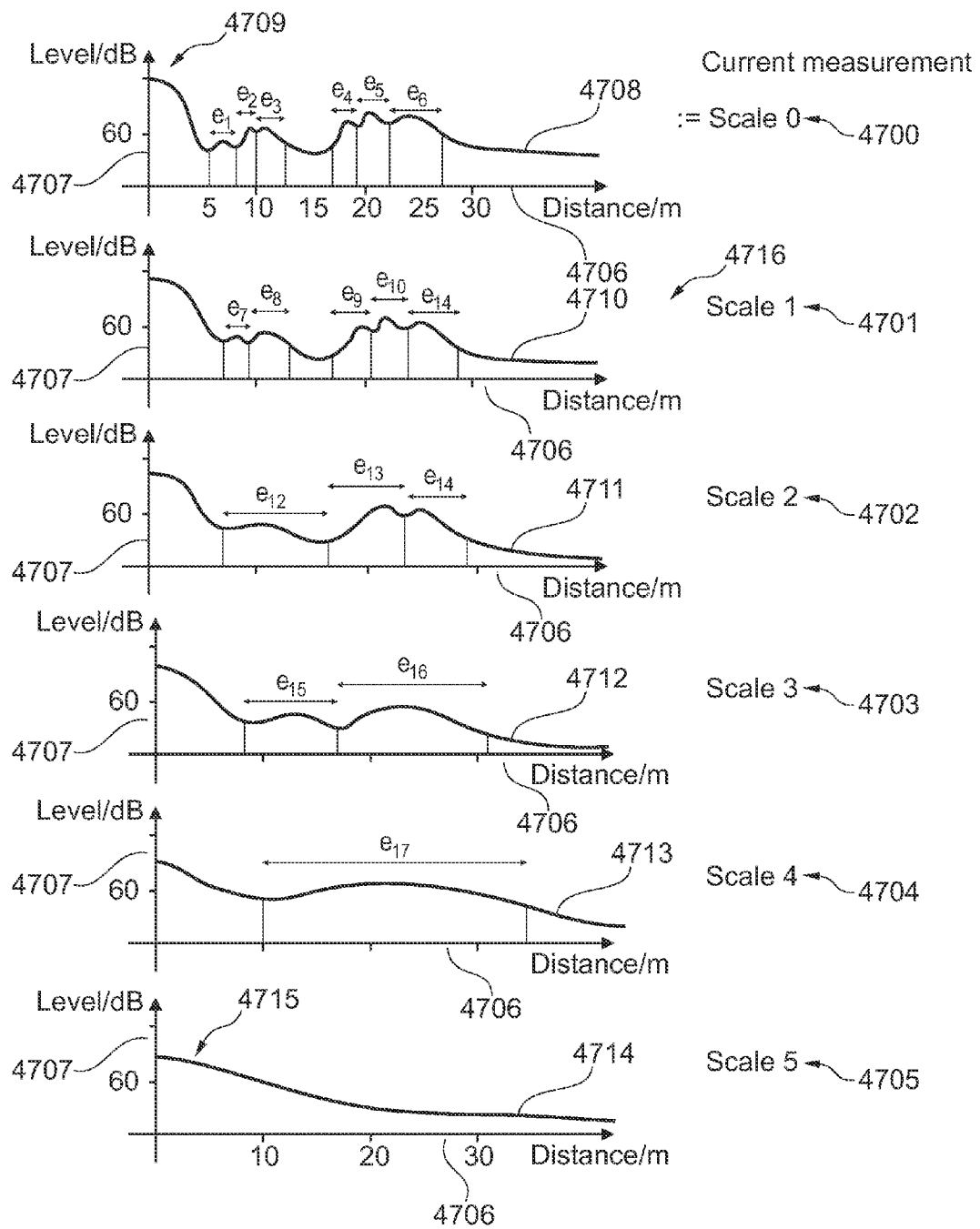
FIG. 47 shows an echo function that is decomposed into scales with found echoes.

FIG. 47 shows an echo function with found echoes, wherein the echo function 4700, as well as its approximation, is shown in various scalings. FIG. 47 shows the scale 0 4700 with the associated echo function 4708, the scale 1 4701 with the associated approximation function 4710, the scale 2 4702 with the associated approximation function 4711, the scale 3 4703 with the associated approximation function 4712, the scale 4 4704 with the associated approximation function 4713 and the scale 5 4705 with the associated approximation function 4714. FIG. 47 thus shows six function progressions 4700, 4701, 4702, 4703, 4704 and 4705 of an echo function in different scalings. The function 4700, which is shown in the upper region of the diagram of FIG. 47, comprises the highest depth of detail.

Each of the functions 4708, 4710, 4711, 4712, 4713, 4714 is entered in a coordinate system which on the abscissa 4706 shows the distance in metres, while on the ordinate 4707 it shows the level in decibels. In the function progression of the echo function 4708 the increase in the level 4709, which increase is caused by antenna ringing, is evident at the start of each one of the distance scales 4706. For the sake of better orientability, the distance values 10 m, 20 m and 30 m are marked on the distance scale 4706.

The approximations of the echo function 4700 in the various scalings 4701, 4702, 4703, 4704, 4705 can be determined, for example, by applying an analog or digital filter bank 3501. In particular, the frequency characteristics of the low-pass filters that are used may correspond to the progression of a Gauss-function.

From the echo function 4708 and its approximations in the different scales it is possible to extract echo information. For example, by applying a filter bank 3506 a coefficient field may be generated that can be further analysed with a method for finding echoes according to FIG. 62. The echoes that have been extracted in the various detail planes can be displayed directly in the representation of the associated functions.

In the echo function 4708 the echoes e1, e2, e3, e4, e5 and e6 are entered and marked. The coordinate systems are the same in respect of all the echo functions.

The approximation function 4710 of the first scale shows a changed form in the progression when compared to the progression of the echo function 4708. In the approximation function 4710 of the first scale 4701 the echoes e7, e8, e9, e10, e11 are shown.

In the second scale the approximation function 4711 is shown. This function shows a smoothed progression when compared to the echo function 4708 of scale 0. In the function progression of the approximation function 4711 of the second scale the echoes e12, e13 and e14 can still be identified, however in comparison to the echoes of the scale 0 they comprise a considerably wider width.

Furthermore, scale 3 4703 shows the approximation function 4712 of the third scale, in which the echoes e15 and e16 can be identified. Generally speaking, the echo that is caused by antenna ringing and that is the first echo in each of the representations 4708, 4710, 4711, 4712, 4713 and 4714 is not identified as an independent echo that is to be analysed.

Moreover, in the scale 4 4704 the echo function 4713 is shown in which only that echo e11 still remains to be identified whose width is, however, larger when compared to the widths of the echoes of the approximations of low scale numbers 4708, 4710, 4711, 4712.

The approximation function 4714 of the scale 5 4705 comprises a flattened progression. With the exception of an increase in the level 4715, which increase is due to antenna ringing, no further maximum is to be identified.

Below, the method of multiple echo extraction is to be clarified, wherein implementation of the multiple echo extraction is carried out by a scale-based echo extraction according to FIG. 62.

In the functions of the representations 4708, 4710, 4711, 4712, 4713 and 4714 first all the echoes e1, e2, e3, e4, e5, e6, e7, e8, e9, e10, e11, e12, e13, e14, e15, e16, e17 are identified. For example, the echoes are identified by means of an analysis of the coefficient field 4002, which comprises the coefficients of the detail signals that are associated with the signal progressions 4708, 4710, 4711, 4712, 4713, 4714. It may also be possible to use the filter bank 3800 to form the detail coefficients.

In FIG. 47 the following echo table Tab1 results.

TABLE 1

| ID | Start in m | Position/ location of the echo in m | End in m | Amplitude in dB | Front edge height in dB | Scale of the detail signal in which the echo was found |
|---|---|---|---|---|---|---|
| e1 | 6 | 6.8 | 7.6 | 58 | 12 | From scale 1 |
| e2 | 7.6 | 8 | 10 | 65 | 22 | |
| e3 | 10 | 10.5 | 12.5 | 65 | 3 | |
| e4 | 17 | 18 | 19 | 75 | 35 | |
| e5 | 19.1 | 20 | 22.5 | 82 | 21 | |
| e6 | 22.6 | 24 | 27.5 | 80 | 6 | |
| e7 | 6.7 | 7 | 7.6 | 52 | 6 | From scale 2 |
| e8 | 7.6 | 10.5 | 12.5 | 64 | 18 | |
| e9 | 16 | 18.5 | 19 | 61 | 31 | |
| e10 | 19 | 20 | 22.5 | 65 | 16 | |
| e11 | 22.5 | 24.5 | 29 | 61 | 4 | |
| e12 | 6.7 | 10 | 16.5 | 45 | 11 | From scale 3 |
| e13 | 16.6 | 21 | 23 | 63 | 29 | |
| e14 | 23 | 24 | 29.5 | 59 | 3 | |
| e15 | 8 | 12.5 | 17 | 39 | 7 | From scale 4 |
| e16 | 17 | 23 | 31 | 57 | 24 | |
| e17 | 9 | 21 | 32 | 55 | 12 | From scale 5 |

As shown in the echo table, and in particular as shown in FIG. 47 in scale 5 4705, no further echoes can be found in the approximation signal 4715.

It should be pointed out that the echoes of a signal or of an approximation function of the scale i can only be identified in the detail coefficients of the detail signal of the scale i+1.

Expressed differently, numbering of the scales according to Tab1 differs from numbering of the scales of FIG. 47. The scales according to Tab1 designate the scales of the detail signals, while the scales 4700, 4701, 4702, 4703, 4704, 4705 as used in FIG. 47 relate to the echo function 4708 and to the approximation functions 4710, 4711, 4712, 4713, 4714. Such different numbering of the detail signals and approximation functions is, for example, also evident in FIG. 39.

The table Tab1 that has been obtained represents various physically possible interpretations of the signal progression 4708. In particular, in table Tab1 at least two echoes are processed in parallel, which echoes comprise a causal dependence. Table Tab1 therefore represents a multiple echo list.

A multiple echo list 4616 is a list which comprises the echoes that are characterised in that from a plurality of possible physical interpretations of a group of several local maxima they provide at least two concrete physically imaginable variants for further processing.

For example, table Tab1 provides the echo e12, which allows another physical interpretation of the echoes e1, e2, e3 of the signal of the scale 0 4700. While in an evaluation of the echoes e1, e2, e3 of the signal of the scale 0 4700 the physical interpretation of the maxima would result in three small local echoes, the approximation signal of the scale 2 4702, as a result of the interpretation of the echo e12 in this region, results in the physical interpretation according to which only one echo is present.

The prepared table Tab1 is subjected to subsequent treatment, and redundant echoes are removed. To this effect one of the methods for eliminating redundant echoes can be carried out. A redundant echo may be recognisable in a relationship graph in that only precisely one children echo exists in relation to a parent echo, wherein the parent echo is considered a redundant echo.

During implementation of the method for eliminating redundant echoes, an echo of a detail signal of the scale i is deleted precisely when it has originated from a single echo of the detail signal of the scale i−1.

During the check as to whether an echo of the scale i has originated from a single echo of the scale i−1, the region of the echo of the scale i is determined. Subsequently a check is made to determine the number of echoes of the scale i−1 which in relation to their position are situated in the region of the echo of the scale i. If the number of echoes of the scale i−1 in the region of the echo of the scale i is greater than one, no redundancies are defined.

In contrast to the above, if only a single echo of the scale i−1 in relation to its position in the region of the echo of the scale i is found, then said echo represents the entire information. Consequently, the echo of the scale i is redundant and can be removed. In other words, checking occurs as to whether several echo positions of a detail plane $D_{i-1}$ are situated within an echo region of an echo of a detail plane $D_i$, wherein the detail plane $D_{i-1}$ comprises a higher degree of detail than does the detail plane $D_i$.

As shown in FIG. 47, for example, the position of the echo e1 of the scale 0 4700 is in the region of the echo e7 of the scale 1 4701. Furthermore, the echo e1 is the only echo whose position in the scale 0 4700 is situated in the region of the echo e7 of the scale 1 4701. In other words, the position of the echo e1 is situated between the start and the end of the echo e7, and the echo e1 is the only echo of the scale 0, which echo is situated in the region between the start and the end of the echo e7. Therefore the echo e7 is redundant and can be removed. Consequently, the further redundant echoes and thus the lines of the echoes e7, e9, e10, e11, e14 and e15, too, can be deleted from the table Tab1. After deletion of the redundant echoes, the redundancy-free table Tab2 results.

TABLE 2

| ID | Start in m | Position/ location of the echo in m | End in m | Amplitude in dB | Front edge height in dB |
|---|---|---|---|---|---|
| e1 | 6 | 6.8 | 7.6 | 58 | 12 |
| e2 | 7.61 | 8 | 10 | 65 | 22 |
| e3 | 10.1 | 10.5 | 12.5 | 65 | 3 |
| e4 | 17 | 18 | 19 | 75 | 35 |
| e5 | 19.1 | 20 | 22.5 | 82 | 21 |

TABLE 2-continued

| ID | Start in m | Position/ location of the echo in m | End in m | Amplitude in dB | Front edge height in dB |
|---|---|---|---|---|---|
| e6 | 22.6 | 24 | 27.5 | 80 | 6 |
| e8 | 7.6 | 10.5 | 12.5 | 64 | 18 |
| e12 | 6.7 | 10 | 16.5 | 45 | 11 |
| e13 | 16.6 | 21 | 23 | 63 | 29 |
| e16 | 17 | 23 | 31 | 57 | 24 |
| e17 | 9 | 21 | 32 | 55 | 12 |

The table Tab2 consequently represents the redundancy-free variant of table Tab1.

In the next subsequent treatment the relationship correlation of the echoes of table Tab2 can be analysed. In this process an analysis is carried out as to whether an echo in the scale i comprises echoes of scales situated underneath it. The scale i comprises a lower degree of detail than do the lower scales H. In this process, for example, a method according to FIG. 63 may be applied.

Figure 48:
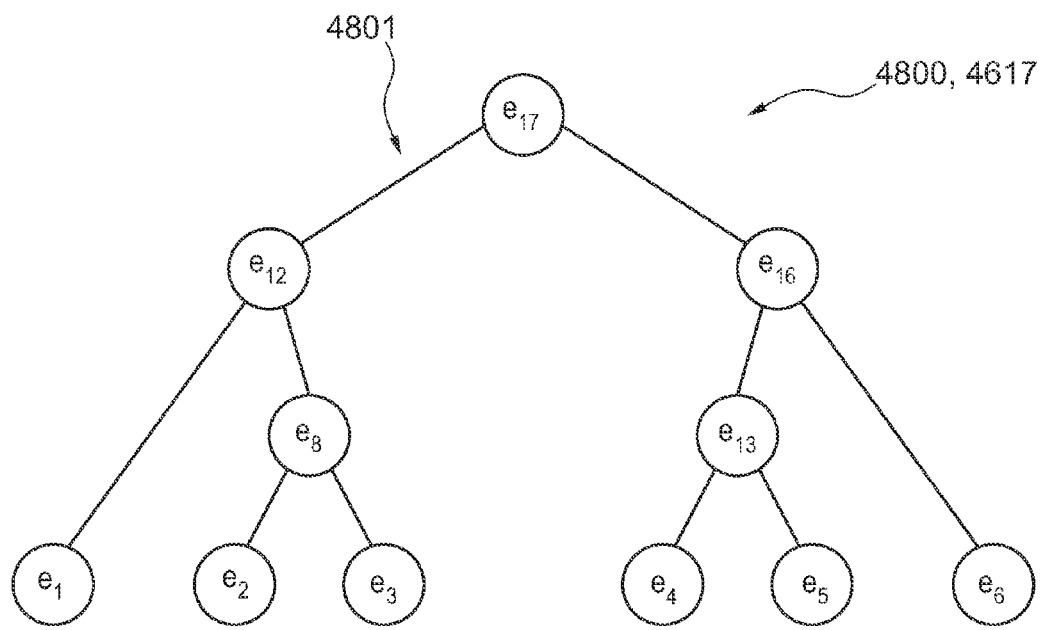
FIG. 48 shows a relationship graph of echoes of an echo function.

FIG. 48 shows a relationship graph 4800 of echoes of an echo function. The analysis of the relationship correlation or of the causal interdependence of the echoes among each other leads to a relationship graph 4800. The relationship graph 4800 comprises the echoes of the multiple echo list Tab2. The connections 4801 express a relationship correlation.

The relationship correlation leads to the expression wherein, for example, the echo e8 covers the echoes e2 and e3, or wherein the echo e2 is covered by the echo e8. According to another expression the echoes e2 and e3 are children or children echoes of e8, while the echo e8 is a parent echo of e2.

In this arrangement the relationship graph 4800 is hierarchically structured. The relationship graph 4800 comprises four planes. The echo e17 is situated on the uppermost plane, which represents the coarsest degree of detail. The echoes e12 and e16 are situated on a plane underneath it, which plane comprises a finer resolution or a finer degree of detail than does the plane 1. The echoes e8 and e13 are situated on the third plane, and, lastly, the echoes e1, e2, e3, e4, e5, e6 are situated on the fourth plane. In FIG. 48 the fourth plane is the lowermost plane, wherein the lowermost plane represents a fine local resolution or a fine degree of detail.

The multiple echo extraction can also be carried out by means of a wavelet echo extraction that comprises the steps of wavelet transformation of the echo signal or of the echo function in order to generate detail coefficients $\{cD_i\}$, and thereafter carries out identification of characteristic coefficient transitions, for example according to a method for extracting echo data from a coefficient field and for reduction of redundancies according to figures FIG. 41 and FIG. 62. The echoes are obtained from various wavelet scales, and an analysis of the relationship correlation of the multiple echo list that has arisen in this manner takes place, as described in FIG. 63.

Multiple echo extraction can also be carried out by means of a modified threshold value method.

Figure 49:
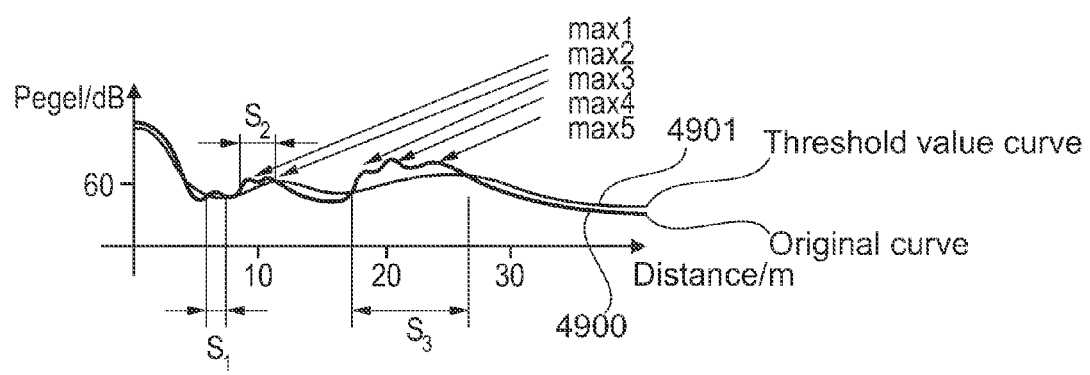
FIG. 49 shows an echo function with threshold value curve.

FIG. 49 shows an echo function 4900 with a threshold value curve 4901. FIG. 49 shows the original curve 4900 or echo function 4900. In addition, FIG. 49 shows the threshold value curve 4901. The threshold value curve results from the echo function. The threshold value curve 4901 or threshold value function 4901 shows a progression of a threshold by means of the diagram of the echo function 4900. This means that the threshold value curve does not indicate any increase in a value or any growth in a value, but instead shows the threshold above which a function value is evaluated as being an echo.

FIG. 49 shows the three search regions S1, S2, S3. In the region of the search regions or between the limits of the search regions the echo function is situated above the threshold value curve 4901. Furthermore, FIG. 49 shows the maxima, peaks or humps max1, max2, max3, max4, max5, which show local maxima between the limits of the intersections of the echo function 4900 with the threshold value curve 4901.

The limits of the search regions are determined by the intersections of the echo function 4900 with the threshold value curve 4901, at which intersections the gradient of the echo function 4900 has a different operational sign.

Figure 64:
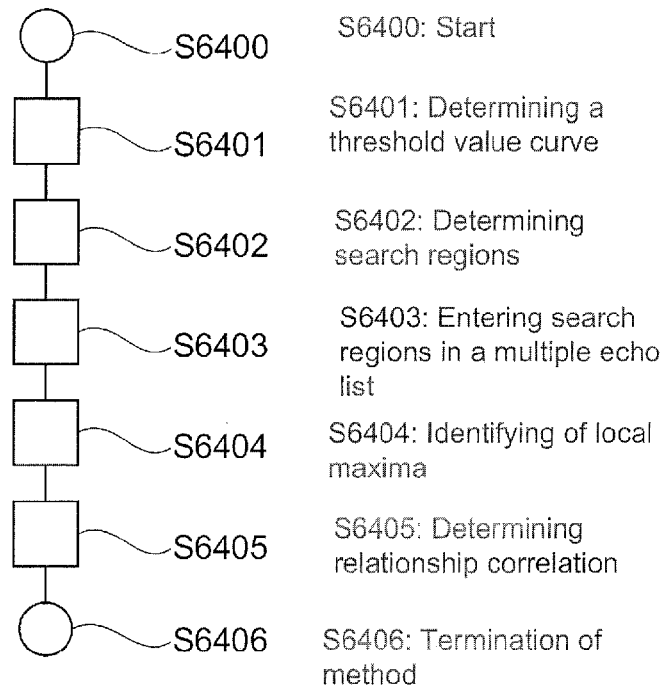
FIG. 64 shows a threshold value method for the generation of a multiple echo list.

FIG. 64 shows a modified threshold value method for generating a multiple echo list. The modified threshold value method commences in the start state S6400. In step S6401 a threshold value curve 4901 is determined by means of low-pass filtering or wavelet processing of the echo function 4901.

In step S6402 the search regions or echo regions S1, S2, S3 are determined by means of identification of the intersections of the threshold value curve 4901 with the original curve 4900 or echo function 4900.

In step S6403 the search regions S1, S2, S3 are entered in a multiple echo list.

In step S6404 identification of local maxima max1, max2, max3, max4, max5 within the search regions S1, S2, S3 takes place, and the local maxima are also incorporated in the multiple echo list, provided more than one maximum is found in the search region. The identified local maxima max1, max2, max3, max4, max5 within a search region S1, S2, S3 define the local echoes within the search region. If a single maximum is found in the search region, then the modified threshold value assumes that the associated echo has already been taken into account by an entry of the search region.

In step S6405 a relationship correlation is then determined such that the search regions are designated parent echoes, and the local maxima within the respective search region are designated children echoes that are associated with the corresponding search region, in particular with the parent echo.

In the final state S6406 the method is terminated as the multiple echo list is forwarded.

In relation to the function progression shown in FIG. 49, the following multiple echo list Tab3 thus results.

TABLE 3

| ID | Start in m | Location in m | End in m | Amplitude in dB | Front edge height in dB |
|---|---|---|---|---|---|
| S1 | 6 | 6.5 | 7.2 | 58 | 12 |
| S2 | 8 | 10 | 11.5 | 62 | 16 |
| S3 | 17.5 | 21 | 27 | 80 | 45 |
| max1 | 7.6 | 8 | 10 | 65 | 22 |
| max2 | 10 | 10.5 | 12.5 | 65 | 3 |
| max3 | 17 | 18 | 19 | 75 | 35 |
| max4 | 19 | 20 | 22.5 | 82 | 21 |
| max5 | 22.5 | 24 | 27.5 | 80 | 6 |

In an alternative embodiment of the method, in step S6404 it is also possible to incorporate in the multiple echo list those local maxima within a search region which represent the only maximum in the respective search region. As a result of this modification of the method, consequently a redundant multiple echo list arises, which needs to be reworked with corresponding methods, in particular with a method for eliminating redundant echoes.

Figure 50:
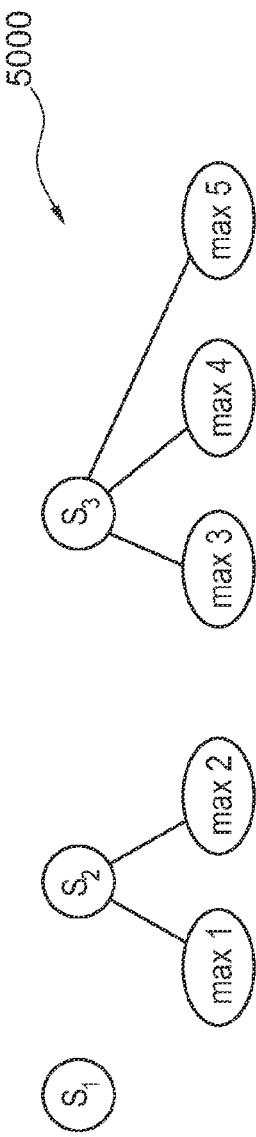
FIG. 50 shows a relationship graph that has been determined by a threshold value method.

In the example shown in FIG. 49 the relationship graph shown in FIG. 50 results. FIG. 50 shows a relationship graph that has been determined with the use of a threshold value method. FIG. 50 shows the relationship graph 5000, which on a first plane comprises the parent echoes, in particular the search regions S1, S2 and S3. As shown in the relationship graph 5000, the local maxima max1, max2 are children echoes to the search region S2, while the local maxima max3, max4, max5 are children echoes to the parent echo S3.

Based on a multiple echo list with relationship correlation, wherein the relationship correlation is either stored so as to be integrated in the multiple echo list, or is provided as a separate list, a selection algorithm can be carried out. By means of the selection algorithm 4618 a single echo list 4606 can be generated from a multiple echo list 4616 and from a relationship correlation 4617, 4800.

Figure 51:
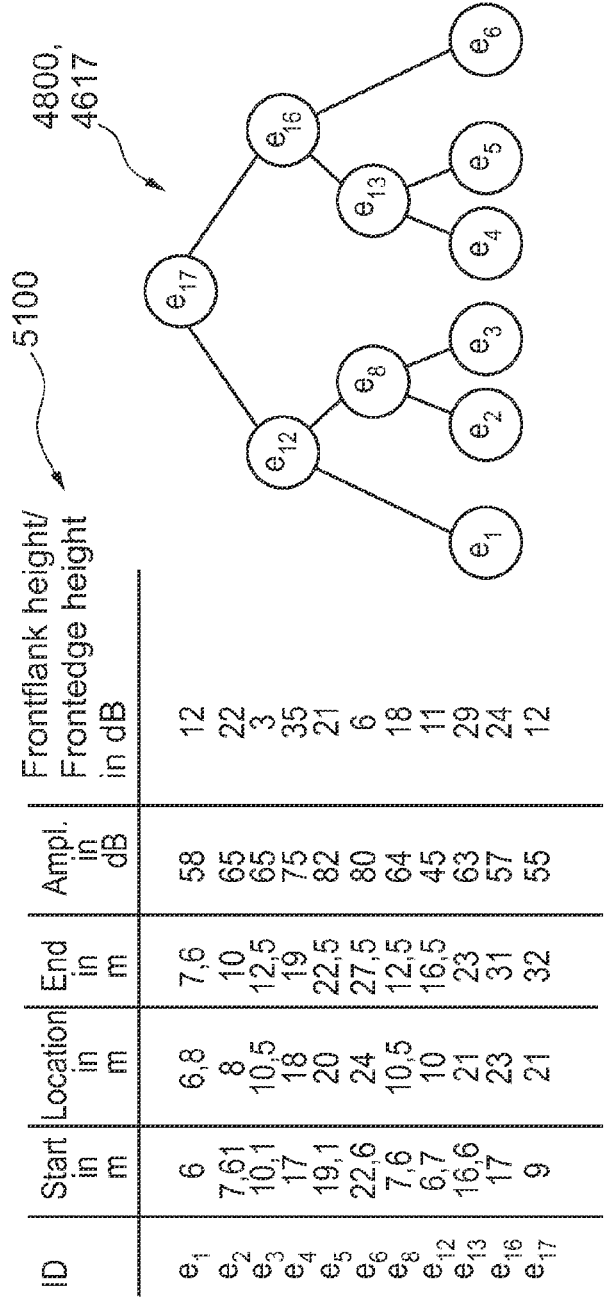
FIG. 51 shows a multiple echo list with an associated relationship graph.

FIG. 51 shows a multiple echo list with an associated relationship graph. In this arrangement the multiple echo list 5100 corresponds to table Tab2, while the relationship graph 4800, 4617 corresponds to the relationship graph from FIG. 48.

Figure 65:
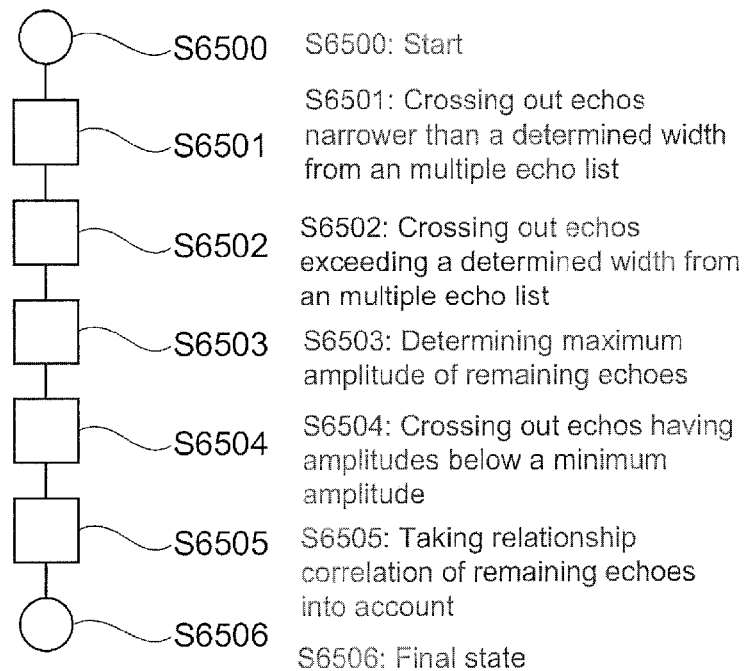
FIG. 65 shows a selection algorithm for the generation of a simplex echo list from a multiple echo list.

Below, the selection algorithm is described. The selection algorithm is shown in FIG. 65. FIG. 65 shows a selection algorithm for generating a single echo list from a multiple echo list. The selection algorithm starts in the start state S6500; in step S6501 all the echoes of a determined width are crossed out. For example, all the echoes of a width that is narrower than a predeterminable lower limit $b_{min}$ are crossed out. $b_{min}$ can, for example, be 0.5 m. In step S6502 of the selection algorithm all the echoes that exceed a determined width are crossed out. The width can be predeterminable by an upper limit $b_{max}$. For example, the upper limit could be 5 m.

In step S6503 the maximum amplitude $A_{max}$ of all the remaining echoes is determined, and in step S6504 all those echoes are crossed out whose amplitude is below a predeterminable minimum amplitude that can be derived from the determined maximum amplitude. For example the minimum amplitude can be calculated as $A_{max} - \Delta A$. For example, it is possible for $\Delta A = 30$ dB.

In step S6505 the relationship correlation of the remaining echoes is taken into account. To this effect any echoes whose ancestors are still present in the list are crossed out.

In the final state S6506 a single or an unambiguous echo list has been achieved. FIG. 52 shows a multiple echo list with crossed-out echoes. FIG. 52 shows the multiple echo list 5100 from FIG. 51 after treatment by means of the selection algorithm from FIG. 65. The figure shows that the echoes e2, e3, e12, e13, e16 and e17 have been deleted. The deletion criteria were a $b_{min}$ of 0.5 m, a $b_{max}$ of 5 m, an $A_{max}$ of 82 dB, which was determined from the echo e5. The maximum amplitude was reduced by $\Delta A = 30$ dB so that all the echoes that are smaller than 52 dB were crossed out. However, this does not apply to any echo of FIG. 52.

Furthermore, the echoes e2 and e3 were deleted, since the echo e8 is still present and, as shown in the relationship graph 4800, e8 is an ancestor of the echoes e2 and e3 and is still contained in the echo list 5200 according to FIG. 52. This results in the single echo list from FIG. 53. FIG. 53 shows a single echo list 5300 that stems from a multiple echo list 5100. The single echo list 5300 corresponds to Tab4.

TABLE 4

| ID | Start in m | Location in m | End in m | Amplitude in dB | Front edge height in dB |
|---|---|---|---|---|---|
| e1 | 6 | 6.8 | 7.6 | 58 | 12 |
| e4 | 17 | 18 | 19 | 75 | 35 |
| e5 | 19.1 | 20 | 22.5 | 82 | 21 |
| e6 | 22.6 | 24 | 27.5 | 80 | 6 |
| e8 | 7.6 | 10.5 | 12.5 | 64 | 18 |

Figure 54:
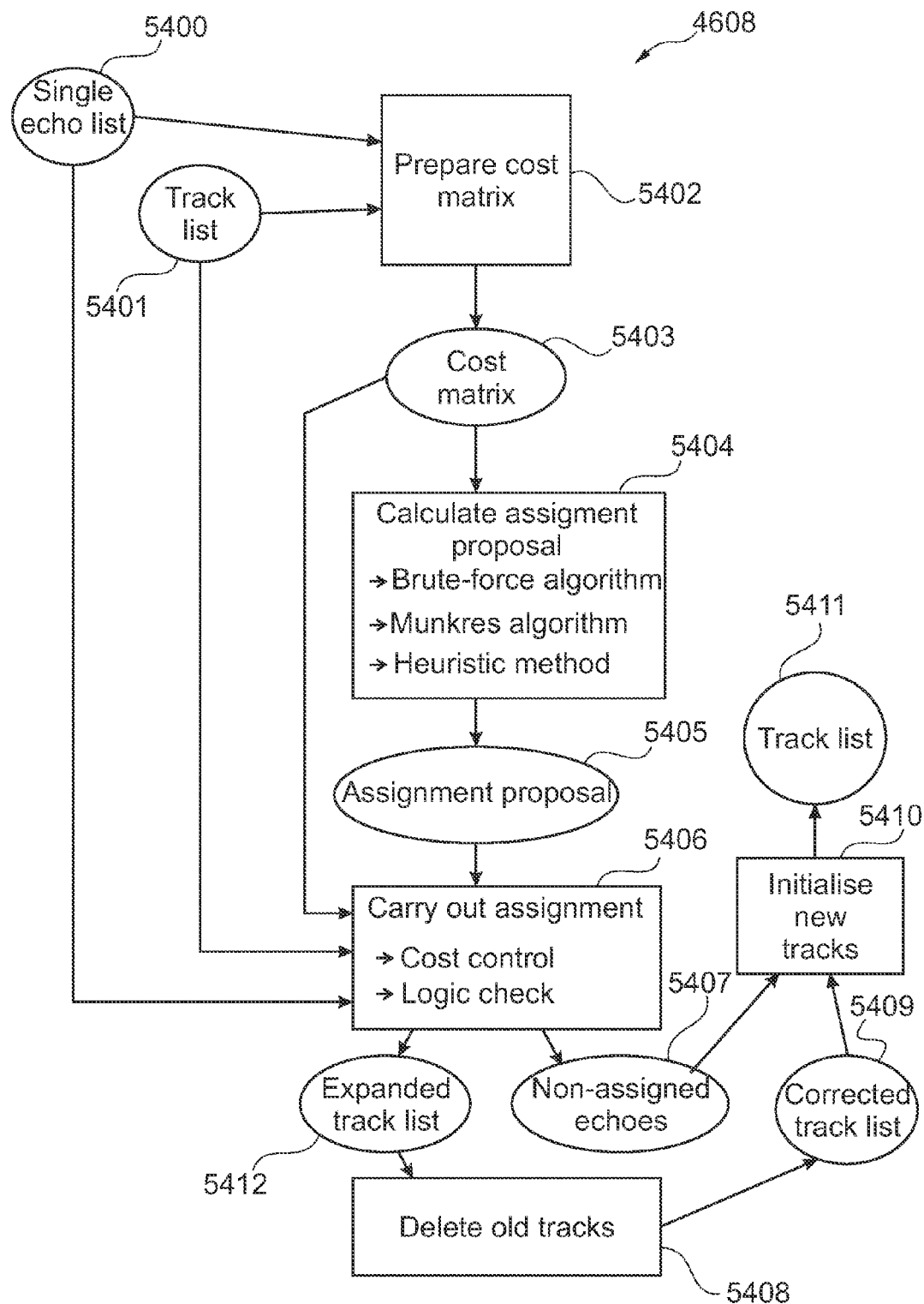
FIG. 54 shows a method for single (one time, simplex) tracking.

FIG. 54 shows a method for simple tracking 4608. The method from FIG. 54 is, for example, applied when a single echo list 4606 is used. The method comprises the steps of preparing a cost matrix 5402 from a single echo list 5400 and from a track list 5401. The prepared cost matrix 5403 is forwarded to an assignment algorithm 5404. The latter can use various methods to determine an assignment proposal.

Examples of assignment algorithms are a brute-force algorithm, the Munkres algorithm or a heuristic method. By means of these methods an assignment proposal 5405 is prepared, and in block 5406 an assignment is carried out, wherein cost control and/or a logic check can take place.

After assignment, an expanded track list 5412 is generated. Ageing tracks or old tracks are deleted in block 5408, and the corrected track list 5409 is expanded by new tracks that are initialised in the unit 5410 so that a new track list 5411 arises. Furthermore, based on the assignment 5406, non-assigned echoes 5407 are extracted, which are used in the initialisation of new tracks in block 5410.

Figure 55:
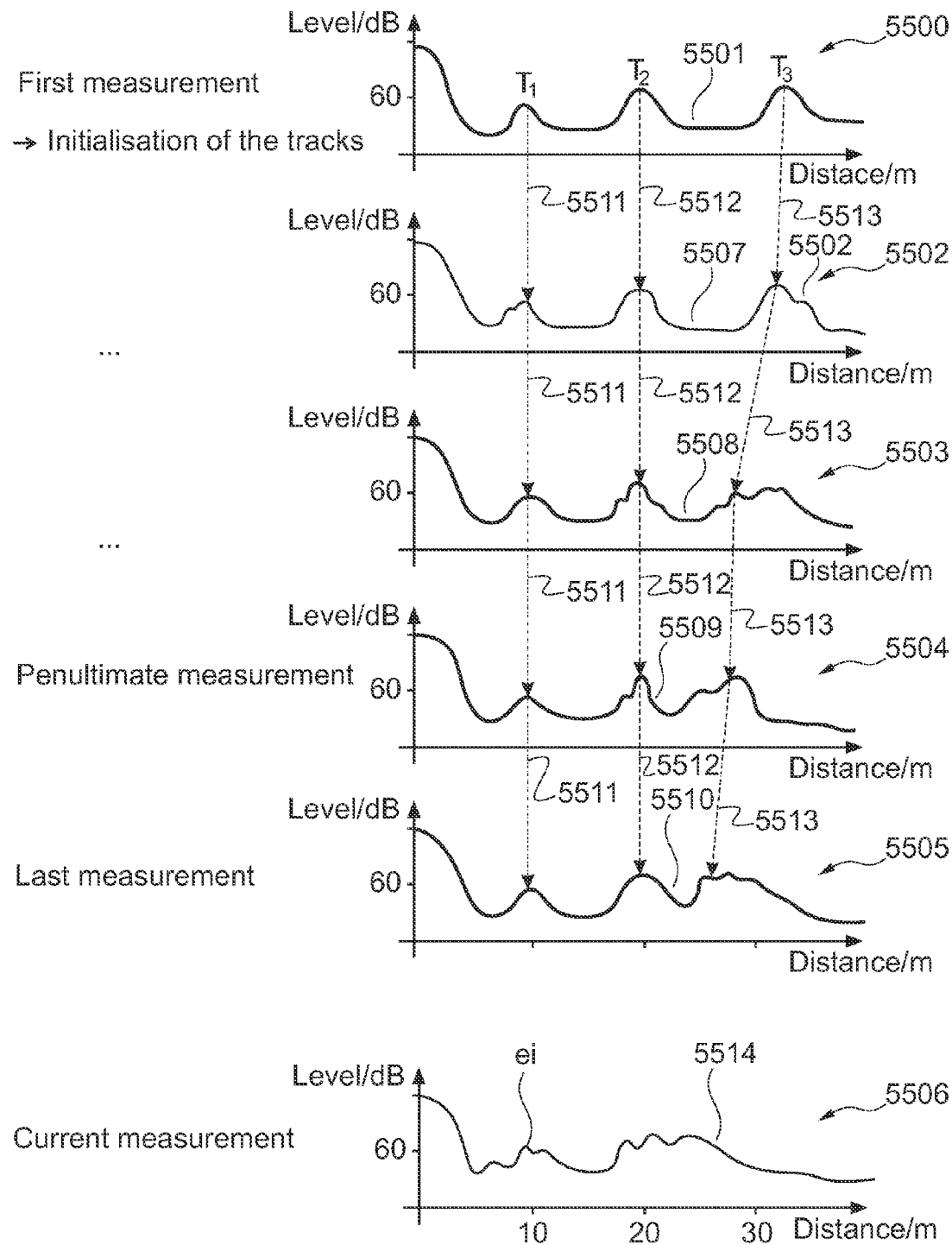
FIG. 55 shows chronologically past echo functions with a current echo function.

FIG. 55 shows past echo functions with a current echo function. In FIG. 55 the first echo reading 5500 is shown, which generates a first echo function 5501. With this first reading 5500 the maxima of the echo function or potential echoes of the echo function are identified and initialised as new tracks T1, T2, T3. In the subsequent reading 5502 the tracks T1, T2, T3 with the echoes of the echo function 5502 that was current at the second point in time are continued; this is also the case in the further readings 5503, 5504 that are more recent, and the last reading 5505 prior to the current reading 5506.

As a result of the time-related joining of the different measuring curves 5501, 5507, 5508, 5509, 5510 the following arise: track T1 which is indicated by the arrows 5511, track T2 which is indicated by the arrows 5512, and track T3 with which the arrows 5513 are associated. The tracks T1, T2, T3 are to be continued with the current echo function 4708, 5514 and in particular with the echoes appearing therein. The echo functions 4708 and 5514 comprise an identical progression. Various selection criteria exist for preparing the cost matrix. For example, the suitability of an echo ei to continue a track Tj, in particular T1, T2, T3, is one selection criterion.

The suitability of an echo ei to continue a track T1, T2 or T3 is expressed by costs. The lower the costs, the better the suitability.

For example, the location difference between the echo ei and the last echo of the track Tj is one criterion for determining the costs. A further criterion relates to, for example, the difference of the echo width between the echo ei and the last echo of the track Tj 5511, 5512, 5513. A further criterion relates to the amplitude difference between the echo ei and the last echo of the track Tj. Yet another criterion relates to the difference of the front edge heights.

Figure 56:
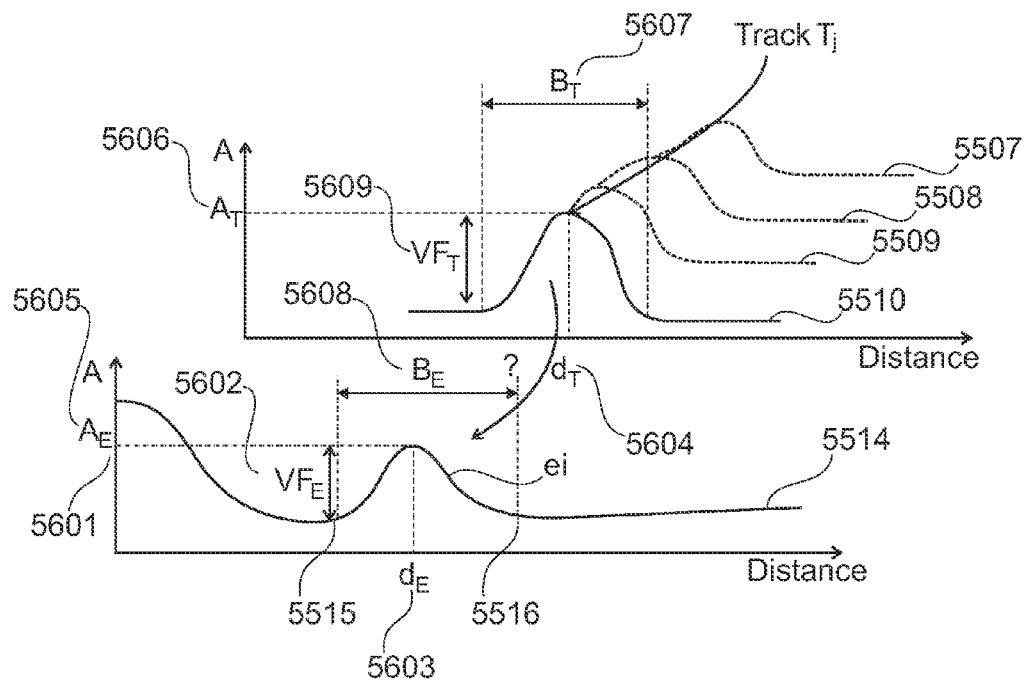
FIG. 56 shows an example of the preparation of a cost matrix.

FIG. 56 shows an example for preparing a cost matrix. In an exemplary manner FIG. 56 shows the track Tj that was constructed from the echoes of subsequent echo functions 5510, 5509, 5508, 5507. Echo function 5510 is the last reading with which the track was able to be continued and is more recent than the current reading 5514. In this process the question poses itself as to the suitability of the echo ei to continue the track Tj.

The location difference is to be understood as being the distance of the location $d_E$ of the echo ei 5603 from the location $d_T$ of the last echo of the track Tj 5604. The difference between the amplitude $A_E$ of the echo ei and the amplitude $A_T$ of the last echo of the track Tj relates to the level axis 5601 and is obtained by subtraction of the amplitude $A_E$ of the echo ei 5605 from the amplitude $A_T$ of the last echo of the track Tj 5606. The front edge height $VF_T$, $VF_E$ of an echo equals the difference between the amplitude at the start of the echo and the amplitude at the location of the echo. The front edge height 5602, $VF_E$ of the echo function is clearly shown. If it differs too much from the front edge height of the last echo of the track Tj 5609, $VF_T$, then this also leads to increased costs of assignment. The width 5608 $B_E$ of an echo ei results from the difference between the echo start position 5515 and the echo end position 5516 or echo ends position 5516. Again, costs are low if the width of the echo 5608, $B_E$ does not differ too much from the width of the last echo of the track Tj 5607, $B_T$.

The cost values calculated in the individual criteria are subsequently combined to form a shared cost value, for example by addition of the costs of the individual criteria.

Generally speaking, the criteria for determining costs represent a correlation measure. In other words this means that the criteria indicate how well the last reading agrees with or correlates with the current reading, and how well the echoes found in the current reading agree with or correlate with the past echoes.

For example, a cost matrix relating to the continuation of tracks 5511, 5512 and 5513 results according to FIG. 55 with the echoes of the multiple echo list 5100 according to FIG. 51 as Tab5.

TABLE 5

|     | T1 | T2 | T3 |
|-----|----|----|----|
| e1  | 7  | 22 | 29 |
| e2  | 6  | 17 | 21 |
| e3  | 6  | 16 | 19 |
| e4  | 12 | 8  | 8  |
| e5  | 15 | 9  | 8  |
| e6  | 21 | 10 | 7  |
| e8  | 3  | 14 | 17 |
| e12 | 10 | 13 | 16 |
| e13 | 15 | 4  | 4  |
| e16 | 22 | 3  | 4  |
| e17 | 28 | 21 | 18 |

If in an example tracks have not yet been defined, then the cost matrix remains empty. If no echoes are found then the cost matrix also remains empty.

In single tracking, calculation of an assignment proposal takes place. This presupposes that a cost matrix for the assignment of the echoes ei to tracks Tj has been calculated, wherein ei originate from a single echo list. This means that they originate from an unambiguous echo list and have been identified as unambiguous echoes by the preceding method. Thus the starting point is the single echo list Tab4 5300, and the cost matrix thus corresponds to the matrix shown in Tab6.

TABLE 6

|    | e1 | e4 | e5 | e6 | e8 |
|----|----|----|----|----|----|
| T1 | 7  | 12 | 15 | 21 | 3  |
| T2 | 22 | 8  | 9  | 10 | 14 |
| T3 | 29 | 8  | 8  | 7  | 17 |

Based on the cost matrix of Tab6, by means of a brute-force algorithm an assignment can be determined that comprises minimal costs. In a brute-force algorithm all the possibilities of combining an echo to a track are carried out. In this process the following combination possibilities arise.

$$T1 \to e1 \wedge T2 \to e4 \wedge T3 \to e5: \sum_i c_i = 23$$

$$T1 \to e1 \wedge T2 \to e4 \wedge T3 \to e6: \sum_i c_i = 22$$

$$T1 \to e1 \wedge T2 \to e4 \wedge T3 \to e8: \sum_i c_i = 32$$

$$T1 \to e1 \wedge T2 \to e5 \wedge T3 \to e4: \sum_i c_i = 24$$

...

In this method all the possibilities are compared, and in the example shown the most favourable example is as follows:

$$T1 \to e8 \wedge T2 \to e4 \wedge T3 \to e6: \sum_i c_i = 18.$$

The symbol $\to$ denotes that the corresponding track is assigned to the corresponding echo, while $$\sum_i$$

ci denotes the total costs arising in a corresponding combination. As a result of trying all the possibilities it is, however, possible to increase the calculation time. A second-minimised solution can also take place by applying the Munkres algorithm.

The use of a heuristic method is a further possibility. In this method the echo that in each case is the most cost-effective and that is not yet occupied by some other track is assigned to each track. Based on Tab6 there is thus an assignment T1→e8, T2→e4, T3→e6. However, in the heuristic method it cannot be assumed that a cost minimum is actually achieved.

A calculated assignment proposal provides the starting point in carrying out the assignment. For example, the assignment T1→e8 incurs the costs 3, T2→e4 the costs 8 and T3→e6 the costs 7.

For cost control, a predeterminable upper limit, for example $c_M$=10, is specified, and all the assignments whose costs exceed $c_M$ are rejected. On the other hand a logic check can take place in that, for example, checking occurs whether in the selected proposal of assigning tracks to echoes crossovers of tracks occur that must not happen.

Should a crossover occur, a check is made whether a crossover is logically possible. If a crossover is not possible, the more cost-intensive assignment of the assignments involved in a crossover situation is deleted.

If after the assignment has been carried out, in other words after continuation of the tracks, echoes that have not yet been assigned remain in the echo list, then they can be used to initialise new tracks.

If tracks were not continued over several readings, then they are deleted.

Figure 57:
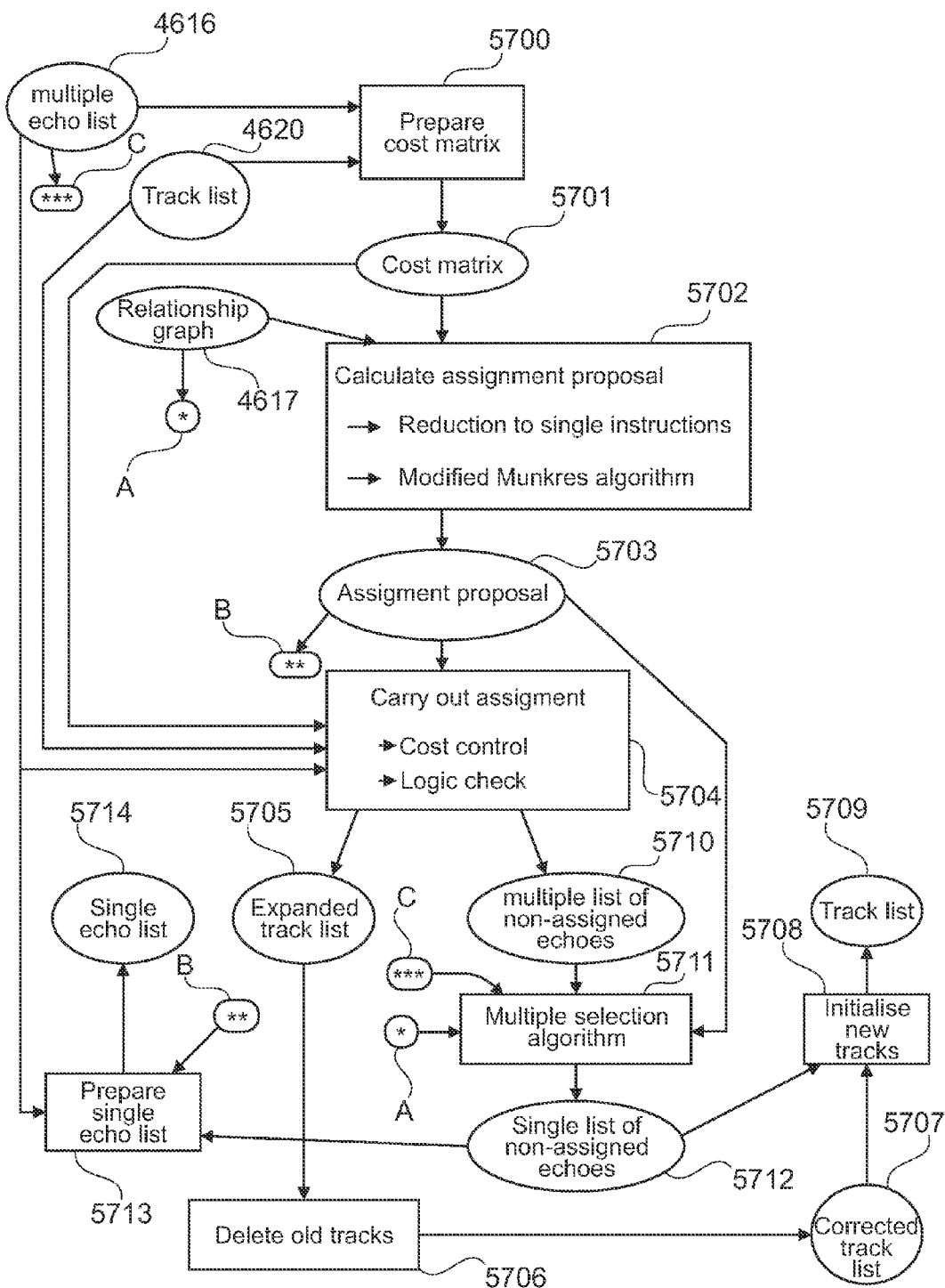
FIG. 57 shows a method for multiple tracking.

FIG. 57 shows a method for multiple tracking. The multiple echo list 4616 together with the track list 4620 is made available to the method. Both the multiple echo list 4616 and the track list are used to prepare a cost matrix in block 5700. The cost matrix 5701 is used to calculate an assignment proposal in block 5702. To calculate the assignment proposal the relationship graph or the relationship correlation 4617 is also used.

In order to calculate an assignment proposal, either a reduction to single assignments is carried out, or the modified Munkres algorithm is used. This results in an assignment proposal 5703, and in step 5704 the assignment of found echoes to already existing tracks can be carried out, wherein in this step both a cost control and a logic check are possible. In order to carry out the assignment in block 5704, the multiple echo list 4616, the track list 4620 and the cost matrix are used. After the assignment has been carried out in block 5704, an expanded track list 5705 is available, from which in block 5706 old tracks are deleted if they can no longer be continued over several readings. This results in a corrected track list 5707.

From the assignments that were not carried out in block 5704, and from the remaining non-assigned echoes of the multiple echo list 4616 a multiple list comprising non-assigned echoes 5710 can be generated, after which a multiple selection algorithm 5711 can be used. The multiple selection algorithm 5711 takes into account the assignment proposal 5703, in that it eliminates all the ancestors and all the descendants of the already assigned echoes. To this effect the method uses the multiple echo list 4616 and the relationship graph 4617. By means of a selection algorithm the remaining echoes are further processed to a single echo list. As an output from the multiple selection algorithm 5711 a single list of non-assigned echoes 5712 can be generated. Based on the single list of non-assigned echoes, new tracks can be initialised in block 5708. At the end in step S709 an updated track list is available.

Furthermore, a single echo list or an unambiguous echo list 5714 can be generated in block 5713, which list may play an important role, for example in relation to compression of the echo curve with wavelets 4601. To this effect first all the echoes of the single list of non-assigned echoes 5712 are taken over into the single echo list 5714. Subsequently, in relation to each echo that was taken into account in the assignment proposal 5703 a check is made as to whether at least one ancestor or descendant of the respective echo is already present in the single echo list 5714. If this is not the case, the respective echo from the multiple echo list 4616 is taken over into the single echo list 5714.

In multiple tracking first of all an assignment proposal is calculated. For this purpose there should be a cost matrix for the assignment of each echo ei to a track Tj or to each track Tj, wherein the ei may originate from a multiple echo list or from a single echo list. In addition, the existence of a relationship correlation or a relationship graph or a storage region of the echoes of the echo list is a prerequisite.

Figure 58:
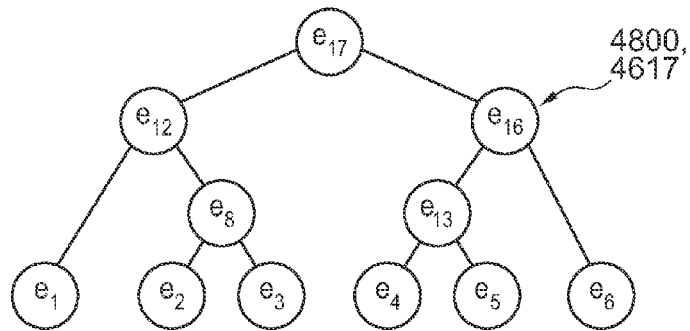
FIG. 58 shows a cost matrix for a multiple echo list with a relationship graph.

FIG. 58 shows a cost matrix 5800 for a multiple echo list 5100 with a relationship graph 4800. The following example is based on three tracks T1, 5511 and T2, 5512 and T3, 5513. The cost matrix 5800 results. The cost matrix 5800 is as follows:

TABLE 7

|    | e1 | e2 | e3 | e4 | e5 | e6 | e8 | e12 | e13 | e16 | e17 |
|----|----|----|----|----|----|----|----|----|----|----|----|
| T1 | 7  | 6  | 6  | 12 | 15 | 21 | 3  | 10  | 15  | 22  | 28  |
| T2 | 22 | 17 | 16 | 8  | 9  | 10 | 14 | 13  | 4   | 3   | 21  |
| T3 | 29 | 21 | 19 | 8  | 8  | 7  | 17 | 16  | 4   | 4   | 18  |

The representation 4800, 4617 of FIG. 58 shows the relationship graph 4800, 4617 that is associated with the echo list. In the special case of a single echo list all the echoes are situated individually in the space, without any relationship to other echoes; in other words, there is no connected relationship graph, for example the relationship graph 4800, 4617.

In the determination of an assignment proposal on the basis of the cost matrix 5800 the relationship correlation 4800, 4617 is taken into account. After processing of the cost table according to Tab7, the Munkres method would furnish an assignment that T1 continues with the echo e8, T2 with the echo e16, and T3 with the echo e13. However, this assignment cannot be valid because either one of e13 or e16 can be used for tracking, but e13 and e16 must not be used at the same time, as shown in FIG. 47.

The above is followed by a description of the method of the reduction to single assignment. In this process, first all the combinatorially and causally valid echo constellations or combinations from the relationship graph 4800, 4617 are formed. After formation of the echo constellations, with each of the single echo lists that have arisen in this manner an assignment proposal is determined, with the most favourable of all the assignment proposals furnishing the result. From the relationship graph 4800 the following combinations or variants result, which are designated V1 to V10.

TABLE 8

| Combination | Echoes used |
|---|---|
| V1  | e17 |
| V2  | e12∧e16 |
| V3  | e12∧e13∧e6 |
| V4  | e12∧e4∧e5∧e6 |
| V5  | e1∧e8∧e16 |
| V6  | e1∧e8∧e13∧e6 |
| V7  | e1∧e8∧e4∧e5∧e6 |
| V8  | e1∧e2∧e3∧e16 |
| V9  | e1∧e2∧e3∧e13∧e6 |
| V10 | e1∧e2∧e3∧e4∧e5∧e6 |

Since, irrespective of the track list, Tab8 comprises all the possible combinations, Tab8 can be reduced in that all the constellations or combinations which do not furnish a sufficient number of echoes to successfully continue an existing track list, for example comprising three tracks, are removed. In order to successfully continue three tracks, at least three disjunctive echoes are required. Therefore in Tab8 the combinations V1 and V2 can be deleted. In the case of an insufficient number of echoes, that is in the absence of at least one constellation by means of which all the tracks can be continued, no constellations are deleted. This could be a pointer that tracks are to be deleted.

The above is followed by the determination of a favourable assignment proposal for each individual constellation. To this effect, for example, the Munkres algorithm can be carried out since in this method the combinations V1 to V10, which were formed from the relationship graph, only combine non-related echoes. Table Tab9 shows the evaluated assignment proposals.

| | | Tab9 | |
|---|---|---|---|
| Combination | Echo used | Assignment proposal according to Munkres | $\sum_i c_i$ |
| V3 | e12 ∧ e13 ∧ e6 | T1 → e12, T2 → e13, T3 → e6 | 21 |
| V4 | e12 ∧ e4 ∧ e5 ∧ e6 | T1 → e12, T2 → e4, T3 → e6 | 25 |
| V5 | e1 ∧ e8 ∧ e16 | T1 → e1, T2 → e8, T3 → e16 | 25 |
| V6 | e1 ∧ e8 ∧ e13 ∧ e6 | T1 → e8, T2 → e13, T3 → e6 | 14 |
| V7 | e1 ∧ e8 ∧ e4 ∧ e5 ∧ e6 | T1 → e8, T2 → e4, T3 → e6 | 18 |
| V8 | e1 ∧ e2 ∧ e3 ∧ e16 | T1 → e2, T2 → e3, T3 → e16 | 26 |
| V9 | e1 ∧ e2 ∧ e3 ∧ e13 ∧ e6 | T1 → e2, T2 → e13, T3 → e6 | 17 |
| V10 | e1 ∧ e2 ∧ e3 ∧ e4 ∧ e5 ∧ e6 | T1 → e2, T2 → e4, T3 → e6 | 21 |

According to Tab9, the constellation V6 with the costs 14, is the selection of constellations with the lowest total costs, and from this an assignment proposal arises that T1 be continued with echo e8, T2 be continued with echo e13, and T3 be continued with echo e6. With the single assignments a global cost minimum can be found, taking into account the relationship. However, the method of reduction to single assignments may involve a very considerable computing effort and/or storage effort.

A further variant for calculating an assignment proposal 5703 within the function block 5702 consists of using a modified Munkres method. In this process the method iteratively approaches a suitable solution, wherein in each iterative step the relationship of the echoes is taken into account. In other words this means that in parallel the multiple echo list and the relationship correlation of the echoes among themselves are taken into account in the determination of an assignment proposal of the echoes to the tracks.

Figure 66:
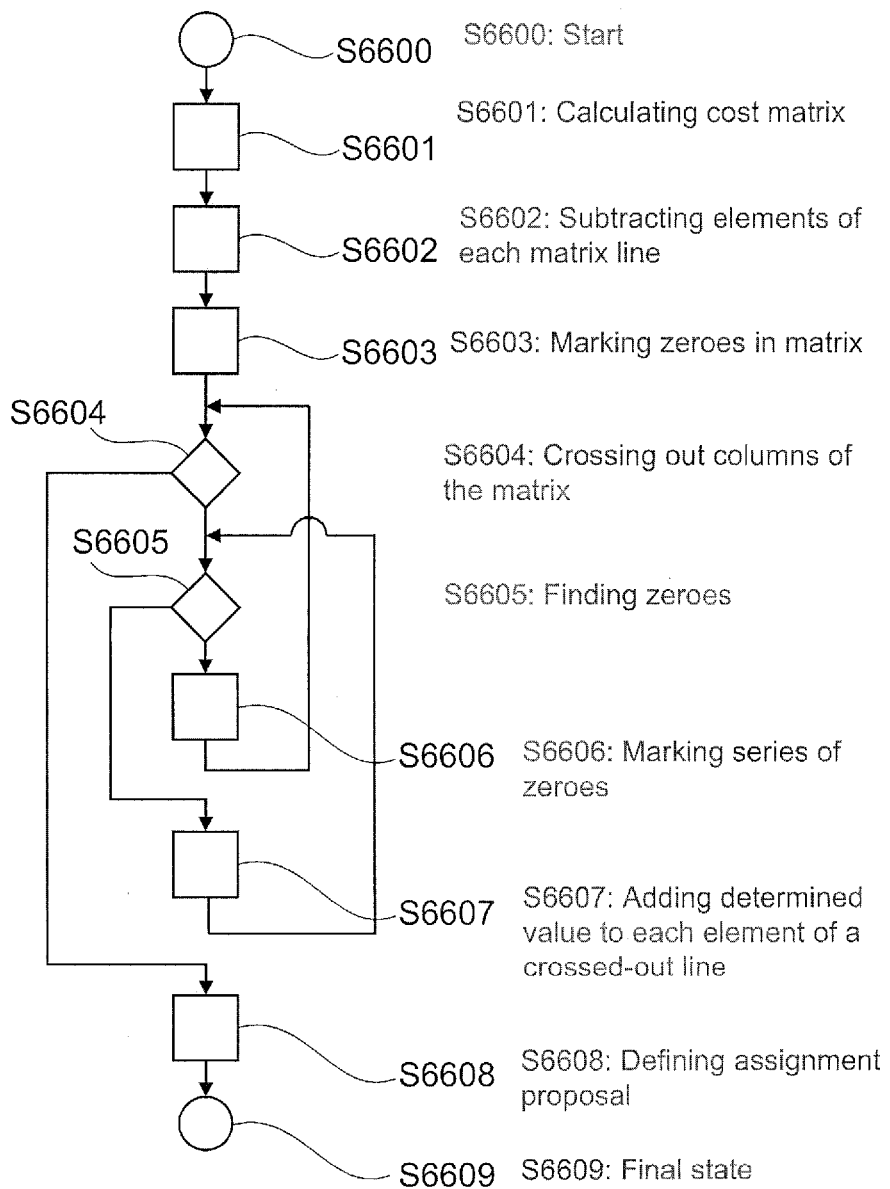
FIG. 66 shows a modified Munkres method.

FIG. 66 shows the modified Munkres method. The method starts at the start point S6600. First, in step S6601, calculation of the cost matrix takes place. To this effect a handed-over cost matrix 5800, if required, is transposed, so that the tracks Tj are entered in the lines, and the echoes ei are entered in the columns of the cost matrix 5800.

Figure 59A:
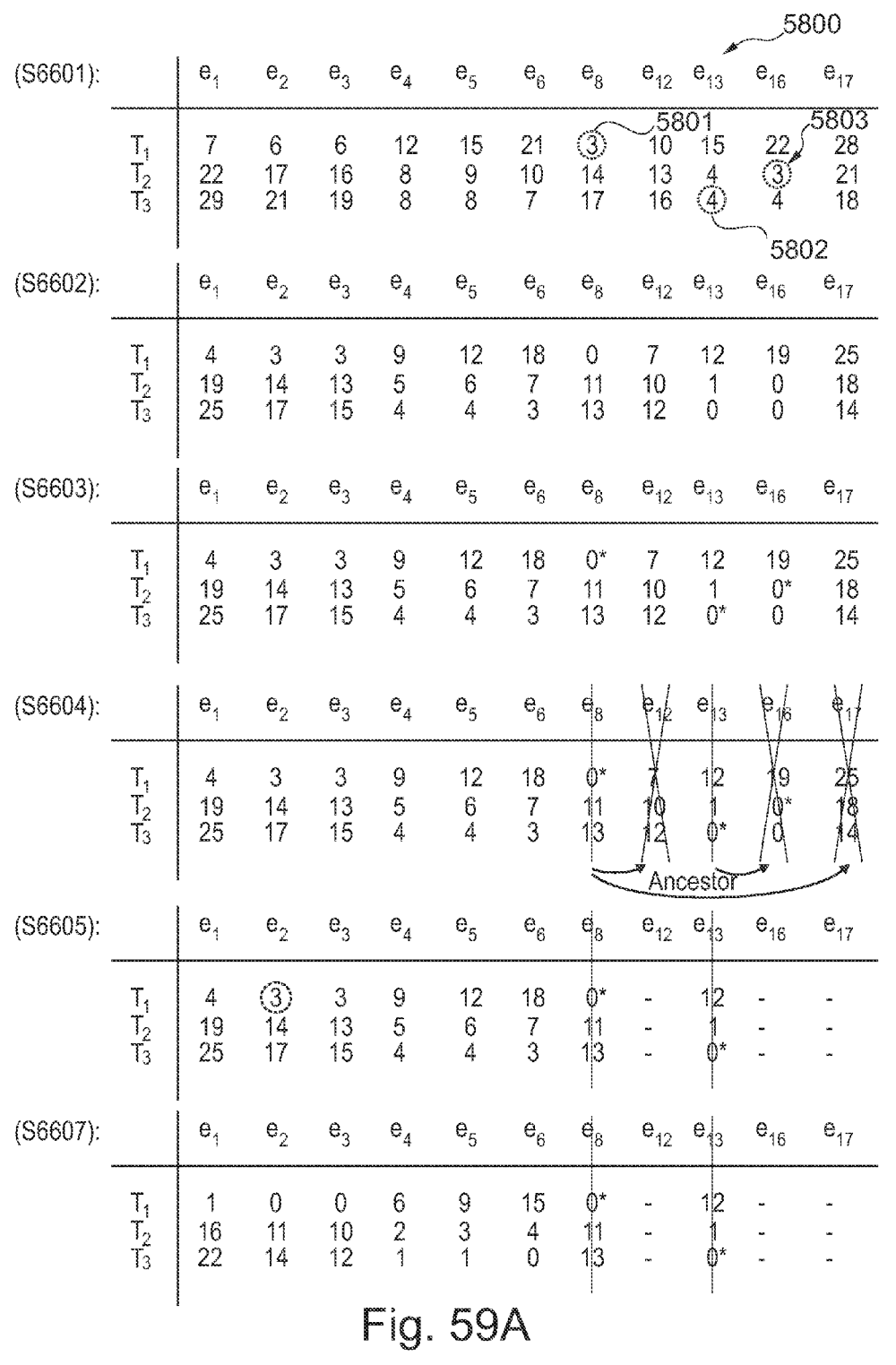

FIG. 59 shows the change in a cost matrix when the Munkres algorithm is carried out taking into account relationship correlations. FIG. 59 shows the cost matrix 5800 and in particular the way it changes in the individual steps. The individual steps are designated in parentheses at the respective cost matrices.

In step S6602 in each line of the matrix 5800 the smallest element 5801, 5802, 5803 is found and subtracted from each other element of the line.

In step S6603 a zero is found in the resulting matrix, which zero hereinafter is designated Z or is given a comparable mark. If no zero marked with an asterisk or a comparable mark from a lower process step exists in the line, or can be found in the line or column of Z, then Z is marked with an asterisk.

Step S6603 is repeated for each element of the matrix.

In step S6604 each column that contains a zero marked with an asterisk is crossed out. In parallel to this, the ancestors of the echo of the respective crossed-out column is determined.

The column comprising the ancestors is rendered invalid. If all the columns have been crossed out or have been rendered invalid, or if each line comprises a zero marked with an asterisk, a jump to step S6608 takes place. Otherwise the method continues in step S6605.

In step S6605 a zero that has not been crossed out is found and is marked with a squiggle or with a comparable mark.

When the line with the squiggled zero does not comprise a zero with an asterisk, a jump to step S6606 takes place. Otherwise this line is crossed out, and the column that comprises the zero marked with an asterisk is restored. This process is continued until such time as there are no longer any crossed-out zeroes. The lowest cost value that has not been crossed out is stored, and a jump to step S6607 takes place.

In step S6606 a series of zeroes in turn squiggled or marked with an asterisk is formed. This series is formed according to a scheme in which, if Z0 is the non-crossed-out squiggled zero that was found in step S6605, Z1 is the zero marked with an asterisk in the column of Z0 if such exists. Furthermore, Z2 is the squiggled zero in the line of Z1, which always has to exist. This scheme is continued until the series ends with a squiggled zero whose column does not comprise a zero marked with an asterisk. The asterisk mark is removed from each zero of the series that is marked by an asterisk, and each squiggled zero of the series is marked with an asterisk. After this, all the squiggle marks are deleted, and every crossed-out line of the matrix is restored. After this a jump to step S6604 takes place.

In step S6607 the value that has been determined in step S6605 is added to each element of each crossed-out line, and the value is subtracted from each element of each column that has not been crossed out. A jump to step S6605 then takes place without there being any change to existing marks.

In step S6608 the assignment proposal is defined by the positions of the zeroes in the matrix, which zeroes are marked with an asterisk. After this the method ends in the final state S6609.

The modified Munkres method determines the assignment proposal T1 to e8, T2 to e13, and T3 to e6.

By means of the modified Munkres algorithm or by means of a combination of the Munkres method with the relationship correlation, fast and storage-favourable processing of the method independently of the depth of the relationship graph 4800, 4617 can be carried out.

The depth of a relationship graph results from the number of echoes along a segment of combined branches 4801 of the relationship graph, which segment starts at an echo without an ancestor, and ends at an echo without a descendant, wherein the segment comprises the maximum number of echoes. As shown in FIG. 59, the assignment proposal T1 to e8 is calculated with costs 3, T2 to e13 with costs 4, and T3 to e6 with costs 7.

During subsequent further processing of the assignment proposal in the function block 5704, cost control can finally take place in that assignments with costs that exceed a predeterminable value of $c_M$ are rejected. For example, $c_M=10$ can be selected. Since in the example the costs are 3, 4 and 7, all the assignments are in order, with none of them exceeding a predeterminable value of $c_M=10$.

Furthermore, in function block 5704 a logic check can take place. In this process a check is carried out as to whether there is a crossover of tracks in the calculated assignment proposal. If a crossover occurs, a check is carried out as to whether a crossover is logically possible. For example an instance where two echoes move through each other could be a permissible crossover. If the crossover is not possible, the more cost-intensive assignment of the assignments involved in the arising of a crossover situation is not taken into account.

After the cost control and/or the logic check have/has been completed, the tracks of the track list 4620 can be expanded, and lead to the expanded track list 5705. Thus, track 1 can be expanded with e8, track 2 with e13, and T3 with e6.

Since there were only three tracks that needed to be continued, echoes exist that have not been assigned. In the example stated above, for example, the table Tab10 results. Tab10 originates from Tab2, wherein the lines e6, e8 and e13 have been crossed out since they have already been used in the continuation of the tracks. Tab10 shows a multiple list of non-assigned echoes.

TABLE 10

| ID | Start in m | Location in m | End in m | Amplitude in dB | Front edge height in dB |
|---|---|---|---|---|---|
| e1 | 6 | 6.8 | 7.6 | 58 | 12 |
| e2 | 7.61 | 8 | 10 | 65 | 22 |
| e3 | 10.1 | 10.5 | 12.5 | 65 | 3 |
| e4 | 17 | 18 | 19 | 75 | 35 |
| e5 | 19.1 | 20 | 22.5 | 82 | 21 |
| e12 | 6.7 | 10 | 16.5 | 45 | 11 |
| e16 | 17 | 23 | 31 | 57 | 24 |
| e17 | 9 | 21 | 32 | 55 | 12 |

For evaluation devices or subsequent algorithms that are unable to handle multiple lists, a single echo list needs to be generated. To this effect a multiple selection algorithm 5711 is used. The multiple selection algorithm is based on the multiple list of non-assigned echoes Tab10 and on the relationship graph 4800 with the multiple echo list 5100, with said multiple selection algorithm taking into account the assignment proposal 5703. In relation to all the echoes of the assignment proposal the multiple selection algorithm checks as to whether the echo appears in the list of non-assigned echoes. If the echo does not appear, all the ancestors and all the descendants of the echo according to the relationship graph 4800, 4617 are crossed out. For example, in the analysis of the associated echo e8 it is detected that e8 does not appear in the list of non-assigned echoes according to Tab10. Therefore, by means of the relationship graph 4800, 4617 the ancestors e12 and e17 of the echo e8, and the descendants of e8, e2 and e3 are crossed out.

Thereafter the assigned echo e13 is analysed, and it is detected that e13 does not appear in the list of non-assigned echoes. Consequently, in the application of the multiple selection algorithm the ancestors of e13, the echo e16 and the echo e17 are crossed out, and the descendants e4 and e5 are also crossed out.

Thereafter the echo e6 is analysed, and it is also detected that this echo does not appear in the list of non-assigned echoes. Since the ancestors e16 and e17 are already crossed out, no crossing-out of the ancestors takes place, and since e6 does not have any descendants no crossing-out of descendants takes place either. Therefore, from the list of non-assigned echoes the echo e1 according to table Tab11 remains.

TABLE 11

| ID | Start in m | Location in m | End in m | Amplitude in dB | Front edge height in dB |
|---|---|---|---|---|---|
| e1 | 6 | 6.8 | 7.6 | 58 | 12 |

The echo list according to table Tab11 is then further processed by means of a selection algorithm. In the table Tab11 all those echoes are crossed out whose width is below a predeterminable limit $b_{min}$, in the present case for example 0.5 m. Thereafter those echoes are crossed out whose width exceeds the predeterminable maximum value, for example 5m.

The above is followed by a determination of the maximum amplitude of the originally existing multiple list of non-assigned echoes according to Tab10, and those echoes are crossed out whose amplitude is lower than an upper limit or minimum amplitude that has been determined according to calculation regulation $A_{max}-\Delta A$. The amplitude difference $\Delta A$ can, for example, be 30 dB. The remaining echoes are subjected to a relationship assessment, and those echoes are deleted whose ancestors still remain in the remaining list of non-assigned echoes.

In the example according to table Tab11, e1 is wider than 0.5 m, and the width of e1 is narrower than 5 m. The found maximum amplitude $A_{max}$ in Tab10 is at echo e5; it is 52 dB. e1 from Tab11 exceeds the minimum amplitude $A_{max}-30$ dB, and for this reason no action takes place. Since only one echo is left in Tab11, no relationship assessment is required. The single list of non-assigned echoes thus corresponds to Tab11.

It is now possible to prepare a single echo list 5713 with the aim of making a concrete statement as to where in the current curve or in the current echo function relevant echoes can be found. This presupposes the existence of a multiple echo list 4616, table Tab2, an assignment proposal 5703 and a single list of non-assigned echoes 5712, as for example shown in Tab11. In order to carry out preparation of the single list the echoes of the single list of non-assigned echoes 5712 are incorporated into the single echo list to be determined.

In respect of all the echoes of the assignment proposal 5703 a check takes place as to whether the echo or ancestors or descendants of the echo are already represented in the single echo list that is to be determined. If neither the echo nor the ancestor or descendant is represented, the associated echo data is taken over from the multiple echo list into the single echo list.

Tab12 shows a single echo list 5714. The list comprises the echo e1 of the single list of non-assigned echoes, and the echoes from the takeover of the assignment proposal.

TABLE 12

| ID | Start in m | Location in m | End in m | Amplitude in dB | Front edge height in dB |
|---|---|---|---|---|---|
| e1 | 6 | 6.8 | 7.6 | 58 | 12 |
| e6 | 22.6 | 24 | 27.5 | 80 | 6 |
| e8 | 7.6 | 10.5 | 12.5 | 64 | 18 |
| e13 | 16.5 | 21 | 23 | 63 | 29 |

In table Tab12 e1 was entered as the only echo of the list of non-assigned echoes. The echoes e6 and e8 and e13 were entered because they were determined according to the assignment proposal, and no ancestors or descendants of the respective echoes in table Tab12 can be found. The echoes of the single echo list according to table Tab12 represent the relevant echoes of an echo curve, which echoes have been identified by a method for multiple tracking.

The single list of non-assigned echoes 5712, Tab11 can be used as the starting point for the initialisation of new tracks in block 5708.

It may be considered to be an idea for an echo extraction method to provide a method for generating and processing multiple echo lists. It may further be considered as an idea for an echo extraction method to provide a method for generating and processing relationship correlations of multiple echo lists.

A relationship correlation is present if echoes of a multiple echo list describe several physically possible variants of one or of several shared local maxima of an echo function or echo curve.

In the processing of multiple echo lists it may be an idea to process in parallel various interpretation possibilities of a local maximum or of several local maxima of an echo curve or echo function. In this context the term processing in parallel refers to evaluating using various methods.

The methods and the devices may be suitable for fill level measuring.

Figure 67A:
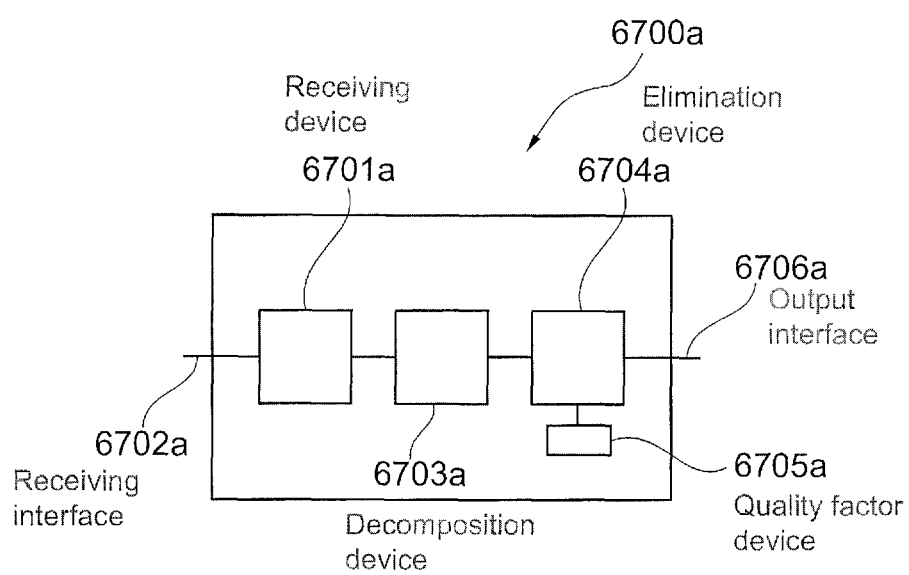
FIG. 67a shows a compression apparatus according to an exemplary embodiment of the present invention.

FIG. 67a shows a compression device according to an exemplary embodiment of the present invention. The compression device 6700a comprises the echo receiving device 6701a. The echo receiving device 6701a receives an echo function by way of the interface 6702a, for example from a sensor (not shown in FIG. 67a) that is connected with the interface 6702a. The echo receiving device 6701a forwards the echo function, and in particular the coefficients of the echo function, to the echo decomposition device 6703a.

The echo decomposition device 6703a decomposes the echo function into detail functions. The detail functions comprise coefficients that form a coefficient field. The elimination device 6704a can eliminate coefficients of the coefficient field depending on a quality factor, and, as a result of this, data reduction or compression takes place. The quality factor is stored in the quality factor device 6705a, which is connected with the elimination device 6704a. The compressed echo function is made available to other methods or other systems (not shown in FIG. 67a) by way of the output interface 6706a.

Figure 67B:
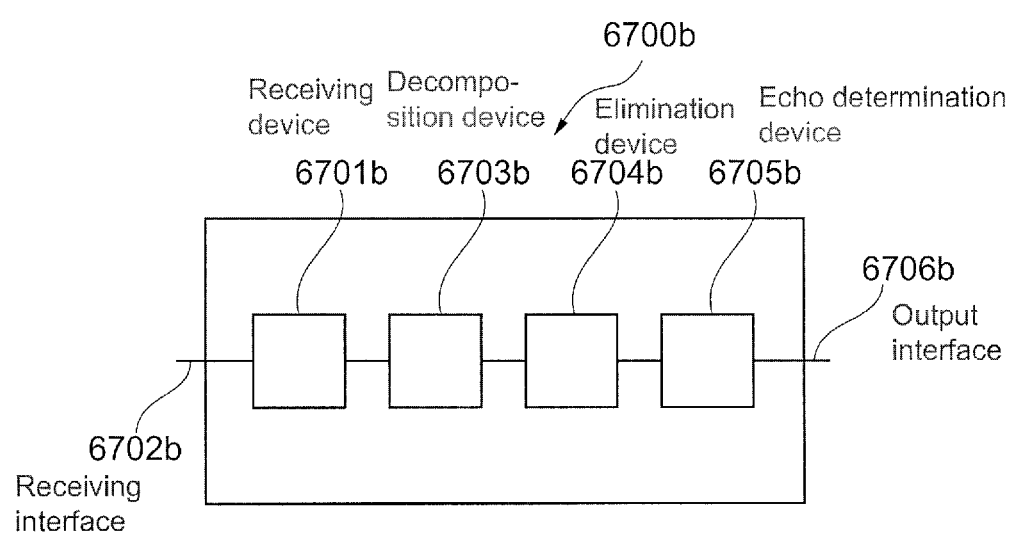
FIG. 67b shows an echo extraction apparatus according to an exemplary embodiment of the present invention.

FIG. 67b shows an echo extraction device according to an exemplary embodiment of the present invention. The echo extraction device 6700b comprises the echo receiving device 6701b. By way of the interface 6702b the echo receiving device 6701b receives an echo function, for example from a sensor (not shown in FIG. 67b) that is connected with the interface 6702b. The echo receiving device 6701b forwards the echo function, and in particular the coefficients of the echo function, to the echo decomposition device 6703b.

The echo decomposition device 6703b decomposes the echo function into detail functions. The detail functions comprise coefficients that form a coefficient field. The elimination device 6704b eliminates a plurality of the coefficients of the detail function. The elimination device forwards the reduced coefficient field to the echo determination device 6705b. By means of a suitable reconstruction regulation the echo determination device 6705b generates a smoothed echo function that evaluates the echo determination device 6705b by means of a threshold value method. The echo determination device 6705b determines at least one echo, which echo the echo determination device 6705b provides at the output interface 6706b or at the provision device 6706b. The output interface 6706b may be an internal or external hardware interface or an internal or external software interface.

Figure 67C:
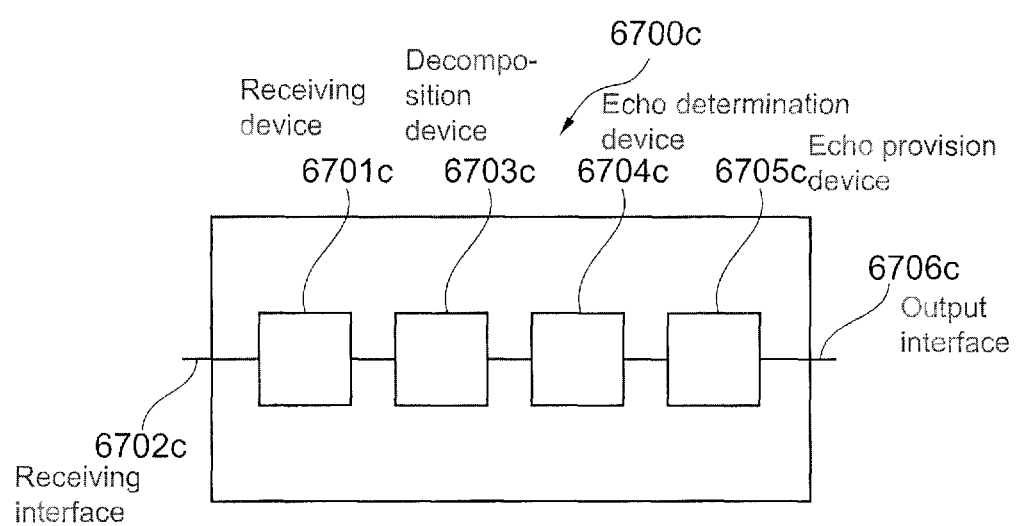
FIG. 67c shows an apparatus for finding an echo in an echo function according to an exemplary embodiment of the present invention.

FIG. 67c shows a device for finding an echo in an echo function according to an exemplary embodiment of the present invention. The device 6700c for finding an echo in an echo function comprises the echo receiving device 6701c. By way of the interface 6702c the echo receiving device 6701c receives an echo function, for example from a sensor (not shown in FIG. 67c) that is connected with the interface 6702c. The echo receiving device 6701c forwards the echo function, and in particular the coefficients of the echo function, to the echo decomposition device 6703c.

The echo decomposition device 6703c decomposes the echo function into detail functions. The detail functions comprise coefficients that form a coefficient field. The echo determination device 6704c determines a characteristic feature in the detail functions, and from it determines a region and/or a position of at least one echo. The characteristic feature is, for example, situated along a local axis of a detail function. The found regions and/or the found positions of the echoes are provided by the echo provision device 6705c by way of the output interface 6706c, for example as a single echo list.

Figure 67D:
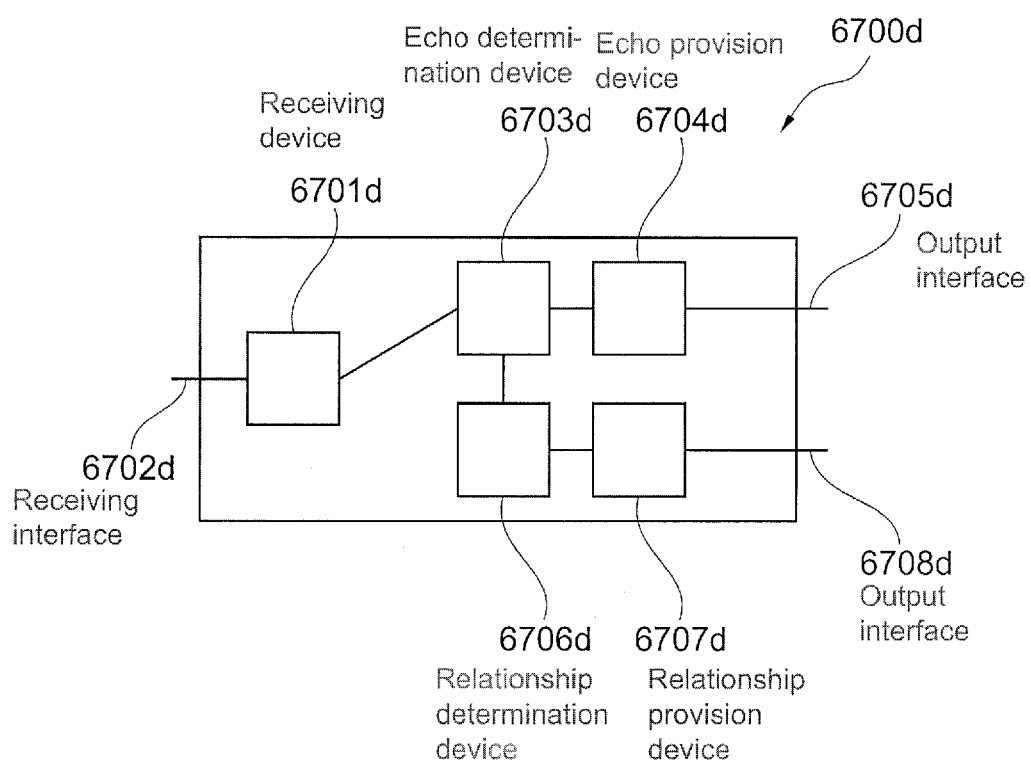
FIG. 67d shows an apparatus for providing a plurality of echoes from an echo function according to an exemplary embodiment of the present invention.

FIG. 67d shows a device for providing a plurality of echoes from an echo function according to an exemplary embodiment of the present invention. The device 6700d for providing a plurality of echoes from an echo function comprises the echo receiving device 6701d. By way of the interface 6702d the echo receiving device 6701d receives an echo function, for example from a sensor (not shown in FIG. 67d) that is connected with the interface 6702d. The echo receiving device 6701d forwards the echo function, and in particular the coefficients of the echo function, to the echo determination device 6703d.

The echo determination device 6703d determines at least one first echo and at least one second echo, which comprise a relationship correlation. The echo provision device 6704d provides the at least one first echo and the at least one second echo by way of the output interface 6705d.

In parallel, the relationship determination device 6706d determines the relationship correlation between the echoes. The determined relationship correlation is provided by the relationship provision device 6707d by way of the output interface 6708d.

The output interface 6705d, 6708d is an external interface. It leads, for example, out of a housing. The output interface 6705d, 6708d can be a hardware interface or a software interface.

Figure 67E:
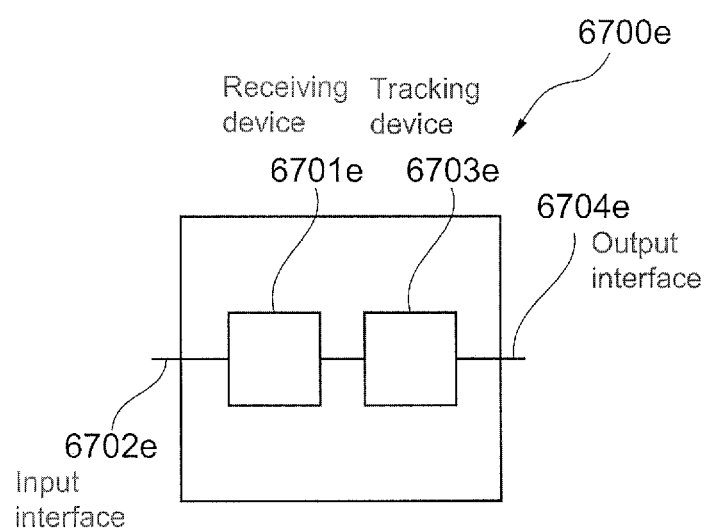
FIG. 67e shows an apparatus for selecting echoes from an echo list according to an exemplary embodiment of the present invention.

FIG. 67e shows a device for selecting echoes from an echo list according to an exemplary embodiment of the present invention. The device 6700e for selecting echoes from an echo list comprises the receiving device 6701e. By way of the input interface 6702e, the receiving device 6701e receives an echo list, for example a multiple echo list. The echo list comprises at least two echoes between which a relationship correlation exists. This multiple echo list may, for example, be provided by a sensor (not shown in FIG. 67e) that is connected with the input interface.

The tracking device 6703e determines an assignment of the at least two echoes of the multiple echo list to past echo function gradients and determines the position of the echoes, taking into account the relationship correlation of the echoes. The tracking device 6703e provides the found position of the echoes at the output interface 6704e.

The input interface 6702e and the output interface 6704e may be hardware interfaces or software interfaces. Furthermore, the input interface 6702e and the output interface 6704e may be internal or external interfaces.

Figure 67F:
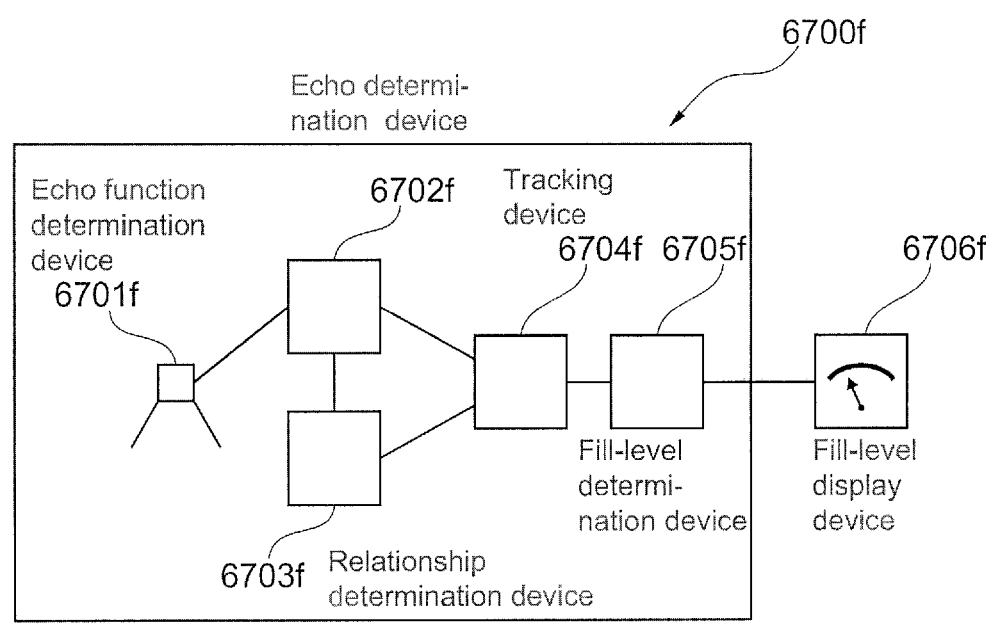
FIG. 67f shows a fill-level measuring apparatus according to an exemplary embodiment of the present invention.

FIG. 67f shows a fill-level measuring device according to an exemplary embodiment of the present invention. The fill-level measuring device 6700f comprises the echo function determination device 6701f. The echo function determination device 6701f, for example a sensor, determines an echo function, and in particular the progression of an echo function. The echo function determination device 6701f forwards the determined echo function to the echo determination device 6702f. The echo determination device 6702f determines a plurality of echoes from the echo function according to various methods, and the relationship determination device 6703f determines a relationship correlation between the echoes.

The found echoes are forwarded as a multiple echo list to the tracking device 6704f. The found relationship correlation is also forwarded to the tracking device 6704f.

In conjunction with history information relating to the past progression of the echoes, the tracking device 6704f determines the position of echoes. The determined position of the echoes is converted by the fill-level determination device 6705f to a fill level that relates to a container. The fill level that has been determined by the fill-level determination device can then be further processed. For example, the fill level can be displayed on the fill-level display 6706f.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A method for selecting echoes from an echo list in order to continue at least one track formed by the progression over time of at least one echo of a plurality of past echo functions, the method comprising:
   receiving, by a receiving device, an echo list, the echo list including a plurality of current echoes, at least two current echoes of the plurality of current echoes including a relationship correlation;
   determining, by a tracking device, a degree of agreement of at least one current echo of the plurality of current echoes with the at least one past echo of the at least one past echo function;
   selecting, by the tracking device, a combination of echoes such that the at least one track is suitably continued,
   wherein in the selection of the combination of the at least one current echo the relationship correlation between the at least two current echoes of the plurality of current echoes is taken into account, and
   providing the position of the selected echoes at an output interface.

2. A non-transitory computer-readable storage medium in which a program for selecting echoes of an echo list in order to continue at least one track formed by at least one progression over time of at least one echo of plurality of past echo functions is stored, the program, when it is executed on a processor, carries out the method for selecting echoes from an echo list including the following steps:
   receiving with a receiving device an echo list, the echo list including a plurality of current echoes, at least two current echoes of the plurality of current echoes including a relationship correlation;
   determining with a tracking device a degree of agreement of at least one current echo of the plurality of current echoes with the at least one past echo of the at least one past echo function;
   selecting with the tracking device a combination of echoes such that the at least one track is suitably continued,
   wherein in the selection of the combination of the at least one current echo the relationship correlation between the at least two current echoes of the plurality of current echoes is taken into account, and
   providing the position of the selected echoes at an output interface.

3. A program element embodied on a non-transitory computer-readable medium for selecting echoes from an echo list in order to continue at least one track formed by at least one progression over time of at least one echo of a plurality of past echo functions, which program element, when it is executed on a processor, executes the method which includes the following steps:
   receiving with a receiving device an echo list, the echo list including a plurality of current echoes, at least two current echoes of the plurality of current echoes including a relationship correlation;
   determining with a tracking device a degree of agreement of at least one current echo of the plurality of current echoes with the at least one past echo of the at least one past echo function;
   selecting with the tracking device a combination of echoes such that the least one track is suitably continued,
   wherein in the selection of the combination of the at least one current echo to the at least one past echo from the past echo function the relationship correlation between the at least two current echoes of the plurality of current echoes is taken into account; and
   providing the position of the selected echoes at an output interface.

4. A device for selecting echoes from an echo list in order to continue at least one track formed by at least one progression over time of at least one echo of a plurality of past echo functions, the device comprising:
   a receiving device configured for receiving an echo list, the echo list including a plurality of current echoes, at least two current echoes of the plurality of current echoes including a relationship correlation;
   a tracking device configured for determining a degree of agreement of at least one current echo of the plurality of current echoes with the at least one past echo of the at least one past echo function, the tracking device being configured for selecting a combination of echoes such that the at least one track is suitably continued,
   wherein the receiving device is connected with the tracking device, and
   wherein in the selection of combination of the at least one current echo the relationship correlation between the at least two current echoes of the plurality of current echoes is taken into account; and
   an output interface configured for providing the position of the selected echoes.

5. The device according to claim 4, wherein the tracking device is configured for evaluating the degree of agreement with costs.

6. The device according to claim 4, wherein the degree of agreement is an amplitude difference between an amplitude of the current echo and an amplitude of the echo of the past echo function.

7. The device according to claim 4, wherein the degree of agreement is a location difference between the location of the current echo and the location of the echo of the past echo function.

8. The device according to claim 4, wherein the tracking device is configured for selecting the combination by means of carrying out the Munkres algorithm in combination with taking into account the relationship correlation.

9. The device according to claim 4, wherein the tracking device is configured for selecting the combination by using the following steps:
   forming at least one echo combination from the plurality of current echoes taking into account the relationship correlation
   determining a favorable echo combination; and
   selecting the echo combination from the at least one echo combination so that the echo combination comprises the lowest overall costs.

10. The device according to claim 4, wherein the relationship correlation between the at least two current echoes of the plurality of current echoes relates to a different detailing degree of a decomposition of the echo function.

11. The device according to claim 4, wherein the echo list is a multiple echo list comprising at least two determined echoes, wherein determining of at least one of a first echo and a second echo includes the following steps:
   decomposing a received echo function into at least one detail function, each of the at least one detail functions including a plurality of coefficients, each of the at least one detail functions representing a different degree of detail of the echo function,
   finding a characteristic feature for an echo in a detail function,
   determining an echo region using a found characteristic feature in the echo function, and providing the echo region.

12. The device according to claim 4, wherein the relationship correlation relates to the position relating to a threshold value function.

13. An arrangement, comprising:
   a device configure to select echoes from an echo list in order to continue at least one track formed by at least one progression over time of at least one echo of a plurality of past echo functions, the device including a receiving device, a tracking device and an output interface,
   wherein the receiving device is configured for receiving an echo list, the echo list including a plurality of current echoes, at least two current echoes of the plurality of current echoes including a relationship correlation,
   wherein the tracking device is configured for determining a degree of agreement of at least one current echo of the plurality of current echoes with the at least one past echo of the at least one past echo function, the tracking device being configured for selecting a combination of echoes such that the at least one track is suitably continued,
   wherein the receiving device is connected with the tracking device,
   wherein in the selection of the assignment of the at least one current echo to the at least one past echo of the past echo function the relationship correlation between the at least two current echoes of the plurality of current echoes is taken into account; and
   wherein the output interface is configured for providing the position of the selected echoes.

* * * * *